US012264276B2

(12) United States Patent
Chuang et al.

(10) Patent No.: US 12,264,276 B2
(45) Date of Patent: Apr. 1, 2025

(54) LIQUID-CRYSTAL MEDIUM COMPRISING POLYMERIZABLE COMPOUNDS

(71) Applicant: MERCK PATENT GMBH, Darmstadt (DE)

(72) Inventors: Min Tzu Chuang, Taipei (TW); I-Wen Chen, Taipei (TW); Cheng-Jui Lin, Taipei (TW); Jer-Lin Chen, Taipei (TW); Kuang-Ting Chou, Taipei (TW)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 18/077,799

(22) Filed: Dec. 8, 2022

(65) Prior Publication Data

US 2023/0183571 A1 Jun. 15, 2023

(30) Foreign Application Priority Data

Dec. 10, 2021 (EP) .................................... 21213602

(51) Int. Cl.

*G02F 1/1333* (2006.01)
*C09K 19/12* (2006.01)
*C09K 19/32* (2006.01)

(52) U.S. Cl.

CPC .............. *C09K 19/12* (2013.01); *C09K 19/32* (2013.01); *C09K 2019/122* (2013.01); *C09K 2019/123* (2013.01); *C09K 2219/15* (2013.01)

(58) Field of Classification Search

CPC ........ C09K 19/12; C09K 19/32; C09K 19/04; C09K 19/3066; C09K 19/3003; C09K 19/3405; C09K 19/586; C09K 19/3804; C09K 2019/122; C09K 2019/123; C09K 2019/124; C09K 2019/3009; C09K 2019/3098; C09K 2019/3004; C09K 2019/301; C09K 2019/3015; C09K 2019/3016; C09K 2019/3021; C09K 2019/3027; C09K 2019/3408; C09K 2019/3422; C09K 2019/3491; C09K 2019/0448; C09K 2019/44; C09K 2019/127; G02F 1/1333; G02F 1/1337

See application file for complete search history.

(56) References Cited

U.S. PATENT DOCUMENTS

| | | | | |
|---|---|---|---|---|
| 11,312,909 | B2 | 4/2022 | Tong et al. | |
| 2017/0121606 | A1 | 5/2017 | Tong et al. | |
| 2023/0183571 | A1* | 6/2023 | Chuang .................. | C09K 19/04 252/299.66 |

FOREIGN PATENT DOCUMENTS

| | | | |
|---|---|---|---|
| EP | 3162875 | A1 | 5/2017 |

OTHER PUBLICATIONS

Search report in corresponding EP22212177.4 dated Apr. 17, 2023 (pp. 1-6).

* cited by examiner

*Primary Examiner* — Geraldina Visconti

(74) *Attorney, Agent, or Firm* — Millen, White, Zelano & Branigan, P.C.; Brion P. Heaney

(57) ABSTRACT

The present invention relates to an LC medium comprising two or more polymerizable compounds, at least one of which contains a substituent comprising a tertiary OH group, to its use for optical, electro-optical and electronic purposes, in particular in LC displays, especially in LC displays of the PSA (polymer sustained alignment) or SA (self-aligning) mode, to an LC display of the PSA or SA mode comprising the LC medium, and to a process of manufacturing the LC display using the LC medium, especially an energy-saving LC display and energy-saving LC display production process.

20 Claims, No Drawings

LIQUID-CRYSTAL MEDIUM COMPRISING POLYMERIZABLE COMPOUNDS

The present invention relates to an LC medium comprising two or more polymerizable compounds, at least one of which contains a substituent comprising a tertiary OH group, to its use for optical, electro-optical and electronic purposes, in particular in LC displays, especially in LC displays of the PSA (polymer sustained alignment) or SA (self-aligning) mode, to an LC display of the PSA or SA mode comprising the LC medium, and to a process of manufacturing the LC display using the LC medium, especially an energy-saving LC display and energy-saving LC display production process.

The popularity of 8K and gaming monitors leads to an increased need for LC display (LCD) panels having higher refresh rates and thus for LC media having faster response times. Many of these LCD panels are using polymer stabilized (PS) or polymer sustained alignment modes (PSA) modes, like the PS-VA (vertically aligned), PS-IPS (in-plane switching) or PS-FFS (fringe-field switching) mode or modes derived therefrom, or self-aligned (SA) modes like SA-VA which are polymer stabilized.

In the PS or PSA mode a small amount, typically from 0.1 to 1% of one or more polymerizable mesogenic compounds, also known as RMs (reactive mesogens), is added to the LC medium. After filling the LC medium into the display the RMs are then polymerized in situ by UV photopolymerization, while a voltage is applied to the electrodes of the display. Thereby a small tilt angle is generated in the LC molecules of the LC medium, which is stabilized by the polymerized RMs. The UV polymerization process, also referred to as "PSA process", is usually carried out in two steps, a first UV exposure step ("UV1 step"), with application of a voltage, to generate the tilt angle, and a second UV exposure step ("UV2 step"), without application of a voltage, to complete polymerization of the RMs.

In the SA-VA mode the alignment layers are omitted in the display. Instead, a small amount, typically 0.1 to 2.5%, of a self alignment (SA) additive is added to the LC medium, which induces the desired alignment, for example homeotropic or planar alignment, in situ by a self assembling mechanism. The SA additive usually contains an organic, mesogenic core group and attached thereto one or more polar anchor groups, for example hydroxy, carboxy, amino or thiol groups, which are capable of interacting with the substrate surface, causing the additives on the substrate surface to align and induce the desired alignment also in the LC molecules. The SA additive may also contain one or more polymerizable groups that can be polymerized under similar conditions as the RMs used in the PSA process. The LC medium may in addition to the SA additive also contain one or more RMs.

One method to reduce the response times in LC media for the PSA mode is for example by using compounds with an alkenyl group as components of the LC host mixture. However, this may lead to a decrease of the reliability of the mixture when being exposed to the UV light need to polymerize the RMs additives, which is believed to be caused by a reaction of the alkenyl compound with the polyimide of the alignment layer, which is especially problematic when using shorter UV wavelengths of less than 320 nm. Therefore there is a tendency to use longer UV wavelengths for the PSA process.

UV-LED lamps have also been proposed for use in the PSA process, as they show less energy consumption, longer lifetime and more effective optical energy transfer to the LC medium due to the narrower emission peak, which allows to reduce the UV intensity and/or UV irradiation time. This enables a reduced tact time and savings in energy and production costs. The UV lamps currently available have higher wavelength emission, for example at 365 nm.

Therefore, there is a need for polymerizable LC media which contain RMs that can be effectively polymerized at longer UV wavelengths.

In addition, there is a great demand for PSA or SA displays, and LC media and polymerizable compounds for use in such PSA or SA displays, which enable a high specific resistance at the same time as a large working-temperature range, short response times, even at low temperatures, and a low threshold voltage, a low tilt angle, a high tilt stability, a multiplicity of grey shades, high contrast and a broad viewing angle, have high reliability and high values for the VHR after UV exposure, and, in case of the polymerizable compounds, have low melting points and a high solubility in the LC host mixtures. In displays for mobile applications, it is especially desired to have available LC media that show low threshold voltage and high birefringence.

The present invention is based on the object of providing novel suitable materials, in particular RMs and LC media comprising the same, for use in PSA or SA displays, which do not have the disadvantages indicated above or do so to a reduced extent.

In particular, the invention is based on the object of LC media comprising RMs for use in PSA or SA displays, which enable very high specific resistance values, high VHR values, high reliability, low threshold voltages, short response times, high birefringence, show good UV absorption especially at longer UV wavelengths, preferably in the range from 340 to 380 nm, enable quick and complete polymerization of the RMs, allow the generation of a low tilt angle, preferably as quickly as possible, enable a high stability of the tilt angle even after longer time and/or after UV exposure, reduce or prevent the occurrence of "image sticking" and "ODF mura" in the display, and in case of the RMs polymerize as rapidly and completely as possible and show a high solubility in the LC media which are typically used as host mixtures in PSA or SA displays.

A further object of the invention is to provide LC media for use in PSA displays wherein the RMs exhibit both fast polymerization speed and good reliability parameters, like high VHR or good tilt stability.

A further object of the invention is the provision of novel LC media containing RMs, in particular for optical, electro-optical and electronic applications, and of suitable processes and intermediates for the preparation thereof.

A further object of the invention is to provide LC media containing RMs which show one or more of the following advantageous effects:

- they generate a tilt angle to a desired degree after exposure to UV-light,
- they lead to good tilt stability,
- they lead to high VHR,
- they show good UV absorption especially at longer UV wavelengths, especially in the range from 340 to 400 nm, and enable quick and complete polymerization of the RMs at these wavelengths,
- they are suitable for use in PSA displays prepared by a polymerization process using UV-LED lamps,
- they enable good control of the the time range of the first UV-step in which the tilt angle is generated during UV-processing,
- they enable to keep the time range of the second UV-step, in which any residual RM is polymerized and the tilt angle is stabilized, as short as possible to minimize energy consumption and production cost, after the first and second UV-exposure step, the residue RMs have less or no negative effects on the LC-mixture performance parameters, such as VHR, tilt stability, etc.

It was found that one or more of these objects could be achieved by providing LC media comprising polymerizable compounds as disclosed and claimed hereinafter.

The invention relates to an LC medium comprising one or more polymerizable compounds selected from formula IA and one or more polymerizable compounds selected from formulae IB and IC P-Sp-$M^1$-Sp-P IA P-Sp-$M^2$-Sp-P IB P-Sp-$M^3$-Sp-P IC wherein the individual radicals, independently of each other and on each occurrence identically or differently, have the following meanings P a polymerizable group, Sp a spacer group or a single bond, $M^1$, $M^2$, $M^3$ a group each individually selected from the following formulae

1

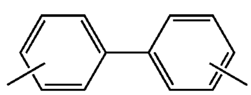

2

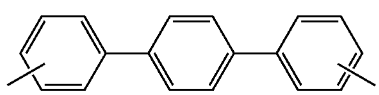

3

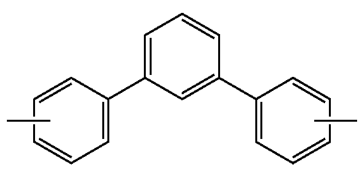

wherein the benzene rings are optionally substituted by one or more groups L or P-Sp-, L F, Cl, —ON, P—Sp-, or straight chain, branched or cyclic alkyl having 1 to 25 C atoms, wherein one or more non-adjacent $CH_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P, F or Cl, wherein in the compounds of formula IA the group $M^1$ and/or at least one spacer group Sp is at least monosubstituted with $L^a$, $L^a$ —C($R^{aa}$)($R^{bb}$)OH, $R^{aa}$, $R^{bb}$ straight-chain alkyl with 1 to 6 C atoms and in the compounds of formula IC the group $M^3$ is at least monosubstituted with $L^b$, $L^b$ straight-chain or branched alkenyl with 2 to 7 C atoms, preferably 3 or 4 C atoms.

The invention further relates to an LC medium having negative dielectric anisotropy and comprising one or more polymerizable compounds selected from formula IA, one or more polymerizable compounds selected from formulae IB and IC, and further comprising one or more compounds of formula II

II

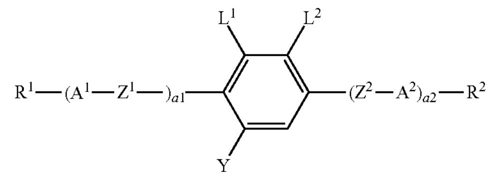

wherein the individual radicals, independently of each other and on each occurrence identically or differently, have the following meanings $R^1$ and $R^2$ straight chain, branched or cyclic alkyl having 1 to 25 C atoms, wherein one or more non-adjacent $CH_2$-groups are each optionally replaced by —O—, —S—, —CO—, —CO—O—, —O—CO—, —O—CO—O—, $CR^0$═$CR^{00}$—, —C≡C—,

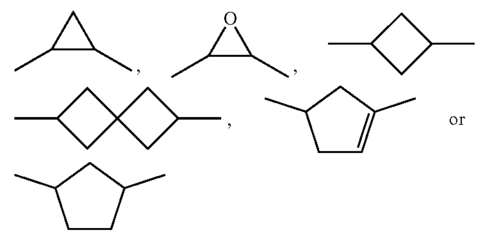

in such a manner that O- and/or S-atoms are not directly connected with each other, and wherein one or more H atoms are each optionally replaced by F or Cl, $R^1$ and $R^2$ are preferably alkyl or alkoxy having 1 to 6 C atoms, $R^0$ and $R^{00}$ H or alkyl with 1 to 12 C atoms, preferably H, $A^1$ and $A^2$ a group selected from the following formulae

A1

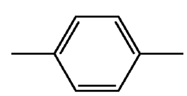

A2

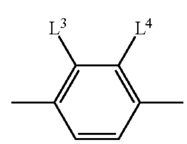

A3

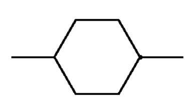

A4

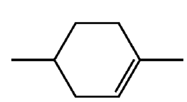

A5

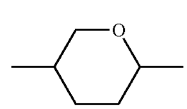

-continued

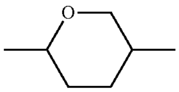

A6

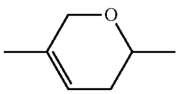

A7

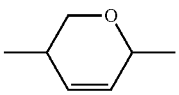

A8

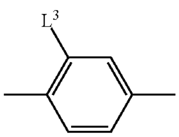

A9

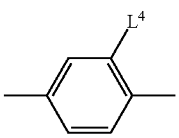

A10

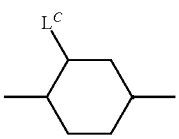

A11

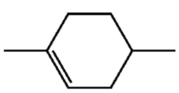

A12

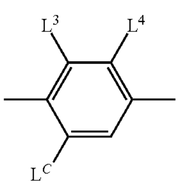

A13

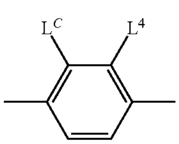

A14

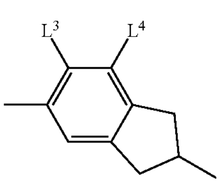

A15

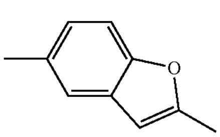

A16 preferably from formulae A1, A2, A3, A4, A5, A6, A9 and A10, very preferably from formulae A1, A2, A3, A4, A5, A9 and A10, $Z^1$ and $Z^2$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond, $L^1$, $L^2$, $L^3$ and $L^4$ F, Cl, $OCF_3$, $CF_3$, $CH_3$, $CH_2F$ or $CHF_2$, preferably F or Cl, very preferably F, Y H, F, Cl, $CF_3$, $CHF_2$ or $CH_3$, preferably H or $CH_3$, very preferably H, $L^C$ $CH_3$ or $OCH_3$, preferably $CH_3$, a1 1 or 2, a2 0 or 1.

The invention further relates to the use of the LC medium as described above and below in LC displays of the PSA or SA mode.

The invention furthermore relates to a process for preparing an LC medium as described above and below, comprising the steps of mixing one or more polymerizable compounds of formula IA with one or more polymerizable compounds selected from formulae IB and IC, and optionally one or more compounds of formula II, and optionally with further LC compounds and/or additives.

The invention furthermore relates to an LC display comprising an LC medium according to the invention as described above and below, which is a PSA or SA display, preferably a PS-VA, PS-IPS, PS-FFS or SA-VA display.

The invention furthermore relates to an LC display comprising an LC medium as described above and below wherein the polymerizable compounds are present in polymerized form, which is preferably a PSA or SA display, very preferably a PS-VA, PS-IPS, PS-FFS or SA-VA display.

The invention furthermore relates to an LC display of the PSA type comprising two substrates, at least one which is transparent to light, an electrode provided on each substrate or two electrodes provided on only one of the substrates, and located between the substrates a layer of an LC medium as described above and below, wherein the polymerizable compounds are polymerized between the substrates of the display by UV photopolymerization.

The invention furthermore relates to a process for manufacturing an LC display as described above and below, comprising the steps of filling or otherwise providing an LC medium as described above and below between the substrates of the display, and polymerizing the polymerizable compounds, preferably by irradiation with UV light, preferably having a wavelength >340 nm, preferably >360 nm, preferably in the range from 340 to 400 nm, more preferably in the range from 350 to 390 nm, very preferably in the range from 360 to 380 nm, most preferably in the range from 360 to 368 nm, and preferably while a voltage is applied to the electrodes of the display.

The invention furthermore relates to a process for manufacturing an LC display as described above and below, wherein irradiation of the polymerizable compounds is carried out using a UV-LED lamp.

The LC media according to the present invention show the following advantageous properties when used in PSA displays:

- a suitable tilt generation which is inside a certain process window,
- fast polymerization leading to minimal residues of RM after the UV-process,
- a high voltage-holding-ratio after the UV-process,
- good tilt stability,
- good VHR,
- sufficient stability against heat,
- sufficient solubility in organic solvents typically used in display manufacture.

In addition the LC media according to the present invention show one or more of the following advantageous properties:

they generate a tilt angle to a desired degree after exposure to UV-light, they provide a high tilt stability, they show good UV absorption especially at longer UV wavelengths, preferably in the range from 340 to 400 nm, more preferably in the range from 350 to 390 nm, very preferably in the range from 360 to 380 nm, most preferably in the range from 360 to 368 nm, and enable quick and complete polymerization of the RMs at these wavelengths, they are suitable for use in PSA displays prepared by a polymerization process using UV-LED lamps, they enable to control the time range of the first UV-step in which the tilt angle is generated during UV-processing, they keep the time range of the second UV-step as short as possible to minimize production cost, after the first and second UV-exposure step, they reduce or avoid any negative effects of the residual RM on the LC mixture performance parameters, such as VHR, tilt stability, etc.

An alkenyl group in the compounds of formula II or other components of the LC medium as disclosed below is not considered to be within the meaning of the term "polymerizable group" as used herein. The conditions for the polymerization of the polymerizable compounds of the LC medium are preferably selected such that alkenyl substituents do not participate in the polymerization reaction. Preferably the LC media disclosed and claimed in the present application do not contain an additive that initiates or enhances the participation of the alkenyl group in a polymerization reaction.

Unless stated otherwise, the polymerizable compounds and the compounds of formula II are preferably selected from achiral compounds.

As used herein, the expression "UV light having a wavelength of" followed by a given range of wavelengths (in nm), or by a given lower or upper wavelength limit (in nm), means that the UV emission spectrum of the respective radiation source has an emission peak, which is preferably the highest peak in the respective spectrum, in the given wavelength range or above the given lower wavelength limit or below the given upper wavelength limit and/or that the UV absorption spectrum of the respective chemical compound has a long or short wavelength tail that extends into the given wavelength range or above the given lower wavelength limit or below the given upper wavelength limit.

As used herein, the term "full width half maximum" or "FWHM" means the width of a spectrum curve measured between those points on the y-axis which are half the maximum amplitude.

As used herein, the term "substantially transmissive" means that the filter transmits a substantial part, preferably at least 50% of the intensity, of incident light of the desired wavelength(s). As used herein, the term "substantially blocking" means that the filter does not transmit a substantial part, preferably at least 50% of the intensity, of incident light of the undesired wavelengths. As used herein, the term "desired (undesired) wavelength" e.g. in case of a band pass filter means the wavelengths inside (outside) the given range of $\lambda$, and in case of a cut-off filter means the wavelengths above (below) the given value of $\lambda$.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display), and will be understood to be inclusive of "pretilt" and "pretilt angle". The tilt angle here denotes the average angle (<90°) between the longitudinal molecular axes of the LC molecules (LC director) and the surface of the plane-parallel outer plates which form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

An SA-VA display according to the present invention will be of the polymer stabilised mode as it contains, or is manufactured by use of, an LC medium containing RMs of formula IA and formula IB and/or formula IC. Consequently as used herein, the term "SA-VA display" when referring to a display according to the present invention will be understood to refer to a polymer stabilised SA-VA display even if not explicitly mentioned.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure App. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure App. Chem.* 2001, 73(5), 888 and C. Tschierske, G. Pelzl, S.

Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

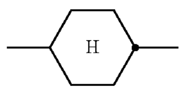

denotes a trans-1,4-cyclohexylene ring, and

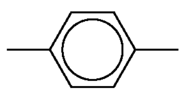

denotes a 1,4-phenylene ring.

In a group

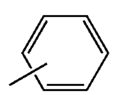

the single bond shown between the two ring atoms can be attached to any free position of the benzene ring.

If in the formulae shown above and below a group $R^{1-13}$, $R^{41}$, $R^{42}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If in the formulae shown above and below a group $R^{1-13}$, $R^{41}$, $R^{42}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, or L denotes an alkyl radical wherein one or more $CH_2$ groups are each replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

If in the formulae shown above and below a group $R^{1-13}$, $R^{41}$, $R^{42}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, or L denotes an alkoxy or oxaalkyl group it may also contain one or more additional oxygen atoms, provided that oxygen atoms are not linked directly to one another.

In another preferred embodiment, one or more of $R^{1-13}$, $R^{41}$, $R^{42}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$ or L are selected from the group consisting of

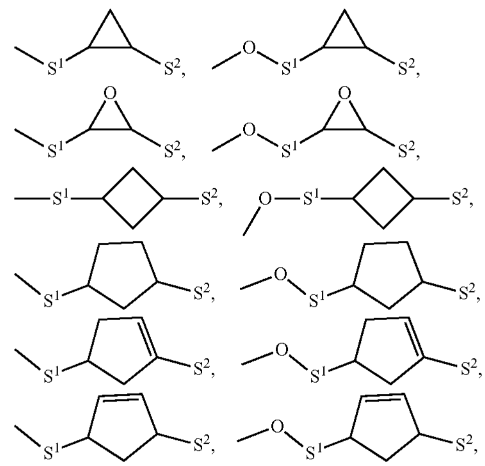

—$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

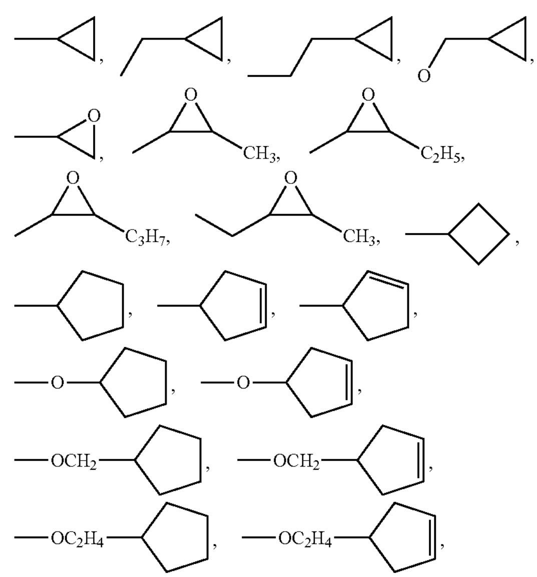

—$OCH_2OCH_3$, —$O(CH_2)_2OCH_3$, —$O(CH_2)_3OCH_3$, —$O(CH_2)_4OCH_3$, —$O(CH_2)_2F$, —$O(CH_2)_3F$, —$O(CH_2)_4F$.

If in the formulae shown above and below a group $R^{1-13}$, $R^{41}$, $R^{42}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, or L denotes an alkyl radical in which one $CH_2$ group has been replaced by —CH═CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If in the formulae shown above and below a group $R^{1-13}$, $R^{41}$, $R^{42}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, or L denotes an alkyl or alkenyl radical which is at least monosubstituted by halogen, this radical is preferably straight-chain, and halogen is preferably F or Cl.

In the case of polysubstitution, halogen is preferably F. The resultant radicals also include perfluorinated radicals. In the case of monosubstitution, the fluorine or chlorine substituent may be in any desired position, but is preferably in the ω-position.

Halogen is preferably F or Cl, very preferably F.

The group —$CR^0$═$CR^{00}$— is preferably —CH═CH—.

—CO—, —C(═O)— and —C(O)— denote a carbonyl group, i.e.

Preferred substituents L, are, for example, F, Cl, —ON, P—Sp-, or straight chain, branched or cyclic alkyl having 1 to 25 C atoms, wherein one or more non-adjacent $CH_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P, F or Cl.

Particularly preferred substituents L are, for example, F, Cl, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, and $OC_2F_5$.

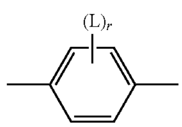

is preferably

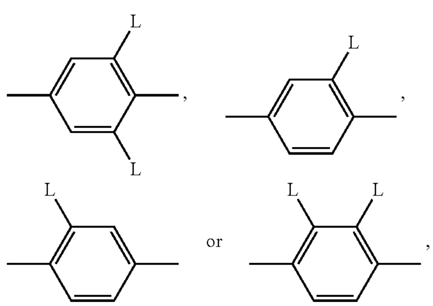

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C═C double bond or —C≡C— triple bond, and groups which are suitable for polymerization with ring opening, such as, for example, oxetane or epoxide groups.

Preferred groups P are selected from the group consisting of $CH_2$═$CW^1$—CO—O—, $CH_2$═$CW^1$—CO—,

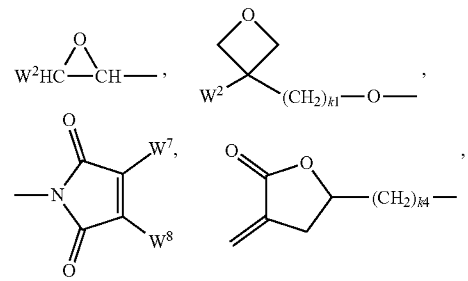

$CH_2$═$CW^2$—$(O)_{k3}$—, $CW^1$═CH—CO—$(O)_{k3}$—, $CW^1$═CH—CO—NH—, $CH_2$═$CW^1$—CO—NH—, $CH_3$—CH═CH—O—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, HO—$CW^2W^3$—, HS—$CW^2W^3$—, $HW^2N$—, HO—$CW^2W^3$—NH—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$═$CW^1$—CO—O—, $CH_2$═$CW^1$—CO—,

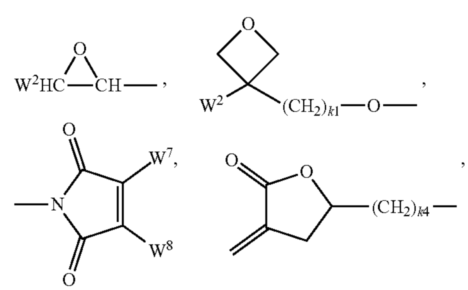

$CH_2$═$CW^2$—O—, $CH_2$═$CW^2$—, $CW^1$═CH—CO—$(O)_{k3}$—, $CW^1$═CH—CO—NH—, $CH_2$═$CW^1$—CO—NH—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH— and $W^4W^5W^6$Si—, in which $W^1$ denotes H, F, Cl, CN, $CF_3$, phenyl or alkyl having 1 to C atoms, in particular H, F, Cl or $CH_3$, $W^2$ denotes H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$═$CW^1$—CO—O—, in particular $CH_2$═CH—CO—O—, $CH_2$═C($CH_3$)—CO—O— and $CH_2$═CF—CO—O—, furthermore $CH_2$═CH—O—, ($CH_2$═CH)$_2$CH—O—CO—, ($CH_2$═CH)$_2$CH—O—,

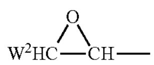
and
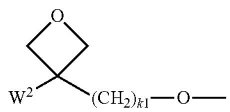
.

Further preferred polymerizable groups P are selected from the group consisting of vinyloxy, acrylate, methacrylate, fluoroacrylate, chloroacrylate, oxetane and epoxide, most preferably from acrylate and methacrylate.

Very preferably all polymerizable groups in the polymerizable compound have the same meaning.

If the spacer group Sp is different from a single bond, it is preferably of the formula Sp"-X", so that the respective radical P-Sp- conforms to the formula P-Sp"-X"—, wherein Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH═CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^2$=$CY^3$—, —C≡C—, —CH═CH—CO—O—, —O—CO—CH═CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —($CH_2$)$_{p1}$—, —($CH_2$)$_{p1}$—O—, —($CH_2$)$_{p1}$—O—CO—, —($CH_2$)$_{p1}$—CO—O—, —($CH_2$)$_{p1}$—O—CO—O—, —($CH_2CH_2O$)$_{q1}$—$CH_2CH_2$—, —$CH_2CH_2$—S—$CH_2CH_2$—, —$CH_2CH_2$—NH—$CH_2CH_2$— or —($SiR^0R^{00}$—O)$_{p1}$—, in which p1 is an integer from 1 to 12, q1 is an integer from 1 to 3, and $R^0$ and $R^{00}$ have the meanings indicated above.

Particularly preferred groups Sp and -Sp"-X"— are —($CH_2$)$_{p1}$—, —($CH_2$)$_{p1}$—O—, —($CH_2$)$_{p1}$—O—CO—, —($CH_2$)$_{p1}$—CO—O—, —($CH_2$)$_{p1}$—O—CO—O—, in which p1 has the meaning indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

In a preferred embodiment of the invention the compounds of formula IA and/or IB and/or IC and their subformulae contain a spacer group Sp that is substituted by one or more polymerizable groups P, so that the group Sp-P corresponds to Sp(P)$_s$, with s being ≥2 (branched polymerizable groups).

Preferred compounds of formula IA, IB and IC according to this preferred embodiment are those wherein s is 2, i.e. compounds which contain a group Sp(P)$_2$. Very preferred compounds of formula IA and IB according to this preferred embodiment contain a group selected from the following formulae:

| | |
|---|---|
| —X-alkyl-CHPP | S1 |
| —X-alkyl-CH(($CH_2$)$_{aa}$P)(($CH_2$)$_{bb}$P) | S2 |
| —X—N(($CH_2$)$_{aa}$P)(($CH_2$)$_{bb}$P) | S3 |
| —X-alkyl-CHP—$CH_2$—$CH_2$P | S4 |
| —X-alkyl-C($CH_2$P)($CH_2$P)—$C_{aa}H_{2aa+1}$ | S5 |
| —X-alkyl-CHP—$CH_2$P | S6 |
| —X-alkyl-CPP—$C_{aa}H_{2aa+1}$ | S7 |
| —X-alkyl-CHPCHP—$C_{aa}H_{2aa+1}$ | S8 |

in which P is as defined in formula I, alkyl denotes a single bond or straight-chain or branched alkylene having 1 to 12 C atoms which is unsubstituted or mono- or polysubstituted by F, Cl or ON and in which one or more non-adjacent $CH_2$ groups may each, independently of one another, be replaced by —C($R^0$)═C($R^0$)—, —C≡C—, —N($R^0$)—, —O—, —S—, —CO—, —CO—O—, —O—CO—, —O—CO—O— in such a way that O and/or S atoms are not linked directly to one another, where $R^0$ denotes H or alkyl having 1 to 20 C atoms, aa and bb each, independently of one another, denote 0, 1, 2, 3, 4, 5 or 6, X has one of the meanings indicated for X", and is preferably O, CO, $SO_2$, O—CO—, CO—O or a single bond.

Preferred spacer groups Sp(P)$_2$ are selected from formulae S1, S2 and S3.

Very preferred spacer groups Sp(P)$_2$ are selected from the following subformulae:

| | |
|---|---|
| —CHPP | S1a |
| —O—CHPP | S1b |
| —$CH_2$—CHPP | S1c |
| —$OCH_2$—CHPP | S1d |
| —CH($CH_2$—P)($CH_2$—P) | S2a |
| —OCH($CH_2$—P)($CH_2$—P) | S2b |
| —$CH_2$—CH($CH_2$—P)($CH_2$—P) | S2c |
| —$OCH_2$—CH($CH_2$—P)($CH_2$—P) | S2d |
| —CO—NH(($CH_2$)$_2$P)(($CH_2$)$_2$P) | S3a |

P is preferably selected from the group consisting of vinyloxy, acrylate, methacrylate, fluoroacrylate, chloroacrylate, oxetane and epoxide, very preferably from acrylate and methacrylate, most preferably from methacrylate.

Further preferably all polymerizable groups P that are present in the same compound have the same meaning, and very preferably denote acrylate or methacrylate, most preferably methacrylate.

Sp preferably denotes a single bond or —$(CH_2)_{p1}$—, —$(CH_2)_{p2}$—CH═CH—$(CH_2)_{p3}$—, —O—$(CH_2)_{p1}$—, —O—CO—$(CH_2)_{p1}$—, or —CO—O—$(CH_2)_{p1}$—, wherein p1 is 2, 3, 4, 5 or 6, preferably 2 or 3, p2 and p3 are independently of each other 0, 1, 2 or 3 and, if Sp is —O—$(CH_2)_{p1}$—, —O—CO—$(CH_2)_{p1}$ or —CO—O—$(CH_2)_{p1}$ the O-atom or CO-group, respectively, is linked to a benzene ring of group $M^1$, $M^2$, or $M^3$.

In a preferred embodiment in the compounds of formula IA and/or IB and/or IC at least one group Sp is a single bond.

In a very preferred embodiment in the compounds of formula IB all groups Sp are a single bond.

In another preferred embodiment in the compounds of formula IA and/or IB and/or IC at least one group Sp is a single bond and at least one group Sp is different from a single bond.

If a group Sp is different from a single bond, it is preferably selected from —$(CH_2)_{p1}$—, —$(CH_2)_{p2}$—CH═CH—$(CH_2)_{p3}$—, —O—$(CH_2)_{p1}$—, —O—CO—$(CH_2)_{p1}$, or —CO—O—$(CH_2)_{p1}$, wherein p1 is 2, 3, 4, 5 or 6, preferably 2 or 3, p2 and p3 are independently of each other 0, 1, 2 or 3 and, if Sp is —O—$(CH_2)_{p1}$—, —O—CO—$(CH_2)_{p1}$ or —CO—O—$(CH_2)_{p1}$ the O-atom or CO-group, respectively, is linked to a benzene ring of group $M^1$, $M^2$, or $M^3$. Very preferably, if Sp is different from a single bond it is selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to a benzene ring of group $M^1$, $M^2$, or $M^3$.

In a preferred embodiment of the invention the compounds of formula IA and its subformulae contain a spacer group Sp that is substituted by one or more, preferably by one, group $L^a$.

In the compounds of formula IA and its subformulae, $R^{aa}$ and $R^{bb}$ preferably denote straight chain alkyl with 1 to 6 C atoms or branched alkyl with 3 to 6 C atoms. More preferably $R^{aa}$ and $R^{bb}$ denote, independently of each other, methyl, ethyl, propyl and butyl, very preferably methyl or ethyl, most preferably methyl.

Further preferred are compounds of formula IA and its subformulae as described above and below, wherein $R^{aa}$ and $R^{bb}$ together with the C atom to which they are attached form a cyclic alkyl group with 3 to 12 C atoms, very preferably a cyclopropyl, cyclobutyl, cyclopentyl or cyclohexyl group.

Very preferably the compounds of formula IA contain a group $L^a$ selected from the following formulae

1

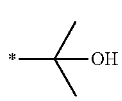

2

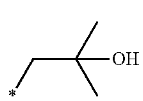

-continued

3

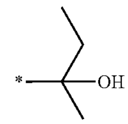

4

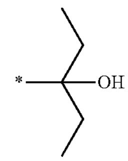

5

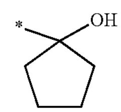

wherein the asterisk denotes the linkage to the adjacent group in the compound of formula IA.

In another preferred embodiment of the invention the compounds of formula IA and its subformulae contain a spacer group Sp that is a linear or branched alkylene with 1 to 12, preferably 1 to 7 C atoms which is substituted by one or more groups $L^a$. Preferred compounds of formula IA according to this preferred embodiment contain a group P-Sp- selected from the following formulae:

| | |
|---|---|
| P—$CHL^a$- | SL1 |
| P—$(CH_2)_{cc}$—O—$CHL^a$- | SL2 |
| P—$(CH_2)_{cc}$—CO—O—$CHL^a$- | SL3 |
| P—$(CH_2)_{cc}$—$CHL^a$- | SL4 |

in which P and $L^a$ are as defined in formula IA or have one of the meanings given above and below, and cc is 1, 2, 3, 4, 5 or 6, preferably 1, 2 or 3.

Preferred compounds of formula IA contain one or more groups P-Sp- selected from formulae SL1, SL2 and SL3, very preferably of formula SL1.

Preferably in the compounds of formula IA, $M^1$ is selected of formula 1 or 2.

Preferred compounds of formula IA are selected from the following subformulae:

IA-1

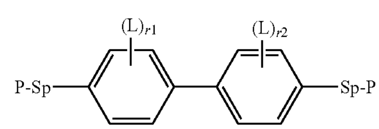

IA-2

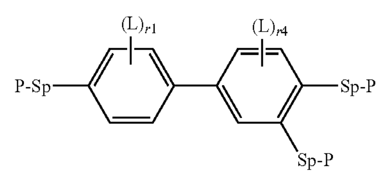

IA-3

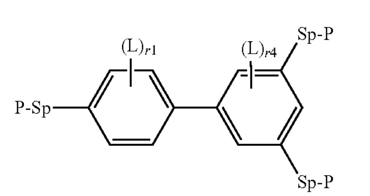

-continued

IA-4

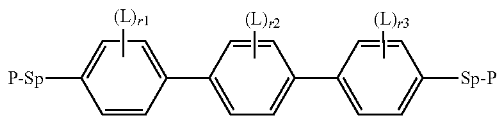

IA-5

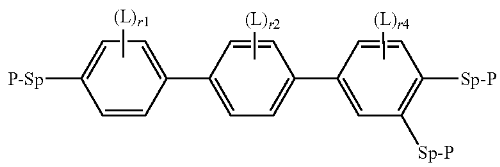

IA-6

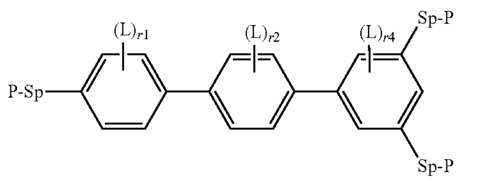

IA-7

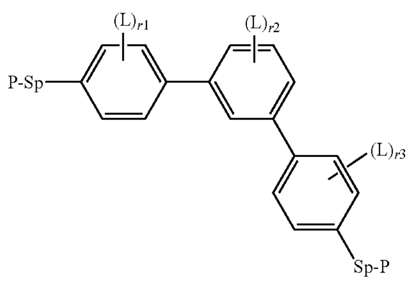

IA-8

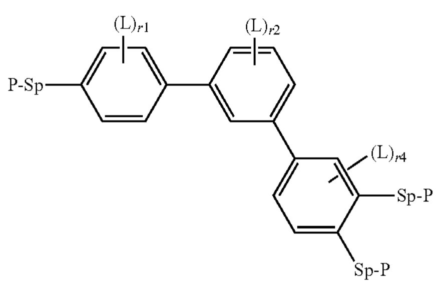

IA-9

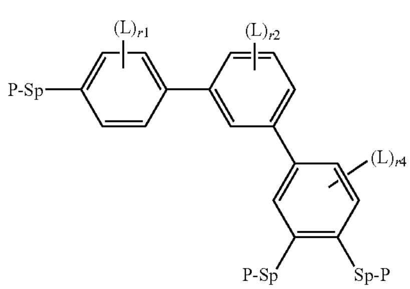

-continued

IA-10

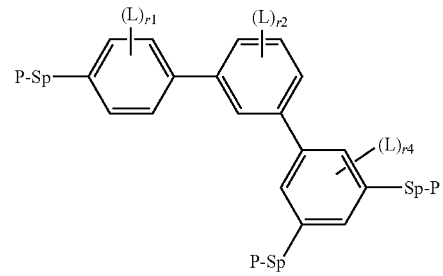

wherein P, Sp and L have the meanings given in formula IA or one of the preferred meanings as given above and below, r1, r2, r3 are independently of each other 0, 1, 2, 3 or 4, r4 is 0, 1, 2 or 3, wherein the compounds contain at least one group Sp that is at least monosubstituted by $L^a$ and/or at least one group L that denotes $L^a$.

Very preferred compounds of formula I are selected from the following subformulae:

IA-1-1

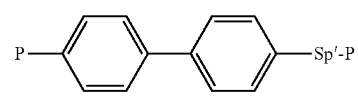

IA-1-2

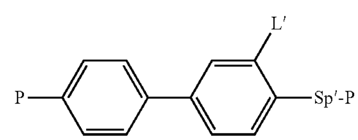

IA-1-3

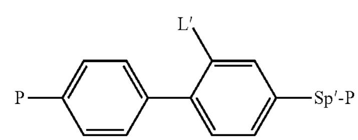

IA-1-4

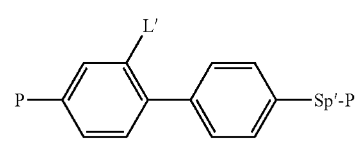

IA-1-5

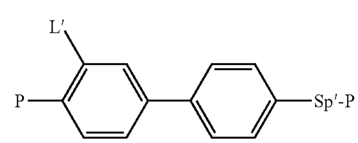

IA-1-6

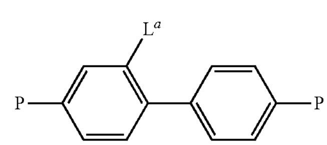

IA-1-7

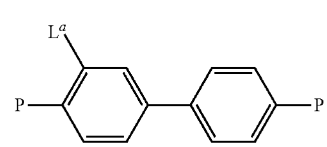

-continued
IA-1-8
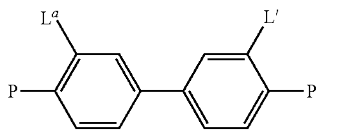
IA-1-9
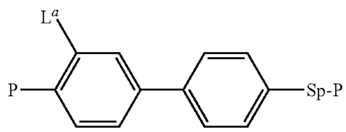
IA-1-10
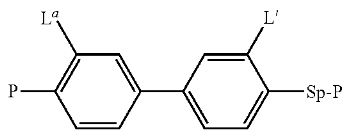
IA-2-1
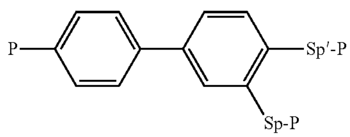
IA-2-2
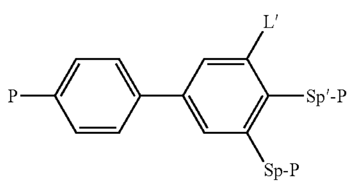
IA-2-3
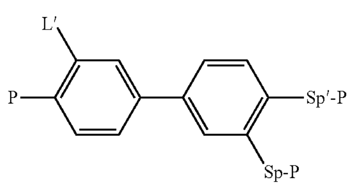
IA-2-4
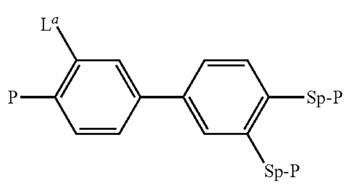
IA-2-5
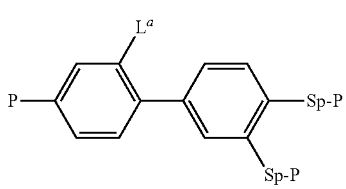
IA-3-1
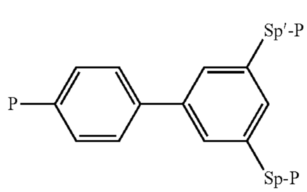
-continued
IA-3-2
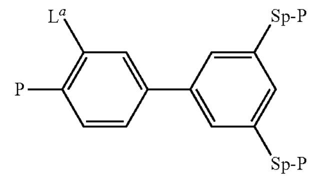
IA-3-3
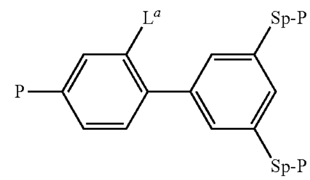
IA-4-1
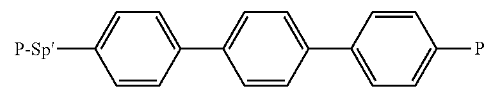
IA-4-2
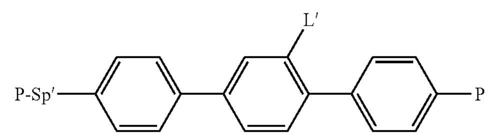
IA-4-3
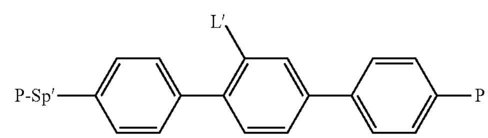
IA-4-4
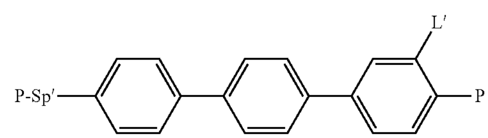
IA-4-5
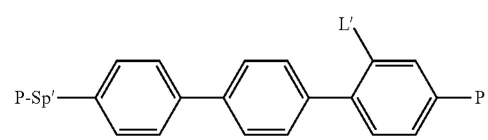
IA-4-6
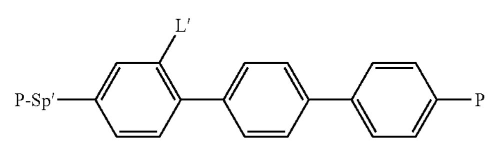
IA-4-7
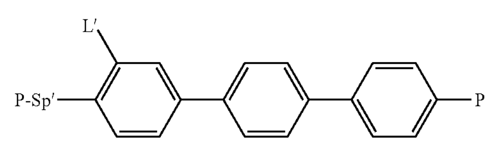
IA-4-8
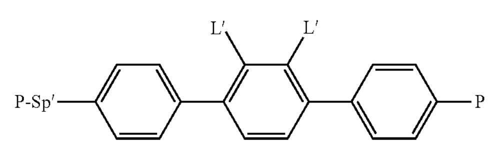

-continued
IA-4-9
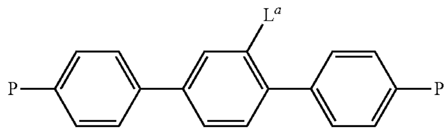
IA-4-10
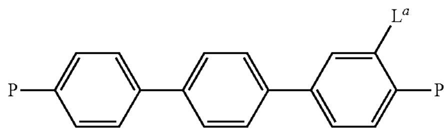
IA-4-11
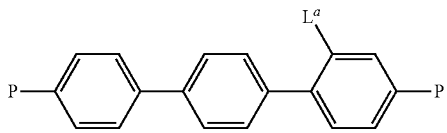
IA-4-12
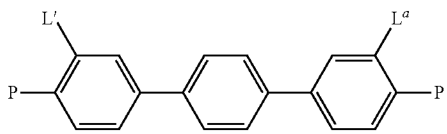
IA-4-13
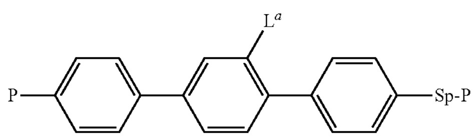
IA-4-14
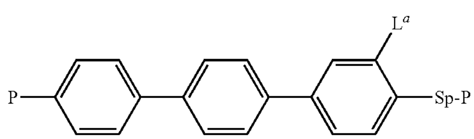
IA-4-15
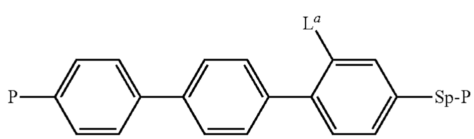
IA-4-16
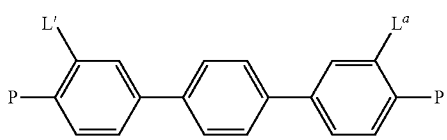
IA-4-17
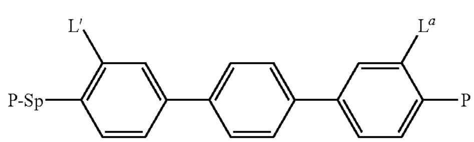
IA-5-1
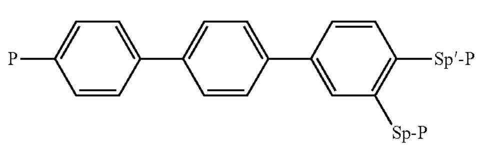
-continued
IA-5-2
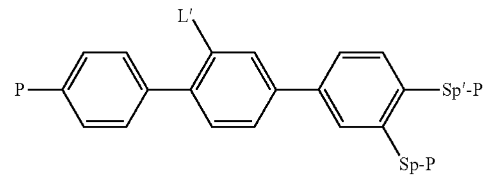
IA-5-3
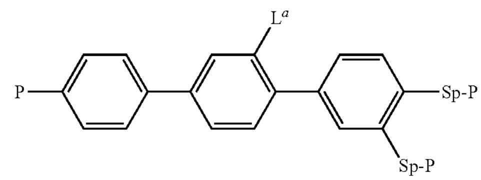
IA-5-4
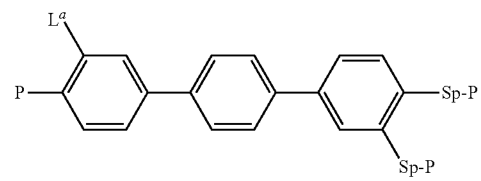
IA-5-5
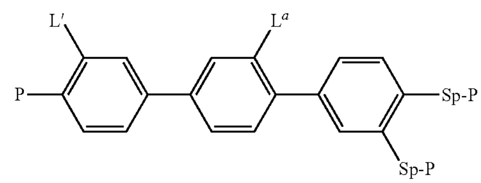
IA-5-6
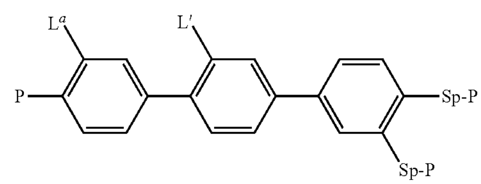
IA-6-1
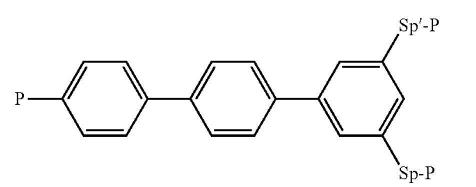
IA-6-2
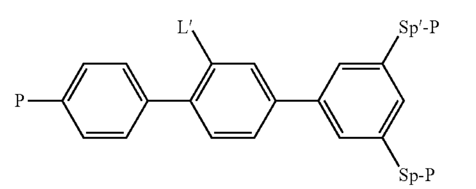
IA-6-3
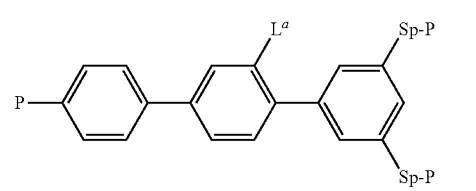

-continued
IA-6-4
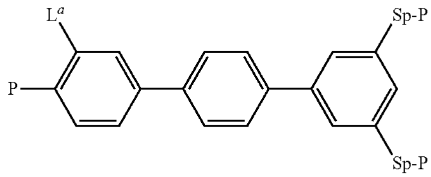
IA-6-5
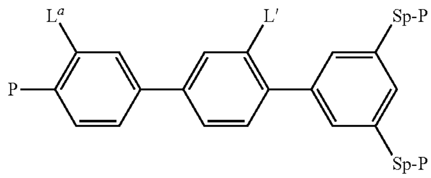
IA-6-6
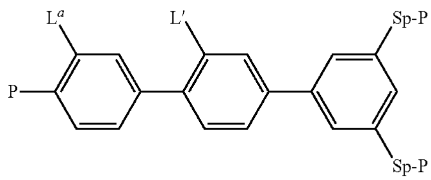
IA-7-1
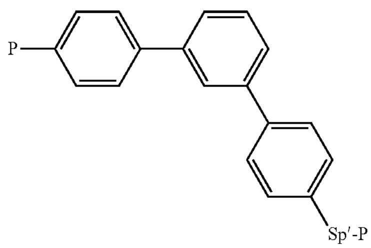
IA-7-2
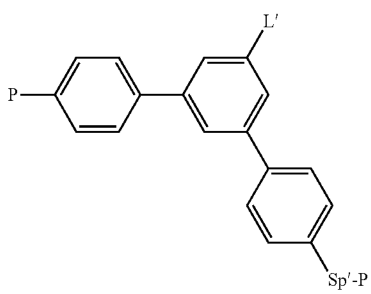
IA-7-3
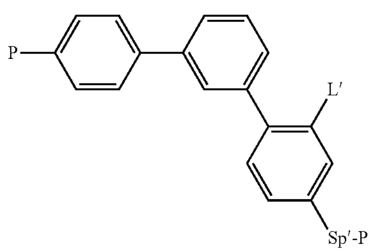
IA-7-4
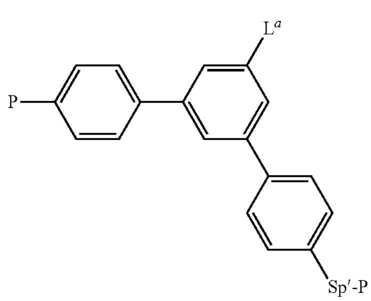
-continued
IA-7-5
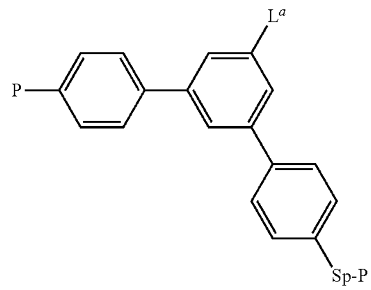
IA-7-6
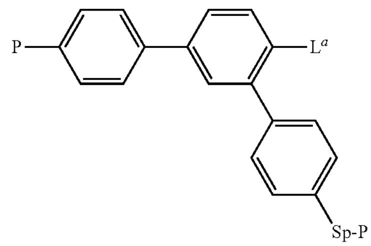
IA-7-7
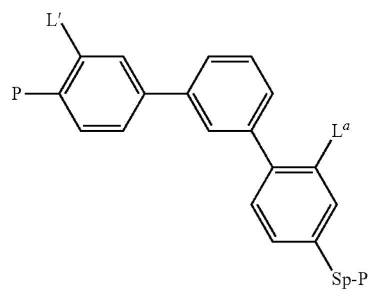
IA-7-8
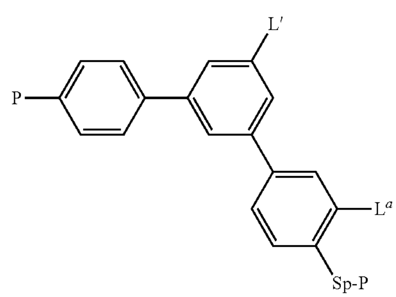
IA-8-1
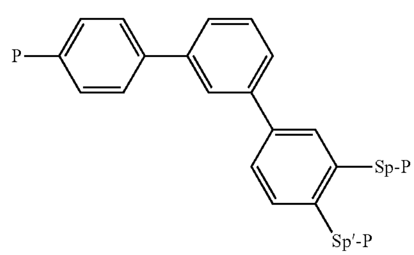

-continued
IA-8-2
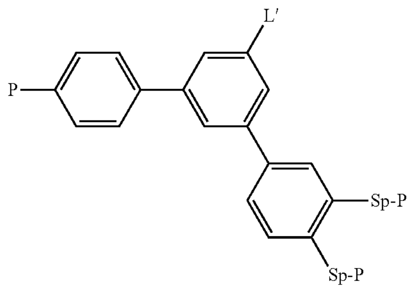
IA-8-3
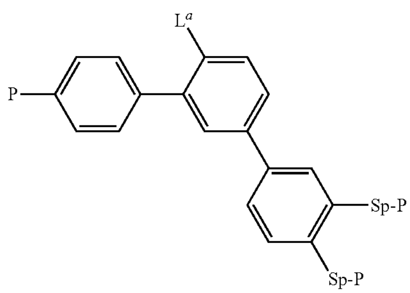
IA-8-4
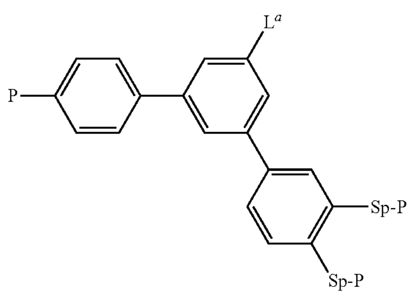
IA-8-5
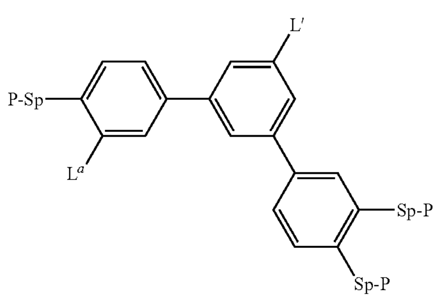
IA-9-1
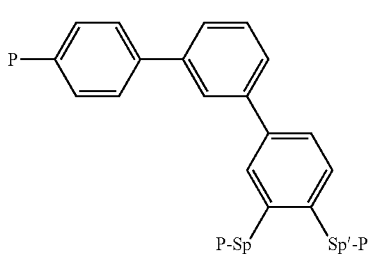
-continued
IA-9-2
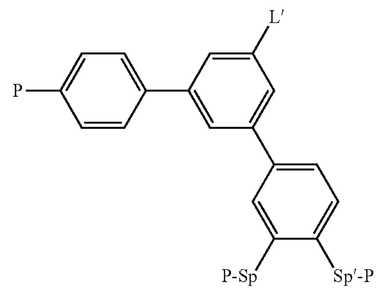
IA-9-3
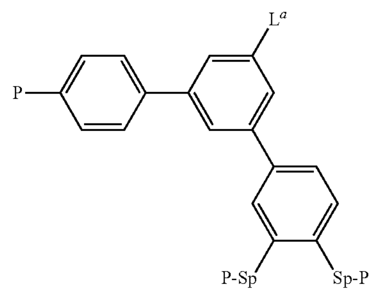
IA-9-4
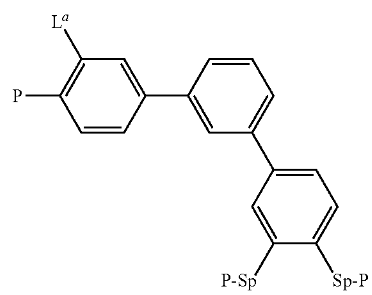
IA-9-5
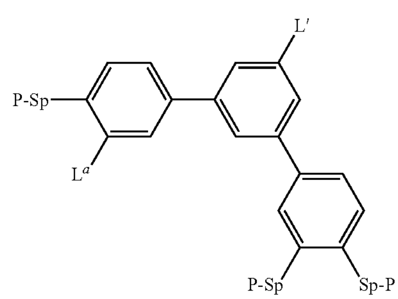
IA-10-1
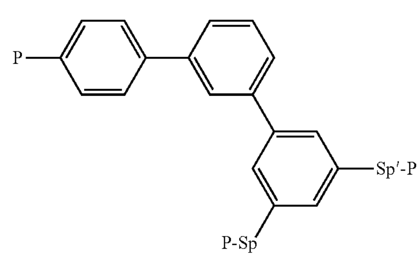

-continued

IA-10-2

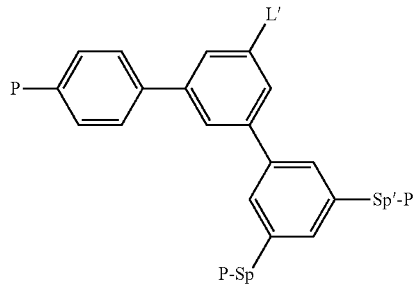

IA-10-3

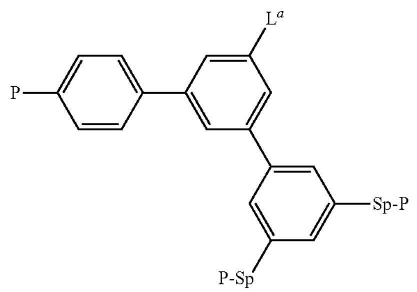

IA-10-4

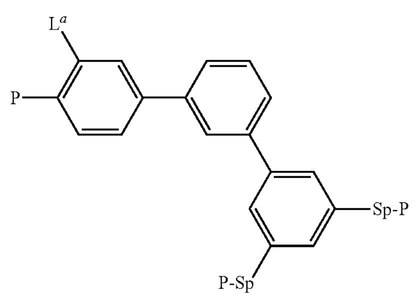

IA-10-5

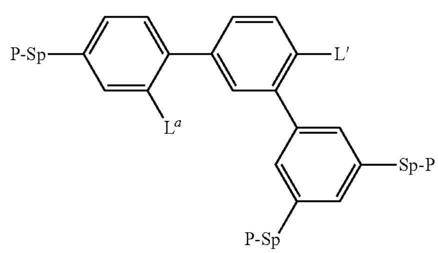

wherein P, Sp and $L^a$ have the meanings given in formula IA or one of their preferred meanings as given above or below, Sp is preferably different from a single bond, Sp' is a spacer group that is substituted by a group $L^a$, and is preferably selected from formulae SL1-SL4, and L' has one of the meanings given for L above or below that is preferably different from $L^a$.

Very preferred compounds of subformulae IA-1-1 to IA-10-5 are those wherein all groups P are identical and denote acrylate or methacrylate, preferably methacrylate, furthermore those wherein Sp is, —$(CH_2)_{p1}$—, —$(CH_2)_{p1}$—O—, —$(CH_2)_{p1}$—O—CO— or —$(CH_2)_{p1}$—CO—O—, in which p1 is an integer from 1 to 12, preferably 1 to 6, and the O— or CO-group is connected to the benzene ring, furthermore those wherein Sp' is selected from formula SL1, furthermore those wherein L' is F.

Further preferred compounds of formula IA and its subformulae are selected from the following preferred embodiments, including any combination thereof:

All groups P in the compound have the same meaning, $M^1$ is of formula 1 or 2, very preferably of formula 1, the compounds contain exactly two polymerisable groups (represented by the groups P), the compounds contain exactly three polymerisable groups (represented by the groups P), P is selected from the group consisting of acrylate, methacrylate and oxetane, very preferably acrylate or methacrylate, the compounds contain at least one, preferably exactly one, group Sp which is substituted by $L^a$, and which is preferably selected from formulae SL1-SL4, very preferably from formulae SL1, SL2 and SL3, Sp, when being different from a single bond, is —$(CH_2)_{p2}$—, —$(CH_2)_{p2}$—O—, $(CH_2)_{p2}$—CO—O—, —$(CH_2)_{p2}$—O—CO—, wherein p2 is 2, 3, 4, 5 or 6, and the O-atom or the CO-group, respectively, is connected to a benzene ring of group $M^1$, Sp' is selected from formula SL1, L denotes F, Cl, $CH_3$, $C_2H_5$, $OCH_3$ or $OC_2H_5$, very preferably F, L' denotes F, Cl, $CH_3$, $C_2H_5$, $OCH_3$ or $OC_2H_5$, very preferably F, $L^a$ denotes —$C(CH_3)_2$—OH, —$C(C_2H_5)_2$—OH or —$C(CH_3)(C_2H_5)OH$, very preferably —$C(CH_3)_2$—OH, r1, r2, r3 and r4 denote 0 or 1, r1+r2 is 0, r1+r2 is 1, r3 is 0, r4 is 0.

Very preferred compounds of formula IA and its subformulae are selected from the following list:

IA1

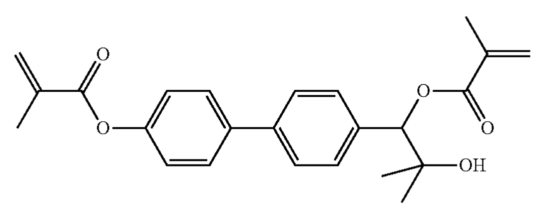

IA2

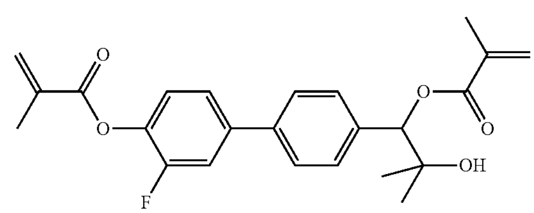

IA3

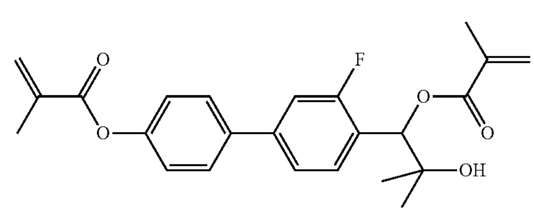

-continued
IA4
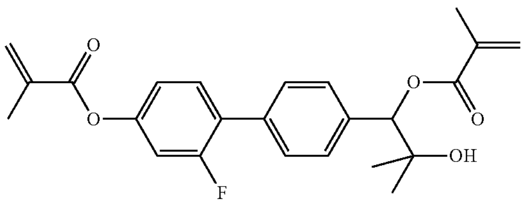
IA5
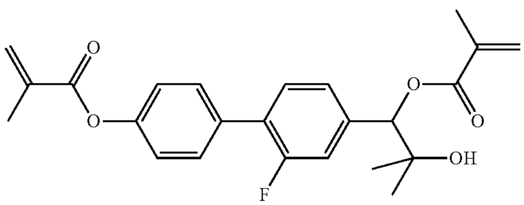
IA6
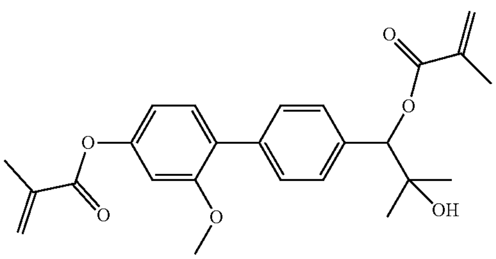
IA7
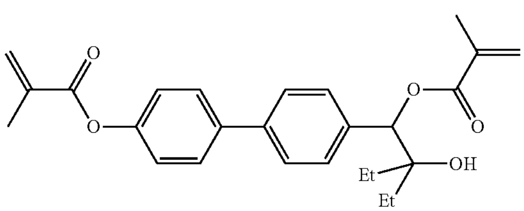
IA8
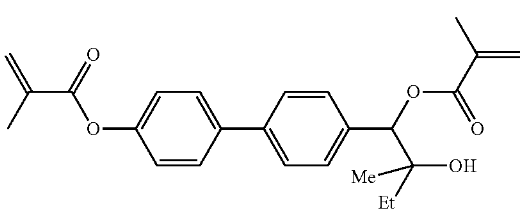
IA9
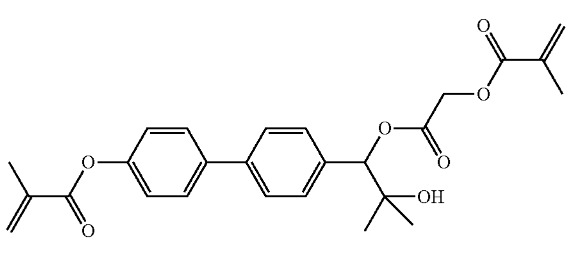
-continued
IA10
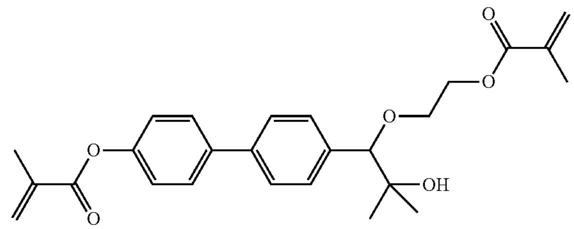
IA11
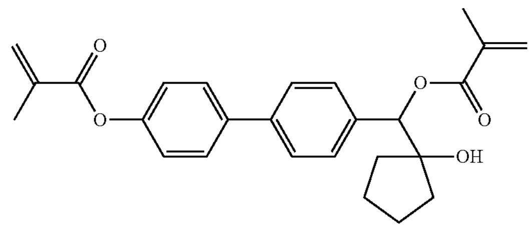
IA12
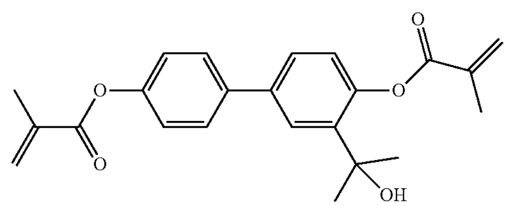
IA13
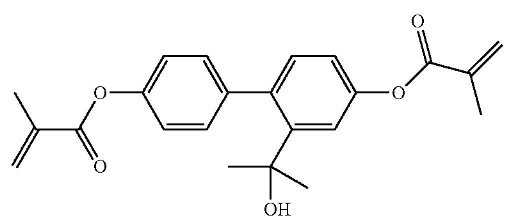
IA14
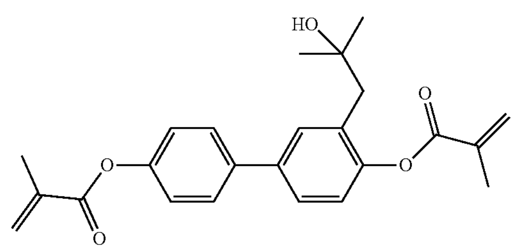
IA15
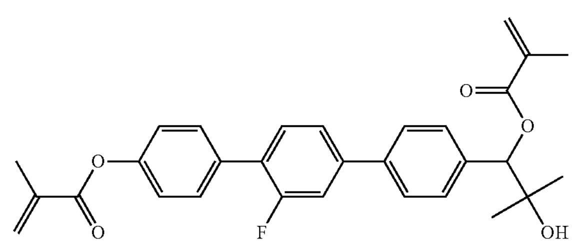

-continued

IA16

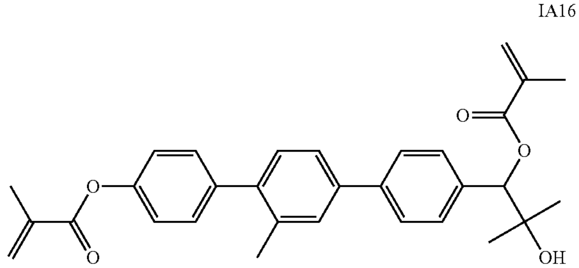

IA17

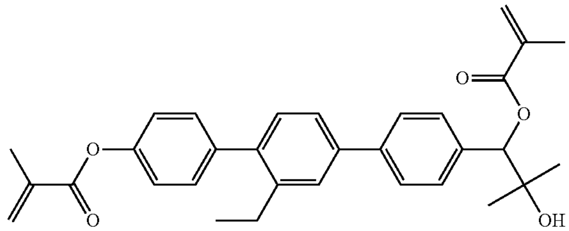

IA18

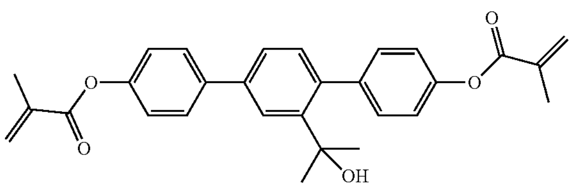

IA19

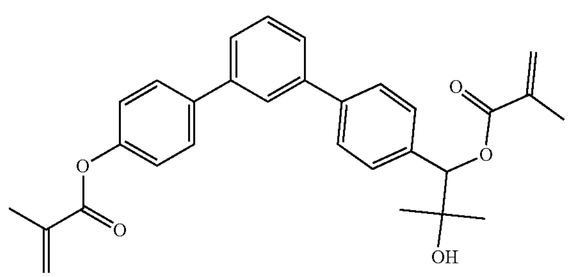

wherein “Me” is methyl and “Et” is ethyl.

In a preferred embodiment the LC medium comprises one or more compounds of formula IB having two polymerizable groups, which are preferably selected from formula IB-D

IB-D

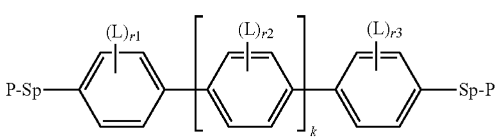

wherein P and Sp have the meanings given in formula IB, L has one of the meanings given in formula IB which is different from P-Sp-, r1, r2 and r3 are independently of each other 0, 1, 2, 3 or 4, preferably 0, 1 or 2, very preferably 0 or 1, and k is 0 or 1.

Preferred compounds of formula IB-D are selected from the following subformulae

IB-D-1

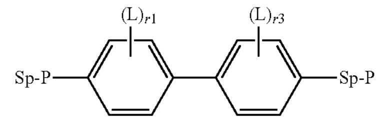

IB-D-2

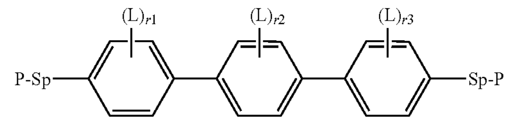

wherein P and Sp, L, r1, r2 and r3 have independently of each other one of the meanings given in formula IB-D or one of their preferred meanings as given above and below.

In the compounds of formula IB-D preferably at least one of r1, r2 and r3 is not 0. P is preferably acrylate or methacrylate, very preferably methacrylate. Preferably all groups P in the formulae IB-D, IB-D-1 and IB-D-2 have the same meaning, and very preferably denote methacrylate. Sp is preferably selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to the benzene ring. L is preferably selected from F, $CH_3$, $OCH_3$, $OC_2H_5$ and $C_2H_5$, very preferably from F.

Very preferred are the compounds of formula IB-D-1.

Further preferred compounds of formula IB-D are selected from the following subformulae

IB-D-1-1

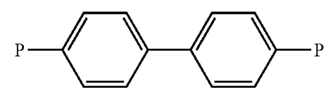

IB-D-1-2

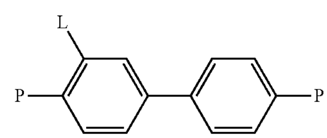

IB-D-1-3

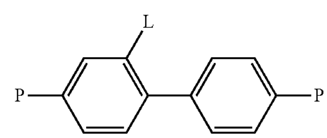

IB-D-1-4

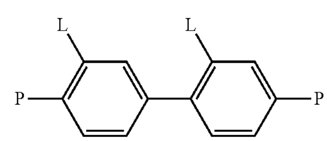

IB-D-1-5

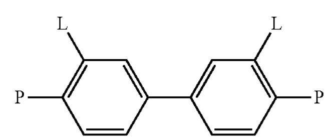

IB-D-1-6

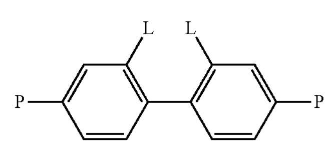

-continued
IB-D-1-7
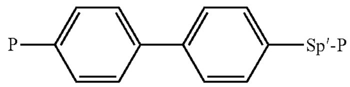
IB-D-1-8
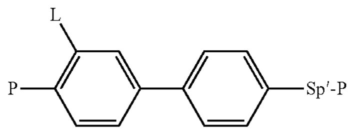
IB-D-1-9
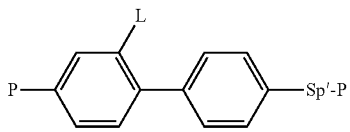
IB-D-1-10
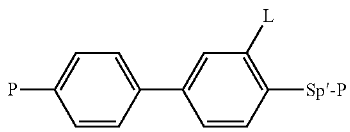
IB-D-1-11
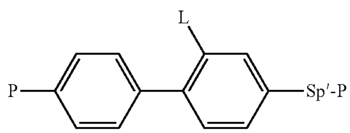
IB-D-1-12
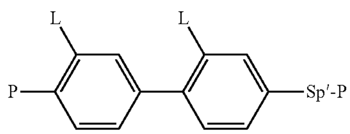
IB-D-1-13
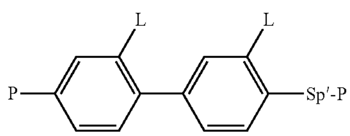
IB-D-1-14
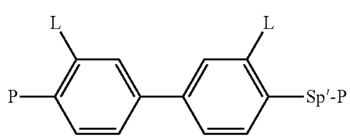
IB-D-1-15
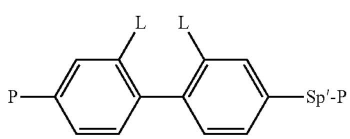
IB-D-2-1
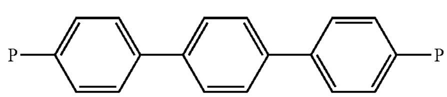
IB-D-2-2
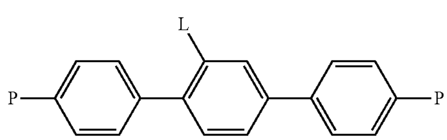
IB-D-2-3
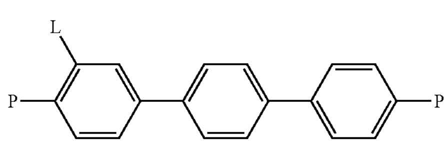
-continued
IB-D-2-4
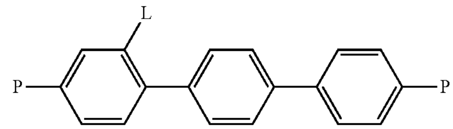
IB-D-2-5
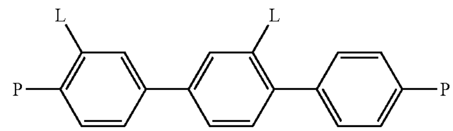
IB-D-2-6
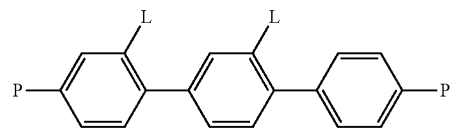
IB-D-2-7
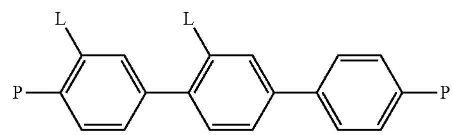
IB-D-2-8
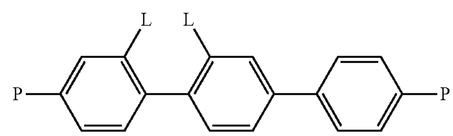
IB-D-2-9
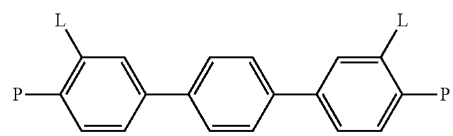
IB-D-2-10
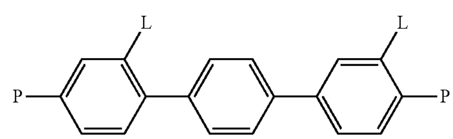
IB-D-2-11
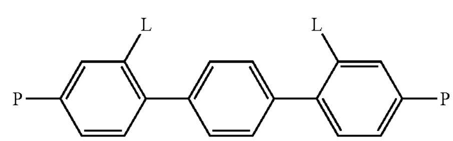
IB-D-2-12
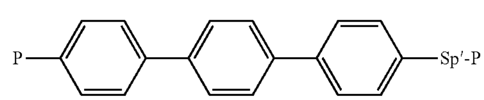
IB-D-2-13
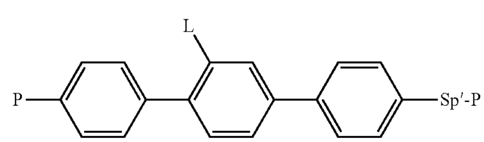
IB-D-2-14
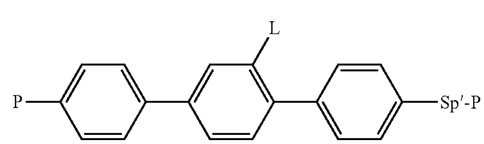

-continued

IB-D-2-15

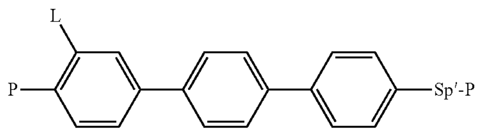

IB-D-2-16

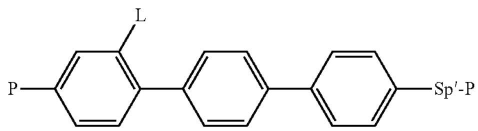

IB-D-2-17

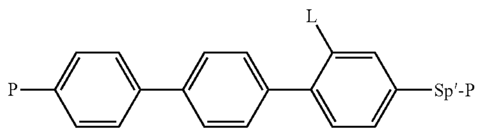

IB-D-2-18

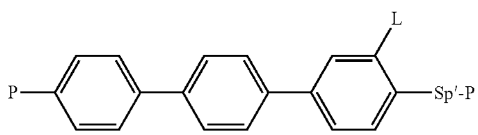

IB-D-2-19

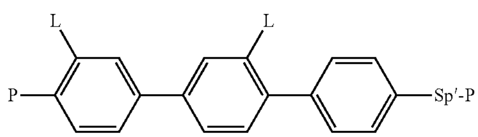

IB-D-2-20

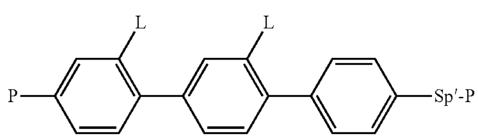

IB-D-2-21

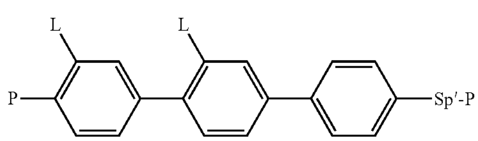

IB-D-2-22

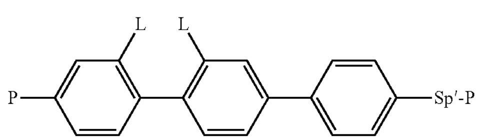

IB-D-2-23

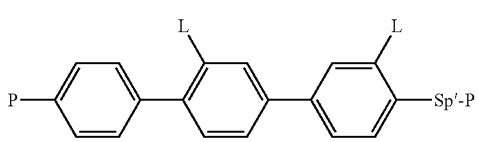

IB-D-2-24

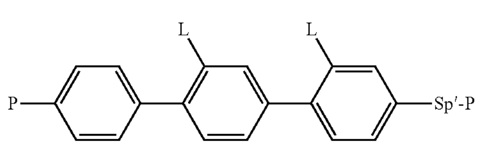

-continued

IB-D-2-25

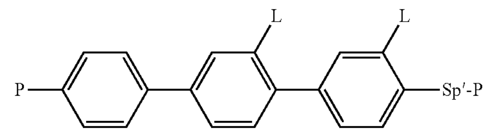

IB-D-2-26

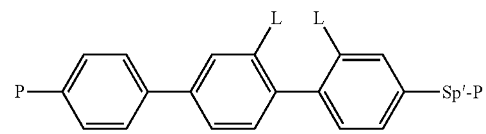

IB-D-2-27

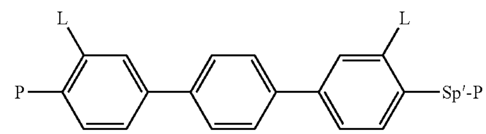

IB-D-2-28

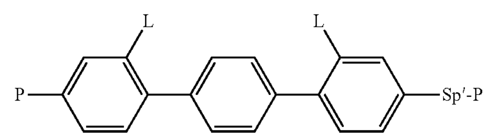

IB-D-2-29

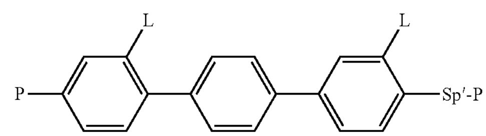

IB-D-2-30

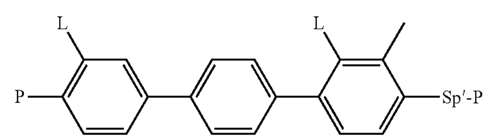

wherein P and L have one of the meanings as given in formula IB-D, and Sp' has one of the meanings given for Sp that is different from a single bond. P is preferably acrylate or methacrylate, very preferably methacrylate. Preferably all groups P in the formulae IB-D-1-1 to IB-D-2-30 have the same meaning, and very preferably denote methacrylate. Sp' is preferably selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to the benzene ring. L is preferably selected from F, $CH_3$, $OCH_3$, $OC_2H_5$ and $C_2H_5$, very preferably from F and $OCH_3$.

Very preferred are the compounds of formula IB-D-1-1, IB-D-1-2, IB-D-1-3, IB-D-1-4, IB-D-1-5, IB-D-1-6, IB-D-2-1, IB-D-2-2, IB-D-2-12, IB-D-2-13 and IB-D-2-14 and their subformulae. Most preferred are the compounds of formula IB-D-1-1.

Very preferred compounds of formula IB-D are selected from the following subformulae:

-continued
IBD1
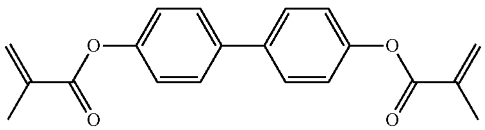
IBD2
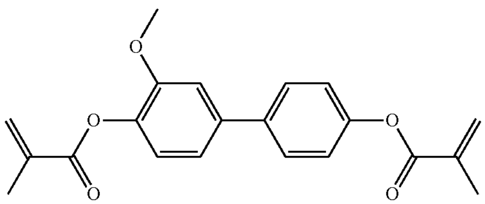
IBD3
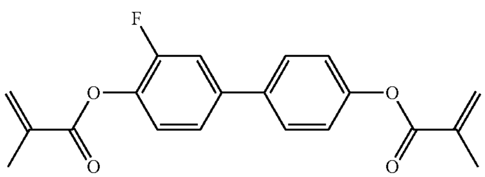
IBD4
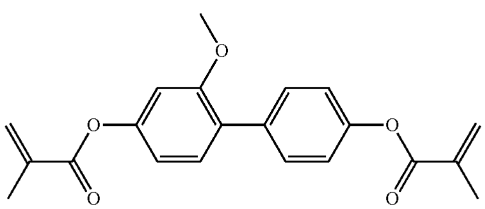
IBD5
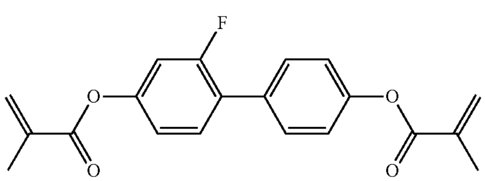
IBD6
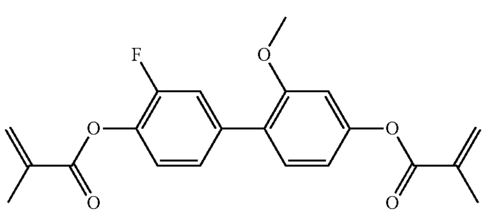
IBD7
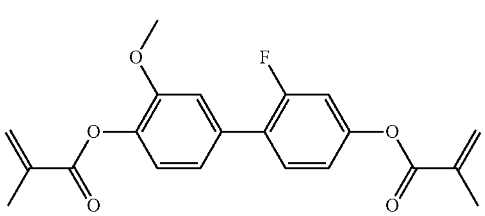
IBD8
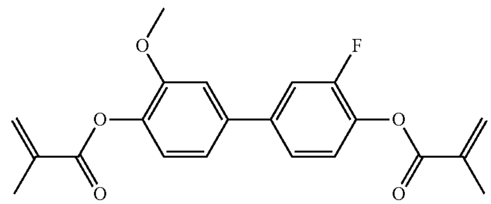
IBD9
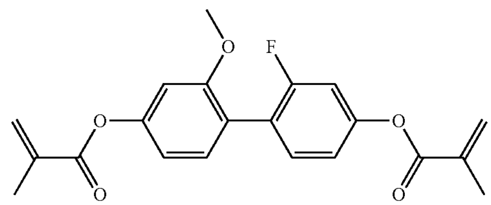
IBD10
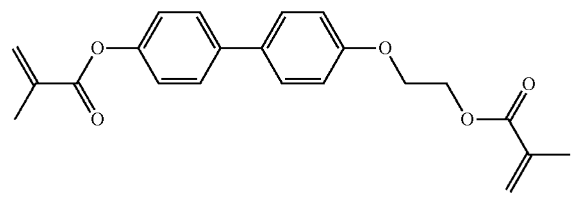
IBD11
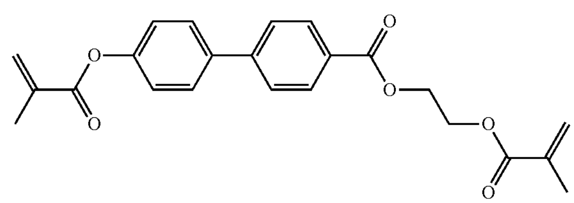
IBD12
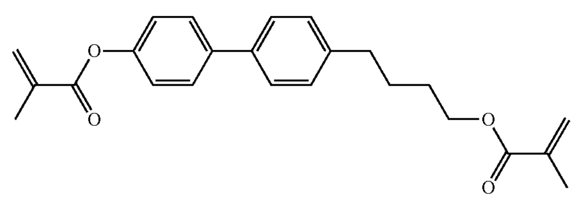
IBD13
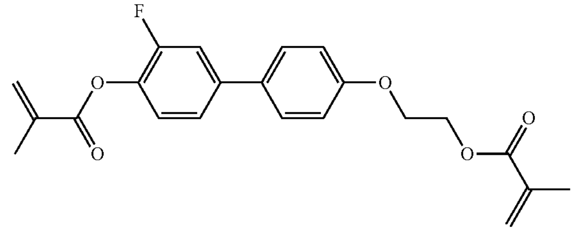
IBD14
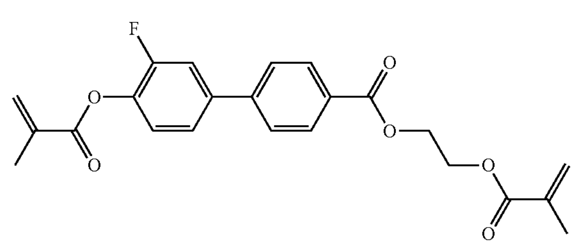

-continued

IBD15

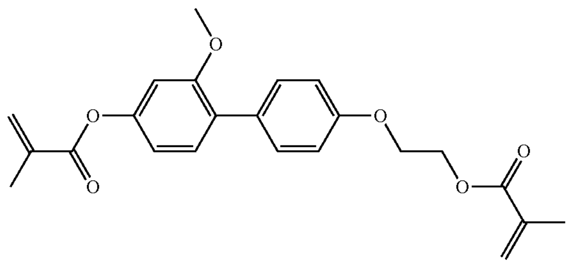

IBD16

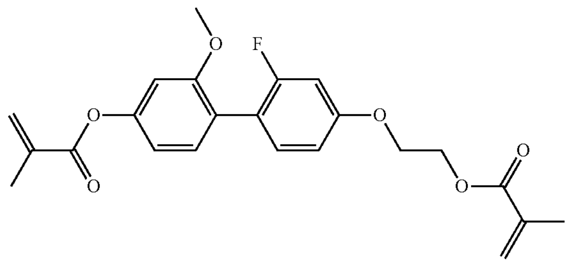

IBD17

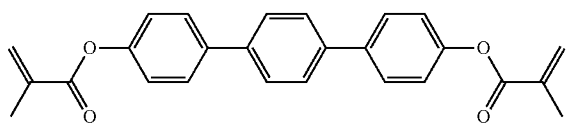

IBD18

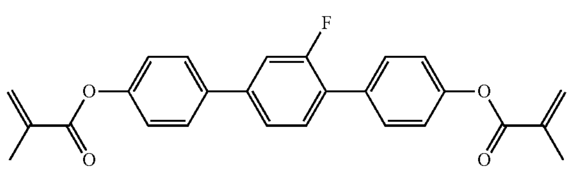

IBD19

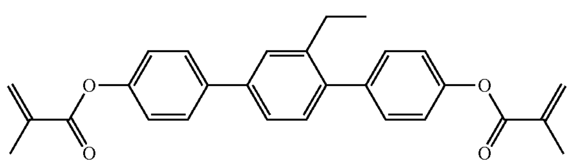

IBD20

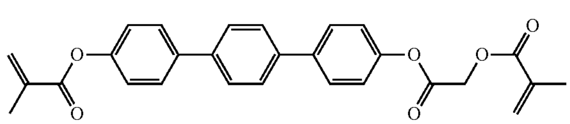

IBD21

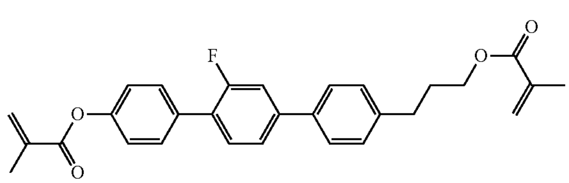

IBD22

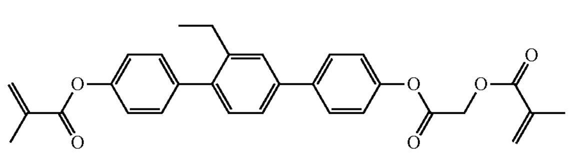

Very preferred are the compounds of formula IBD1, IBD2, IBD4, IBD17, IBD21 and IBD22. Most preferred are the compounds of formula IBD1.

Further preferred are the compounds of formulae IBD1 to IBD16 wherein one or two of the methacrylate groups are each replaced by acrylate groups.

Further preferred compounds of formula IB-D are selected from Table D below, very preferably from the group consisting of RM-1, RM-2, RM-3, RM-4, RM-7 to RM-49 and RM-58 to RM-77, very preferably selected from the group consisting of RM-1, RM-4, RM-8, RM-17, RM-19, RM-35, RM-37, RM-39, RM-40, RM-41, RM-48, RM-58, RM-64, RM-72 and RM-74.

In another preferred embodiment the LC medium comprises one or more polymerizable compounds of formula IB having three polymerizable groups, which are preferably selected from formula IB-T

IB-T

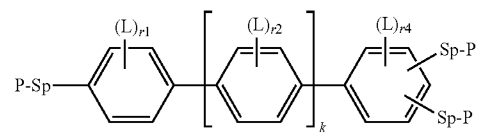

wherein P, Sp, L, r1, r2 and k independently of each other have the meanings given in formula IB-D or one of their preferred meanings as given above and below, and r4 is 0, 1, 2 or 3, preferably 0, 1 or 2, very preferably 0 or 1.

Preferred compounds of formula IB-T are selected from the following subformulae

IB-T-1

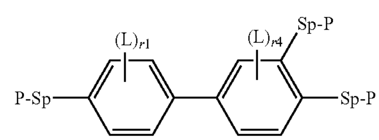

IB-T-2

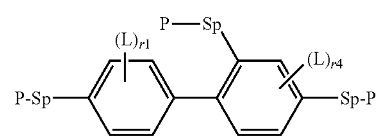

IB-T-3

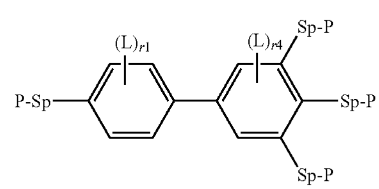

IB-T-4

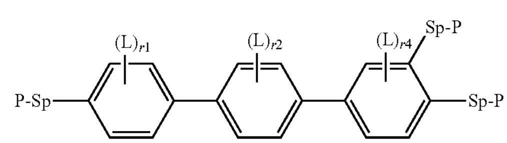

IB-T-5

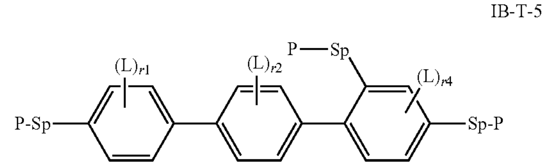

IB-T-6

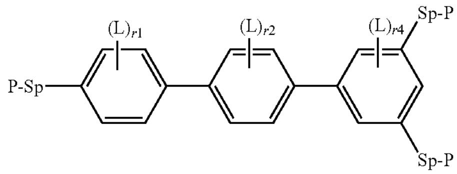

wherein P, Sp, L, r1, r2 and r4 have independently of each other one of the meanings given in formula IB-T or one of their preferred meanings as given above and below. Preferably at least one of r1, r2 and r4 is not 0. P is preferably acrylate or methacrylate, very preferably methacrylate. L is preferably selected from F, $CH_3$, $OCH_3$, $OC_2H_5$ and $C_2H_5$, very preferably from $OCH_3$ or F. Preferably all groups P in the formulae IB-T and IB-T-1 to IB-T-6 have the same meaning, and very preferably denote methacrylate.

Very preferred are the compounds of formula IB-T-1, IB-T-4 and IB-T-5.

More preferred compounds of formula IB-T are selected from the following subformulae

IB-T-1-1

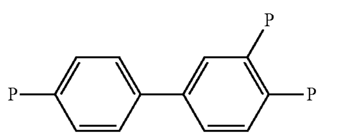

IB-T-1-2

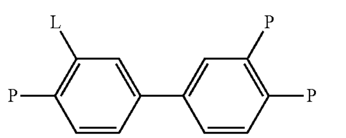

IB-T-1-3

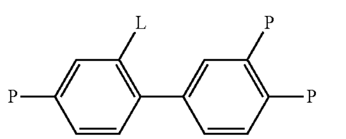

IB-T-1-4

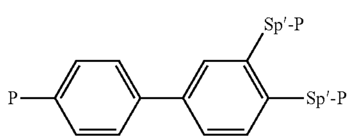

IB-T-1-5

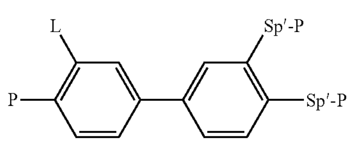

IB-T-1-6

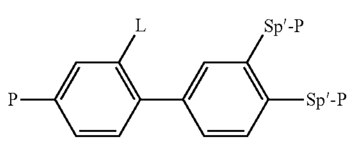

IB-T-2-1

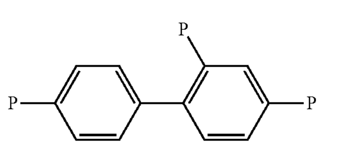

IB-T-2-2

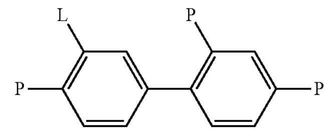

IB-T-2-3

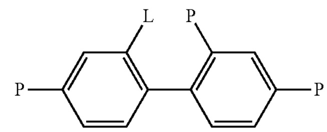

IB-T-2-4

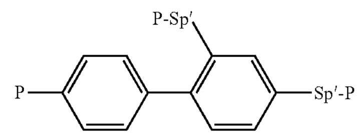

IB-T-2-5

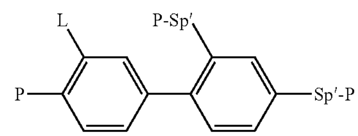

IB-T-2-6

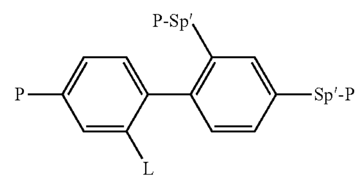

IB-T-3-1

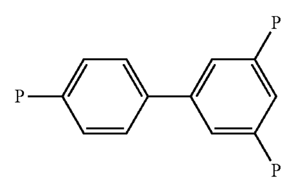

IB-T-3-2

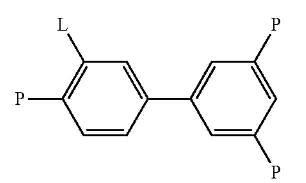

IB-T-3-3

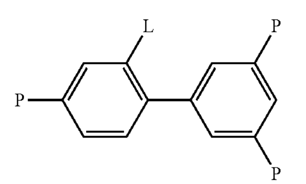

IB-T-3-4

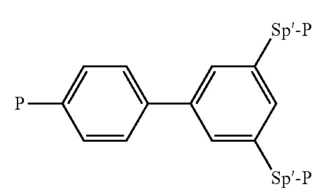

-continued
IB-T-3-5
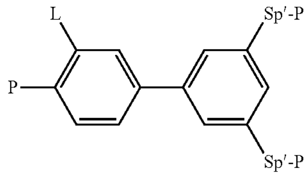
IB-T-3-6
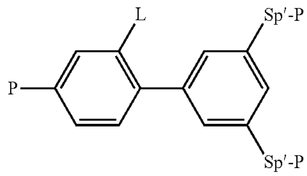
IB-T-4-1
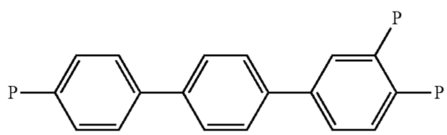
IB-T-4-2
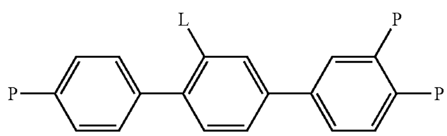
IB-T-4-3
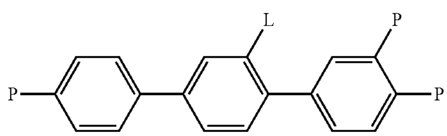
IB-T-4-4
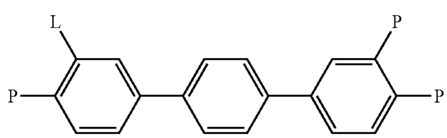
IB-T-4-5
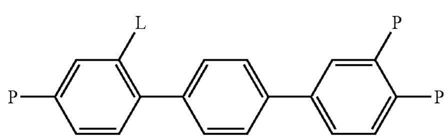
IB-T-4-6
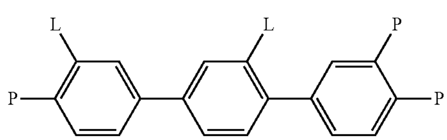
IB-T-4-7
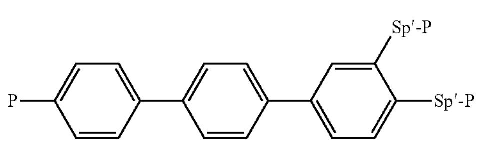
IB-T-4-8
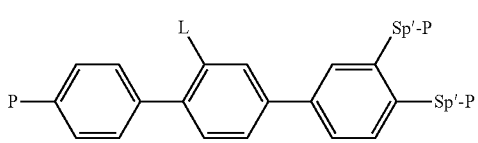
-continued
IB-T-4-9
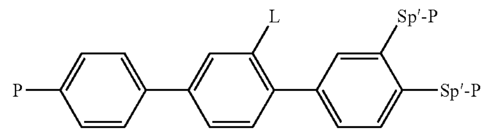
IB-T-4-10
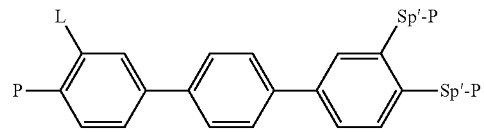
IB-T-4-11
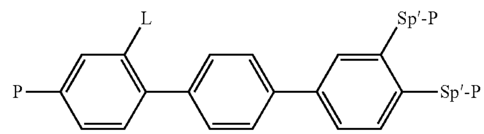
IB-T-4-12
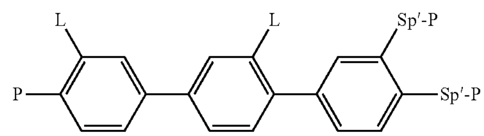
IB-T-5-1
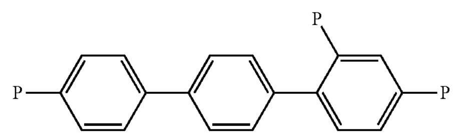
IB-T-5-2
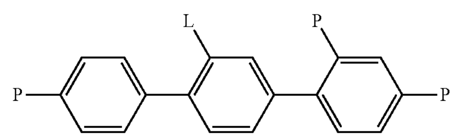
IB-T-5-3
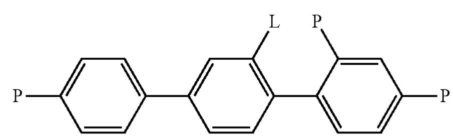
IB-T-5-4
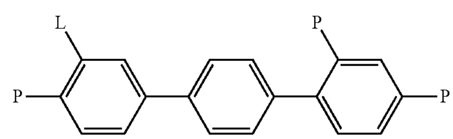
IB-T-5-5
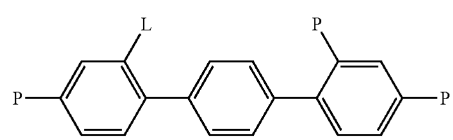
IB-T-5-6
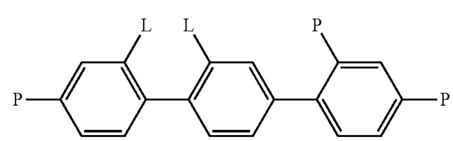
IB-T-5-7
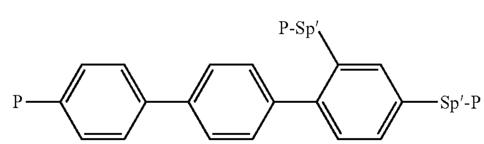

-continued

IB-T-5-8

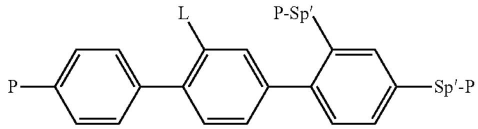

IB-T-5-9

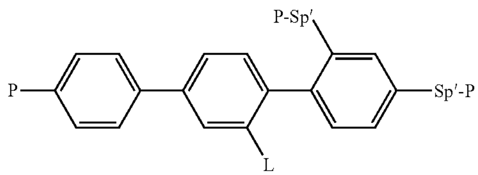

IB-T-5-10

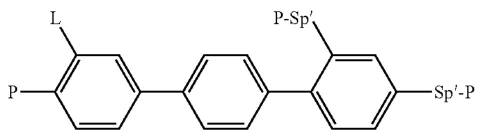

IB-T-5-11

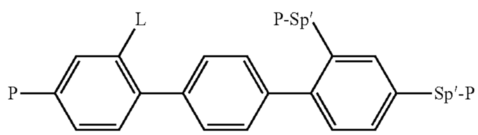

IB-T-5-12

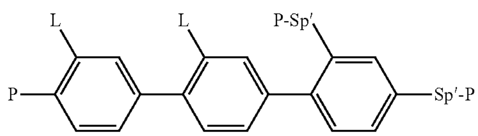

IB-T-6-1

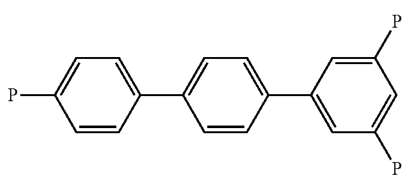

IB-T-6-2

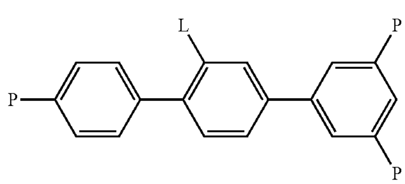

IB-T-6-3

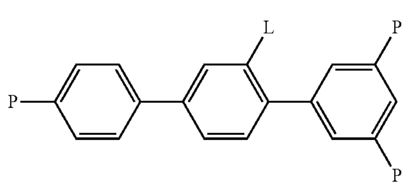

IB-T-6-4

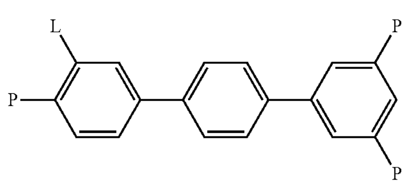

-continued

IB-T-6-5

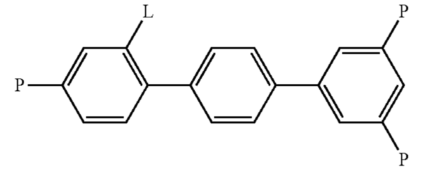

IB-T-6-6

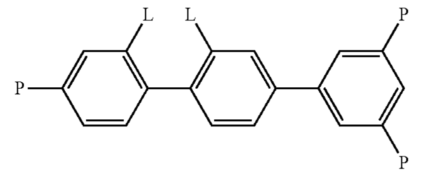

IB-T-6-7

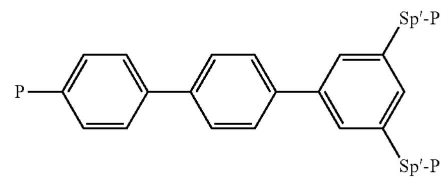

IB-T-6-8

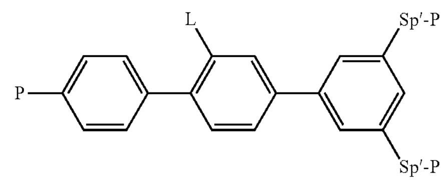

IB-T-6-9

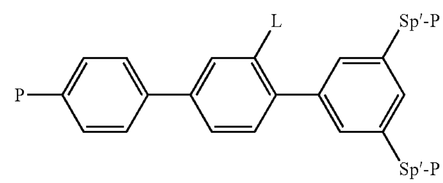

IB-T-6-10

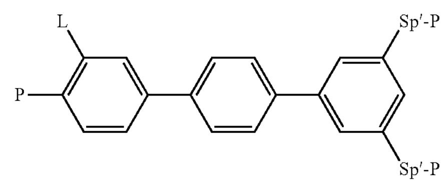

IB-T-6-11

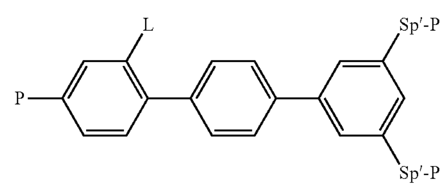

IB-T-6-12

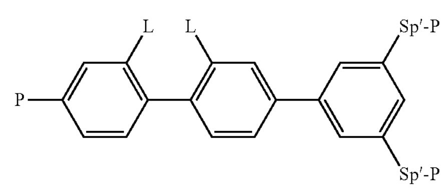

wherein P, Sp and L have one of the meanings as given in formula IB-T and Sp' has one of the meanings given for Sp that is different from a single bond. P is preferably acrylate or methacrylate, very preferably methacrylate. Preferably all groups P in the formulae IB-T-1-1 to IB-T-6-12 have the same meaning, and very preferably denote methacrylate. Sp' is preferably selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to the benzene ring. L is preferably selected from F, $CH_3$, $OCH_3$, $OC_2H_5$ and $C_2H_5$, very preferably from F and $OCH_3$.

Very preferred are the compounds of formula IB-T-1-1, IB-T-1-6, IB-T-4-1, IB-T-5-1 and their subformulae.

Very preferred compounds of formula IB-T are selected from the following subformulae:

IBT1

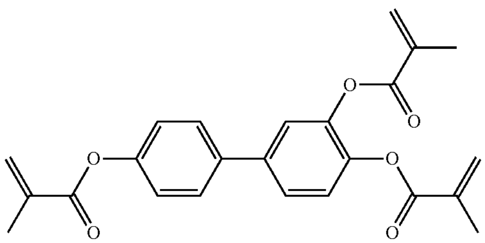

IBT2

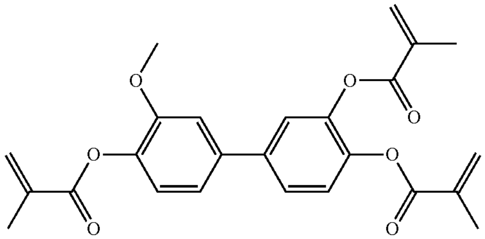

IBT3

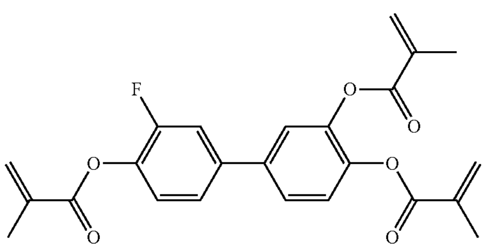

IBT4

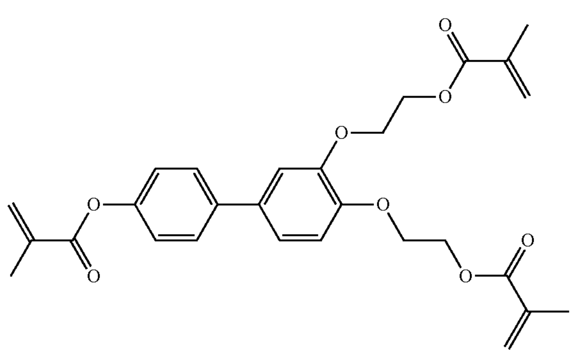

-continued

IBT5

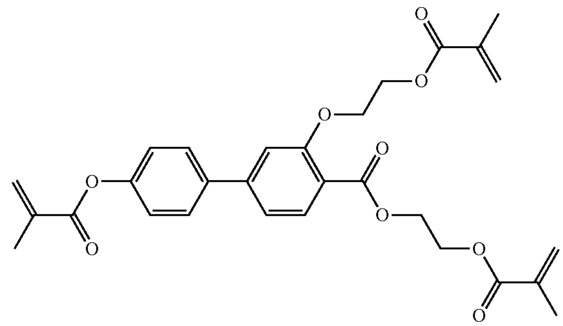

IBT6

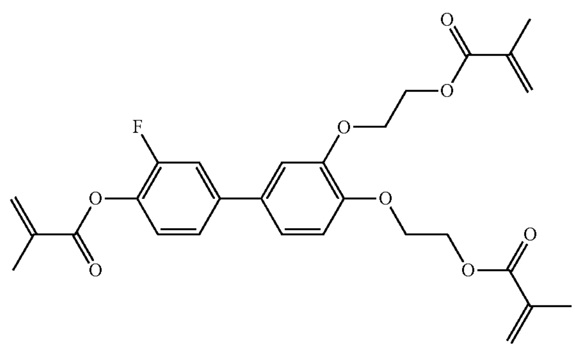

IBT7

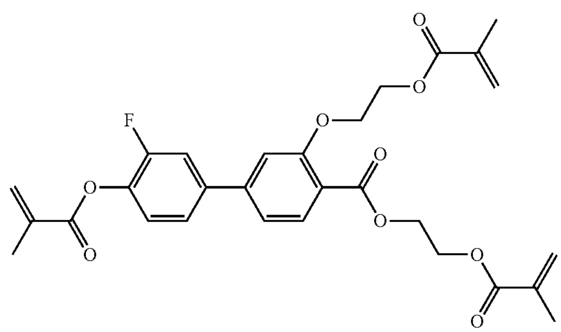

IBT8

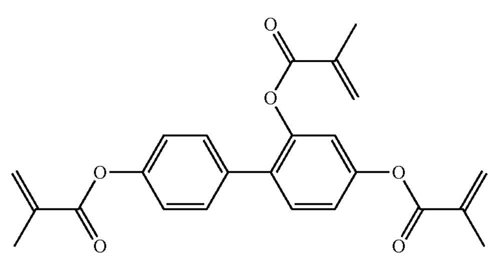

IBT9

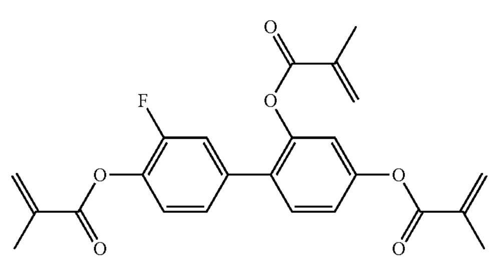

-continued
IBT10
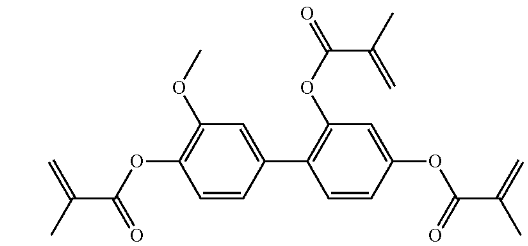
IBT11
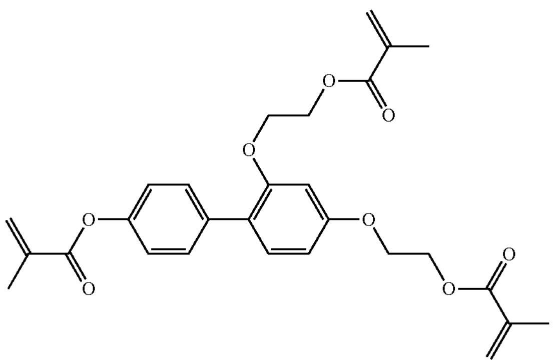
IBT12
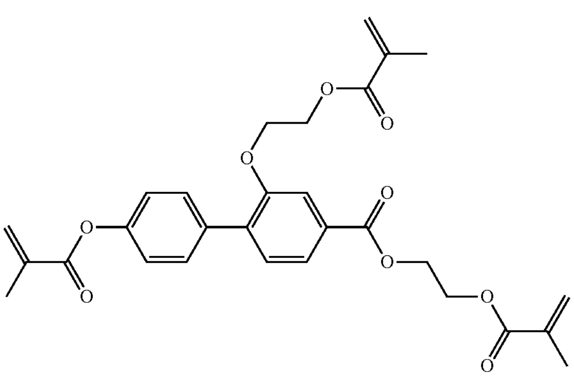
IBT13
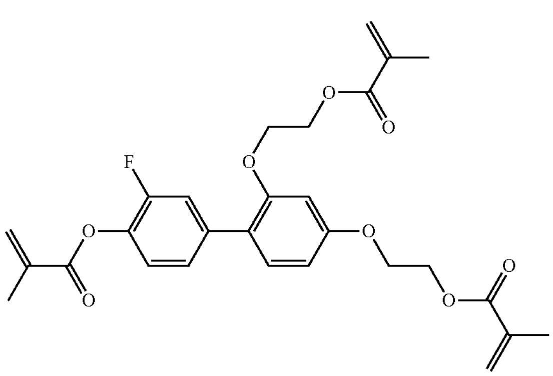
-continued
IBT14
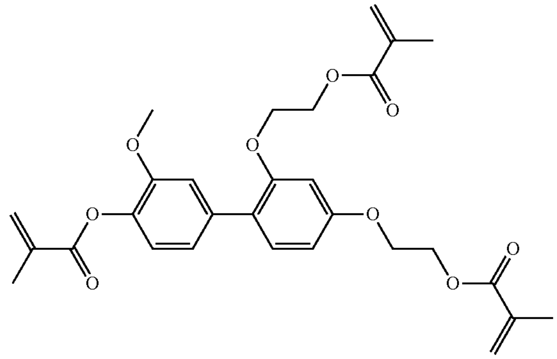
IBT15
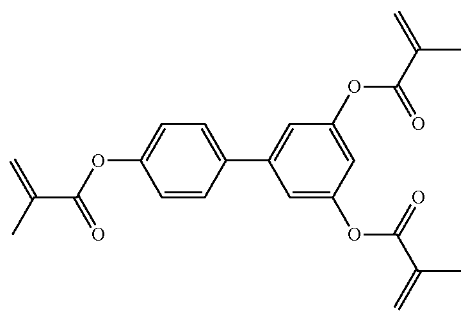
IBT16
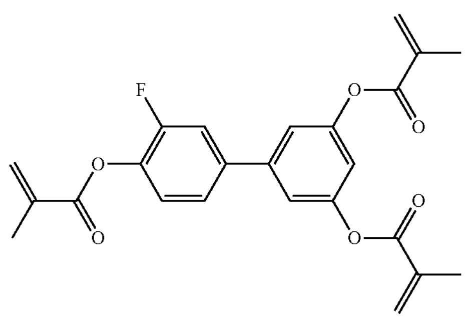
IBT17
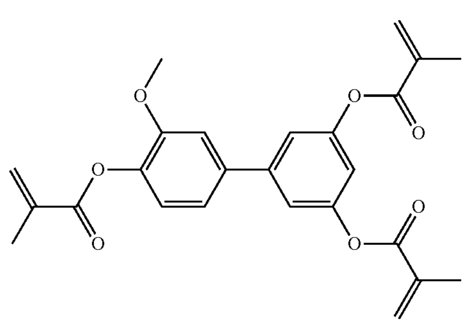

-continued
IBT18
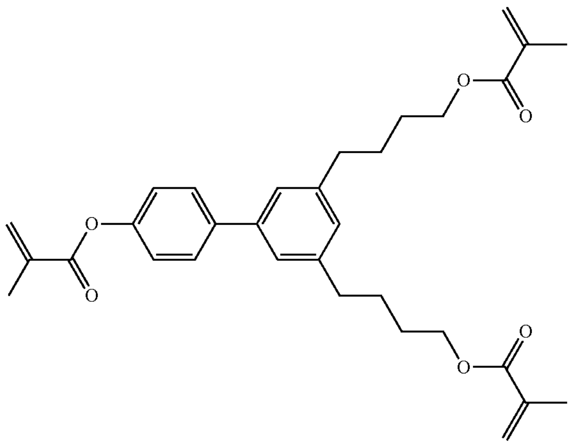
IBT19
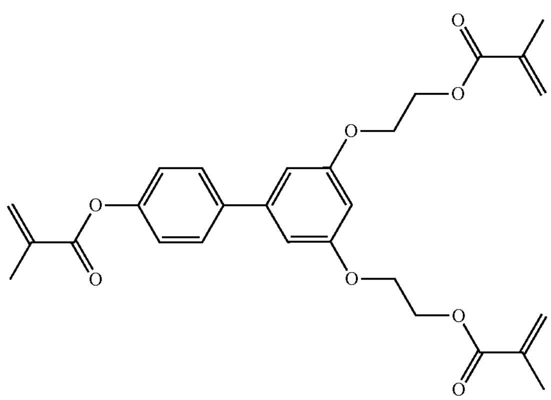
IBT20
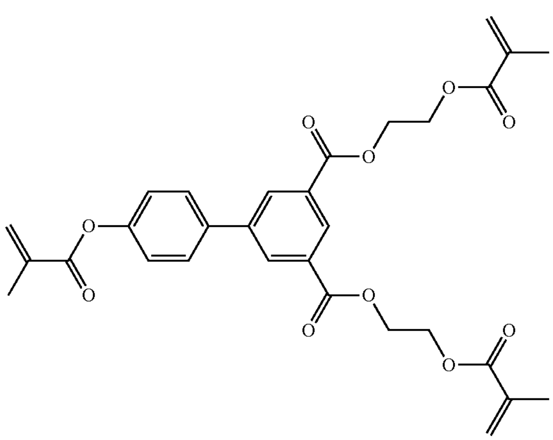
-continued
IBT21
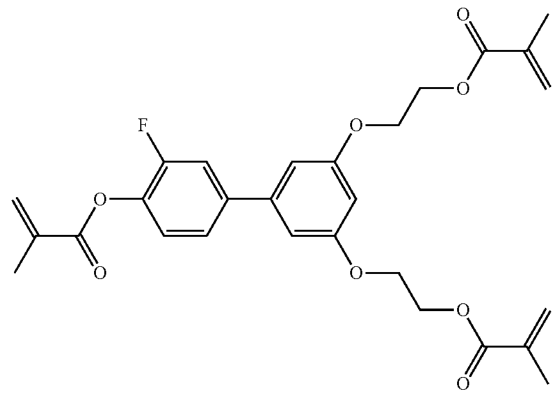
IBT22
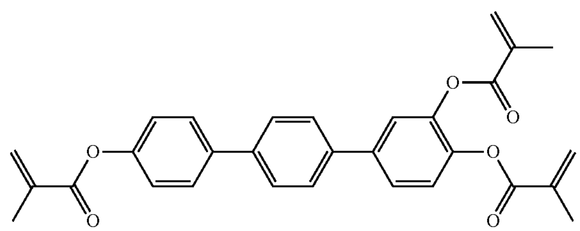
IBT23
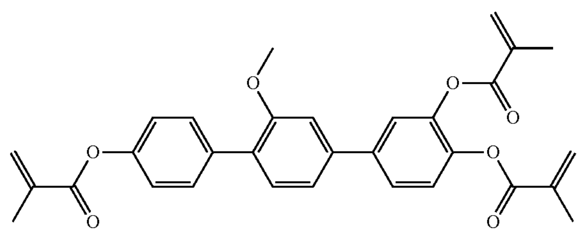
IBT24
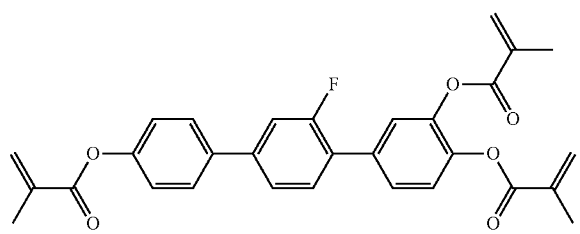
IBT25
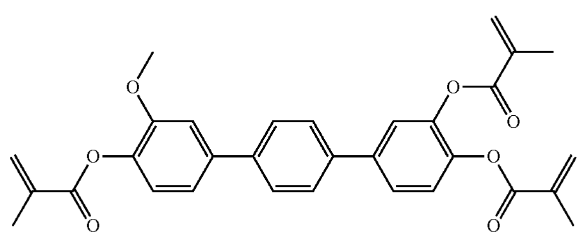

-continued
IBT26
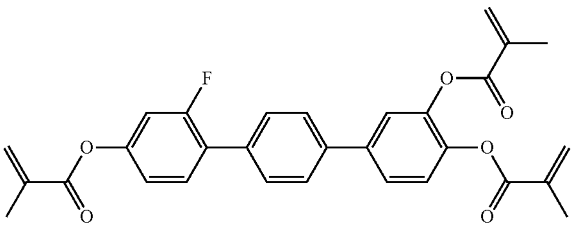
IBT27
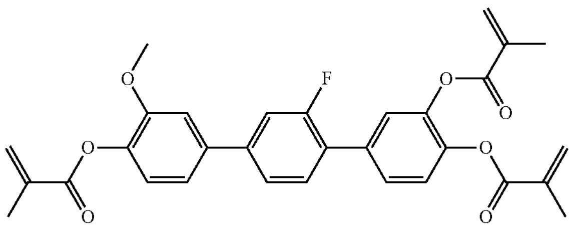
IBT28
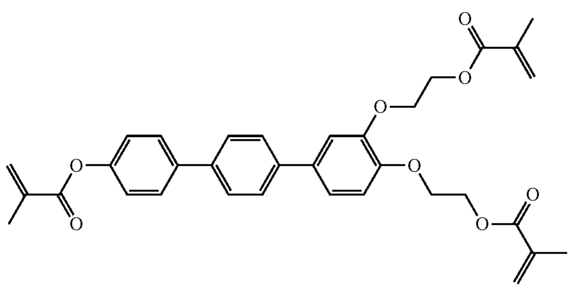
IBT29
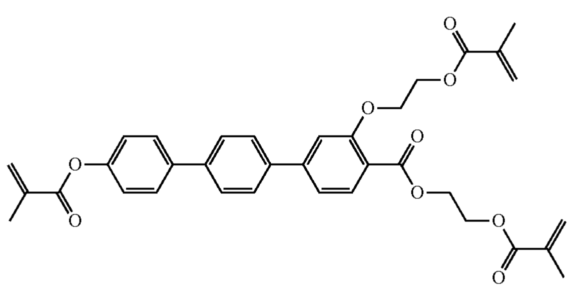
IBT30
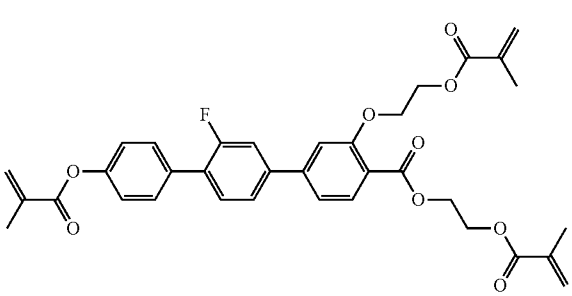
-continued
IBT31
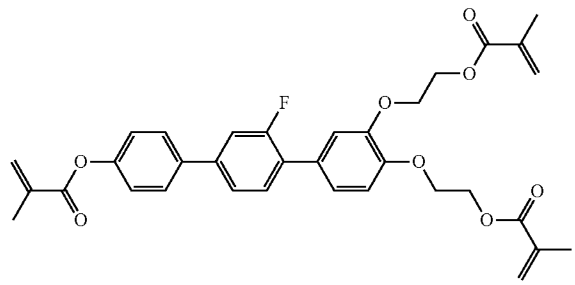
IBT32
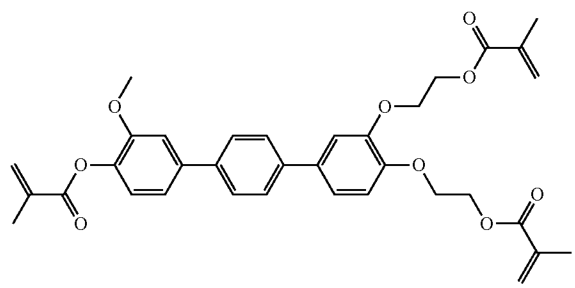
IBT33
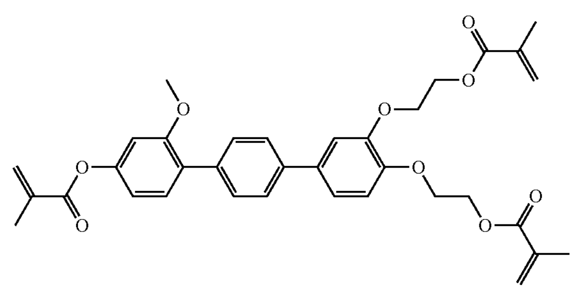
IBT34
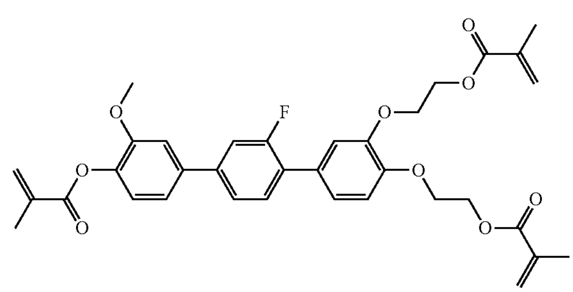
IBT35
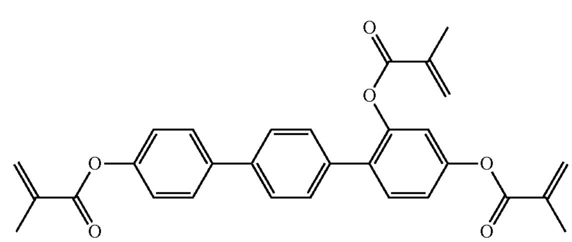

-continued
IBT36
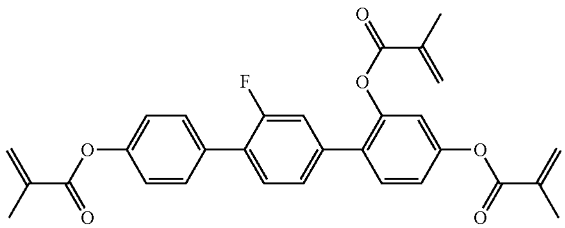
IBT37
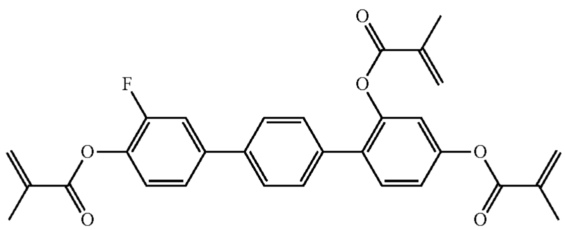
IBT38
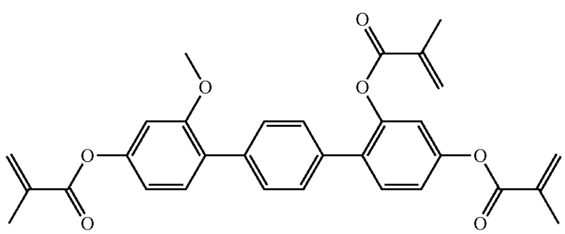
IBT39
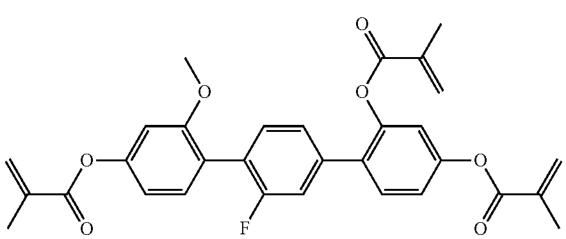
IBT40
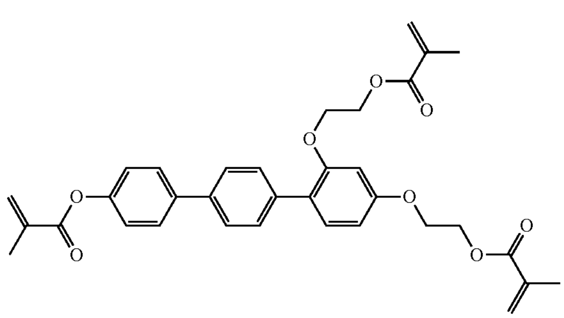
-continued
IBT41
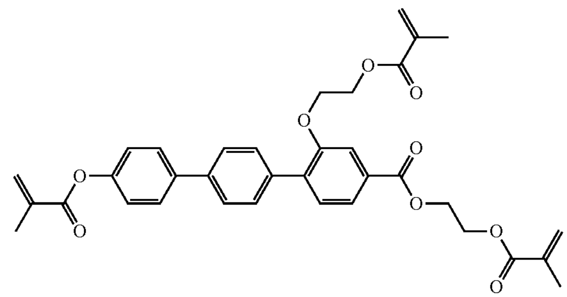
IBT42
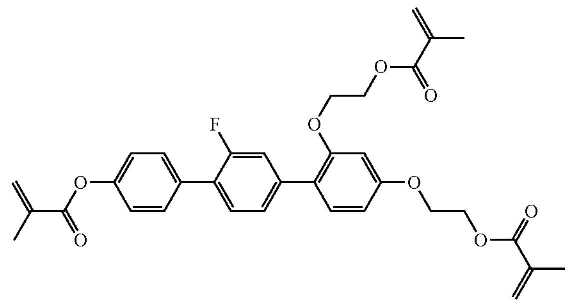
IBT43
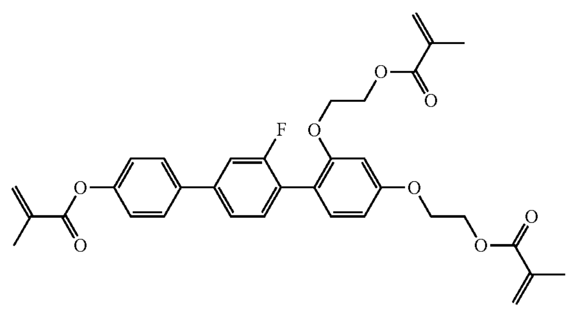
IBT44
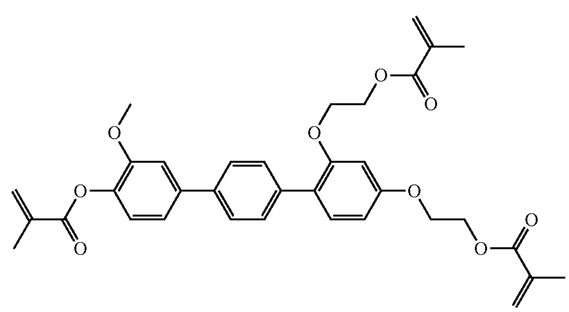
IBT45
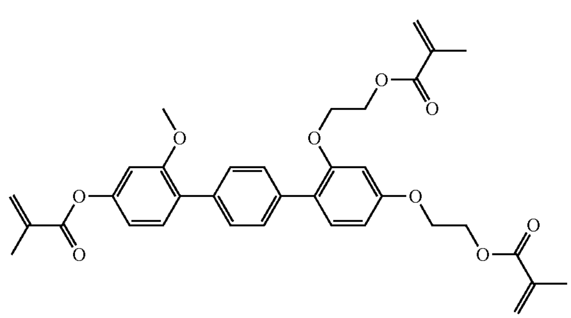

-continued
IBT46
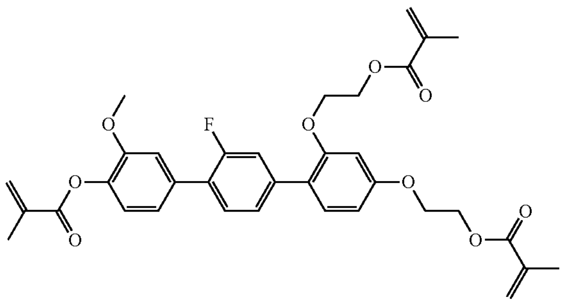
IBT47
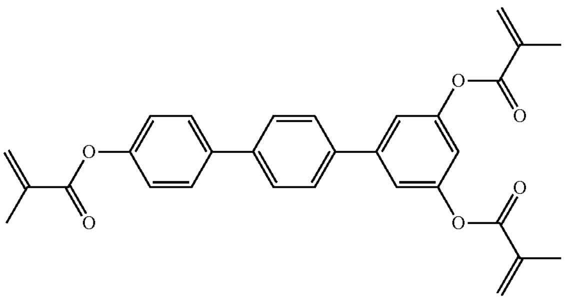
IBT48
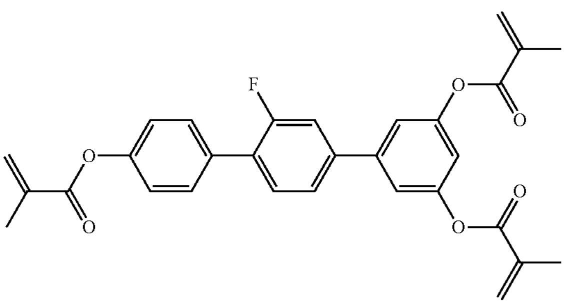
IBT49
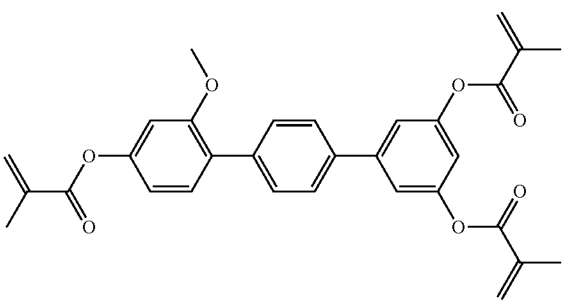
-continued
IBT50
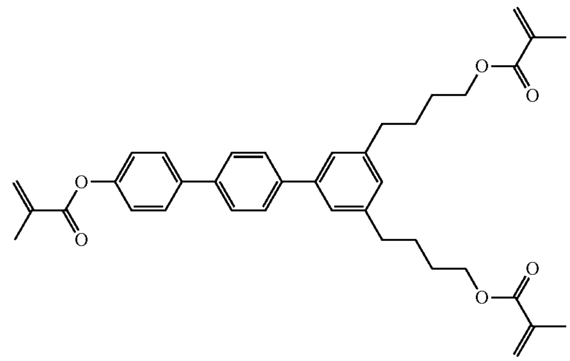
IBT51
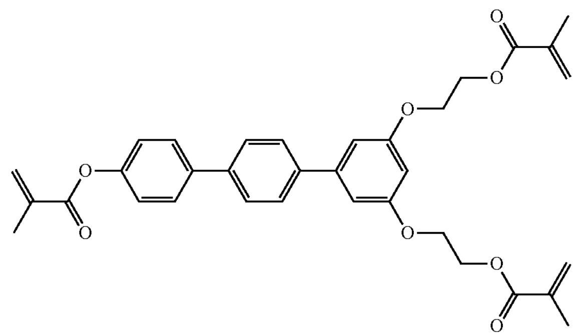
IBT52
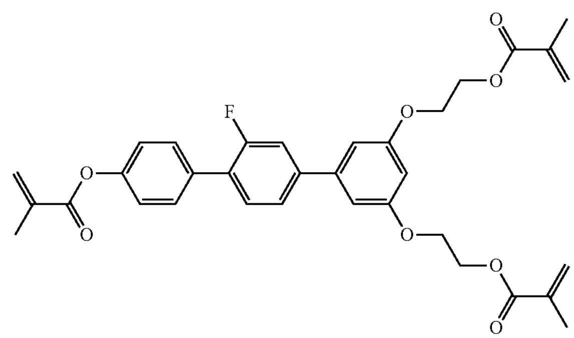
IBT53
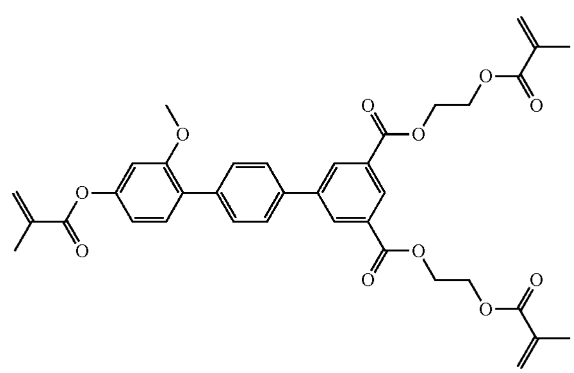
Of the compounds of formula IBT1 to IB-T21 with two benzene rings very preferred are the compounds of formula IBT1, IBT2, IBT3, IBT8, IBT9, IBT10, IBT15, IBT16, IBT17. Most preferred are the compounds of formula IBT1, IBT2, IBT3, IBT8, IBT9 and IB10.

Of the compounds of formula IBT22 to IBT53 with three benzene rings very preferred are the compounds of formula IBT22 to IBT46. Most preferred are the compounds of formula IBT22, IBT28, IBT29, IBT35 and IBT36.

Further preferred are the compounds of formulae IBT1 to IBT53 wherein one or two of the methacrylate groups are each replaced by acrylate groups.

Further preferred are the compounds of formulae IBT1 to IBT53 wherein all methacrylate groups are each replaced by acrylate groups.

In another preferred embodiment the LC medium contains at least one compound of formula IC, which is at least monosubstituted by an alkenyl group $L^b$. Preferred compounds of formula IC of this preferred embodiment are selected from the following subformulae:

IC-1

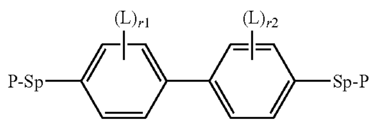

IC-2

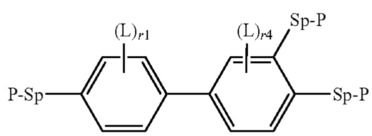

IC-3

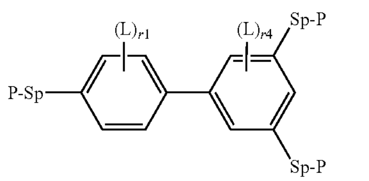

IC-4

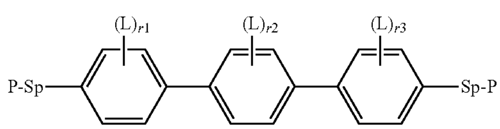

IC-5

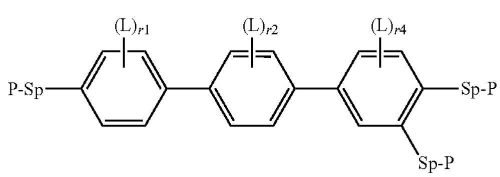

IC-6

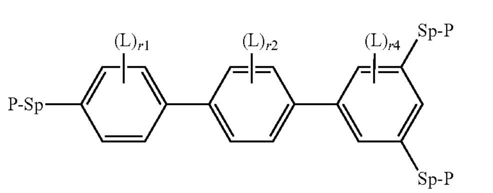

-continued

IC-7

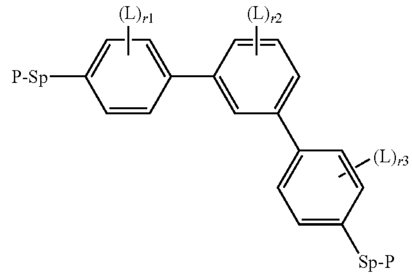

IC-8

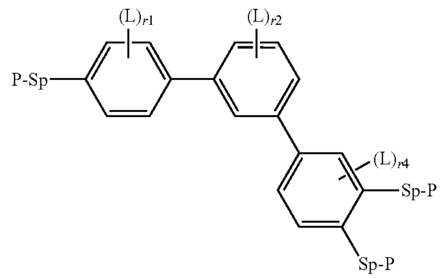

IC-9

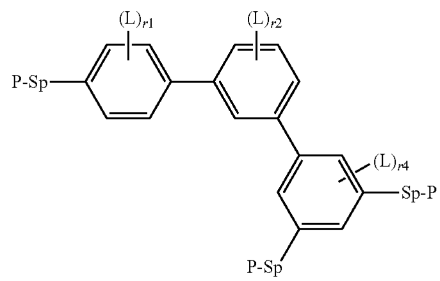

wherein P, Sp, L, r1, r2, r3 and r4 have the meanings given in formula IB-D and IB-T or one of the preferred meanings as given above and below, with r1+r2+r3+r4≥1, and wherein the compounds contain at least one group L that denotes $L^b$.

In the compounds of formulae IC-1 to IC-9 preferably $L^b$ denotes —CH═CH$_2$, —CH$_2$—CH═CH$_2$, —CH═CH—CH$_3$, —CH═CH—CH═CH$_2$ or —C(CH$_3$)═CH$_2$, very preferably —CH═CH$_2$ or C(CH$_3$)═CH$_2$.

In the compounds of formulae IC-1 to IC-9 preferably P is acrylate or methacrylate, very preferably methacrylate. If Sp is different from a single bond, it is preferably selected from —(CH$_2$)$_2$—, —(CH$_2$)$_3$—, —(CH$_2$)$_4$—, —O—(CH$_2$)$_2$—, —O—(CH$_2$)$_3$—, —O—CO—(CH$_2$)$_2$— and —CO—O—(CH)$_2$—, wherein the O atom or the CO group is attached to the benzene ring. L is preferably selected from F, CH$_3$, OCH$_3$, OC$_2$H$_5$ or C$_2$H$_5$, very preferably from OCH$_3$ or F. Preferably all groups P in the formulae IC-1 to IC-9 have the same meaning, and very preferably denote methacrylate.

Preferred compounds of formulae IC-1 to IC-9 are selected from the following subformulae:

IC-1-1

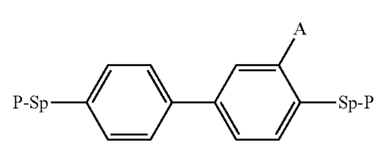

-continued
IC-1-2
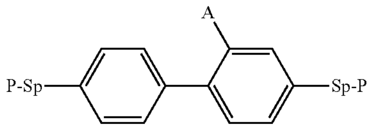
IC-1-3
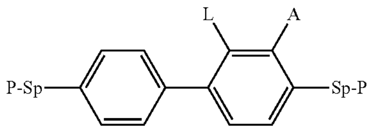
IC-1-4
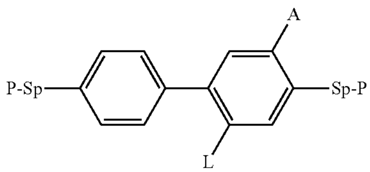
IC-1-5
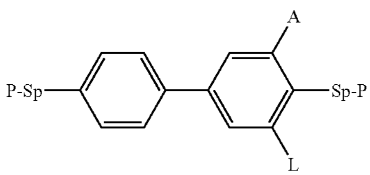
IC-1-6
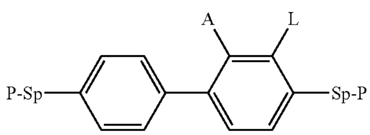
IC-1-7
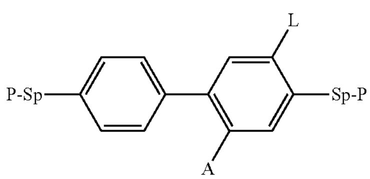
IC-1-8
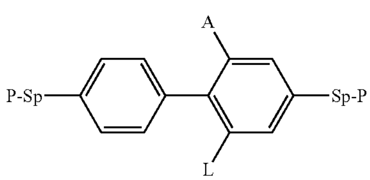
IC-1-9
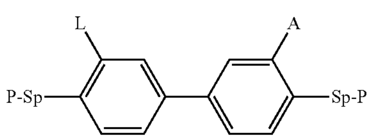
IC-1-10
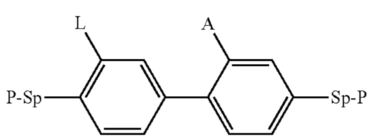
IC-1-11
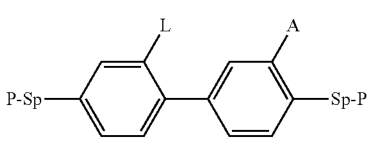
-continued
IC-1-12
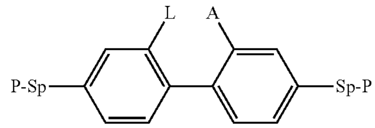
IC-2-1
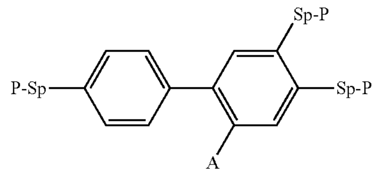
IC-2-2
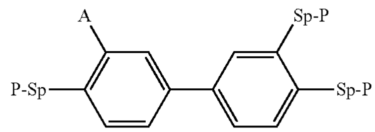
IC-2-3
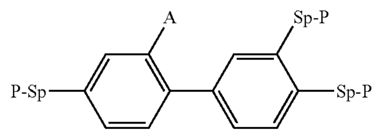
IC-2-4
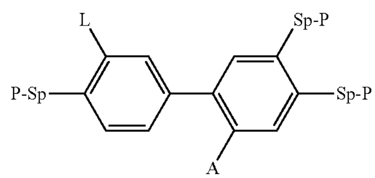
IC-2-5
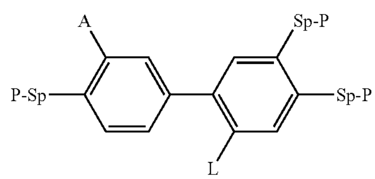
IC-3-1
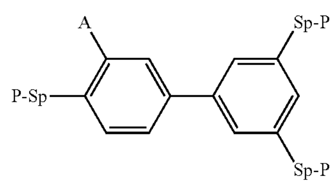
IC-3-2
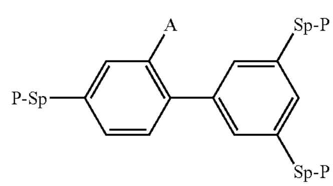
IC-4-1
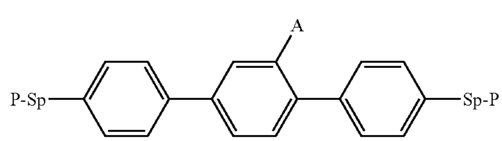

-continued
IC-4-2
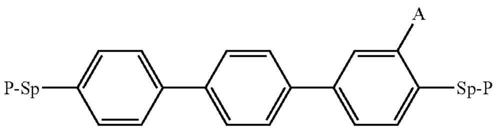
IC-4-3
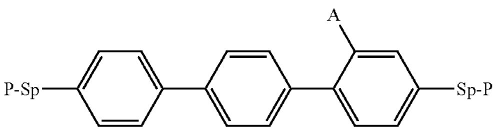
IC-4-4
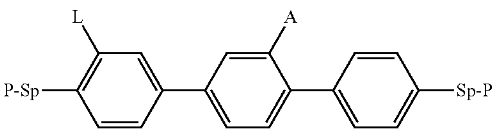
IC-4-5
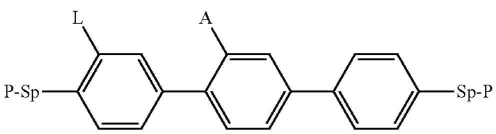
IC-4-6
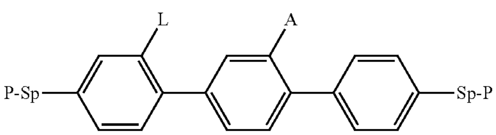
IC-4-7
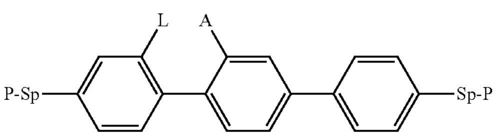
IC-4-8
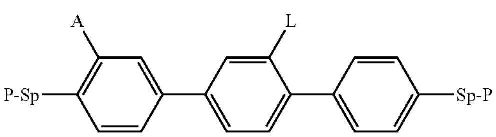
IC-4-9
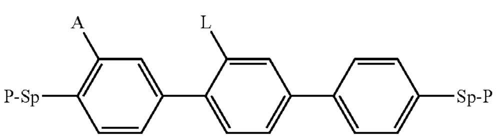
IC-4-10
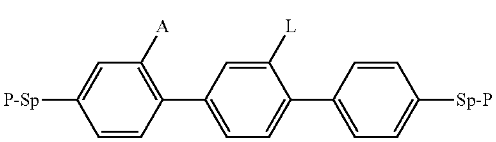
IC-4-11
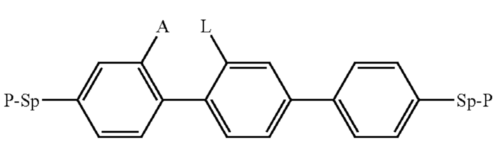
IC-4-12
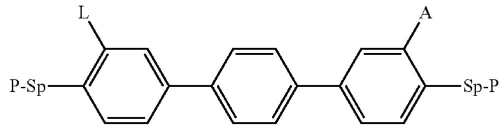
IC-4-13
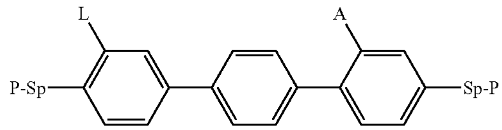
IC-4-14
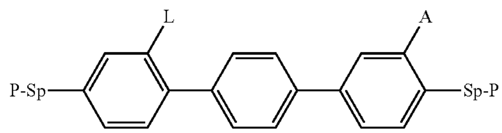
IC-4-15
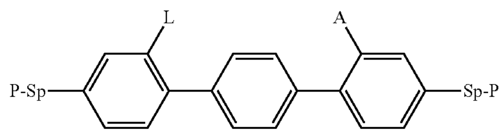
IC-4-16
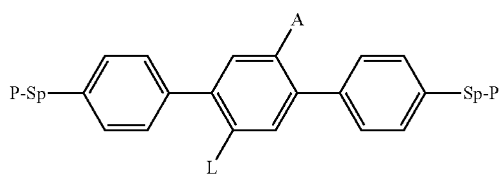
IC-4-17
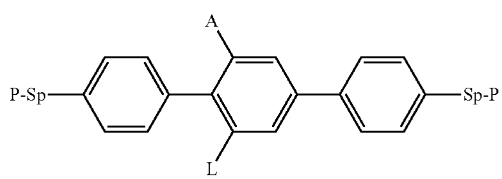
IC-4-18
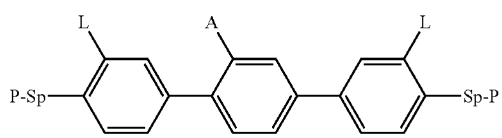
IC-4-19
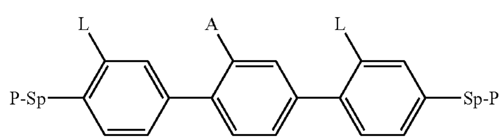
IC-4-20
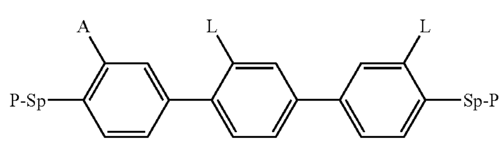

IC-4-21
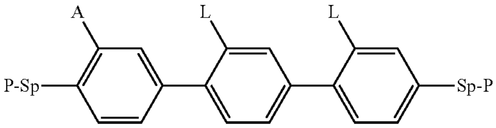
IC-4-22
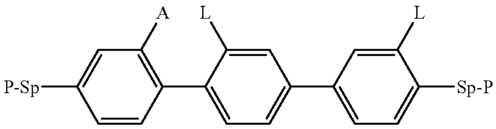
IC-4-23
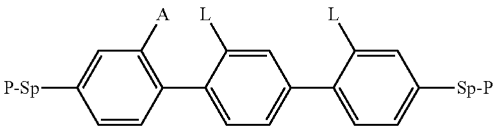
IC-5-1
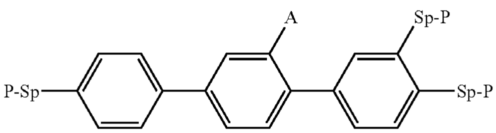
IC-5-2
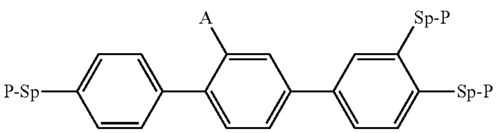
IC-5-3
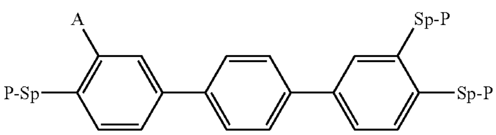
IC-5-4
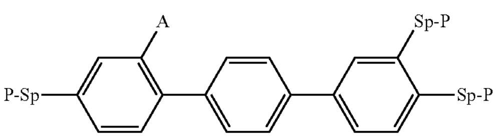
IC-5-5
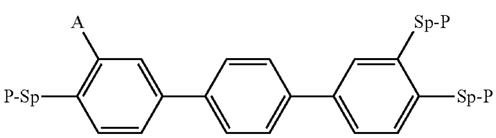
IC-5-6
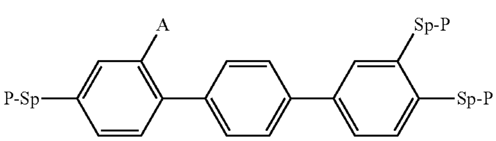
IC-5-7
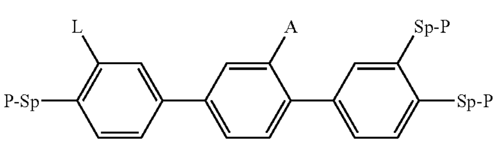
IC-5-8
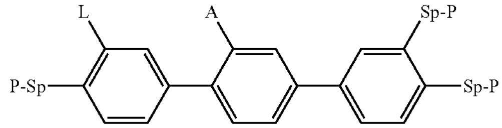
IC-5-9
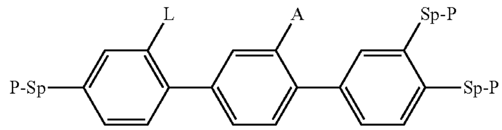
IC-5-10
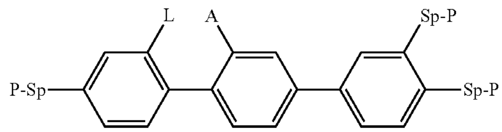
IC-5-11
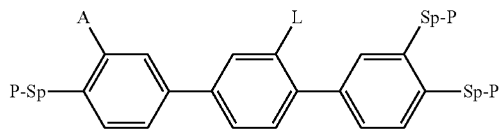
IC-5-12
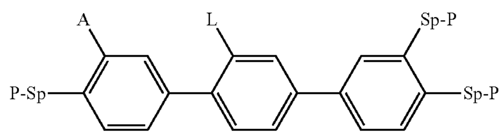
IC-5-13
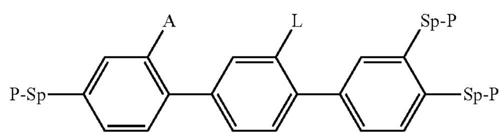
IC-5-14
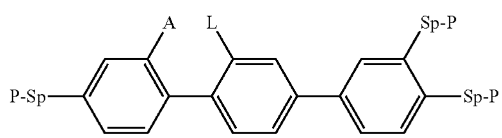
IC-6-1
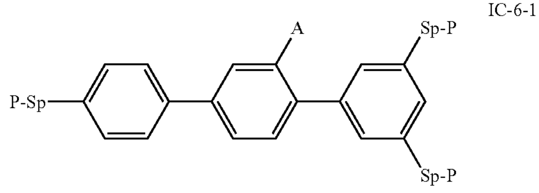
IC-6-2
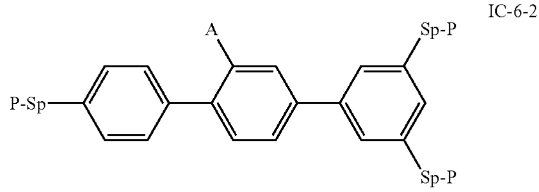

-continued
IC-6-3
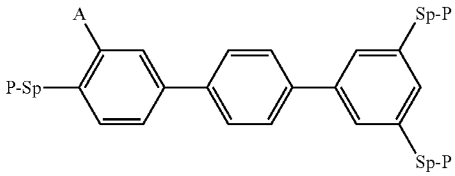
IC-6-4
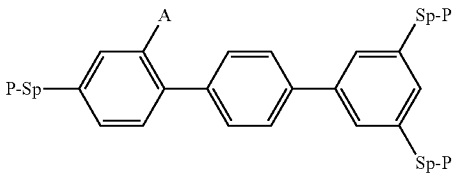
IC-6-5
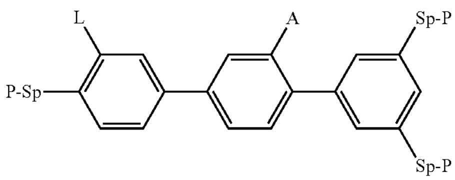
IC-6-6
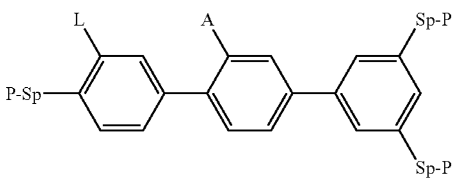
IC-6-7
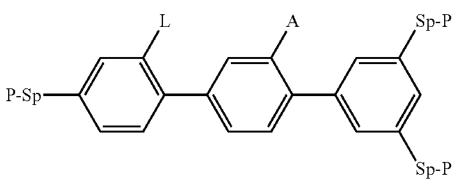
IC-6-8
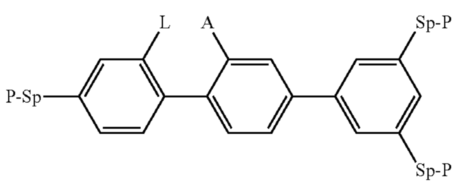
IC-6-9
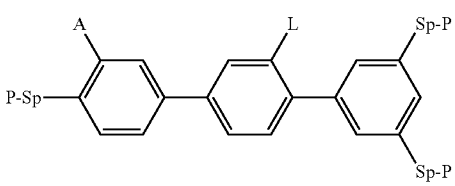
IC-6-10
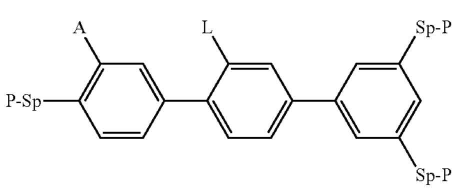
IC-6-11
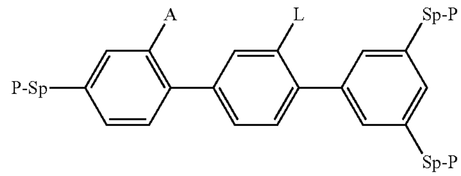
IC-6-12
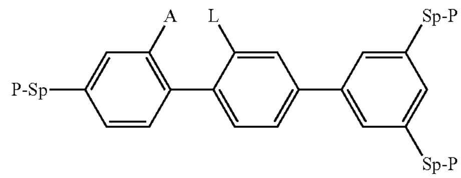
IC-7-1
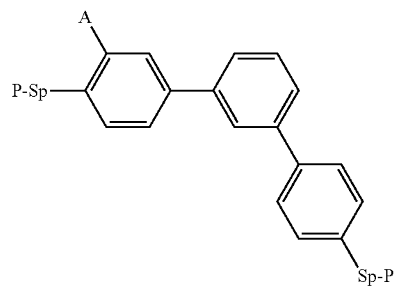
IC-7-2
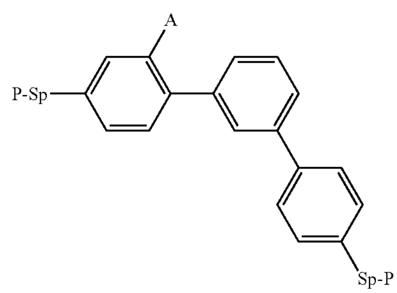
IC-7-3
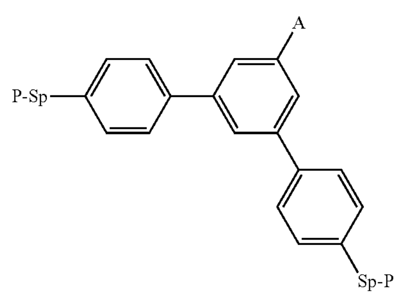
IC-7-4
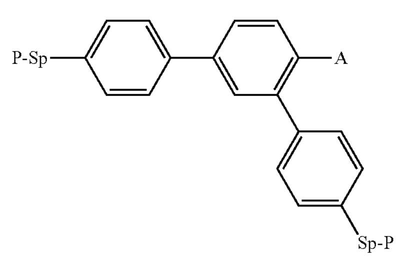

-continued
IC-7-5
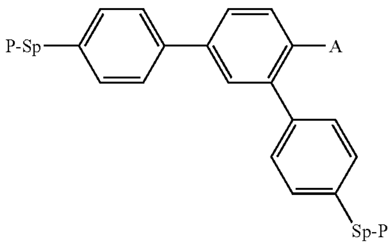
IC-7-6
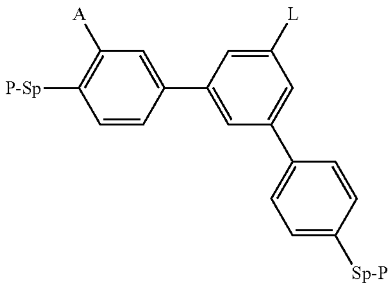
IC-7-7
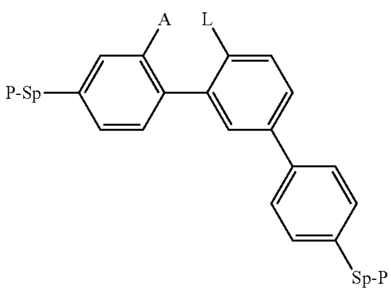
IC-7-8
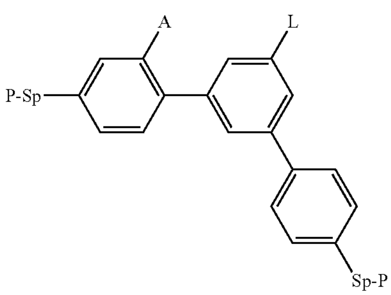
IC-7-9
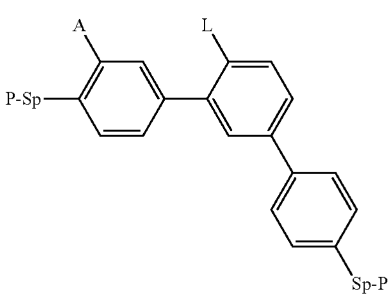
-continued
IC-7-10
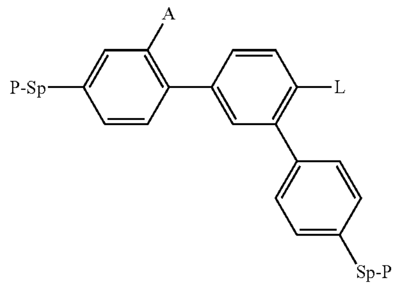
IC-7-11
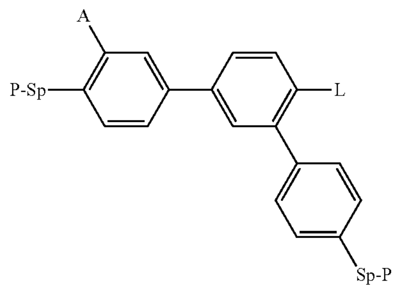
IC-7-12
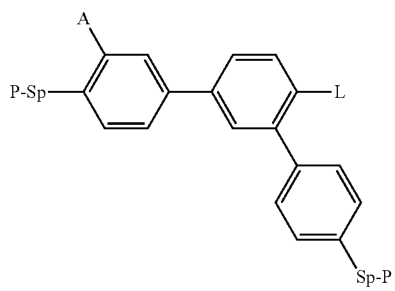
IC-7-13
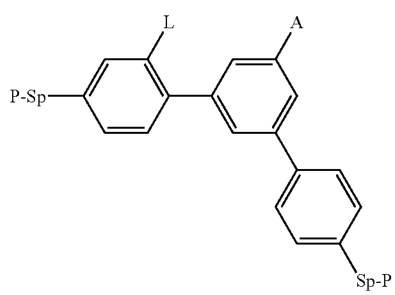
IC-7-15
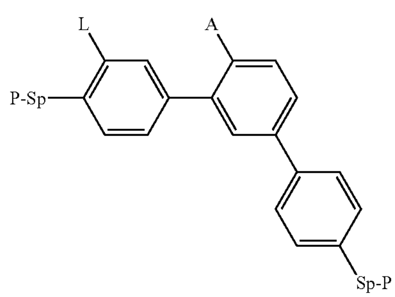

-continued
IC-7-16
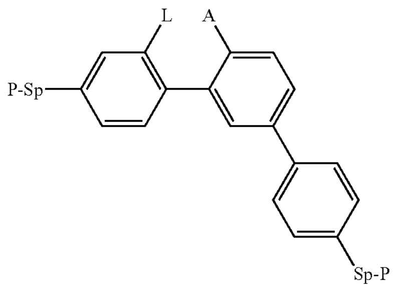
IC-7-17
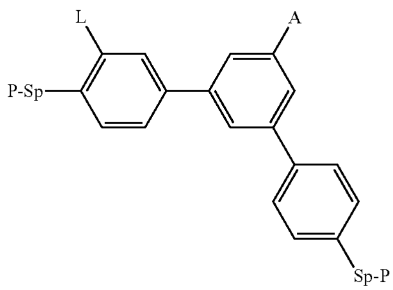
IC-7-18
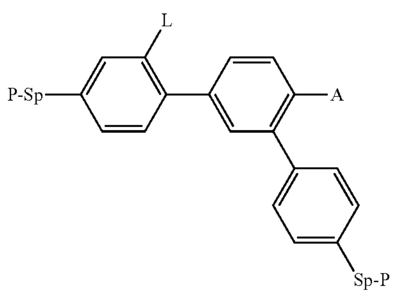
IC-7-19
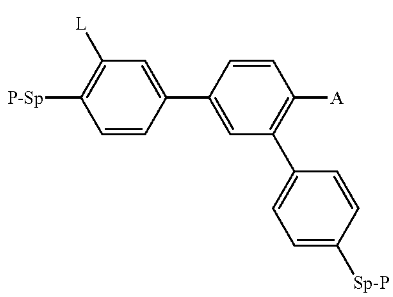
IC-7-20
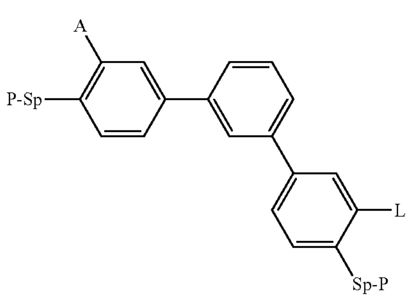
IC-7-21
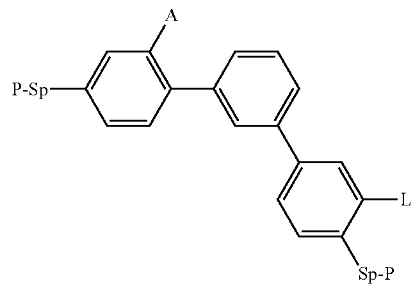
IC-7-22
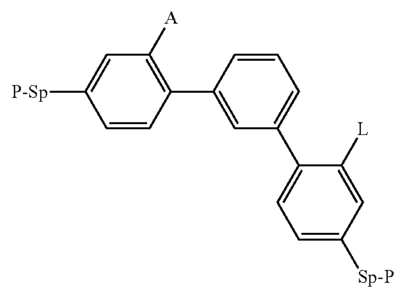
IC-7-23
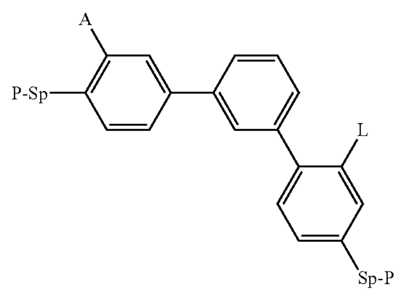
IC-7-24
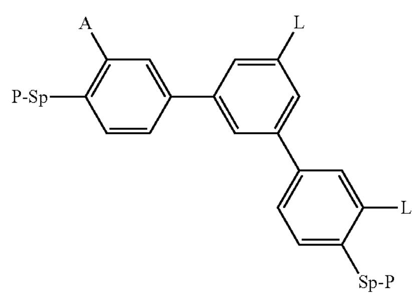
IC-7-25
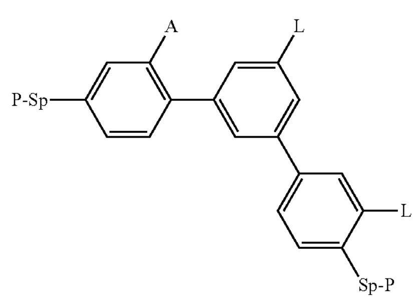

-continued
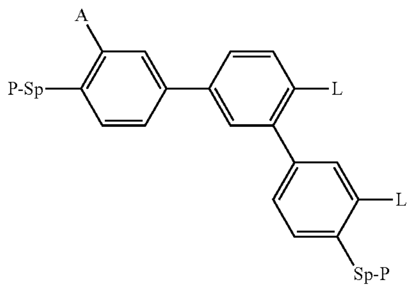
IC-7-26
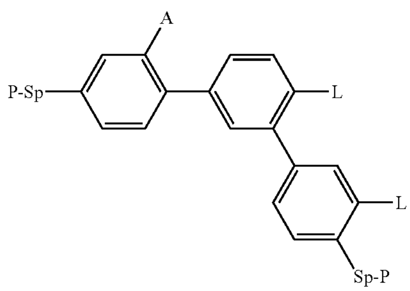
IC-7-27
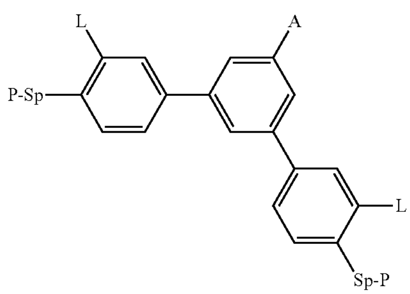
IC-7-28
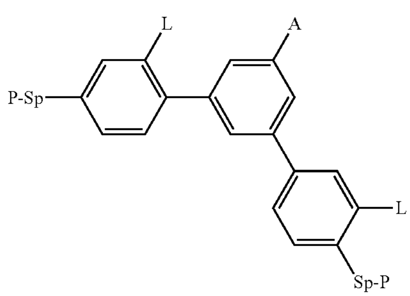
IC-7-29
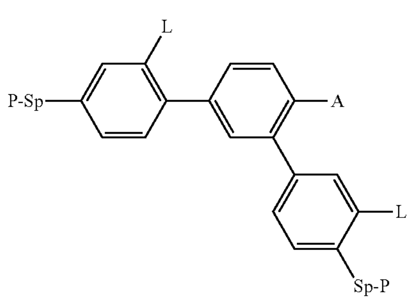
IC-7-30
-continued
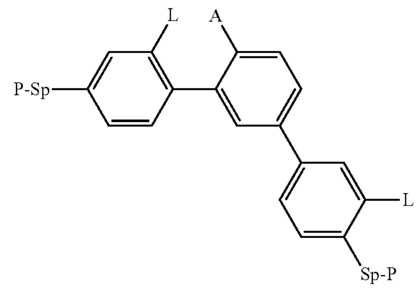
IC-7-31
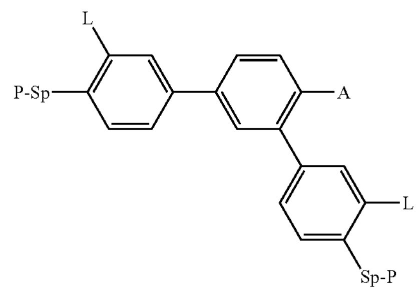
IC-7-32
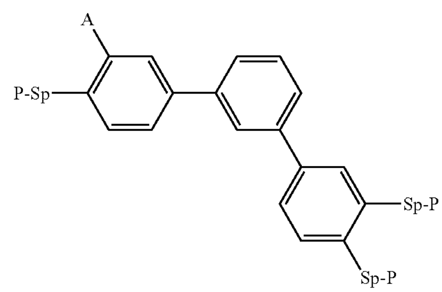
IC-8-1
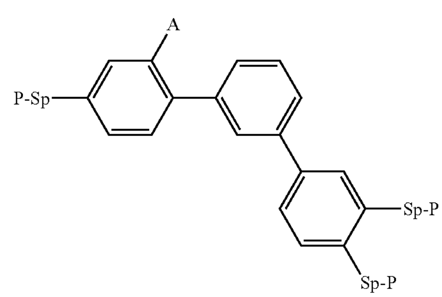
IC-8-2
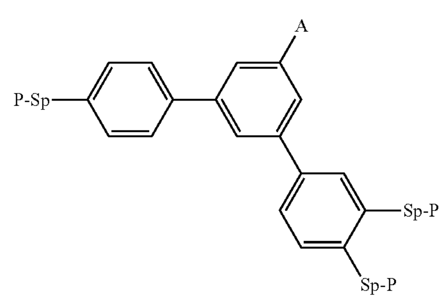
IC-8-3

-continued
IC-8-4
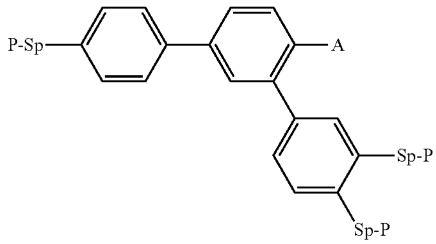
IC-8-5
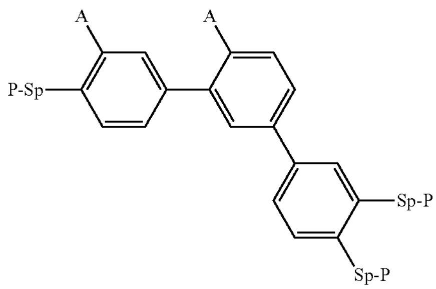
IC-8-6
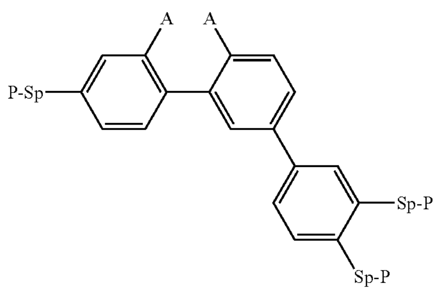
IC-8-7
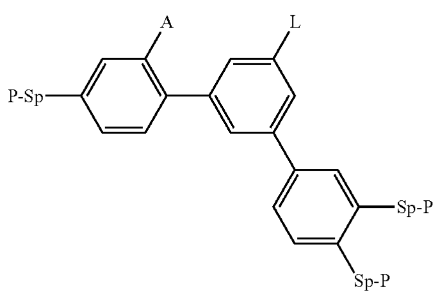
IC-8-8
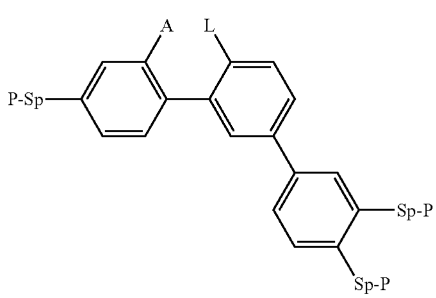
IC-8-9
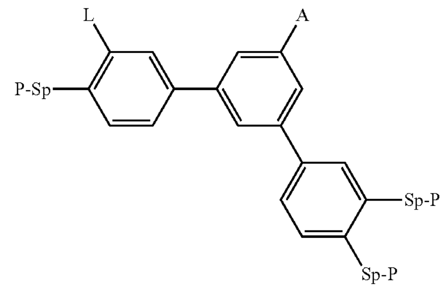
IC-8-10
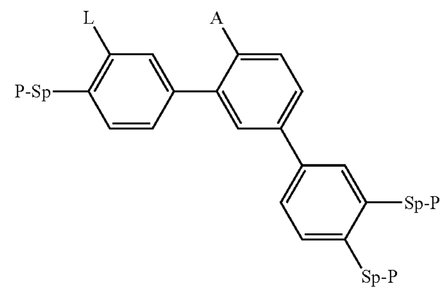
IC-9-1
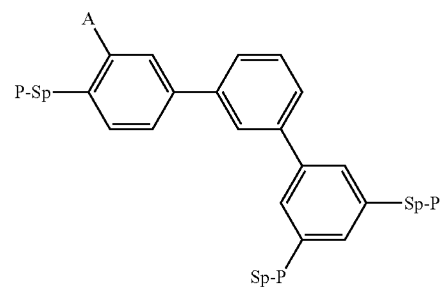
IC-9-2
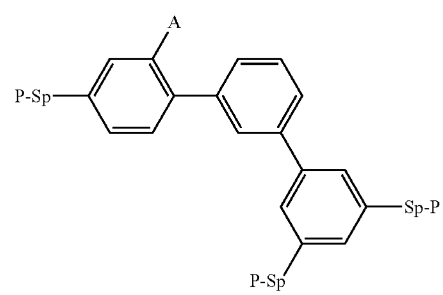
IC-9-3
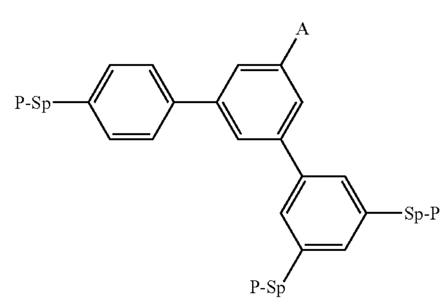

-continued

IC-9-4

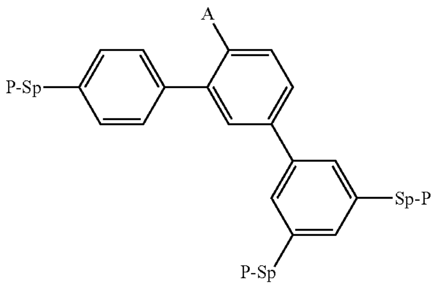

IC-9-5

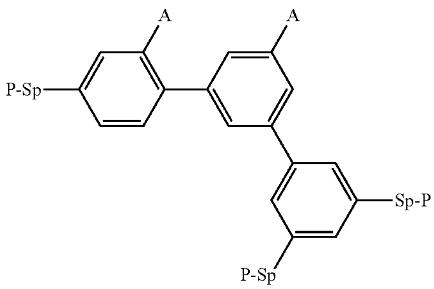

IC-9-6

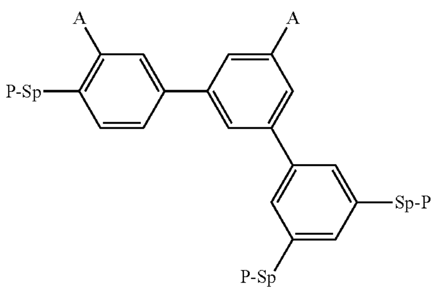

IC-9-7

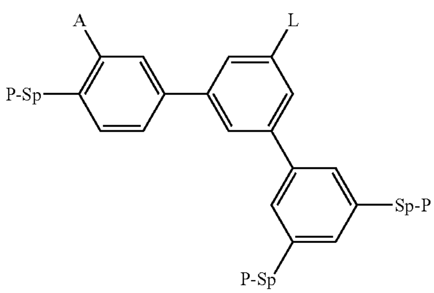

IC-9-8

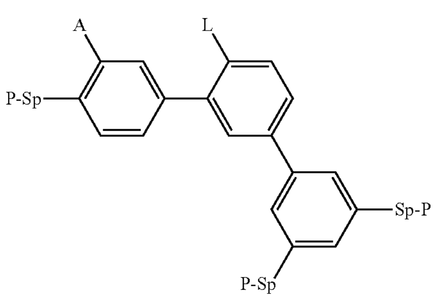

-continued

IC-9-9

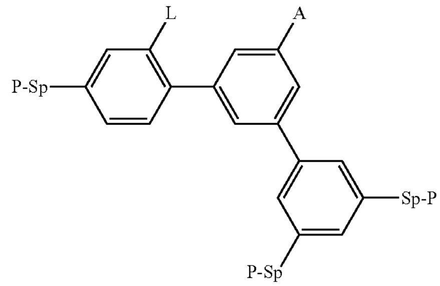

IC-9-10

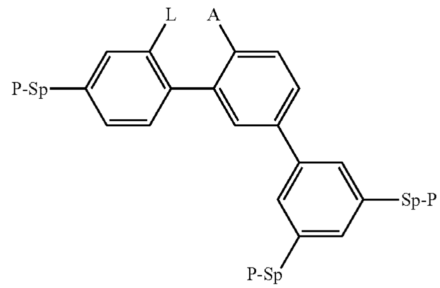

wherein A denotes $L^b$, P, Sp and L have the meanings given in formula IC or one of the preferred meanings given above and below, L may also have one of the meanings given for A.

Preferably in these compounds A is —CH═CH$_2$, —CH$_2$—CH═CH$_2$, —CH═CH—CH$_3$, —CH═CH—CH═CH$_2$ or —C(CH$_3$)=CH$_2$, very preferably —CH═CH$_2$ or C(CH$_3$)=CH$_2$. Further preferably in these compounds L denotes F, Cl, CH$_3$, C$_2$H$_5$, OCH$_3$ or OC$_2$H$_5$, very preferably F. Further preferably in these compounds L has one of the meanings given for A, preferably —CH═CH$_2$ or C(CH$_3$)=CH$_2$. Further preferably in these compounds at least one group Sp denotes a single bond. Further preferably in these compounds P denotes acrylate or methacrylate, very preferably methacrylate.

Very preferred compounds of formulae IC-1 to IC-9 are selected from the following subformulae:

IC1

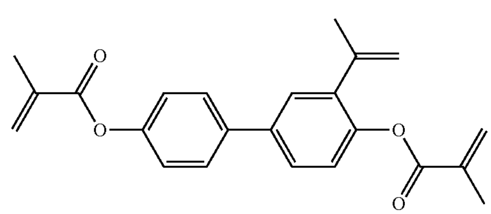

IC2

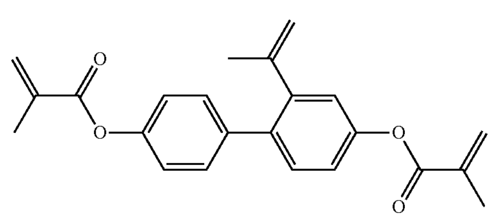

-continued
IC3
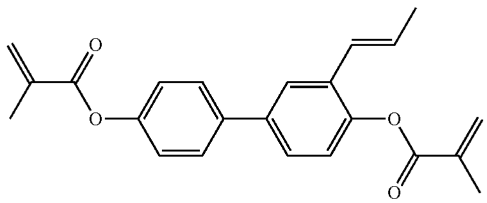
IC4
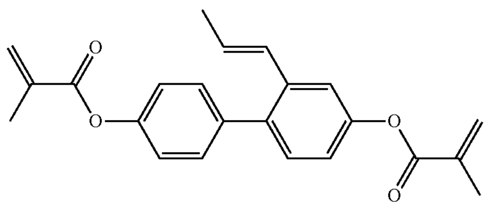
IC5
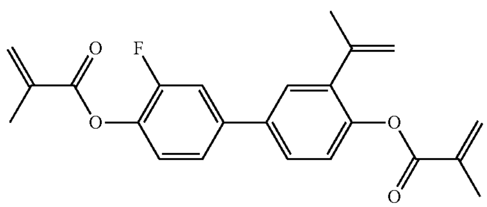
IC6
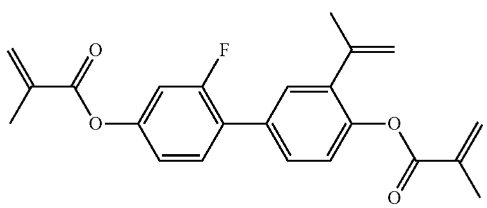
IC7
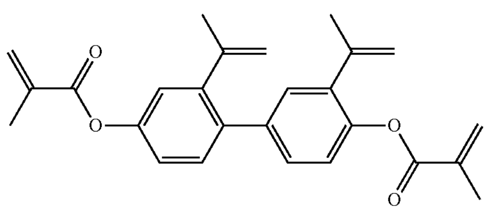
IC8
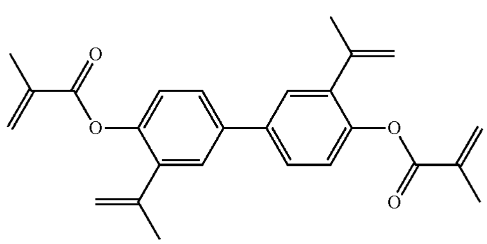
IC9
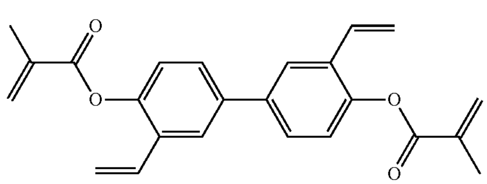
-continued
IC10
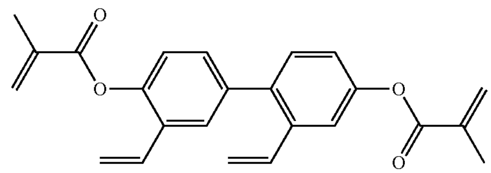
IC11
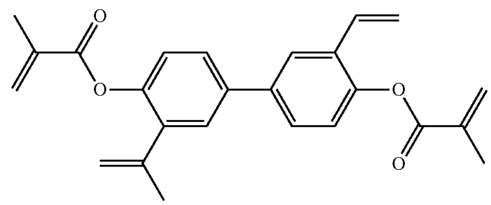
IC12
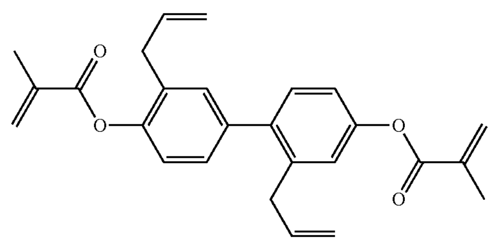
IC13
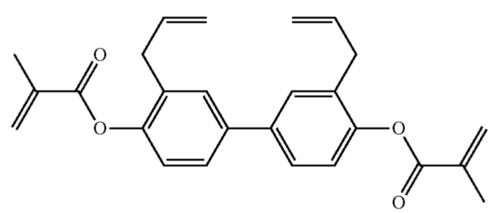
IC14
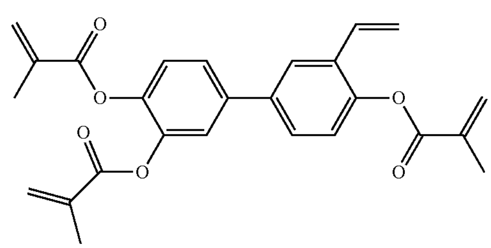
IC15
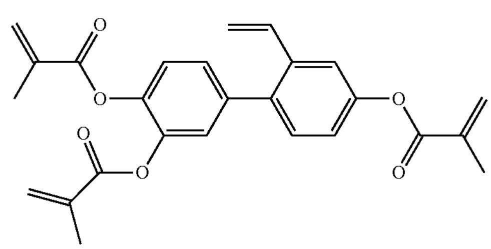

-continued
IC16
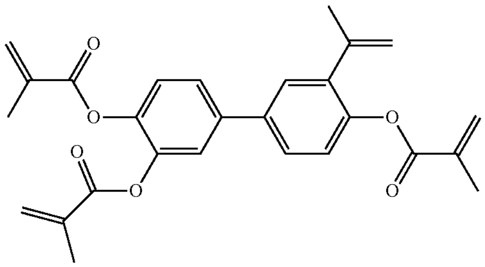
IC17
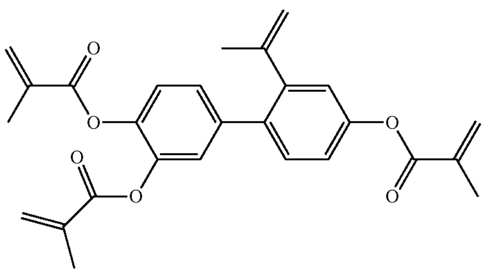
IC18
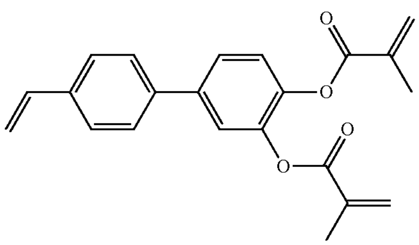
IC19
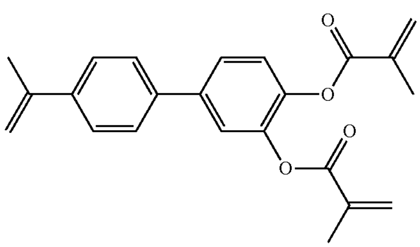
IC20
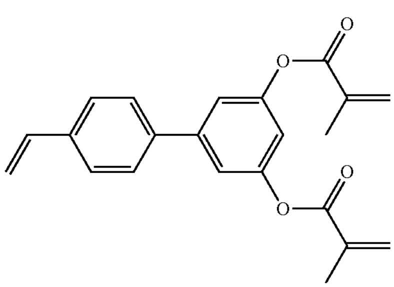
IC21
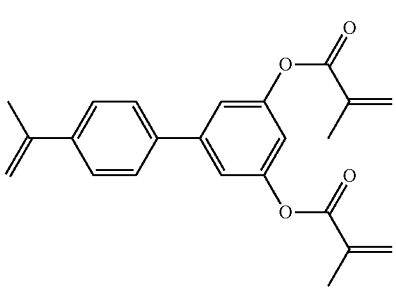
-continued
IC22
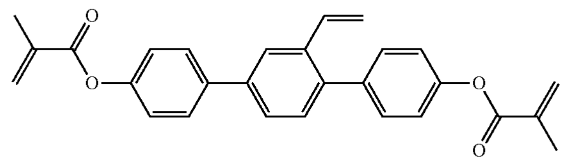
IC23
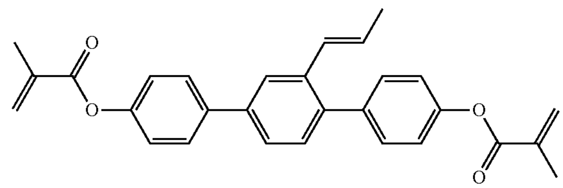
IC24
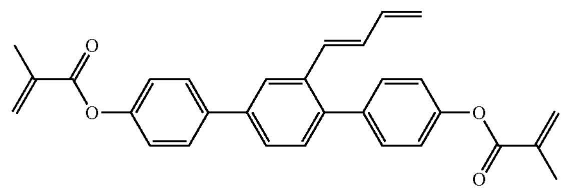
IC25
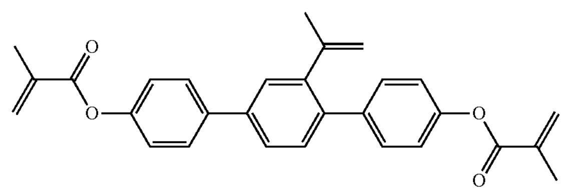
IC26
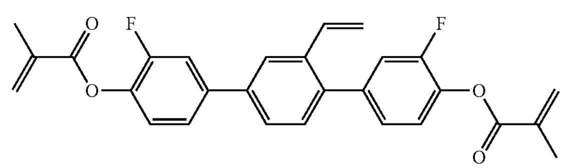
IC27
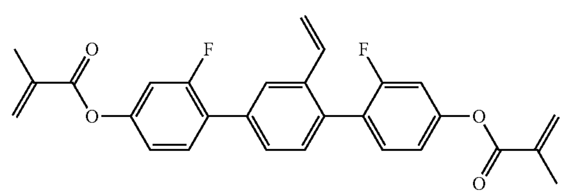
IC28
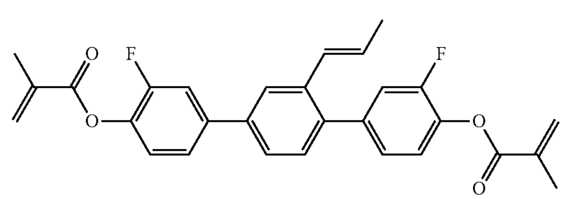

-continued
IC29
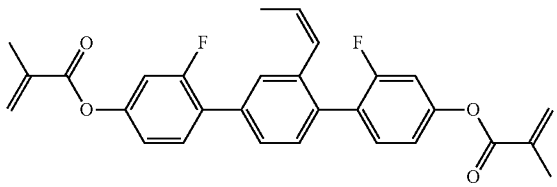
IC30
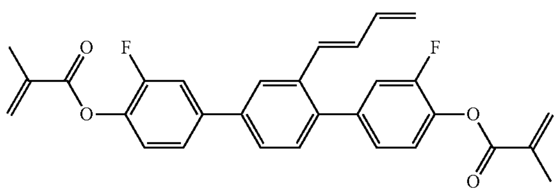
IC31
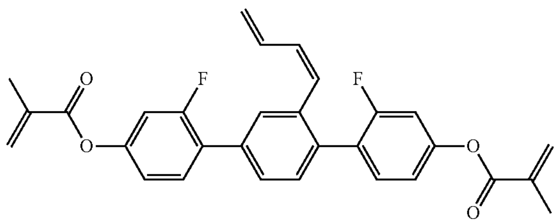
IC32
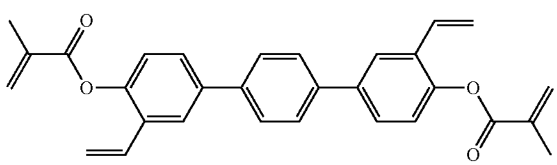
IC33
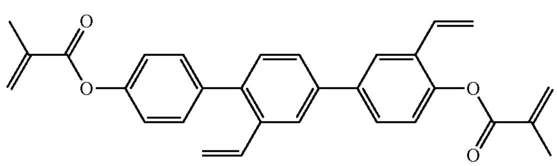
IC34
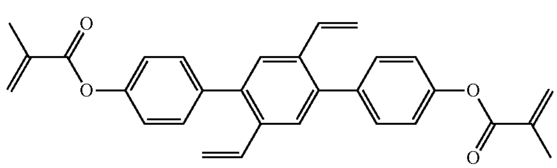
IC35
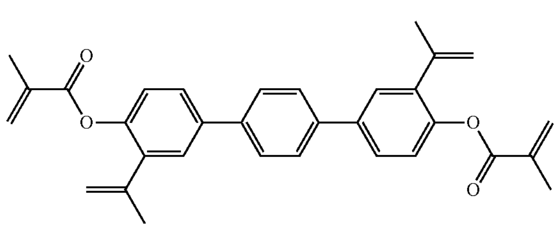
-continued
IC36
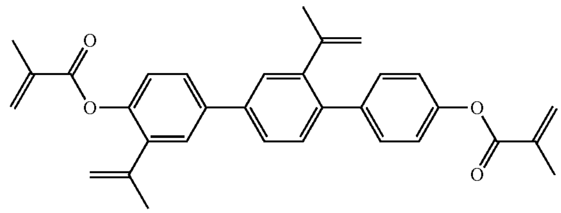
IC37
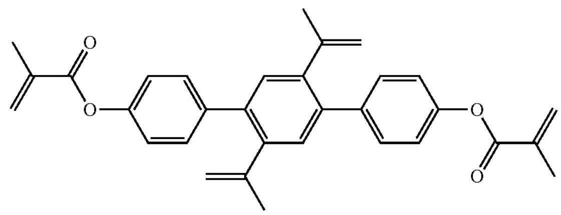
IC38
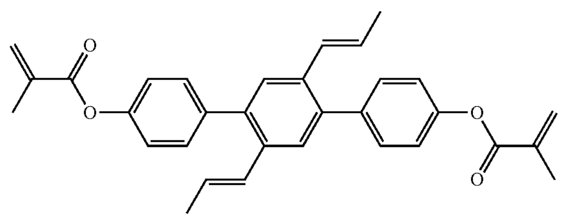
IC39
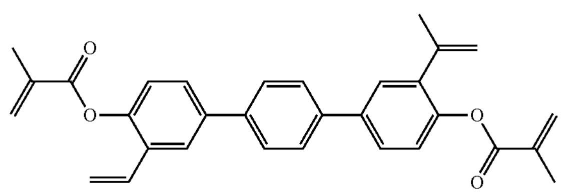
IC40
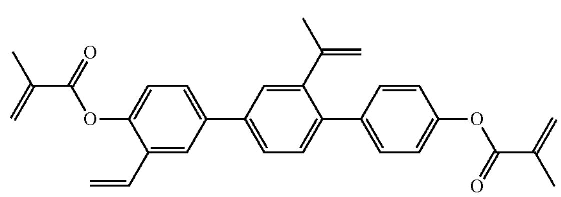
IC41
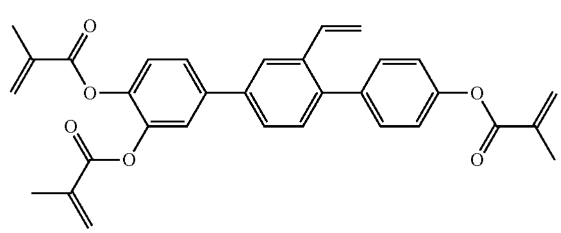

-continued

IC42

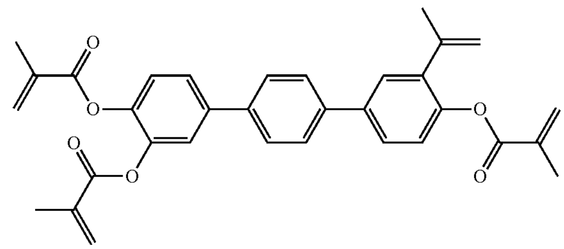

IC43

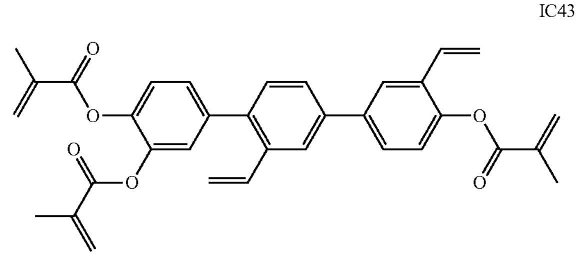

IC44

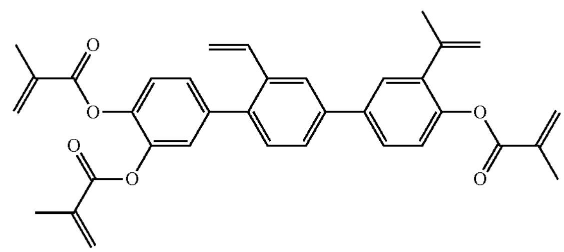

IC45

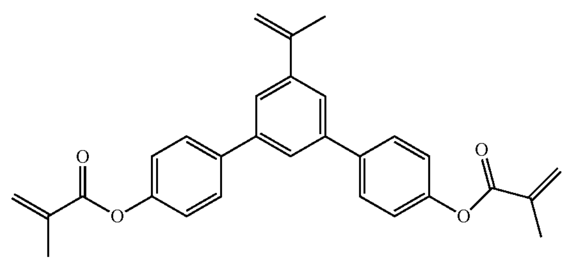

IC46

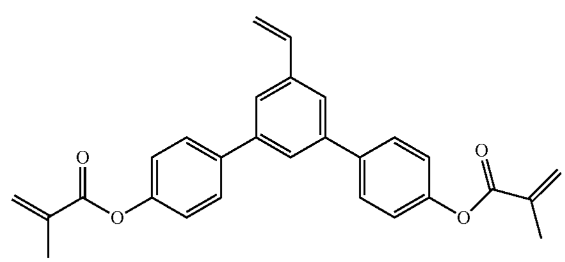

Further preferred are compounds of formula IC1 to IC46 wherein one, two or all of the methacrylate groups are each replaced by acrylate groups.

In a preferred embodiment the LC medium comprises at least one polymerizable compound of formula IA and/or formula IB and/or formula IC which have absorption in the range from 330 to 390 nm. Very preferably these compounds have an extinction coefficient of at least 0.5 at a wavelength in the range from 330 to 390 nm, more preferably in the range from 340 to 380 nm, very preferably in the range from 350 to 370 nm, most preferably in the range from 355 to 365 nm. The extinction coefficient and absorption wavelength are measured unless stated otherwise in a solution of the compound in DCM at a concentration of 3 g/L.

The total proportion of the polymerizable compounds of formulae IA, IB, IC and their subformulae in the LC medium according to the present invention is preferably from 0.05 to 3.0%, more preferably from 0.1 to 1.5%, very preferably from 0.1 to 0.9%.

In a first preferred embodiment of the present invention, the LC medium contains one or more, preferably exactly one, compound(s) of formula IA or its subformulae and one or more, preferably exactly one, compound(s) of formula IB or IC their subformulae, and preferably does not contain further polymerizable compounds.

Preferably, in the LC medium of this first preferred embodiment the proportion of the compound(s) of formula IA or its subformulae is from 0.01 to 1.0%, more preferably from 0.05 to 0.8%, very preferably from 0.1 to 0.6%, and the proportion of the compound(s) of formula IB or IC or their subformulae is from 0.01 to 1.0%, more preferably from 0.02 to 0.8%, very preferably from 0.05 to 0.5%.

In a second preferred embodiment of the present invention, the LC medium contains one or more, preferably exactly one, compound(s) of formula IA or its subformulae, one or more, preferably exactly one, compound(s) of formula IB or their subformulae, and one or more, preferably exactly one, compound(s) of formula IC or their subformulae, and preferably does not contain further polymerizable compounds.

More preferably the LC medium of this second preferred embodiment contains one or more, preferably exactly one, compound(s) of formula IA or its subformulae, one or more, preferably exactly one, compound(s) of formula IB-D or IB-T or their subformulae, and one or more, preferably exactly one, compound(s) selected from formulae IC-1 to IC-9 or their subformulae, and preferably does not contain further polymerizable compounds.

Preferably, in the LC medium of this second preferred embodiment the proportion of the compound(s) of formula IA or its subformulae is from 0.01 to 1.0%, more preferably from 0.05 to 0.8%, very preferably from 0.1 to 0.6%, the total proportion of the compound(s) of formula IB-D and IB-T or their subformulae is from 0.01 to 1.0%, more preferably from 0.05 to 0.8%, very preferably from 0.1 to 0.6%, and the total proportion of the compound(s) of the formulae IC-1 to IC-9 or their subformulae is from 0.01 to 1.0%, more preferably from 0.02 to 0.8%, very preferably from 0.05 to 0.5%.

In another preferred embodiment the LC medium comprises, in addition to the polymerizable compounds of formulae IA, IB, IC and their subformulae, at least one further polymerizable compound.

Preferred further polymerizable compounds are selected from Table D below, especially those selected from the group consisting of formulae RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122, R-139, RM-142, RM-143, RM-148 to RM-158, RM-164, RM-165 and RM-166 to RM-178.

The proportion of these further polymerizable compounds in the LC medium is preferably from 0.01 to 1.0%, more preferably from 0.05 to 0.6%.

The polymerizable compounds can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

The invention furthermore relates to an LC medium or LC display as described above, wherein the polymerizable compounds are present in polymerized form.

The LC display is preferably a PS-VA, PS-IPS, PS-FFS, or SA-VA display.

For the production of PSA or polymer stabilised SA displays, the polymerizable compounds contained in the LC medium are polymerized by in-situ polymerization in the LC medium between the substrates of the LC display, preferably while a voltage is applied to the electrodes.

The structure of the displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:

- a first substrate including a pixel electrode defining pixel areas, the pixel electrode being connected to a switching element disposed in each pixel area and optionally including a micro-slit pattern, and optionally a first alignment layer disposed on the pixel electrode,
- a second substrate including a common electrode layer, which may be disposed on the entire portion of the second substrate facing the first substrate, and optionally a second alignment layer,
- an LC layer disposed between the first and second substrates and including an LC medium as described above and below, wherein the polymerizable compounds may also be present in polymerized form.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerization the polymerizable compounds form a copolymer, which causes a certain tilt angle of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to produce a tilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

A preferred process of preparing a PSA display includes one or more of the following features:

- the polymerizable medium is exposed to UV light in the display in a 2-step process, including a first UV exposure step ("UV1 step"), with application of a voltage, to generate the tilt angle, and a second UV exposure step ("UV2 step"), without application of a voltage, to complete polymerization,
- the polymerizable medium is exposed to UV light in the display generated by an UV-LED lamp, preferably at least in the UV2 step, more preferably both in the UV1 and UV2 step.
- the polymerizable medium is exposed to UV light in the display generated by a UV lamp with a radiation spectrum that is shifted to longer wavelengths, preferably ≥340 nm, more preferably from 350 to <370 nm, very preferably from 355 to 368 nm, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:

- the polymerizable LC medium is irradiated by UV light in a 2-step process, including a first UV exposure step ("UV1 step"), with application of a voltage, to generate the tilt angle, and a second UV exposure step ("UV2 step"), without application of a voltage, to complete polymerization,
- the polymerizable LC medium is irradiated by UV light generated by a UV lamp having an intensity of from 0.5 mW/cm$^2$ to 10 mW/cm$^2$ in the wavelength range from 300-380 nm, preferably in the UV2 step, and optionally also in the UV1 step, the polymerizable LC medium is irradiated by UV light having a wavelength of ≥340 nm and ≤420 nm, preferably >350 nm, preferably in the range from 340 to 400 nm, more preferably in the range from 350 to 390 nm, very preferably in the range from 360 to 380 nm, most preferably in the range from 360 to 368 nm, the polymerizable LC medium is irradiated by UV light while a voltage is applied to the electrodes of the display, irradiation by UV light is carried out using a UV-LED lamp.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV irradiation can be carried out using a cut-off filter being substantially transmissive for wavelengths λ>340 nm.

Preferably UV irradiation is carried out using a UV-LED lamp.

The use of UV-LED lamps, which have with only one narrow emission peak, in the PSA process provides several advantages, like for example a more effective optical energy transfer to the polymerizable compounds in the LC medium, depending on the choice of the suitable polymerizable compounds that shows absorption at the emission wavelength of the LED lamp. This allows to reduce the UV intensity and/or the UV irradiation time, thus enabling a reduced tact time and savings in energy and production costs. Another advantage is that the narrow emission spectrum of the lamp allows an easier selection of the appropriate wavelength for photopolymerization.

Very preferably the UV light source is an UV-LED lamp emitting a wavelength in the range from 340 to 400 nm, more preferably in the range from 350 to 390 nm, very preferably in the range from 360 to 380 nm, most preferably in the range from 360 to 368 nm. UV-LED lamps emitting UV light with a wavelength of 365 nm are especially preferred.

Preferably the UV-LED lamp emits light having an emission peak with a full width half maximum (FWHM) of 30 nm or less.

UV-LED lamps are commercially available, for example from Dr. Hoenle AG, Germany or Primelite GmbH, Germany, or IST Metz GmbH, Germany, with emission wavelengths e.g. of 365, 385, 395 and 405 nm.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

The LC medium according to the present invention may additionally comprise one or more further components or additives, preferably selected from the list including but not limited to co-monomers, chiral dopants, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

The LC medium has preferably a nematic LC phase.

In a preferred embodiment the LC medium contains one or more polymerization initiators. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such as, for example, lower material costs and in particular less contamination of the LC medium by possible residual amounts of the initiator or degradation products thereof.

The polymerization can thus also be carried out without the addition of an initiator. Thus, in another preferred embodiment, the LC medium does not contain a polymerization initiator.

In another preferred embodiment the LC medium additionally comprises one or more stabilisers in order to prevent undesired spontaneous polymerization of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerizable component (component A), is preferably 10-50,000 ppm, particularly preferably 50-5,000 ppm.

In a preferred embodiment the LC medium contains one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

In another preferred embodiment of the present invention the LC media contain one or more further stabilisers, preferably selected from the the group consisting of the following formulae

S1

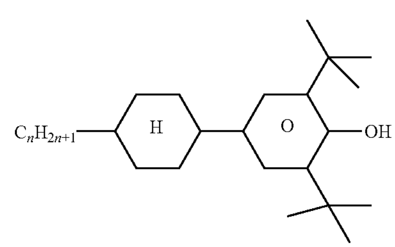

-continued

S2

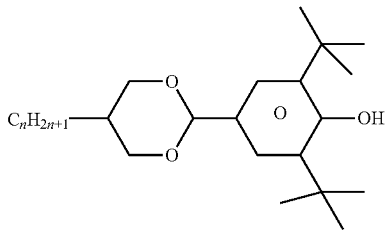

S3

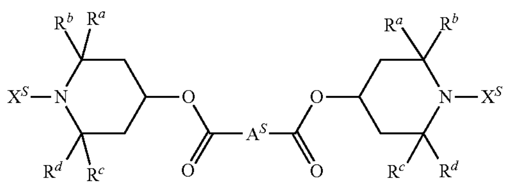

wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, $CH_3$, OH or O·, $A^S$ straight-chain, branched or cyclic alkylene with 1 to 20 C atoms which is optionally substituted, n an integer from 1 to 6, preferably 3.

Preferred stabilisers of formula S3 are selected from formula S3A

S3A

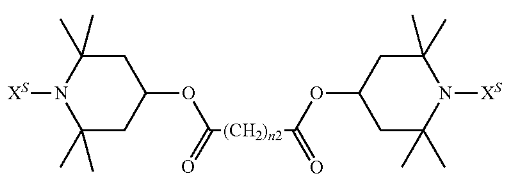

wherein n2 is an integer from 1 to 12, and wherein one or more H atoms in the group $(CH_2)_{n2}$ are each optionally replaced by methyl, ethyl, propyl, butyl, pentyl or hexyl.

Very preferred stabilisers are selected from the group consisting of the following formulae

S1-1

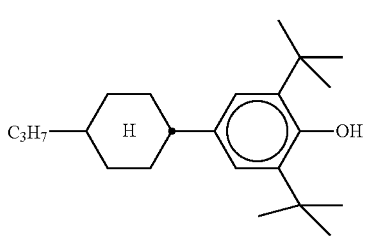

-continued

S2-1

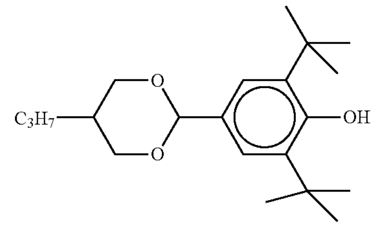

S3-1

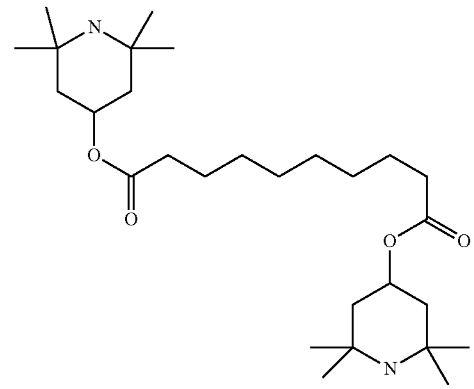

S3-2

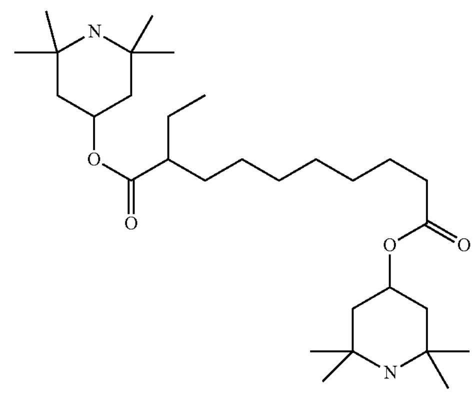

S3-3

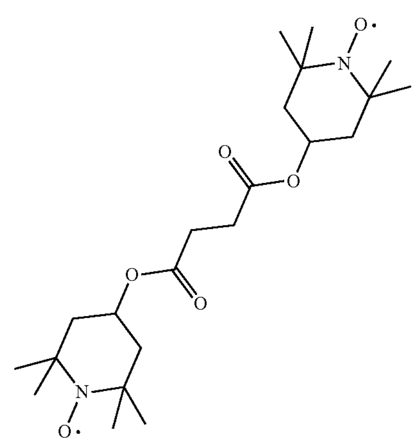

-continued

S3-4

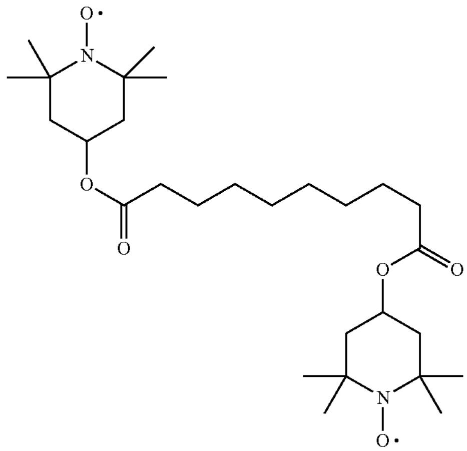

S3-5

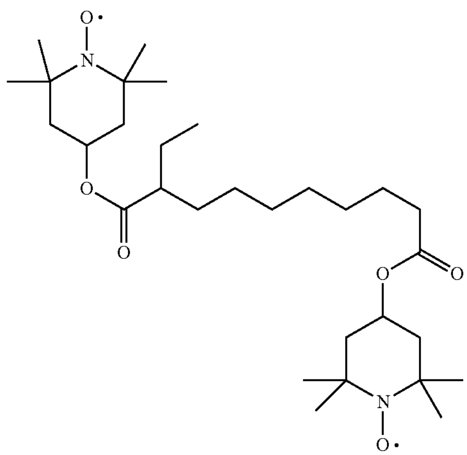

S3-6

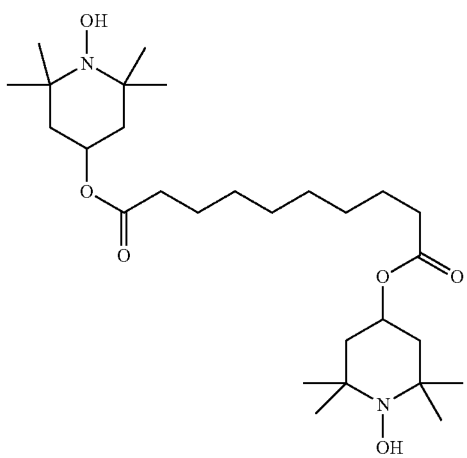

-continued

S3-7

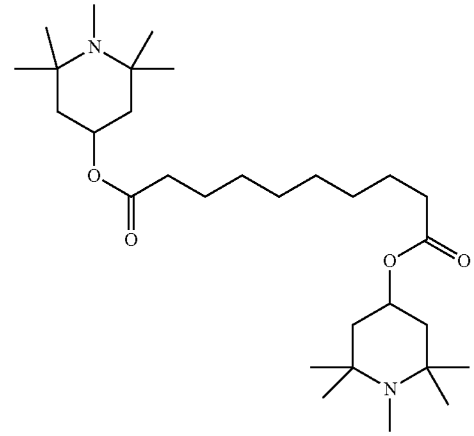

In a preferred embodiment the LC medium comprises one or more stabilisers selected from the group consisting of formulae S1-1, S2-1, S3-1, S3-1 and S3-3.

In a preferred embodiment the LC medium comprises one or more stabilisers selected from Table C below.

Preferably the proportion of stabilisers, like those of formula S1-S3, in the LC medium is from 10 to 500 ppm, very preferably from 20 to 100 ppm.

In another preferred embodiment the LC medium according to the present invention contains a self alignment (SA) additive, preferably in a concentration of 0.1 to 2.5%.

In a preferred embodiment the SA-VA display according to the present invention does not contain a polyimide alignment layer. In another preferred embodiment the SA-VA display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the RMs in the PSA process.

Suitable SA additives to induce homeotropic alignment, especially for use in SA-VA mode displays, are disclosed for example in US 2013/0182202 A1, US 2014/0838581 A1, US 2015/0166890 A1 and US 2015/0252265 A1.

In another preferred embodiment an LC medium or a polymer stabilised SA-VA display according to the present invention contains one or more self alignment additives selected from Table E below.

In another preferred embodiment the LC medium according to the present invention contains one or more SA additives, preferably selected from formula II or its subformulae or selected from Table E, in a concentration from 0.1 to 5%, very preferably from 0.2 to 3%, most preferably from 0.2 to 1.5%.

Besides the polymerizable compounds and additives described above, the LC medium for use in the LC displays according to the invention comprises an LC mixture ("host mixture") comprising one or more, preferably two or more LC compounds which are selected from low-molecular-weight compounds that are unpolymerizable, and at least one of which is a compound of formula II. These LC compounds are selected such that they stable and/or unreactive to a polymerization reaction under the conditions applied to the polymerization of the polymerizable compounds.

Particularly preferred embodiments of such an LC medium are shown below.

Preferably the LC medium contains one or more compounds of formula II selected from the group consisting of compounds of the formulae IIA, IIB, IIC and IID

IIA

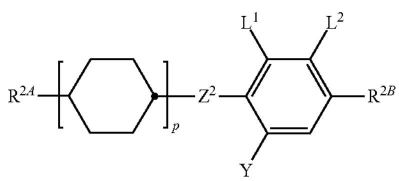

IIB

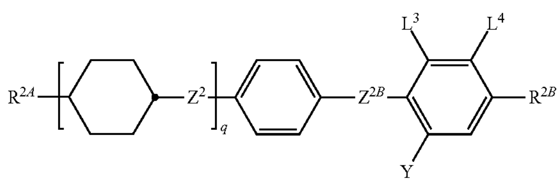

IIC

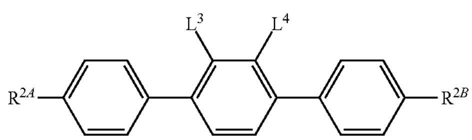

IID

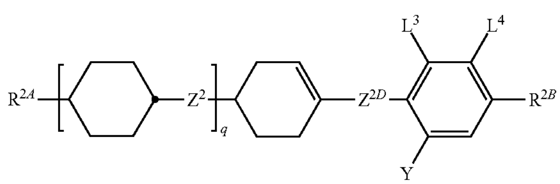

in which $R^{2A}$ and $R^{2B}$ each, independently of one another, denote H, an alkyl or alkenyl radical having up to 15 C atoms which is unsubstituted, monosubstituted by ON or $CF_3$ or at least monosubstituted by halogen, where, in addition, one or more $CH_2$ groups in these radicals may each be replaced by —O—, —S—,

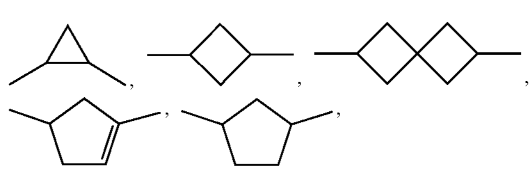

—C≡C—, —$CF_2$O—, —O$CF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, preferably H or $CH_3$, particularly preferably H, $Z^2$, $Z^{2B}$ and $Z^{2D}$ each, independently of one another, denote a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF—, —CH═CH$CH_2$O—, p denotes 0, 1 or 2, and q on each occurrence, identically or differently, denotes 0 or 1.

Preferred compounds of the formulae IIA, IIB, IIC and IID are those wherein $R^{2B}$ denotes an alkyl or alkoxy radical having up to 15 C atoms, and very preferably denotes (O)$C_vH_{2v+1}$ wherein (O) is an oxygen atom or a single bond and v is 1, 2, 3, 4, 5 or 6.

Further preferred compounds of the formulae IIA, IIB, IIC and IID are those wherein $R^{2A}$ or $R^{2B}$ denotes or contains cycloalkyl or cycloalkoxy radical, preferably selected from the group consisting of

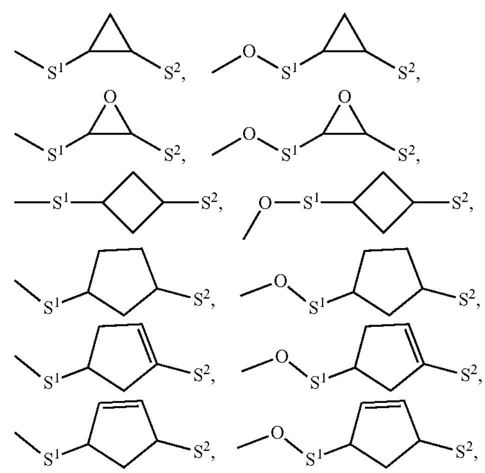

wherein $S^1$ is $C_{1-5}$-alkylene or $C_{2-5}$-alkenylene and $S^2$ is H, $C_{1-7}$-alkyl or $C_{2-7}$-alkenyl, and very preferably selected from the group consisting of

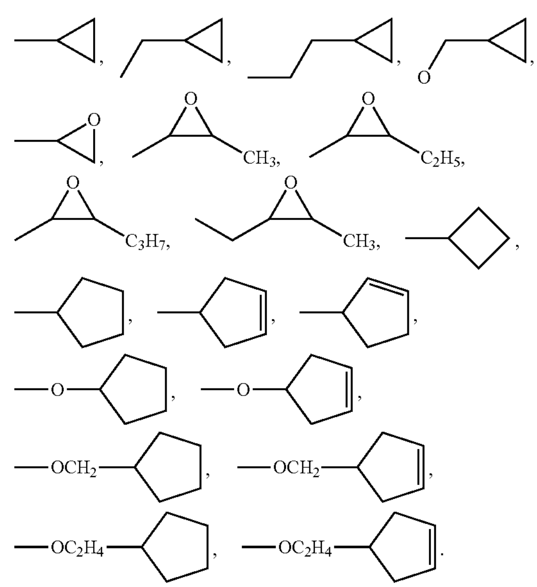

Further preferred compounds of the formulae IIA, IIB, IIC and IID are indicated below:

IIA-1
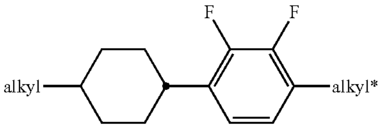
IIA-2
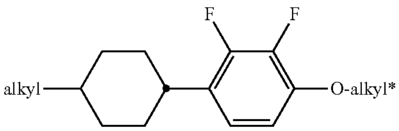
IIA-3
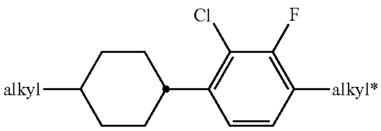
IIA-4
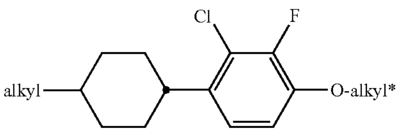
IIA-5
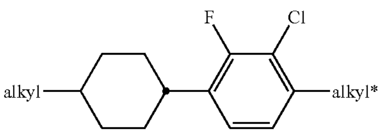
IIA-6
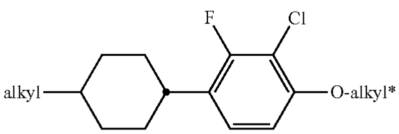
IIA-7
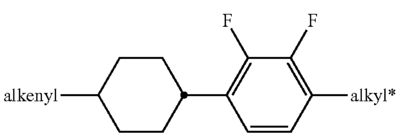
IIA-8
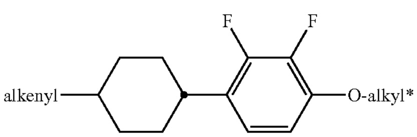
IIA-9
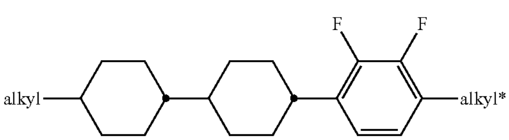
IIA-10
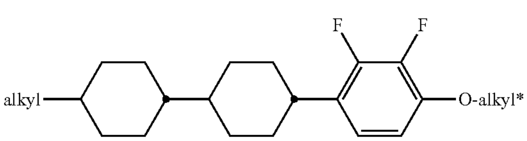
IIA-11
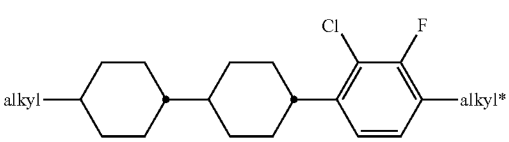
-continued
IIA-12
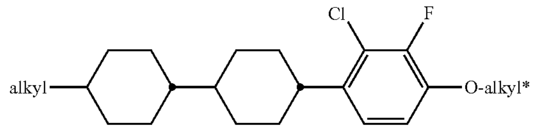
IIA-13
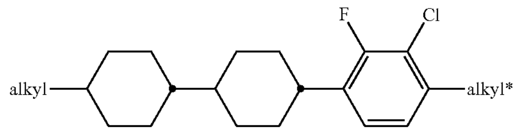
IIA-14
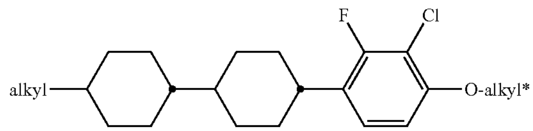
IIA-15
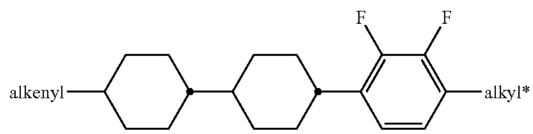
IIA-16
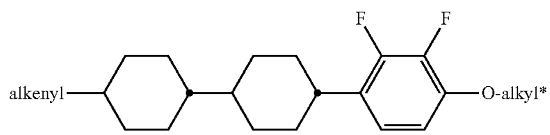
IIA-17
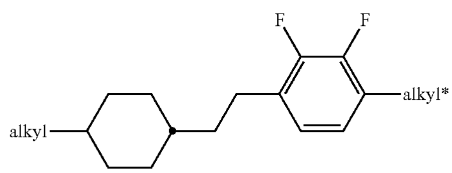
IIA-18
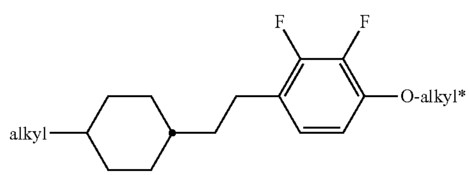
IIA-19
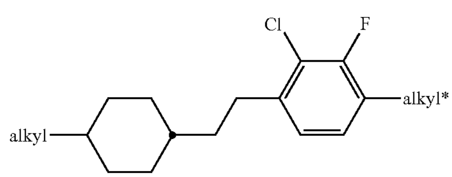
IIA-20
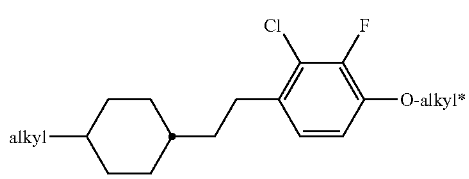

-continued
IIA-21
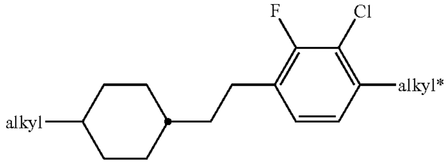
IIA-22
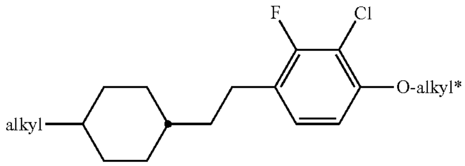
IIA-23
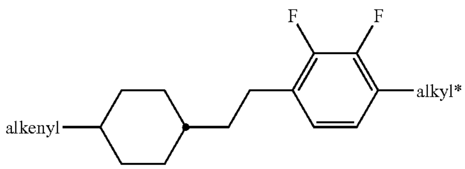
IIA-24
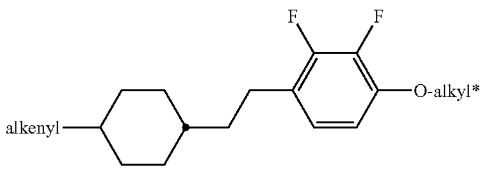
IIA-25
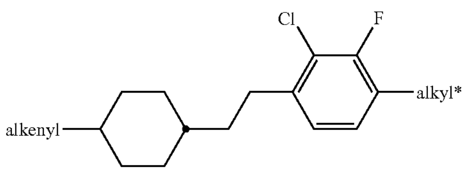
IIA-26
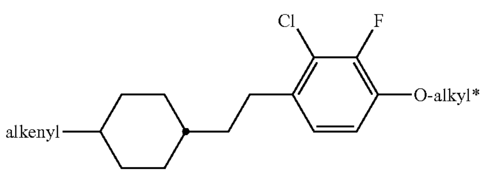
IIA-27
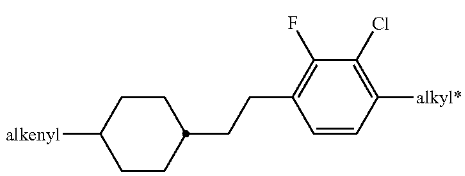
IIA-28
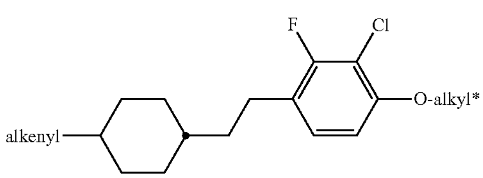
IIA-29
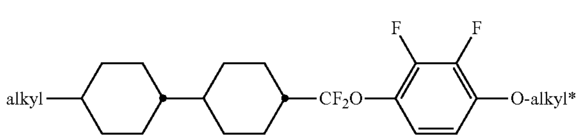
-continued
IIA-30
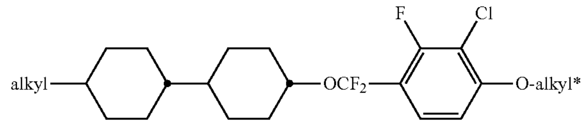
IIA-31
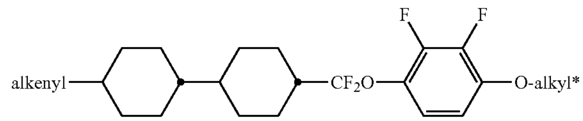
IIA-32
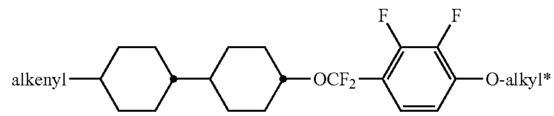
IIA-33
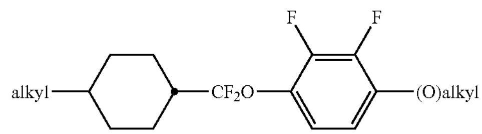
IIA-34
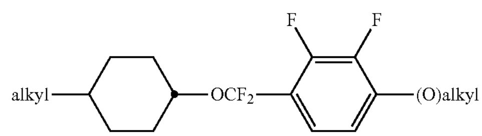
IIA-35
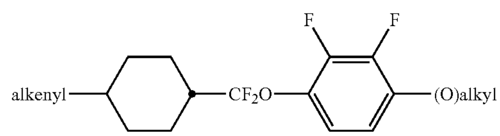
IIA-36
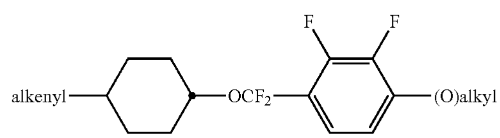
IIA-37
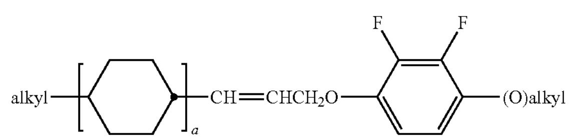
IIA-38
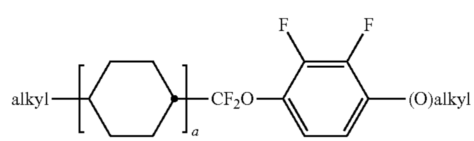
IIA-39
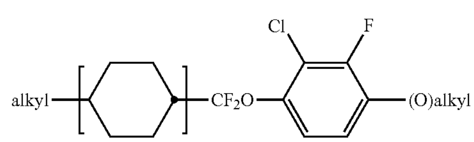

-continued
IIA-40
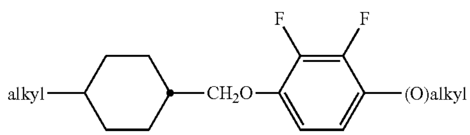
IIA-41
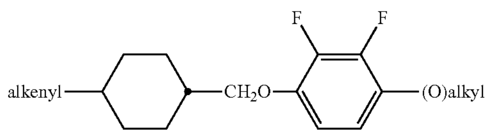
IIA-42
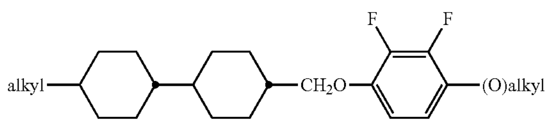
IIA-43
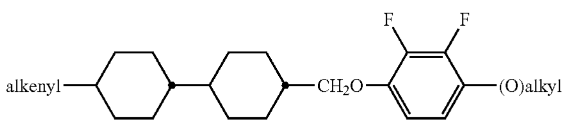
IIA-44
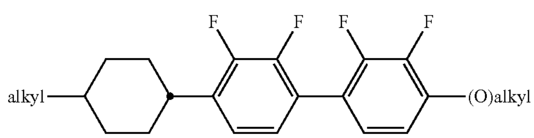
IIA-45
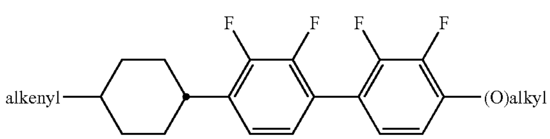
IIA-46
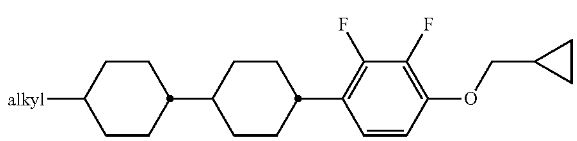
IIB-1
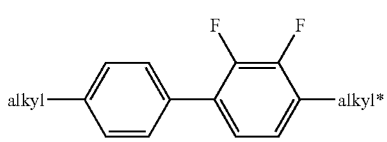
IIB-2
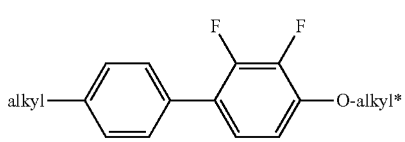
IIB-3
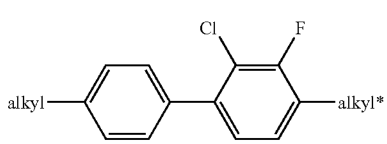
-continued
IIB-4
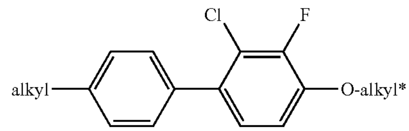
IIB-5
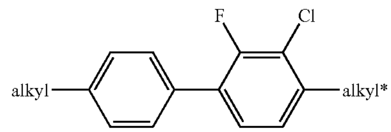
IIB-6
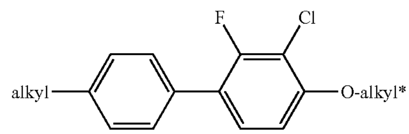
IIB-7
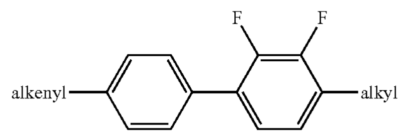
IIB-8
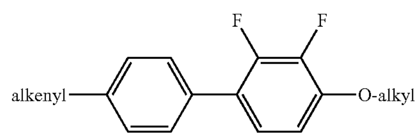
IIB-9
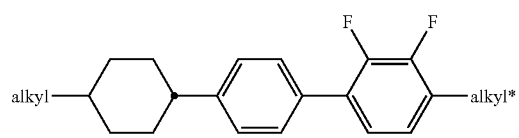
IIB-10
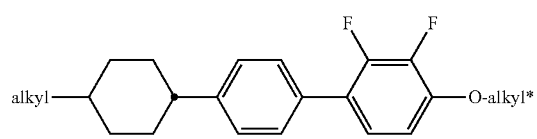
IIB-11
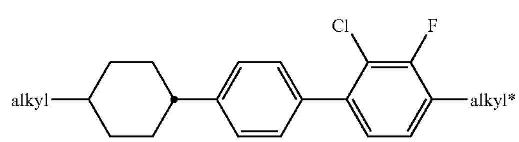
IIB-12
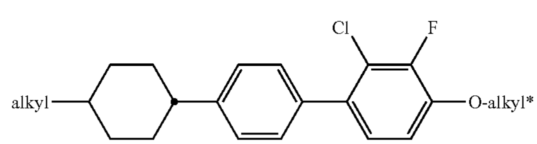
IIB-13
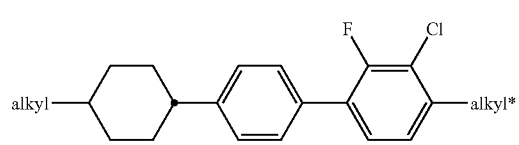

-continued

IIB-14

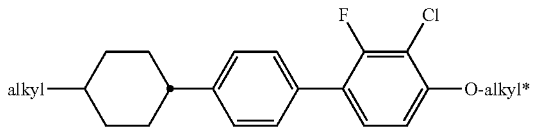

IIB-15

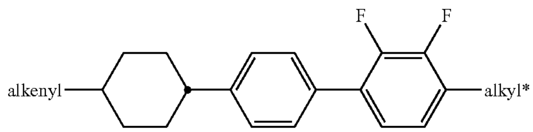

IIB-16

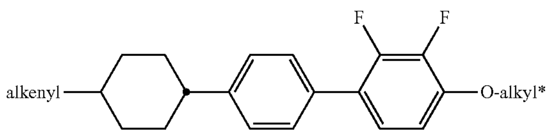

IIB-17

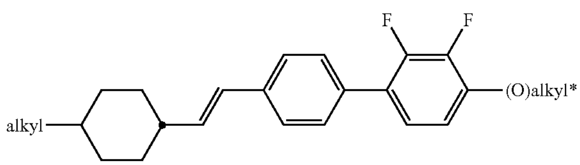

IIB-18

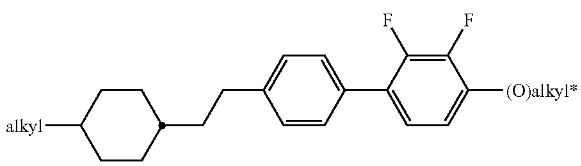

IIB-19

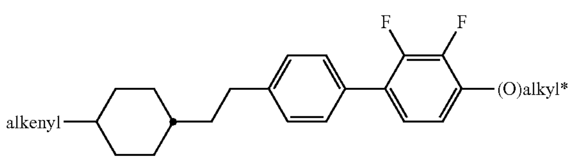

IIB-20

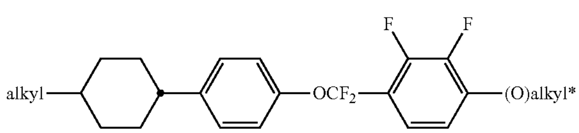

IIB-21

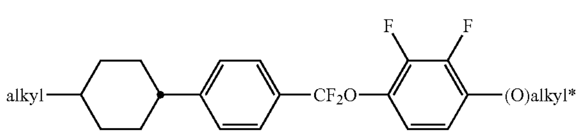

IIB-22

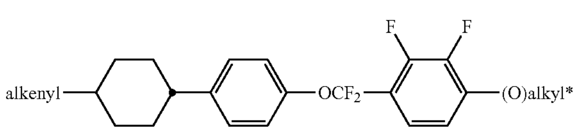

IIB-23

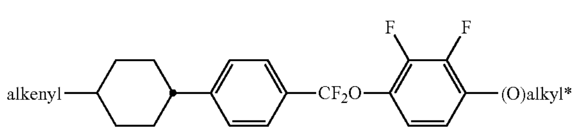

-continued

IIB-24

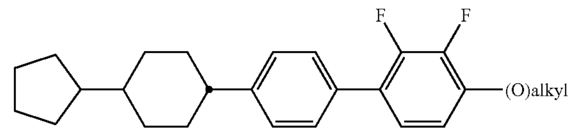

IIC-1

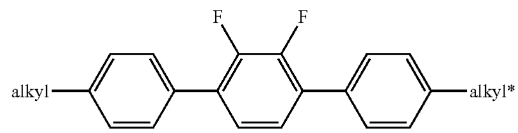

IID-1

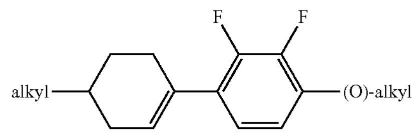

IID-2

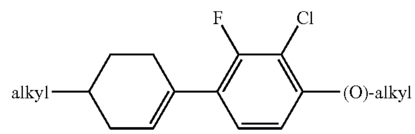

IID-3

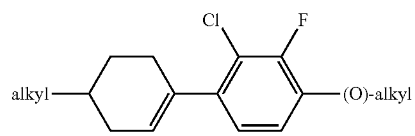

IID-4

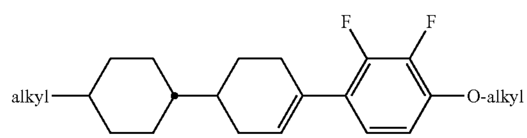

IID-5

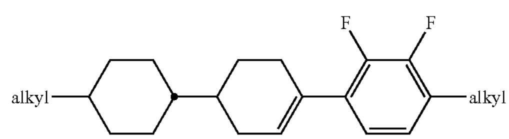

IID-6

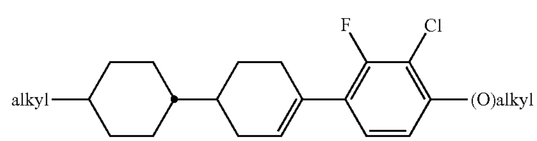

IID-7

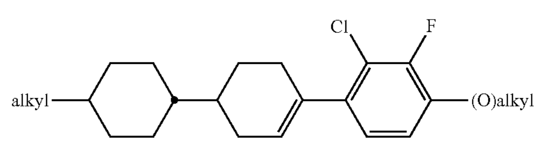

in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred LC medium according to the invention comprises one or more compounds of the formulae IIA-2, IIA-8, IIA-10, IIA-16, II-18, IIA-40, IIA-41, IIA-42, IIA-43, IIB-2, IIB-10, IIB-16, IIC-1, and IID-4.

The proportion of compounds of the formulae IIA and/or IIB in the mixture as a whole is preferably at least 20% by weight.

In another preferred embodiment the LC medium comprises one or more compounds of formula III

III

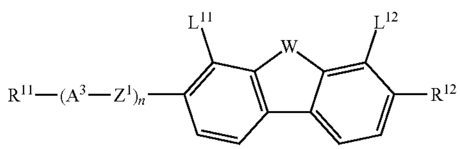

in which $R^{11}$ and $R^{12}$ each, independently of one another, denote H, an alkyl or alkoxy radical having 1 to 15 C atoms, where one or more $CH_2$ groups in these radicals may each be replaced, independently of one another, by

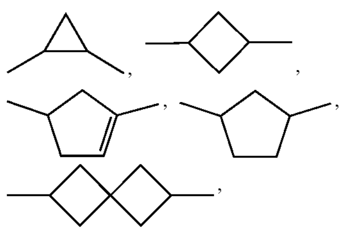

—C≡C—, —$CF_2O$—, —$OCF_2$—, —CH═CH—, by —O—, —CO—O— or —O—CO— in such a way that O atoms are not linked directly to one another, and in which, in addition, one or more H atoms may each be replaced by halogen, $A^3$ on each occurrence, independently of one another, denotes a) 1,4-cyclohexenylene or 1,4-cyclohexylene radical, in which one or two non-adjacent $CH_2$ groups may each be replaced by —O— or —S—, b) a 1,4-phenylene radical, in which one or two CH groups may each be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, preferably 0 or 1, $Z^1$ on each occurrence independently of one another denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF=CH—, —CH═CH—, —C≡C— or a single bond, and $L^{11}$ and $L^{12}$ each, independently of one another, denote F, Cl, $CF_3$ or $CHF_2$, preferably H or F, most preferably F, and W denotes O or S.

In a preferred embodiment of the present invention the LC medium comprises one or more compounds of the formula III-1 and/or III-2

III-1

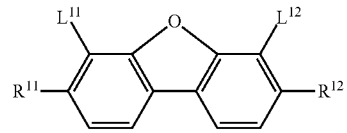

III-2

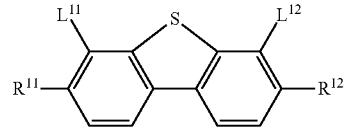

in which the occurring groups have the same meanings as given under formula III above and preferably $R^{11}$ and $R^{12}$ each, independently of one another, an alkyl, alkenyl or alkoxy radical having up to 15 C atoms, more preferably one or both of them denote an alkoxy radical and $L^{11}$ and $L^{12}$ each preferably denote F.

In another preferred embodiment the LC medium comprises one or more compounds of the formula III-1 selected from the group of compounds of formulae III-1-1 to III-1-10, preferably of formula III-1-6,

III-1-1

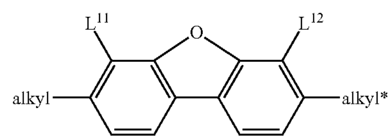

III-1-2

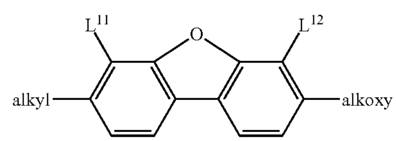

III-1-3

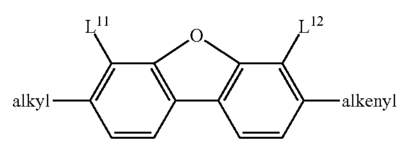

III-1-4

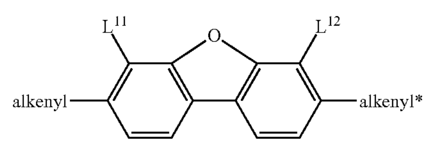

III-1-5

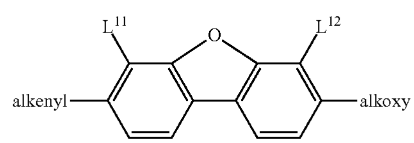

III-1-6

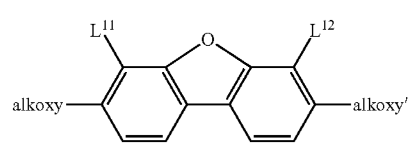

-continued

III-1-7

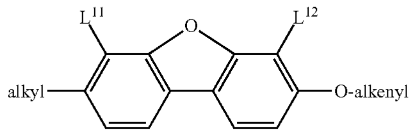

III-1-8

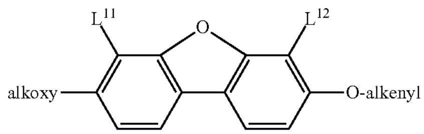

III-1-9

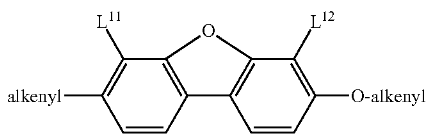

III-1-10

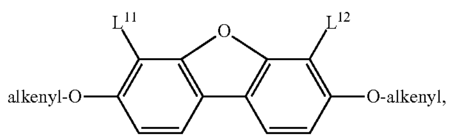

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

In another preferred embodiment the LC medium comprises one or more compounds of the formula III-2 selected from the group of compounds of formulae III-2-1 to III-2-10, preferably of formula III-2-6,

III-2-1

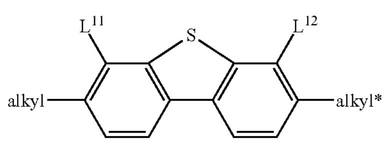

III-2-2

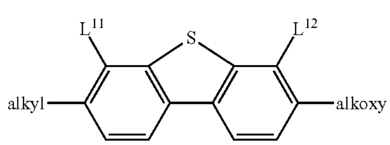

III-2-3

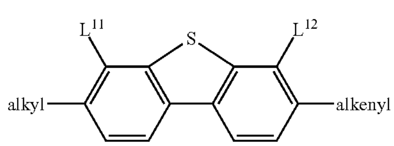

III-2-4

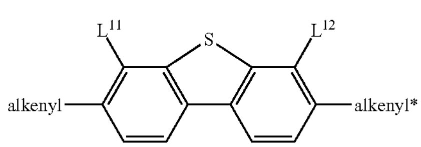

-continued

III-2-5

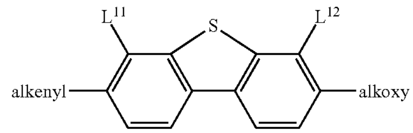

III-2-6

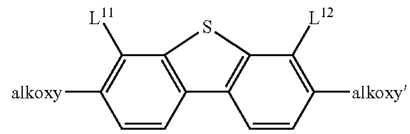

III-2-7

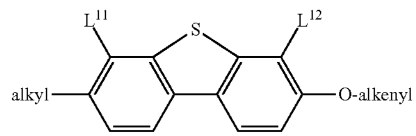

III-2-8

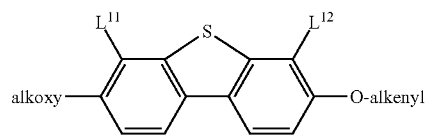

III-2-9

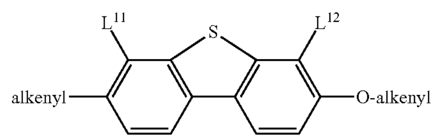

III-2-10

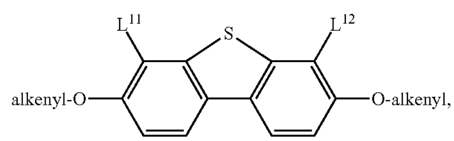

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl, preferably both F.

In another preferred embodiment of the present invention the LC medium comprises one or more compounds of the formula IIIA-1 and/or IIIA-2

IIIA-1

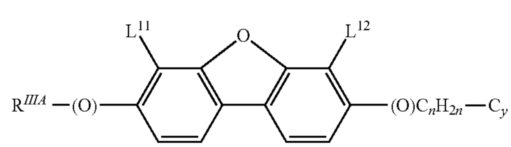

IIIA-2

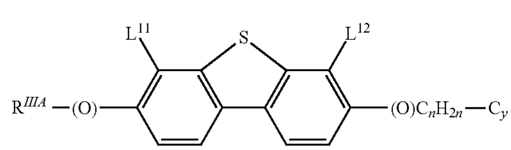

in which $L^{11}$ and $L^{12}$ have the same meanings as given under formula III, (O) denotes O or a single bond, $R^{IIIA}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula IIIA-1 and/or IIIA-2 are contained in the LC medium either alternatively or additionally to the compounds of formula III, preferably additionally.

Very preferred compounds of the formulae IIIA-1 and IIIA-2 are the following:

IIIA-1-1

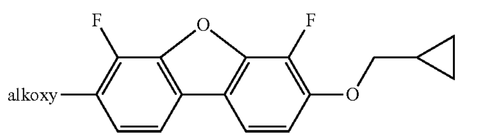

IIIA-1-2

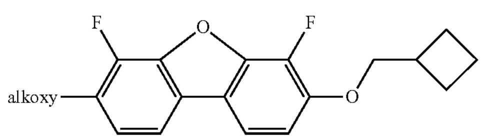

IIIA-1-3

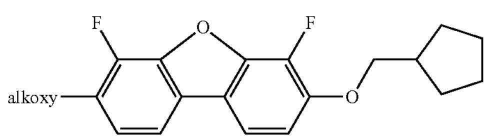

IIIA-2-1

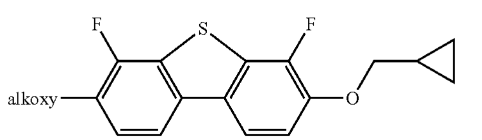

IIIA-2-2

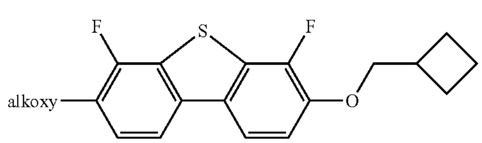

IIIA-2-3

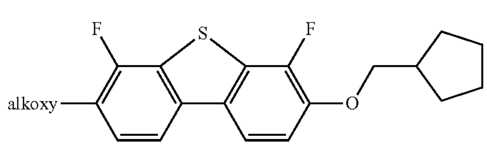

in which alkoxy denotes a straight-chain alkoxy radical having 1-6 C atoms.

In a preferred embodiment of the present invention, the LC medium comprises one or more compounds of formula III-3

III-3

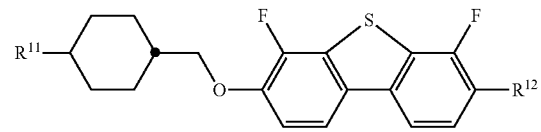

in which $R^{11}$, $R^{12}$ identically or differently, denote H, an alkyl or alkoxy radical having 1 to 15 C atoms, in which one or more $CH_2$ groups in these radicals are each optionally replaced, independently of one another, by

—C≡C—, —$CF_2$O—, —O$CF_2$—, —CH═CH—,

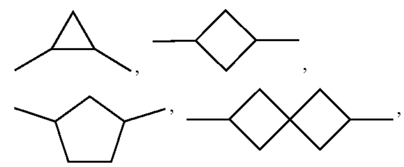

—O—, —CO—O— or —O—CO— in such a way that O atoms are not linked directly to one another, and in which, in addition, one or more H atoms may each be replaced by halogen.

The compounds of formula III-3 are preferably selected from the group of compounds of the formulae III-3-1 to III-3-10:

III-3-1

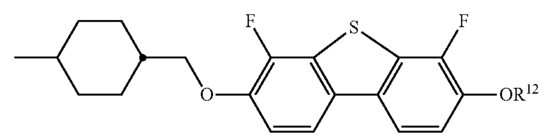

III-3-2

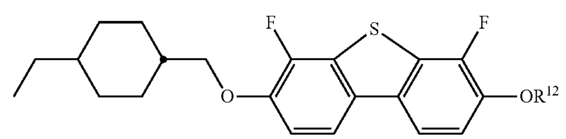

III-3-3

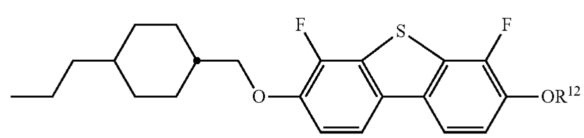

III-3-4

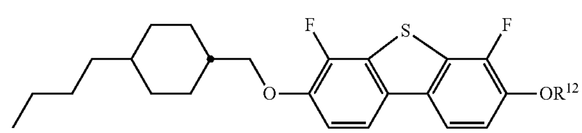

III-3-5

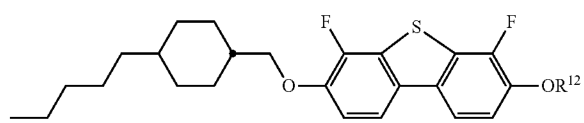

-continued

III-3-6

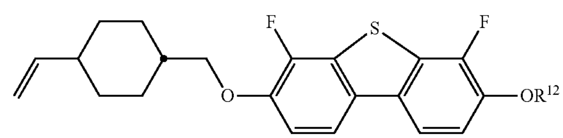

III-3-7

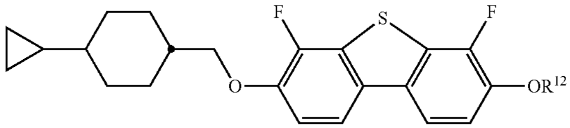

III-3-8

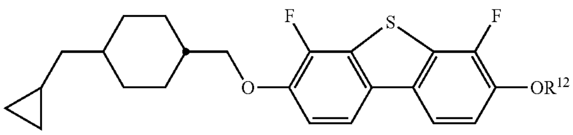

III-3-9

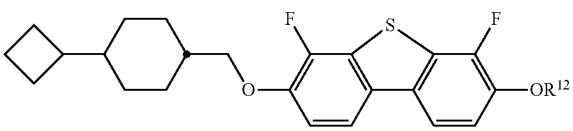

III-3-10

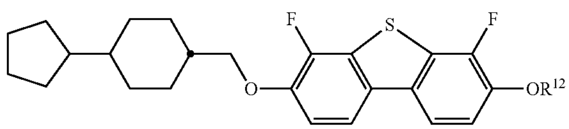

in which $R^{12}$ denotes alkyl having 1 to 7 C-atoms, preferably ethyl, n-propyl or n-butyl, or alternatively cyclopropylmethyl, cyclobutylmethyl or cyclopentylmethyl.

In another preferred embodiment of the present invention, the LC medium comprises one or more compounds of the formulae III-4 to III-6, preferably of formula III-5,

III-4

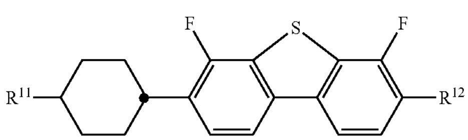

III-6

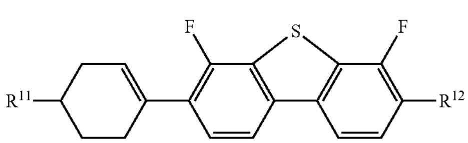

III-6

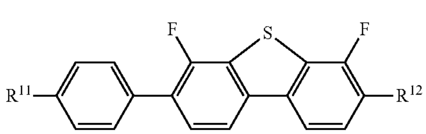

in which the parameters have the meanings given in formula III, $R^{11}$ preferably denotes straight-chain alkyl and $R^{12}$ preferably denotes alkoxy, each having 1 to 7 C atoms.

In another preferred embodiment the LC medium comprises one or more compounds of the formula I selected from the group of compounds of formulae III-7 to III-9, preferably of formula III-8,

III-7

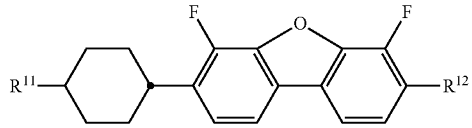

III-8

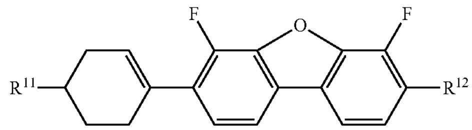

III-9

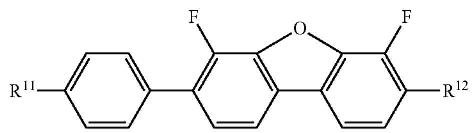

in which the parameters have the meanings given in formula III, $R^{11}$ preferably denotes straight-chain alkyl and $R^{12}$ preferably denotes alkoxy each having 1 to 7 C atoms.

In a preferred embodiment, the medium comprises one or more compounds of the formula IV,

IV

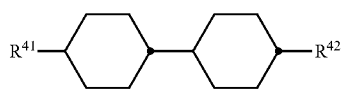

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

IV-1

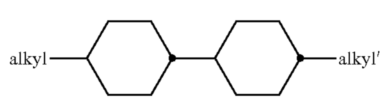

IV-2

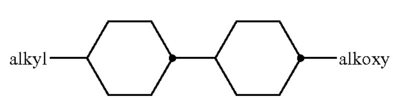

IV-3

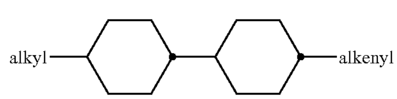

IV-4

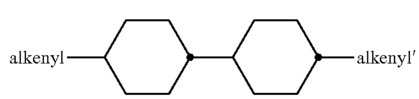

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, the LC medium comprises one or more compounds selected from the compounds of the formulae IV-1-1 to IV-1-4

IV-1-1

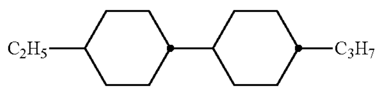

IV-1-2

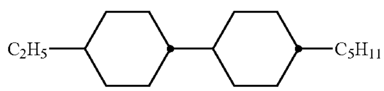

IV-1-3

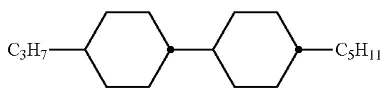

IV-1-4

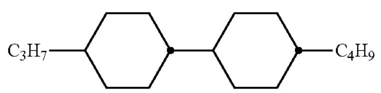

IV-1-5

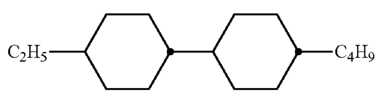

IV-1-6

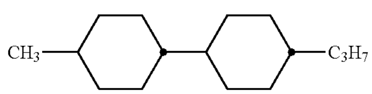

Very preferably, the LC medium according to the invention comprises one or more compounds of the formulae IV-2-1 and/or IV-2-2

IV-2-1

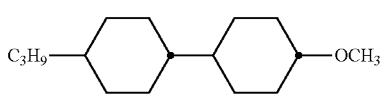

IV-2-2

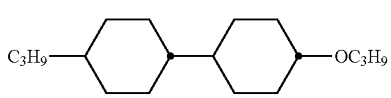

Very preferably, the LC medium according to the invention comprises a compound of formula IV-3, in particular selected from the compounds of the formulae IV-3-1 to IV-3-4

IV-3-1

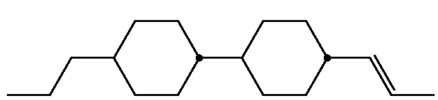

-continued

IV-3-2

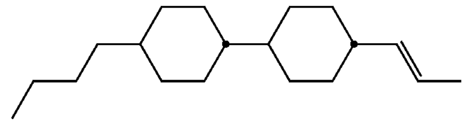

IV-3-3

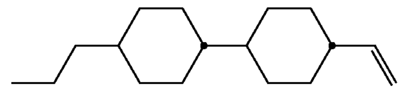

IV-3-4

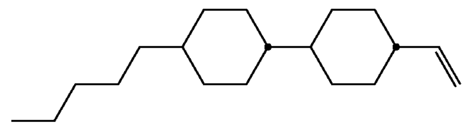

Very preferably, the LC medium according to the invention comprises a compound of formula IV-4, in particular selected from the compounds of the formulae IV-4-1 and IV-4-2

IV-4-1

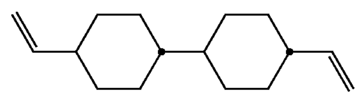

IV-4-2

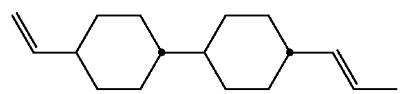

The LC medium preferably additionally comprises one or more compounds of the formula IVa, IVa

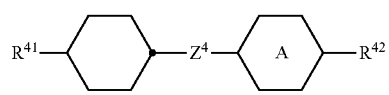

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical, and

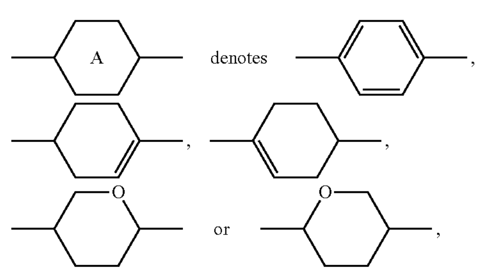

$Z^4$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$— or —CF═CF—.

Preferred compounds of the formula IVa are indicated below:

IVa-1

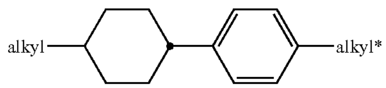

IVa-2

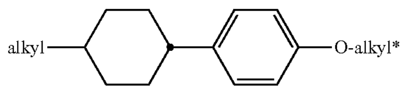

IVa-3

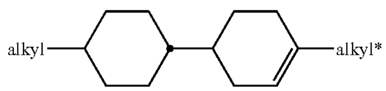

IVa-4

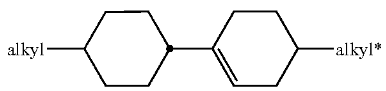

in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula IVa in the mixture as a whole is preferably at least 5% by weight Preferably, the LC medium comprises one or more compounds of formula IVb-1 to IVb-3

IVb-1

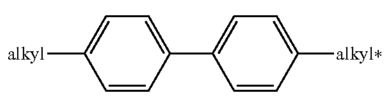

IVb-2

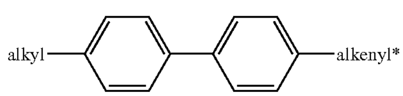

IVb-3

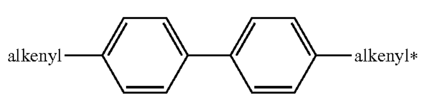

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

The proportion of the biphenyls of the formulae IV-1 to IV-3 in the mixture as a whole is preferably at least 3% by weight, in particular ≥5% by weight.

Of the compounds of the formulae IVb-1 to IVb-3, the compounds of the formula IVb-2 are particularly preferred.

Particularly preferred biphenyls are

IVb-1-1

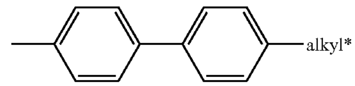

IVb-2-1

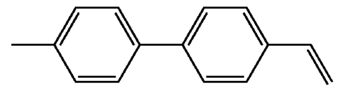

IVb-2-2

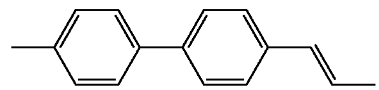

IVb-2-3

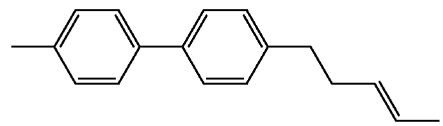

in which alkyl* denotes an alkyl radical having 1 to 6 C atoms and preferably denotes n-propyl.

The LC medium according to the invention particularly preferably comprises one or more compounds of the formulae IVb-1-1 and/or IVb-2-3.

In a preferred embodiment, the LC medium comprises one or more compounds of formula V

V

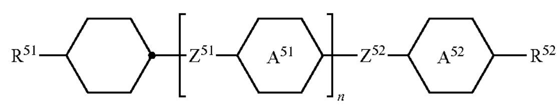

in which $R^{51}$ and $R^{52}$ independently of one another, denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

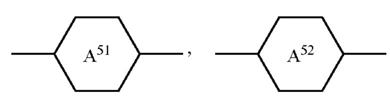

identically, or differently, denote

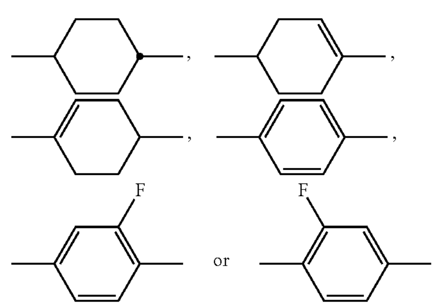

in which

preferably denotes

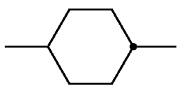 or, 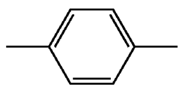 , $Z^{51}$, $Z^{52}$ each, independently of one another, denote $—CH_2—CH_2—$, $—CH_2—O—$, —CH═CH—, —C≡C—, —COO— or a single bond, preferably $—CH_2—CH_2—$, $—CH_2—O—$ or a single bond and particularly preferably a single bond, and n is 1 or 2.

The compounds of formula V are preferably selected from the compounds of the formulae V-1 to V-16:

V-1

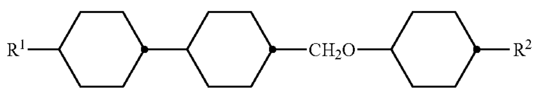

V-2

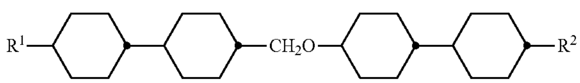

V-3

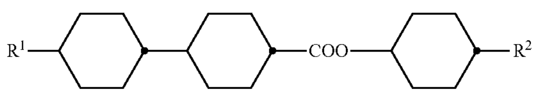

V-4

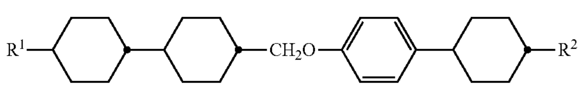

V-5

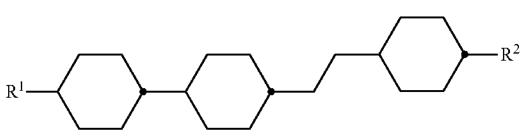

V-6

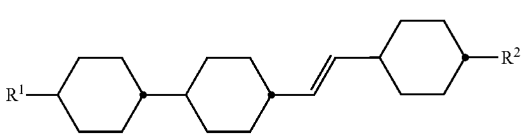

V-7

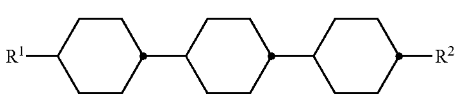

V-8

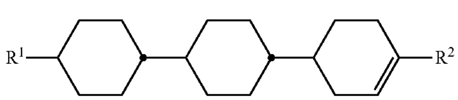

V-9

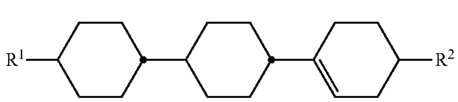

-continued

V-10

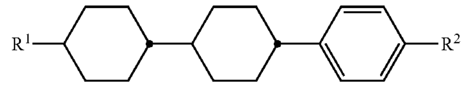

V-11

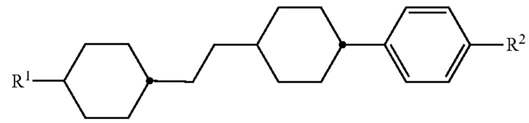

V-12

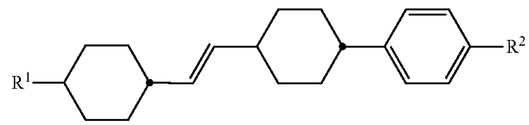

V-13

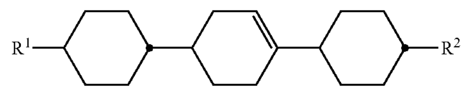

V-14

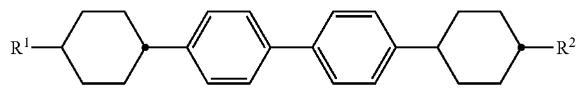

V-15

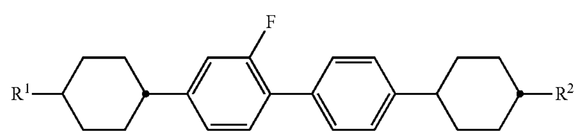

V-16

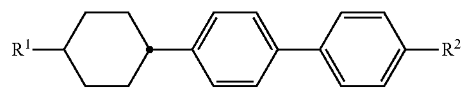

in which $R^1$ and $R^2$ have the meanings indicated for $R^{51}$ and $R^{52}$ above. $R^1$ and $R^2$ preferably each, independently of one another, denote straight-chain alkyl or alkenyl.

Preferred LC media comprise one or more compounds of the formulae V-1, V-3, V-4, V-6, V-7, V-10, V-11, V-12, V-14, V-15, and/or V-16

LC media according to the invention very particularly preferably comprise the compounds of the formula V-10, V-12, V-16 and/or IV-1, in particular in amounts of 5 to 30%.

Preferred compounds of the formulae V-10 are indicated below:

V-10a

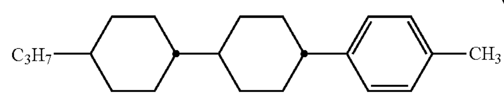

V-10b

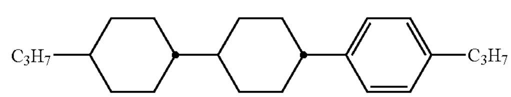

V-10c

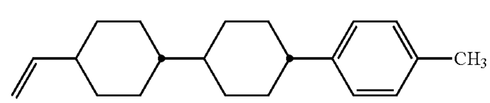

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very particularly preferred LC media comprise compounds V-10a and IV-1-1

V-10a

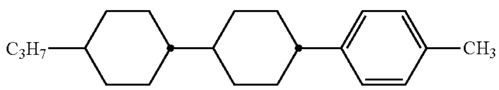

IV-1-1

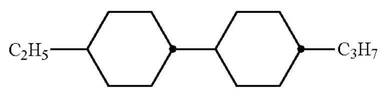

The compounds V-10a and IV-1-1 are preferably present in the mixture in a concentration of 15 to 35%, particularly preferably 15 to 25% and especially preferably 18 to 22%, based on the mixture as a whole.

Very particularly preferred LC media comprise the compounds V-10b and IV-1-1:

V-10b

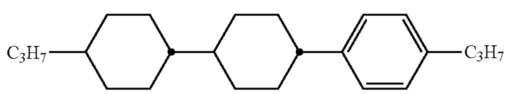

IV-1-1

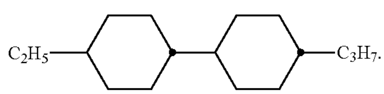

The compounds V-10b and IV-1-1 are preferably present in the mixture in a concentration of 15 to 35%, particularly preferably 15 to 25% and especially preferably 18 to 22%, based on the mixture as a whole.

Very particularly preferred LC media comprise the following three compounds:

V-10a

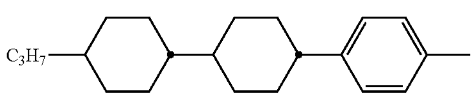

V-10b

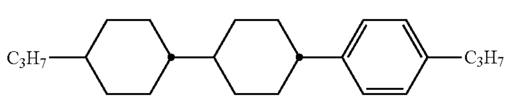

IV-1-1

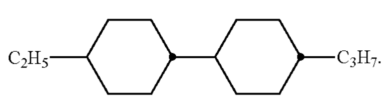

The compounds V-10a, V-10b and IV-1-1 are preferably present in the mixture in a concentration of 15 to 35%, particularly preferably 15 to 25% and especially preferably 18 to 22%, based on the mixture as a whole.

Preferred LC media comprise at least one compound selected from the group of the compounds

V-6

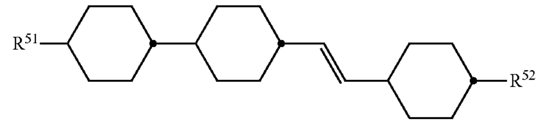

V-7

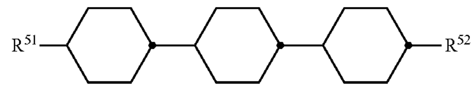

IV-1

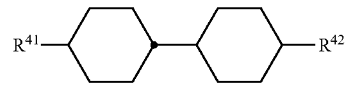

in which $R^{41}$ and $R^{42}$, and $R^{51}$ and $R^{52}$ have the meanings indicated above. Preferably in the compounds V-6, V-7 and IV-1, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms.

Preferred LC media comprise at least one compound of the formulae V-6a, V-6b, V-7a, V-7b, IV-4-1, IV-4-2, IV-3a and IV-3b:

V-6a

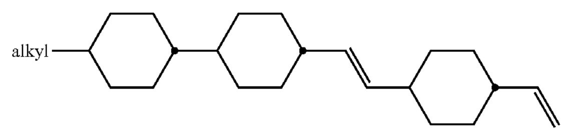

V-6b

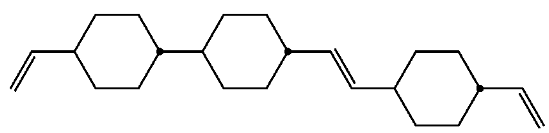

V-7a

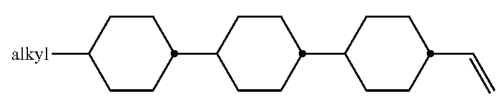

V-7b

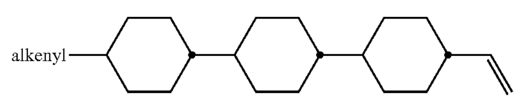

IV-4-1

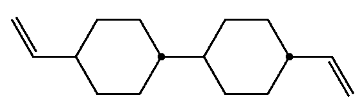

IV-4-2

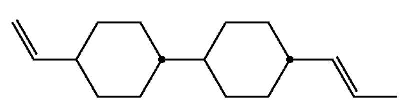

IV-3a

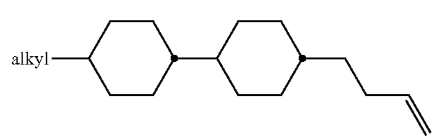

-continued

IV-3b

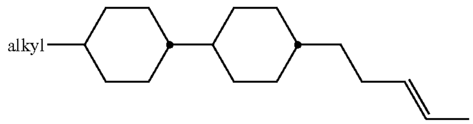

in which alkyl denotes an alkyl radical having 1 to 6 C atoms and alkenyl denotes an alkenyl radical having 2 to 6 C atoms.

The compounds of the formulae V-6a, V-6b, V-7a, V-7b, IV-4-1, IV-4-2, IV-3a and IV-3b are preferably present in the LC media according to the invention in amounts of 1 to 40% by weight, preferably 5 to 35% by weight and very particularly preferably 10 to 30% by weight.

In a preferred embodiment of the present invention the LC medium additionally comprises one or more compounds of the formulae VI-1 to VI-9

VI-1

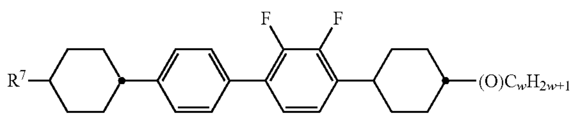

VI-2

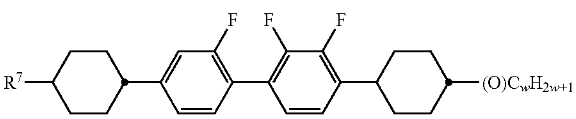

VI-3

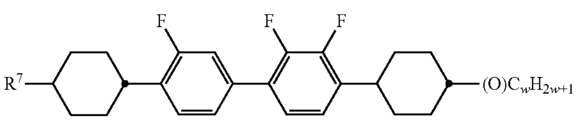

VI-4

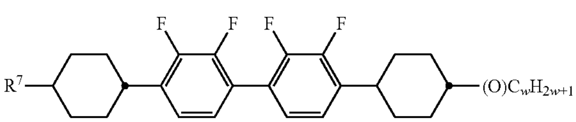

VI-5

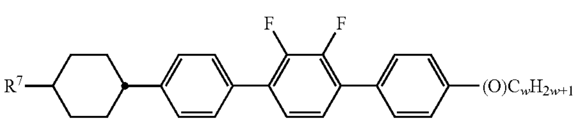

VI-6

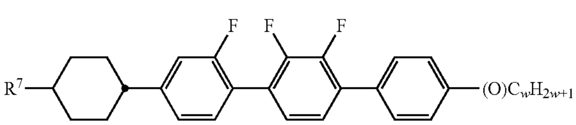

VI-7

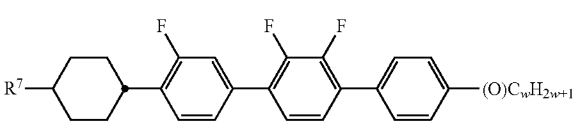

VI-8

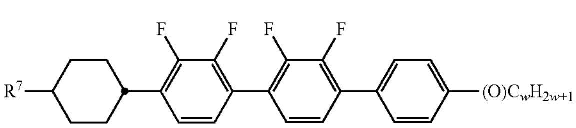

-continued

VI-9

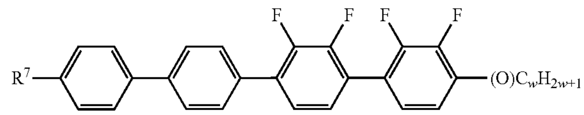

in which $R^7$ each, independently of one another, have one of the meanings indicated for $R^{2A}$ in formula IIA, (O) is an oxygen atom or a single bond, and w and x each, independently of one another, denote 1 to 6.

Particular preference is given to LC media comprising at least one compound of the formula V1-9.

In a preferred embodiment of the present invention the LC medium additionally comprises one or more compounds of the formulae VII-1 to VII-25,

VII-1

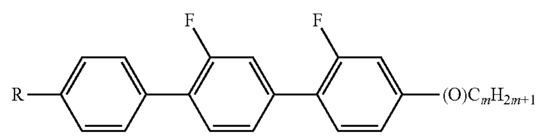

VII-2

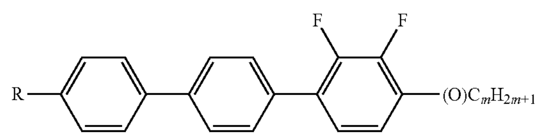

VII-3

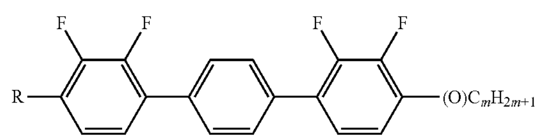

VII-4

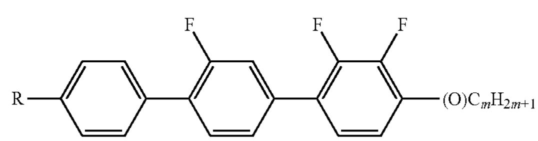

VII-5

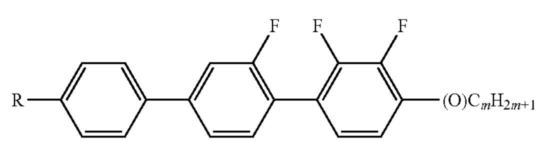

VII-6

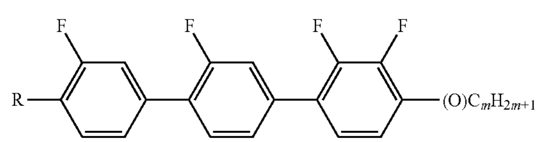

VII-7

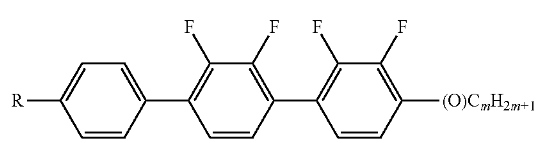

-continued

VII-8

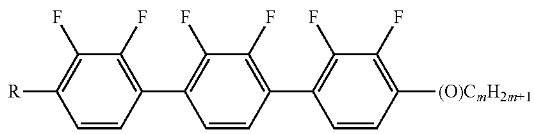

VII-9

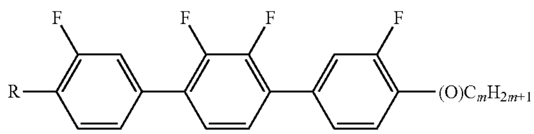

VII-10

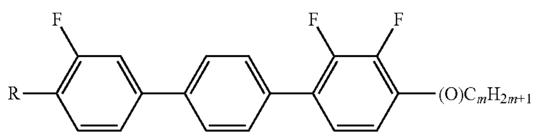

VII-11

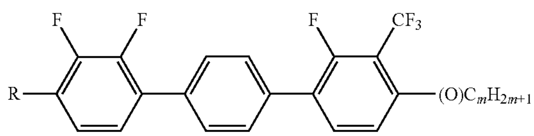

VII-12

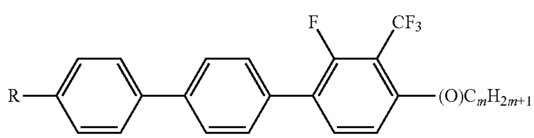

VII-13

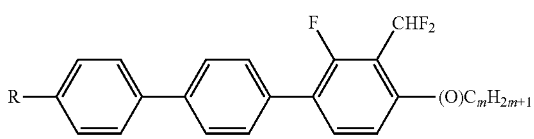

VII-14

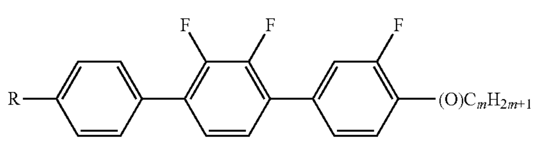

VII-15

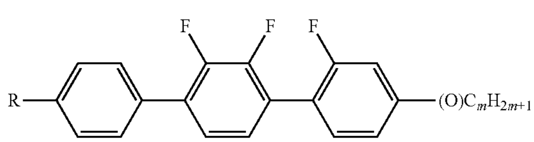

VII-16

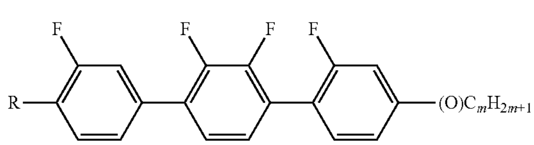

VII-17

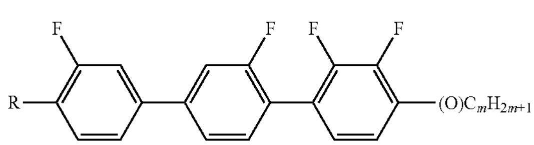

-continued

VII-18

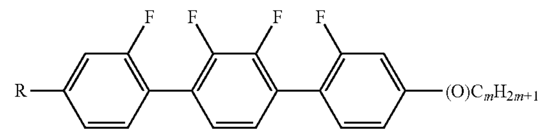

VII-19

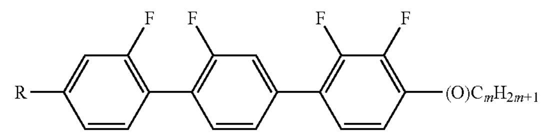

VII-20

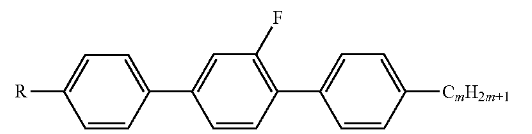

VII-21

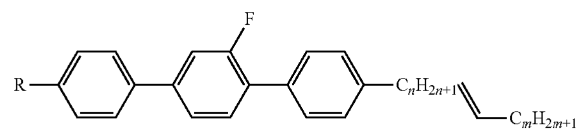

VII-22

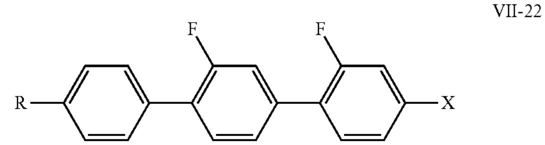

VII-23

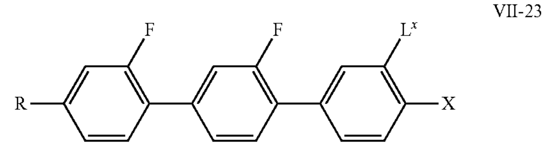

VII-24

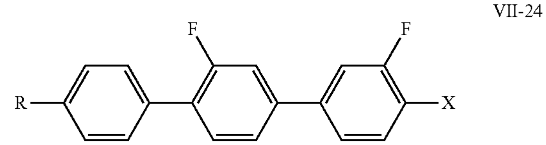

VII-25

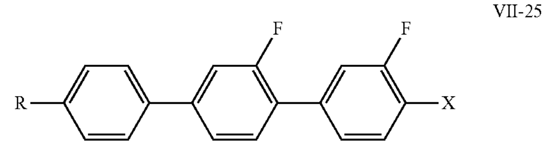

in which

R denotes a straight-chain alkyl or alkoxy radical having 1 to 6 C atoms, (O) denotes —O— or a single bond, X denotes F, Cl, $OCF_3$ or $OCHF_2$, $L^x$ denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or $OCF_3$, very preferably F.

The LC medium according to the invention preferably comprises the terphenyls of the formulae VII-1 to VII-25 in amounts of 2 to 30% by weight, in particular 5 to 20% by weight.

Particular preference is given to compounds of the formulae VII-1, VII-2, VII-4, VII-20, VII-21, and VII-22 wherein X denotes F. In these compounds, R preferably denotes alkyl, furthermore alkoxy, each having 1 to 5 C atoms. In the compounds of the formula VII-20, R preferably denotes alkyl or alkenyl, in particular alkyl. In the compounds of the formula VII-21, R preferably denotes alkyl. In the compounds of the formulae VII-22 to VII-25, X preferably denotes F.

The terphenyls of formula VII-1 to VII-25 are preferably employed in the LC media according to the invention if the Δn value of the mixture is to be ≥0.1. Preferred LC media comprise 2 to 20% by weight of one or more terphenyl compounds selected from the group of the compounds of formulae VII-1 to VII-25.

Further preferred embodiments are listed below:

a) LC medium comprising at least one compound of the formulae Z-1 to Z-7,

Z-1

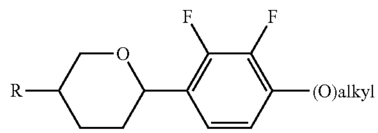

Z-2

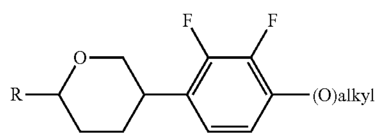

Z-3

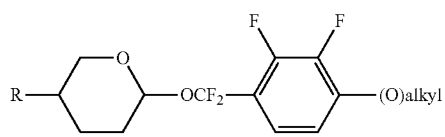

Z-4

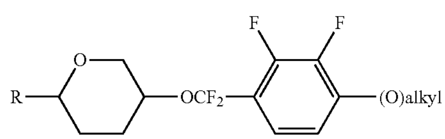

Z-5

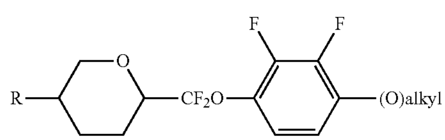

Z-6

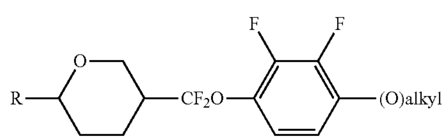

Z-7

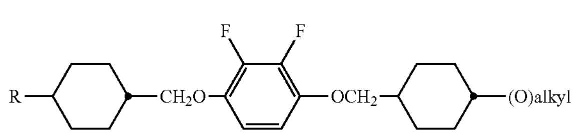

in which R and (O) have the meanings indicated above for formulae VII-1 to VII-25, and alkyl denotes a straight-chain alkyl radical having 1 to 6 C atoms.

b) Preferred LC media according to the invention comprise one or more substances which contain a tetrahydronaphthyl or naphthyl unit, such as, for example, the compounds of the formulae N-1 to N-5,

N-1

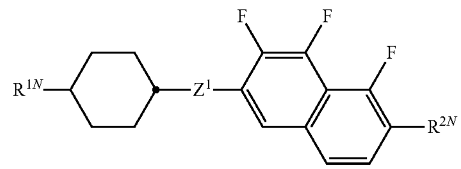

N-2

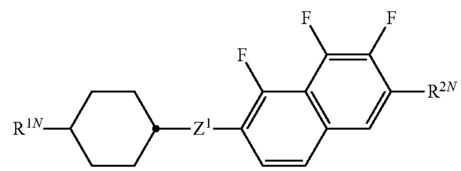

N-3

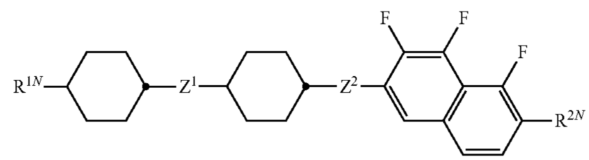

N-4

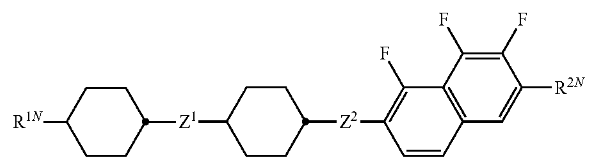

N-5

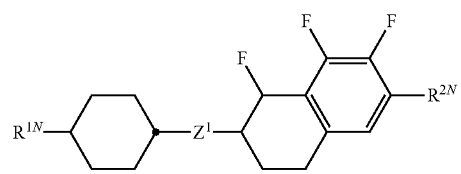

in which $R^{1N}$ and $R^{2N}$ each, independently of one another, have the meanings indicated for $R^{2A}$ in formula IIA, preferably denote straight-chain alkyl, straight-chain alkoxy or straight-chain alkenyl, and $Z^1$ and $Z^2$ each, independently of one another, denote —$C_2H_4$—, —CH═CH—, —$(CH_2)_4$—, —$(CH_2)_3O$—, —$O(CH_2)_3$—, —CH═CHCH$_2$CH$_2$—, —CH$_2$CH$_2$CH═CH—, —CH$_2$O—, —OCH$_2$—, —COO—, —OCO—, —$C_2F_4$—, —CF═CF—, —CF=CH—, —CH═CF—, —CF$_2$O—, —OCF$_2$—, —CH$_2$— or a single bond.

c) Preferred LC media comprise one or more compounds selected from the group of the difluorodibenzochroman compounds of the formula BC, chromans of the formula CR, and fluorinated phenanthrenes of the formulae PH-1 and PH-2,

BC

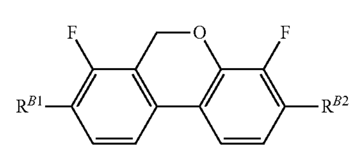

-continued

CR

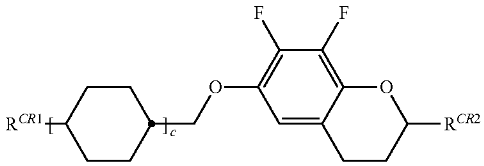

PH-1

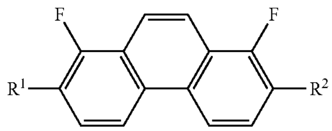

PH-2

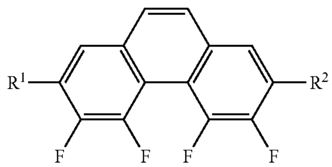

in which $R^{B1}$, $R^{B2}$, $R^{CR1}$, $R^{CR2}$, $R^1$, $R^2$ each, independently of one another, have the meaning of $R^{2A}$ in formula IIA. c is 0, 1 or 2. $R^1$ and $R^2$ preferably, independently of one another, denote alkyl or alkoxy having 1 to 6 C atoms.

The LC media according to the invention preferably comprise the compounds of the formulae BC, CR, PH-1, and/or PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

BC-1

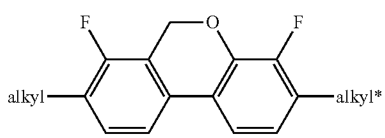

BC-2

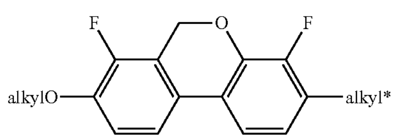

BC-3

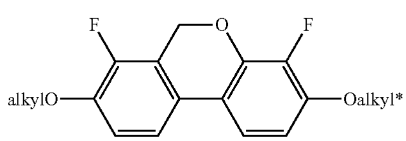

BC-4

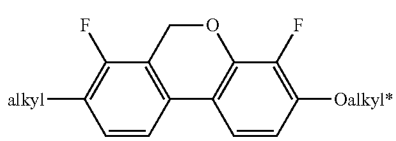

BC-5

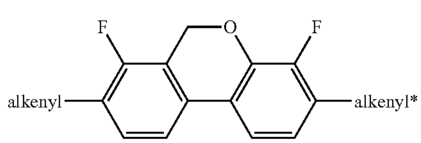

-continued

BC-6

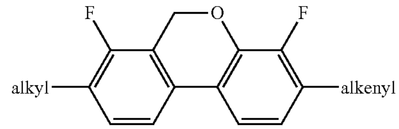

BC-7

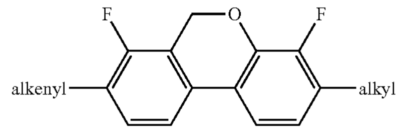

BC-8

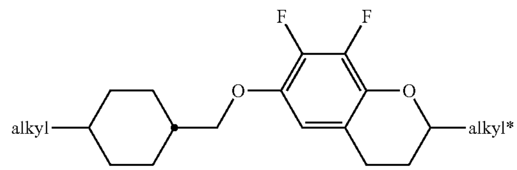

BC-9

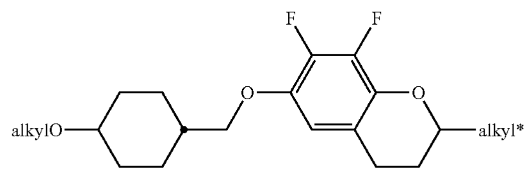

BC-10

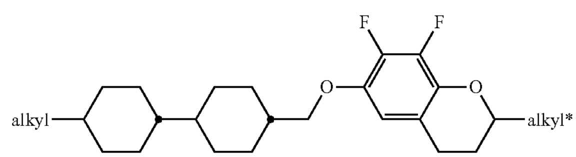

BC-11

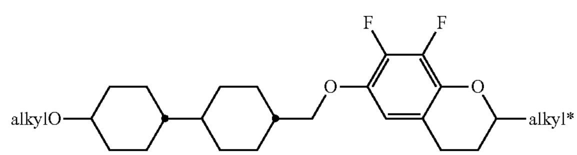

BC-12

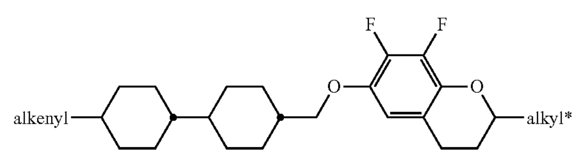

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Very particular preference is given to LC media comprising one, two or three compounds of the formula BC-2.

d) Preferred LC media comprise one or more indane compounds of the formula In,

In
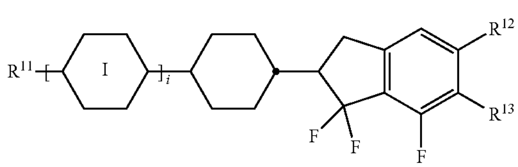
in which
$R^{11}$, $R^{12}$,
$R^{13}$ each, independently of one another, denote a straight-chain alkyl, alkoxy, alkoxyalkyl or alkenyl radical having 1 to 6 C atoms,
$R^{12}$ and $R^{13}$ additionally denote halogen, preferably F,
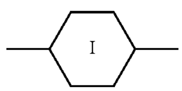
denotes
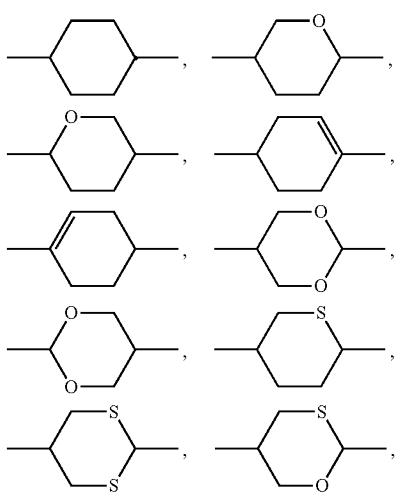
i denotes 0, 1 or 2.
Preferred compounds of the formula In are the compounds of the formulae In-1 to In-16 indicated below:
In-1
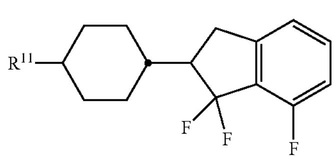
In-2
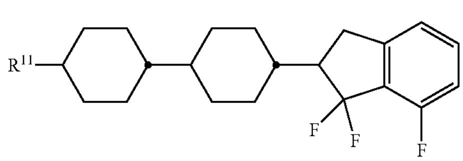
-continued
In-3
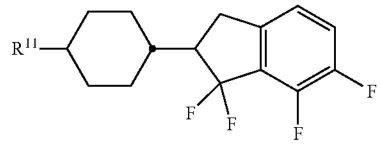
In-4
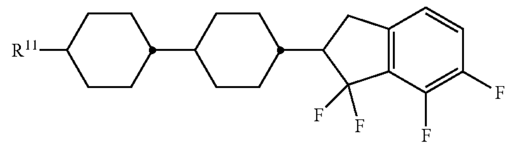
In-5
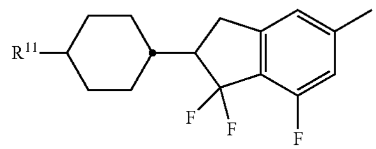
In-6
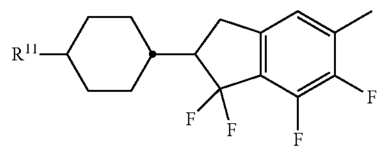
In-7
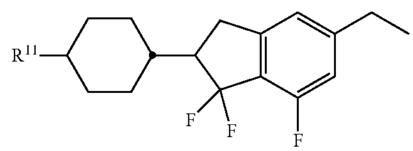
In-8
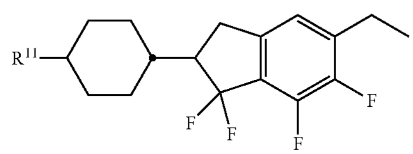
In-9
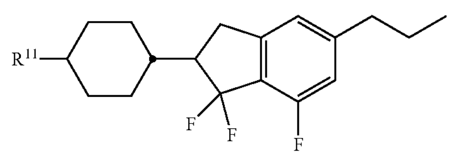
In-10
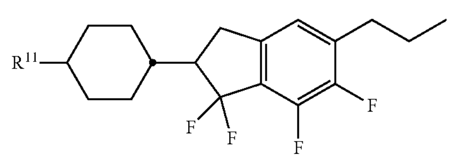
In-11
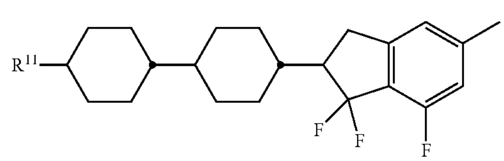
In-12
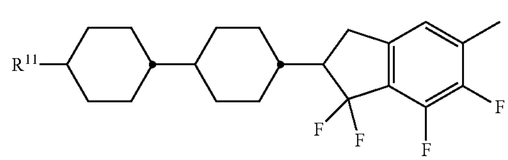

-continued

In-13

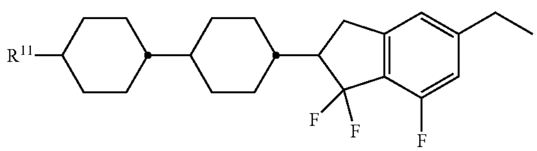

In-14

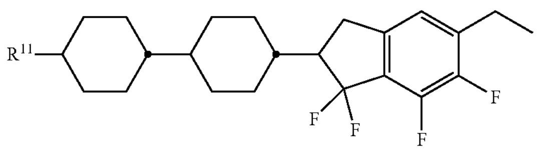

In-15

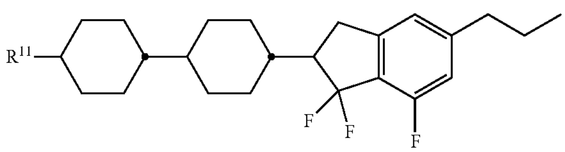

In-16

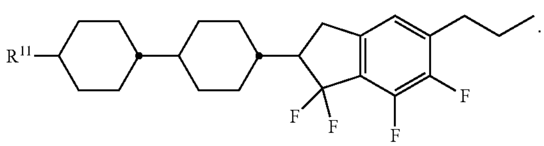

Particular preference is given to the compounds of the formulae In-1, In-2, In-3 and In-4.

The compounds of the formula In and the sub-formulae In-1 to In-16 are preferably employed in the LC media according to the invention in concentrations ≥5% by weight, in particular 5 to 30% by weight and very particularly preferably 5 to 25% by weight.

e) Preferred LC media additionally comprise one or more compounds of the formulae L-1 to L-5,

L-1

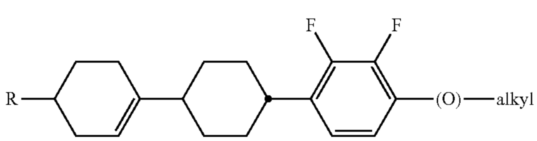

L-2

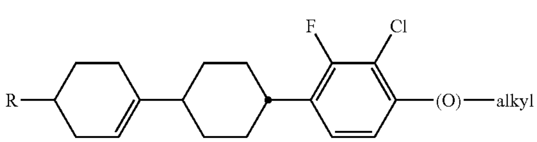

L-3

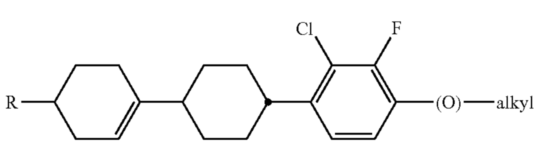

-continued

L-4

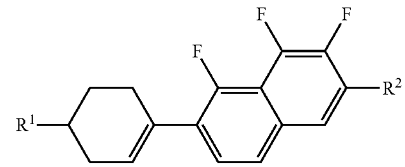

L-5

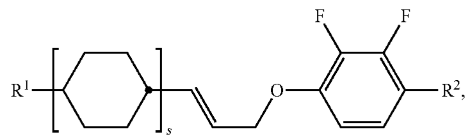

in which

R, $R^1$, and $R^2$ each, independently of one another, have the meanings indicated for $R^{2A}$ in formula IIA above, (O) is an oxygen atom or a single bond, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 5 to 40% by weight and very particularly preferably 10 to 40% by weight.

f) Preferred LC media additionally comprise one or more compounds of formula IIA-Y

IIA-Y

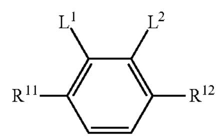

in which $R^{11}$ and $R^{12}$ have one of the meanings given for $R^{2A}$ in formula IIA above, and $L^1$ and $L^2$, identically or differently, denote F or Cl.

Preferred compounds of the formula IIA-Y are selected from the group consisting of the following subformulae

IIA-Y1

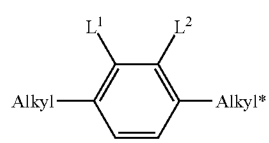

IIA-Y2

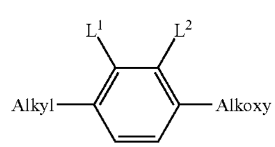

IIA-Y3

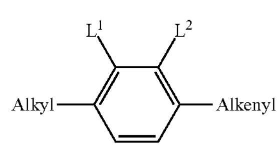

-continued

IIA-Y4

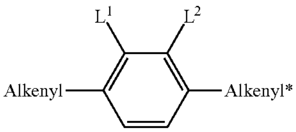

IIA-Y5

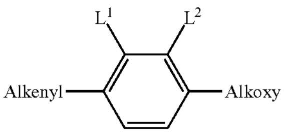

IIA-Y6

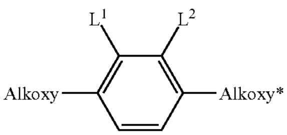

IIA-Y7

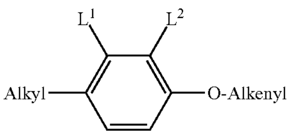

IIA-Y8

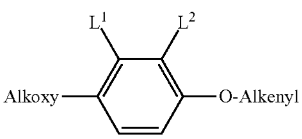

IIA-Y9

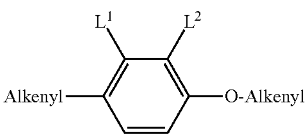

IIA-Y10

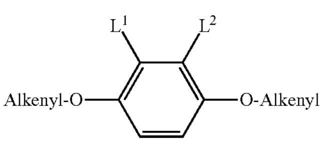

in which, Alkyl and Alkyl* each, independently of one another, denote a straight-chain alkyl radical having 1-6 C atoms, Alkoxy and Alkoxy* each, independently of one another, denote a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred compounds of the formula IIA-Y are selected from the group consisting of following subformulae:

IIA-Y6a

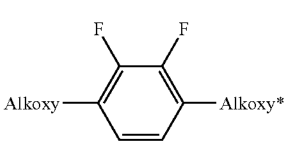

-continued

IIA-Y6b

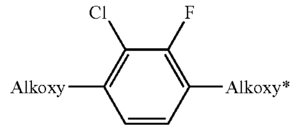

in which Alkoxy and Alkoxy* have the meanings defined above and preferably denote methoxy, ethoxy, n-propyloxy, n-butyloxy or n-pentyloxy.

g) LC medium which additionally comprises one or more quaterphenyl compounds selected from the following formula:

Q

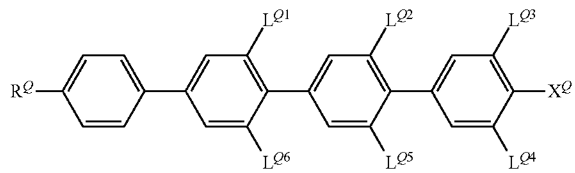

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or C halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

Q1

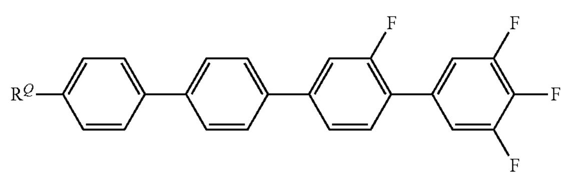

Q2

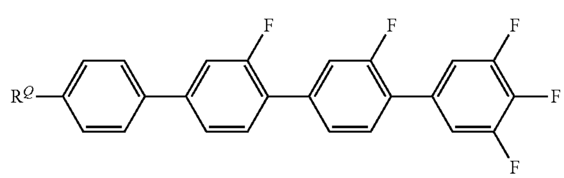

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to ≤5% by weight, very preferably from 0.05 to 2% by weight, more preferably from 0.1 to 1% by weight, most preferably from 0.1 to 0.8% by weight.

Preferably the LC medium contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_{\parallel}$ and $\varepsilon_{\perp}$, and in particular enables to achieve a high value of the dielectric constant $\varepsilon_{\parallel}$ while keeping the dielectric anisotropy Δε constant, thereby reducing the kick-back voltage and reducing image sticking.

The LC media according to the invention preferably comprise one or more compounds of formula IA and one or more compounds of formula IB or IC, preferably selected from the subformulae as defined above, preferably in a total concentration in the range of from 0.01% to 2.0%, more preferably from 0.1% to 1.0%, most preferably from 0.2% to 0.8%, one or more compounds of formula IA, one or more compounds of formula IB, and one or more compounds of formula IC, preferably selected from the subformulae as defined above, preferably in a total concentration in the range of from 0.01% to 2.0%, more preferably from 0.1% to 1.0%, most preferably from 0.2% to 0.8%, and/or one or more compounds of formula IIA, preferably in a total concentration in the range of from 5% to 30%, more preferably from 7% to 25%, particularly preferably from 10% to 20%;

and/or one or more compounds of formulae IIA and IIB, preferably in a total concentration in the range of from 30% to 45%;

and/or one or more compounds of formula IV, preferably in a total concentration in the range of from 35% to 70%, more preferably from 40% to 65%, particularly preferably from 45% to 60%;

and/or one or more compounds of formula IV-3, preferably in a total concentration in the range of from 35% to 60%, more preferably from 40% to 55%, particularly preferably from 45% to 50%;

and/or one or more compounds of formula III-2, preferably of formula III-2-6, preferably in a total concentration in the range of from 2% to 25%, more preferably from 5% to 15%, particularly preferably from 5 to 12%.

In particular, the medium comprises one or more compounds CY-n-Om (see Table A below), in particular CY-3-O4, CY-5-O4 and/or CY-3-O2, preferably in a total concentration in the range of from 5% to 30%, preferably 10% to 20%;

and/or one or more compounds PY-n-Om (see Table A below), in particular PY-3-O2 and/or PY-1-O2, preferably in a total concentration in the range of from 5% to 30%, preferably 5% to 20%;

and/or

CPY-n-Om (see Table A below), in particular CPY-2-O2, CPY-3-O2 and/or CPY-5-O2, preferably in concentrations >5%, in particular 7% to 20%, based on the mixture as a whole, and/or one or more compounds CCY-n-Om (see Table A below), preferably CCY-4-O2, CCY-3-O2, CCY-3-O3, CCY-3-O1 and/or CCY-5-O2, preferably in concentrations >3%, in particular 5 to 15%, based on the mixture as a whole;

and/or one or more compounds CPY-n-Om (see Table A below), preferably CPY-2-O2 and/or CPY-3-O2, preferably in concentrations >3%, in particular 5 to 15%, based on the mixture as a whole;

and/or

CLY-n-Om (see Table A below), preferably CLY-2-O4, CLY-3-O2 and/or CLY-3-O3, preferably in concentrations >5%, in particular 10 to 30%, very preferably 15 to 20%, based on the mixture as a whole;

and/or

CPY-n-Om and CY-n-Om (see Table A below), preferably in concentrations of 10 to 80%, based on the mixture as a whole, and/or CPY-n-Om and PY-n-Om (see Table A below), preferably CPY-2-O2 and/or CPY-3-O2 and PY-3-O2 or PY-1-O2, preferably in concentrations of 5 to 20%, more preferably 10 to 15% to based on the mixture as a whole, and/or CC-3-V (see Table A below), preferably in concentrations of 5 to 50%, based on the mixture as a whole.

and/or the compound of the formula CC-3-V1 (see Table A below), in a total concentration in the range of from 5 to 40%, more preferably from 15% to 35%, particularly preferably from 20% to 30%, and/or one or more compounds of formula B-nO-Om and/or B(S)-nO-Om (see Table A below), in particular the compound B(S)-2O-O4 and/or B(S)-2O-O5, preferably in a concentration in the range of from 2 to 12%.

and/or 0.1% to 3% of the compound PPGU-3-F (see Table A below).

The invention furthermore relates to an electro-optical display having active-matrix addressing, characterised in that it contains, as dielectric, a LC medium according to claim 1 and wherein the display is a VA, SA-VA, IPS, U—IPS, FFS, UB—FFS, SA-FFS, PS-VA, PS—OCB, PS-IPS, PS-FFS, PS—UB—FFS, PS-posi-VA, PS-TN, polymer stabilised SA-VA or polymer stabilised SA-FFS display.

It is advantageous for the LC medium according to the invention to preferably have a nematic phase from ≤−20° C. to ≥70° C., particularly preferably from ≤−30° C. to ≥80° C., very particularly preferably from ≤−40° C. to ≥90° C.

The medium according to the invention has a clearing temperature of 70° C. or more, preferably of 74° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $\nu_{20}$ of at most 30 $mm^2 \cdot s^{-1}$ at 20° C.

The mixture is nematic at a temperature of −20° C. or less, preferably at −30° C. or less, very preferably at −40° C. or less.

The values of the birefringence Δn in the liquid-crystal mixture are generally between 0.07 and 0.16, preferably between 0.08 and 0.15, very preferably between 0.09 and 0.14.

In a preferred embodiment of the present invention, the medium has a birefringence in the range of from 0.090 to 0.110, preferably from 0.095 to 0.105, in particular from 0.100 to 0.105.

In another preferred embodiment, the medium according to the invention has a birefringence of 0.120 or more, preferably in the range of from 0.125 to 0.145, more preferably from 0.130 to 0.140.

The liquid-crystal mixture according to the invention has a dielectric anisotropy Δε of −1.5 to −8.0, preferably of −2.0 to −4.0, in particular −2.5 to −3.5, The rotational viscosity $\gamma_1$ at 20° C. is preferably ≤120 mPa·s, in particular ≤100 mPa·s.

In a preferred embodiment, the rotational viscosity $\gamma_1$ at 20° C. is ≤100 mPa·s, in particular ≤95 mPa·s.

The liquid-crystal media according to the invention have relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a LC host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all VA-TFT (vertical alignment-thin film transistor) applications, such as, for example, VAN (vertically aligned nematic), MVA (multidomain VA), (S)-PVA (super patterned VA), ASV (advanced super view, or axially symmetric VA), PSA (polymer sustained VA) and PS-VA (polymer stabilized VA). They are furthermore suitable for IPS (in-plane switching) and FFS (fringe field switching) applications having negative Δε.

The nematic LC media in the displays according to the invention generally comprise two components A and B, which themselves consist of one or more individual compounds.

Component A has significantly negative dielectric anisotropy and gives the nematic phase a dielectric anisotropy of ≤−0.5. Besides one or more compounds of the formula IA and one or more compounds of formula Ib and/or formula IC, it preferably comprises the compounds of the formulae IIA, IIB and/or IIC, furthermore one or more compounds of the formula IV-1.

The proportion of component A is preferably between 45 and 100%, in particular between 60 and 85%.

For component A, one (or more) individual compound(s) which has (have) a value of Δε≤−0.8 is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

A multiplicity of suitable materials is known to the person skilled in the art from the literature. Particular preference is given to compounds of the formula O—17.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

Besides one or more compounds of the formula I1, I2 and optionally I3, the medium preferably comprises 4 to 15, in particular 5 to 12, and particularly preferably <10, compounds of the formulae IIA, IIB and/or IIC and optionally one or more compounds of the formula IV-1

Besides compounds of the formula I1, I2 and optionally I3 and the compounds of the formulae IIA, IIB and/or IIC and optionally IV-1, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenyl-cyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula OC $$R^{20}\text{-L-G-E-}R^{21} \qquad \text{OC}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline,

| | | |
|---|---|---|
| G denotes | —CH═CH— | —N(O)═N— |
| | —CH═CQ— | —CH═N(O)— |
| | —C≡C— | $—CH_2—CH_2—$ |
| | —CO—O— | $—CH_2\text{-}O—$ |
| | —CO—S— | $—CH_2—S—$ |
| | —CH═N— | —COO—Phe—COO— |
| | $—CF_2O—$ | —CF═CF— |
| | $—OCF_2—$ | $—OCH_2—$ |
| | $—(CH_2)_4—$ | $—(CH_2)_3O—$ |

or a C—C single bond, Q denotes halogen, preferably chlorine, or —CN, and $R^{20}$ and $R^{21}$ each denote alkyl, alkenyl, alkoxy, alkoxyalkyl or alkoxycarbonyl-oxy having up to 18, preferably up to 8, carbon atoms, or one of these radicals alternatively denotes CN, NC, $NO_2$, NOS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays. In particular, the LC media exhibit significantly shortened response times, in particular also the grey-shade response times, in PSA displays compared with the LC media from the prior art.

The LC media according to the invention may also comprise further additives which are known to the person skilled in the art and are described in the literature, such as, for example, polymerization initiators, inhibitors, stabilisers, surface-active substances or chiral dopants. These may be polymerizable or non-polymerizable. Polymerizable additives are accordingly ascribed to the polymerizable component or component A). Non-polymerizable additives are accordingly ascribed to the non-polymerizable component or component B).

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table A below.

TABLE A
| In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$. |
| --- |
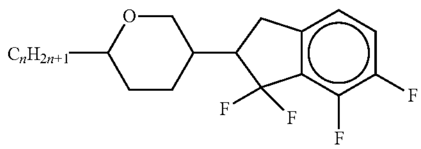
AIK-n-F
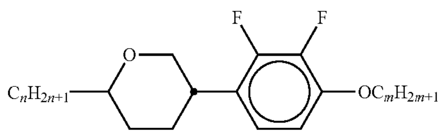
AIY-n-Om
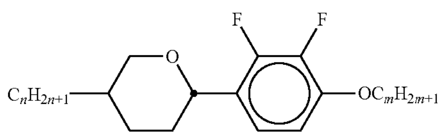
AY-n-Om
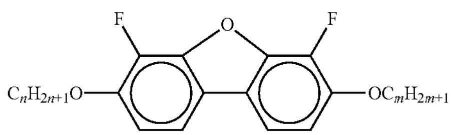
B-nO-Om
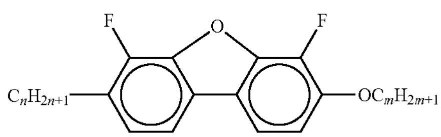
B-n-Om
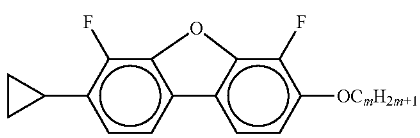
B-cpr-Om
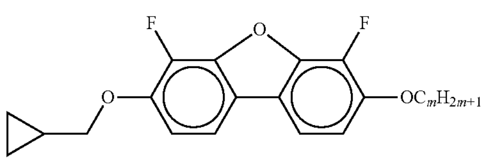
B-cpr1O-Om
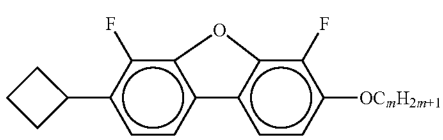
B-4CY-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
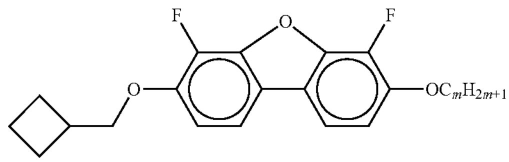
B-4Cy1O-Om
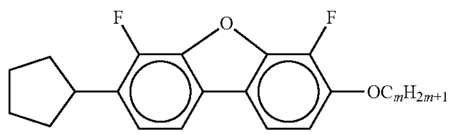
B-cp-Om
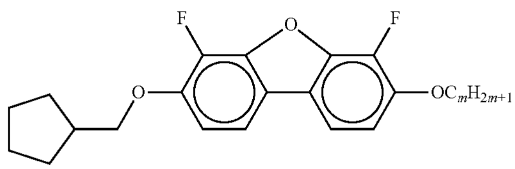
B-cp1O-Om
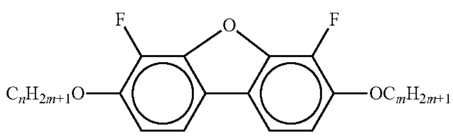
B(S)-nO-Om
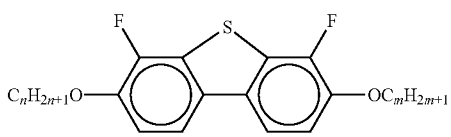
B(S)-n-Om
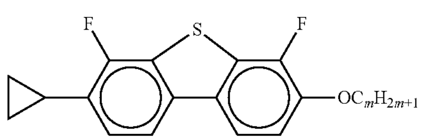
B(S)-cpr-Om
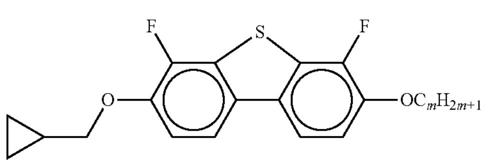
B(S)cpr1O-Om
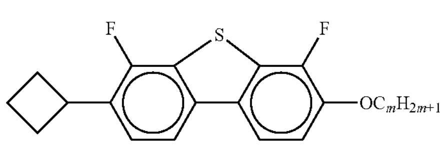
B(S)-4Cy-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
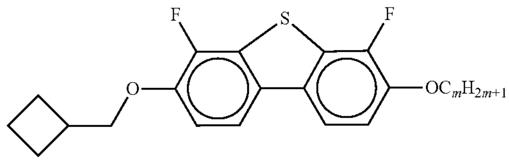
B(S)-4Cy1O-Om
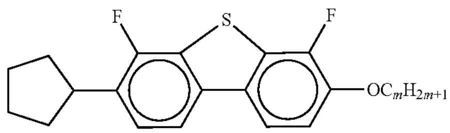
B(S)-cp-Om
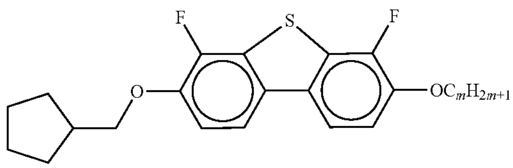
B(S)-cp1O-Om
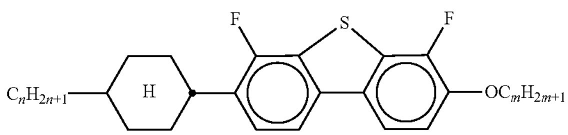
CB(S)-n-(O)m
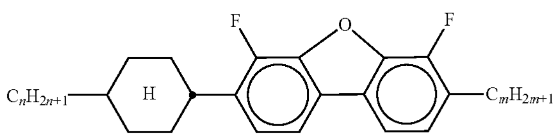
CB-n-m
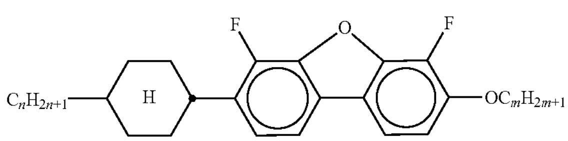
CB-n-Om
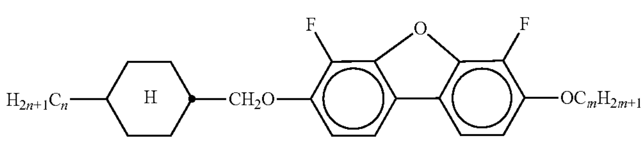
COB-n-Om
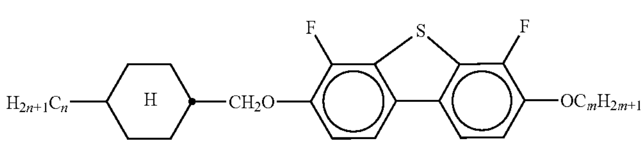
COB(S)-n-Om TABLE A-continued
| In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$. |
|---|
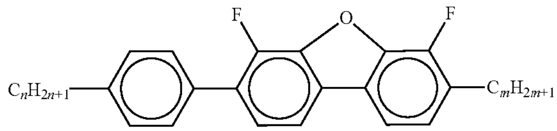
PB-n-m
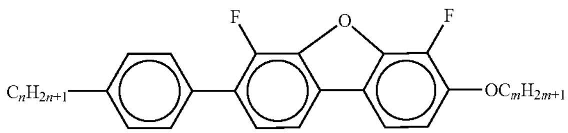
PB-n-Om
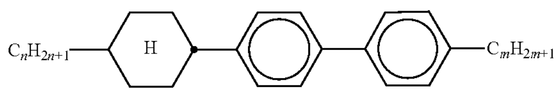
BCH-nm
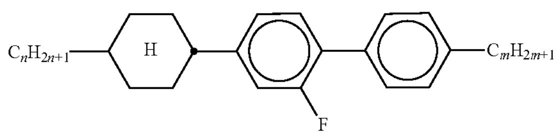
BCH-nmF
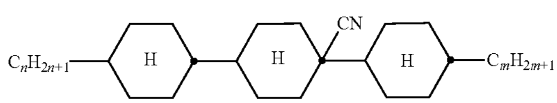
BCN-nm
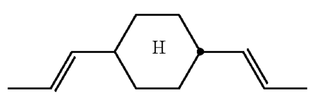
C-1V-V1
CY-n-Om
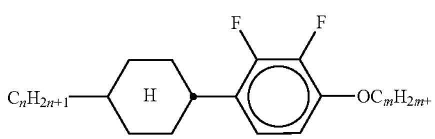
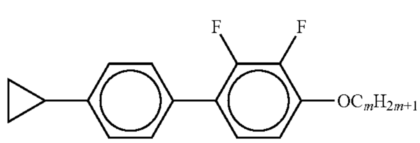
CYcpr-Om
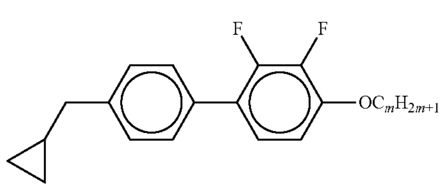
CY-cp1r-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
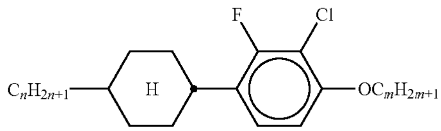
CY(F, C1)-n-Om
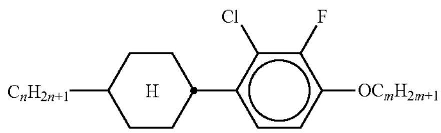
CY(C1,F)-n-Om
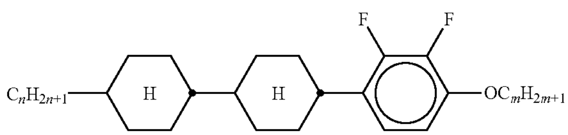
CCY-n-Om
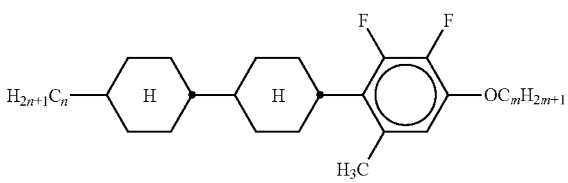
CC1Y-n-Om
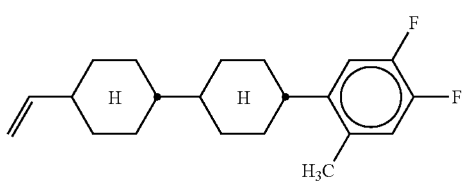
CC1G-V-F
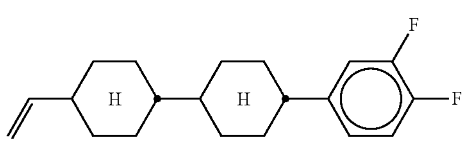
CCG-V-F
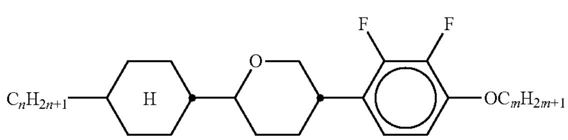
CAIY-n-Om
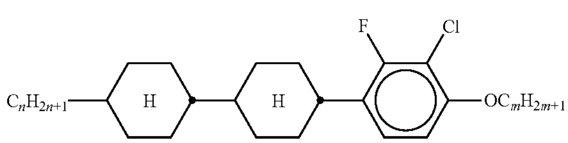
CCY(F,Cl)-n-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
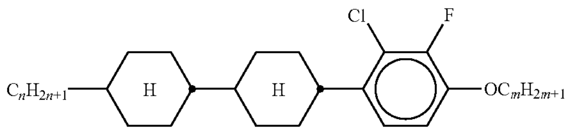
CCY(Cl,F)-n-Om
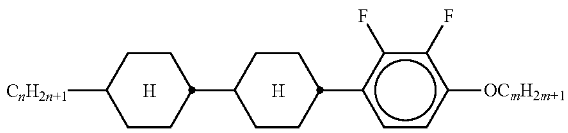
CCY-n-m
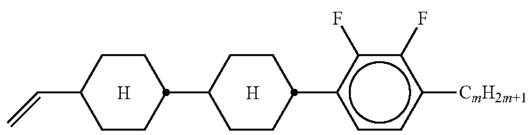
CCY-V-m
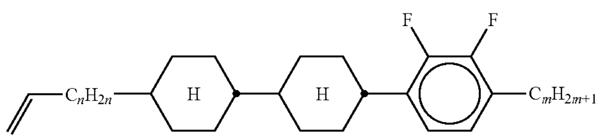
CCY-Vn-m
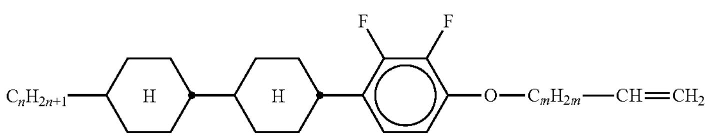
CCY-n-OmV
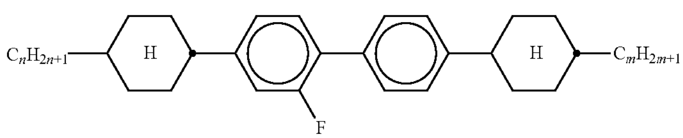
CBC-nmF
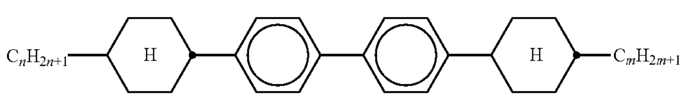
CBC-nm
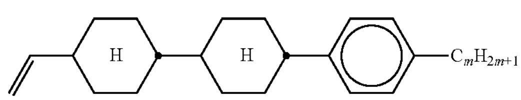
CCP-V-m
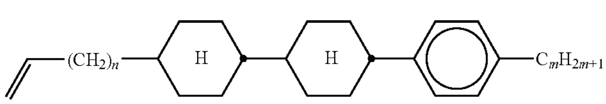
CCP-Vn-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
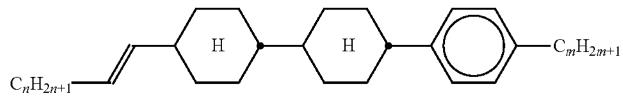
CCP-nV-m
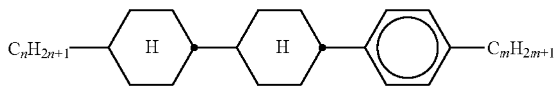
CCP-n-m
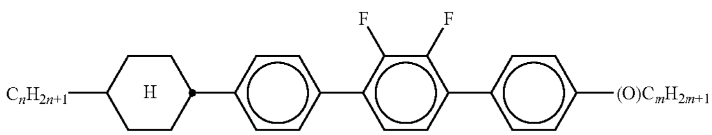
CPYP-n-(O)m
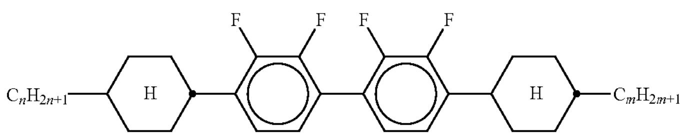
CYYC-n-m
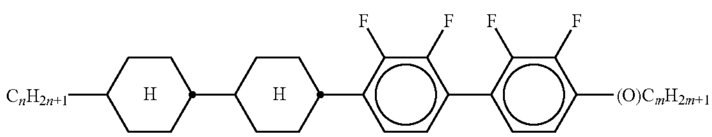
CYYC-n-(O)m
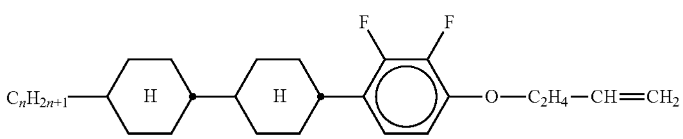
CCY-n-O2V
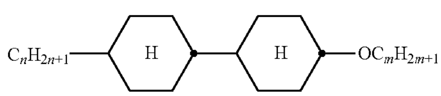
CCH-nOm, CC-n-Om
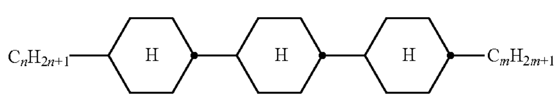
CCC-n-m
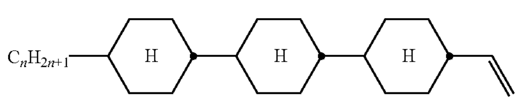
CCC-n-V
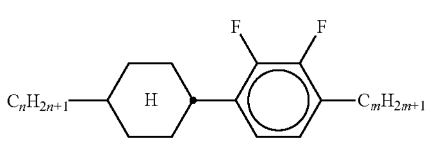
CY-n-m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
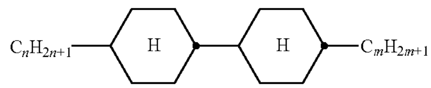
CCH-nm, CC-n-m
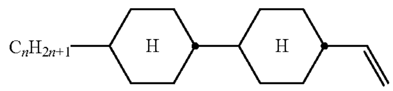
CC-n-V
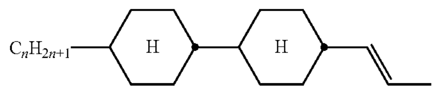
CC-n-V1
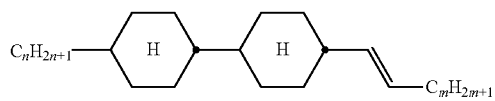
CC-n-Vm
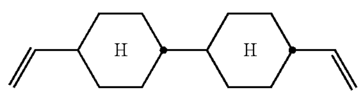
CC-V-V
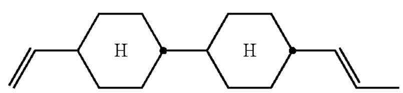
CC-V-V1
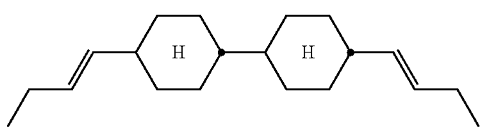
CC-2V-V2
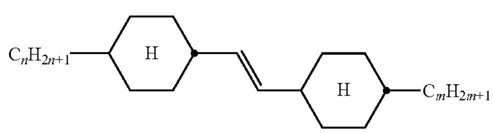
CVC-n-m
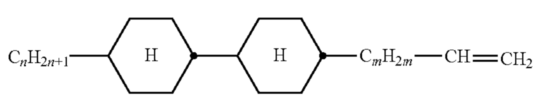
CC-n-mV
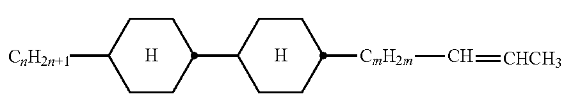
CC-n-mV1
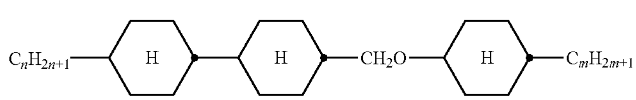
CCOC-n-m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
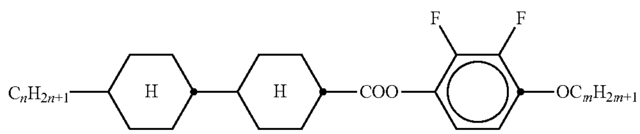
CP-nOmFF
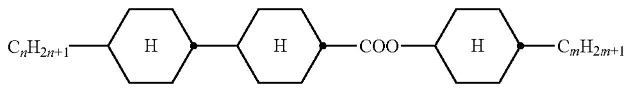
CH-nm
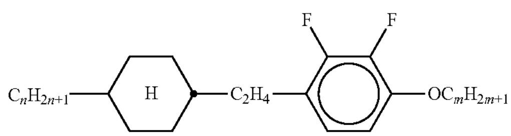
CEY-n-Om
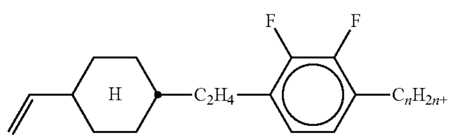
CEY-V-n
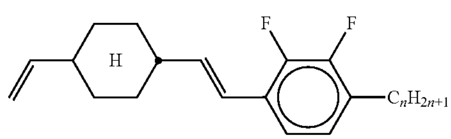
CVY-V-n
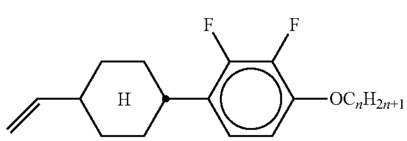
CY-V-On
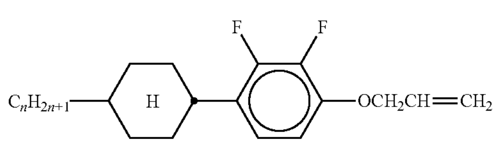
CY-n-O1V
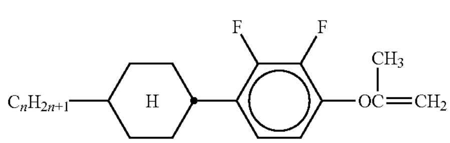
CY-n-OC($CH_3$)═$CH_2$
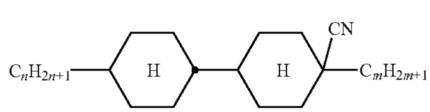
CCN-nm TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
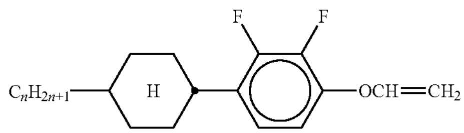
CY-n-OV
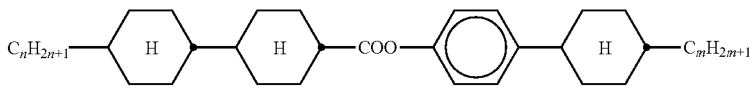
CCPC-nm
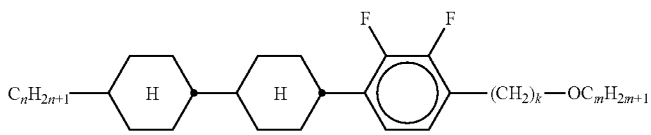
CCY-n-kOm
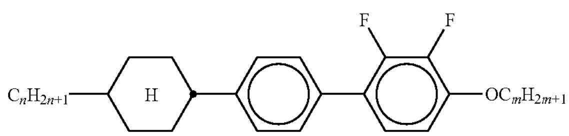
CPY-n-Om
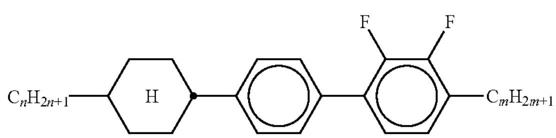
CPY-n-m
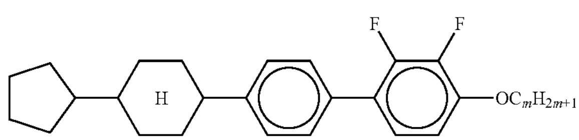
CPY-cp-Om
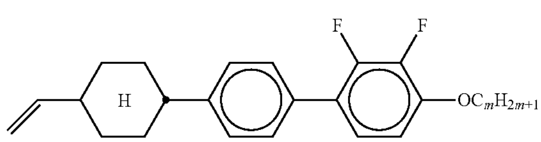
CPY-V-Om
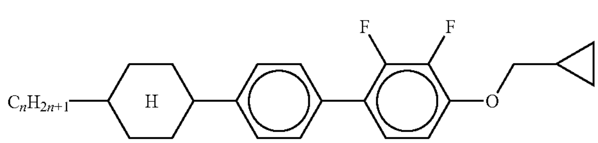
CPY-n-O1cpr
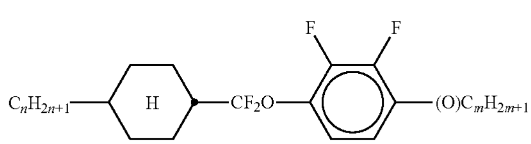
CQY-n-(O)m TABLE A-continued
| In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$. |
| --- |
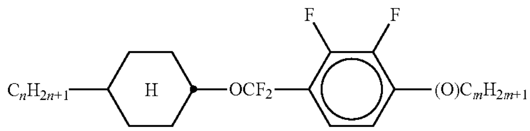
CQIY-n-(O)m
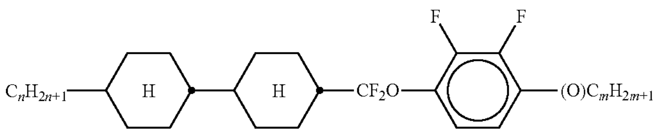
CCQY-n-(O)m
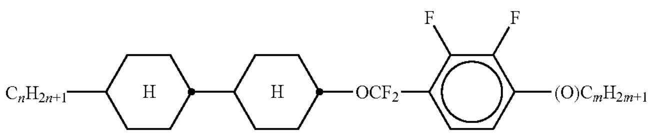
CCQIY-n-(O)m
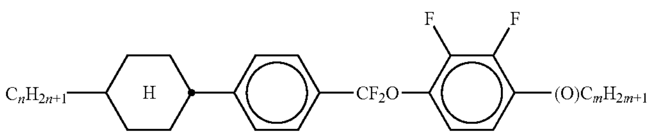
CPQY-n-(O)m
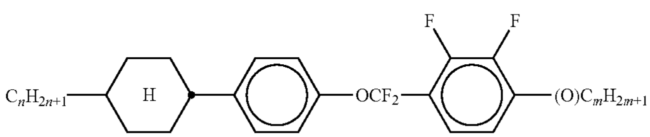
CPQIY-n-(O)m
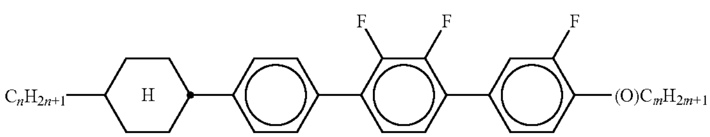
CPYG-n-(O)m
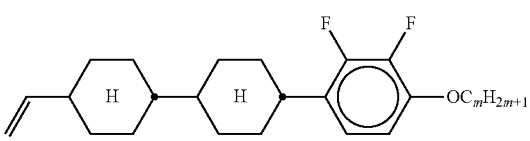
CCY-V-Om
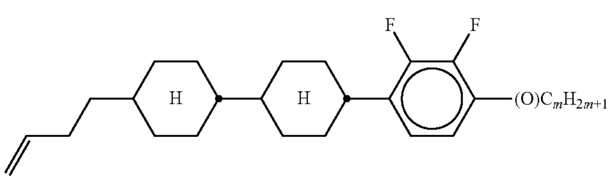
CCY-V2-(O)m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
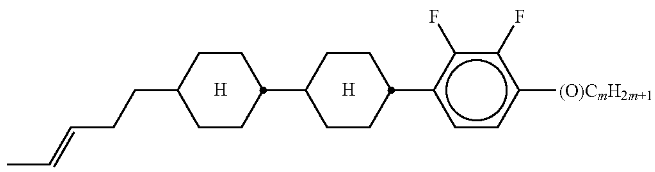
CCY-1V2-(O)m
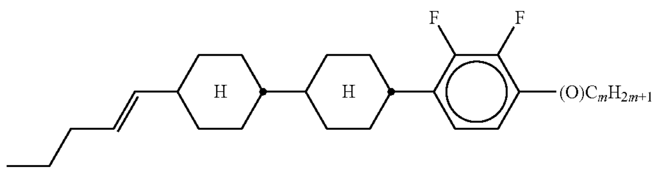
CCY-3V-(O)m
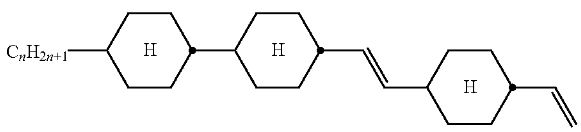
CCVC-n-V
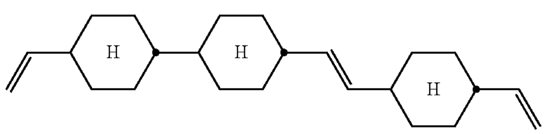
CCVC-V-V
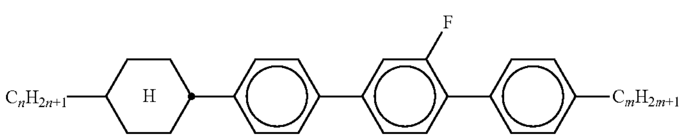
CPGP-n-m
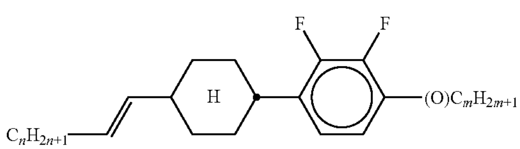
CY-nV-(O)m
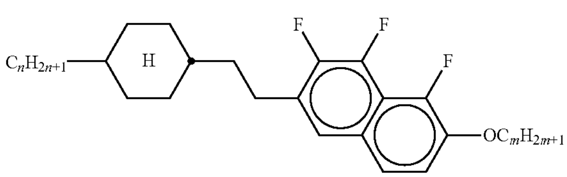
CENaph-n-Om TABLE A-continued
| In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$. |
|---|
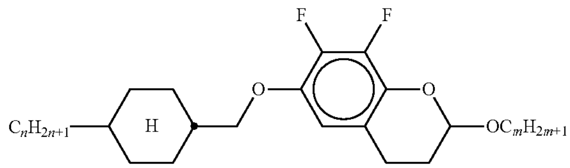
COChrom-n-Om
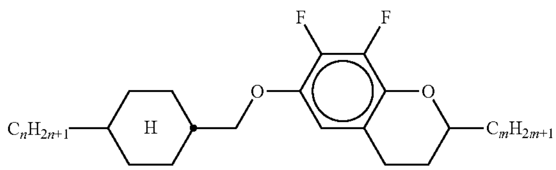
COChrom-n-m
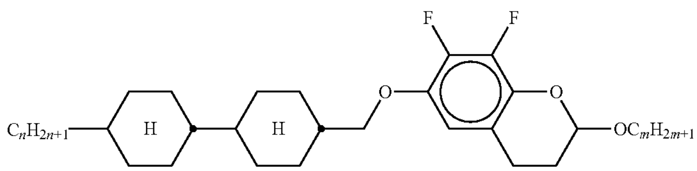
CCOChrom-n-Om
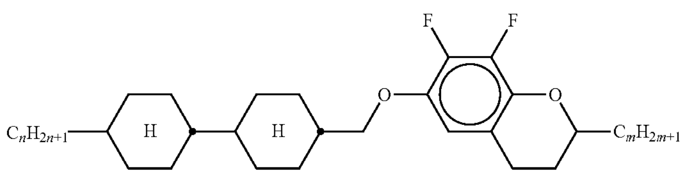
CCOChrom-n-Om
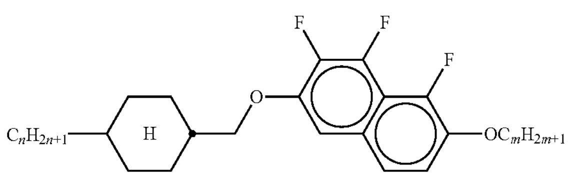
CONaph-n-Om
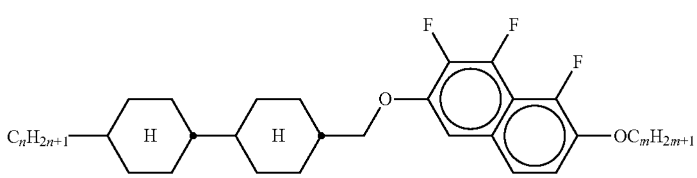
CCONaph-n-Om
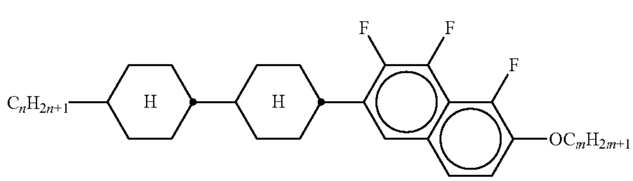
CCNaph-n-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
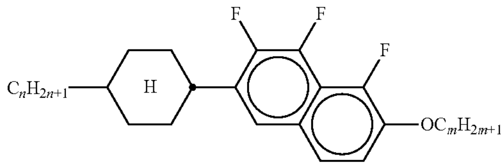
CNaph-n-Om
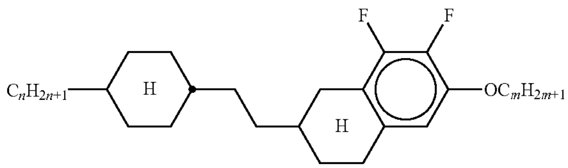
CETNaph-n-Om
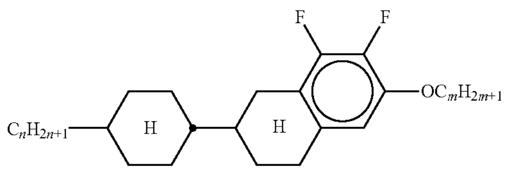
CTNaph-n-Om
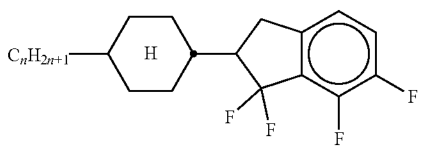
CK-n-F
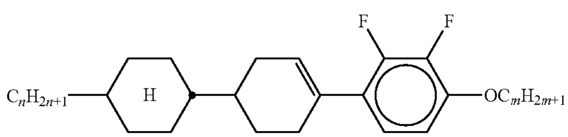
CLY-n-Om
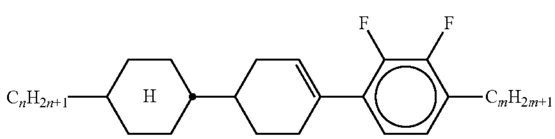
CLY-n-m
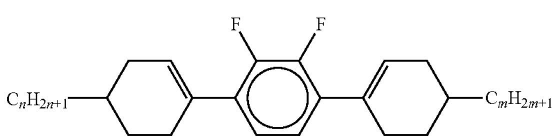
LYLI-n-m
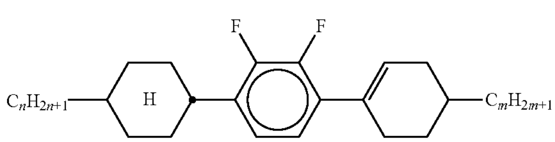
CYLI-n-m TABLE A-continued
| In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$. |
|---|
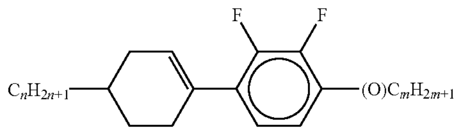
LY-n-(O)m
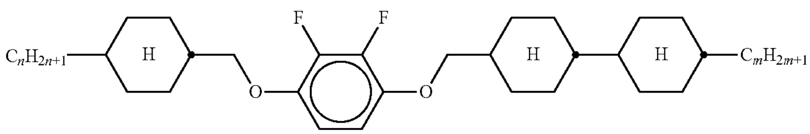
COYOICC-n-m
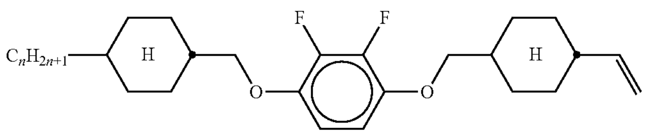
COYOIC-n-V
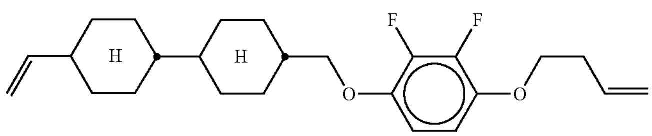
CCOY-V-O2V
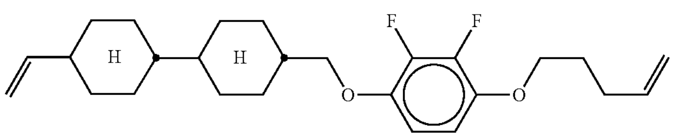
CCOY-V-O3V
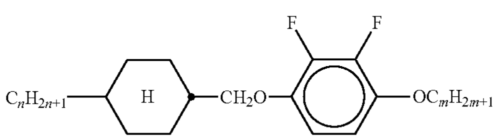
COY-n-Om
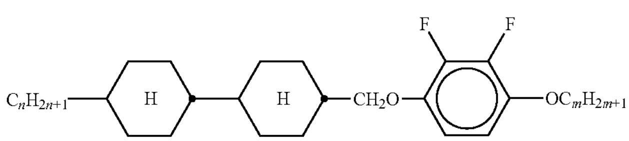
CCOY-n-Om
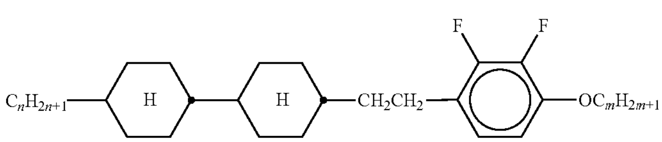
CCEY-n-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
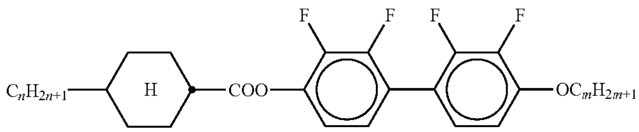
CZYY-n-Om
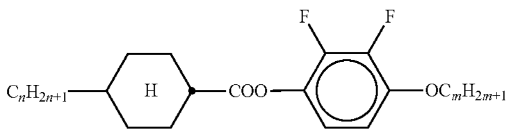
D-nOmFF
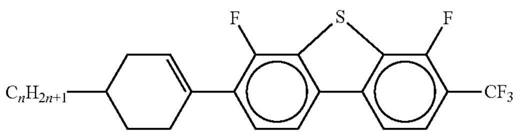
LB(S)-n-T
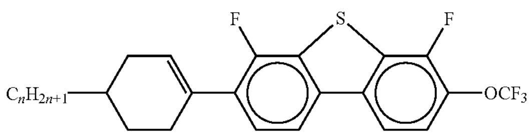
LB(S)-n-OT
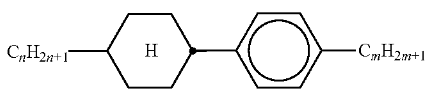
PCH-nm, CP-n-m
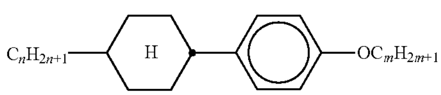
PCH-nOm, CP-n-Om
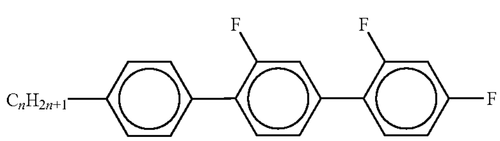
PGIGI-n-F
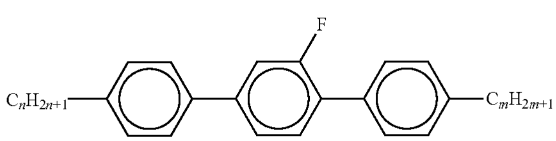
PGP-n-m
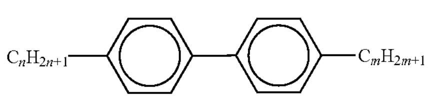
PP-n-m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
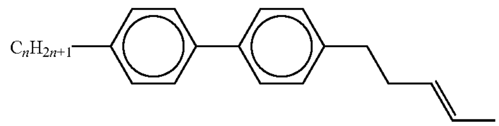
PP-n-2V1
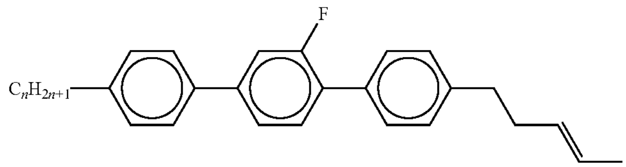
PGP-n-2V1
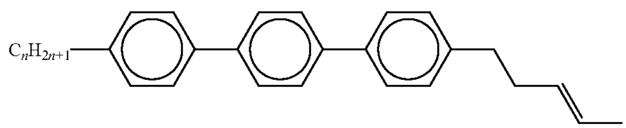
PPP-n-2V1
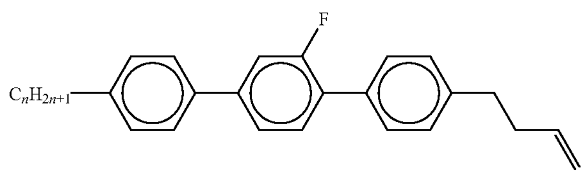
PGP-n-2V
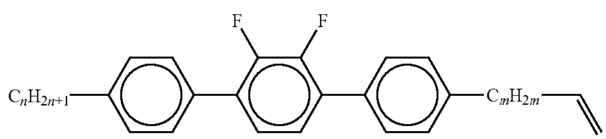
PYP-n-mV
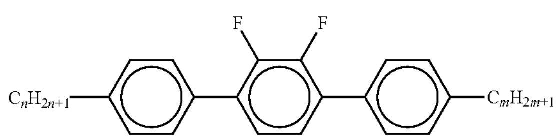
PYP-n-m
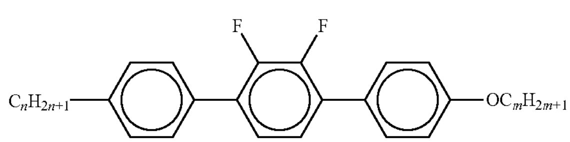
PYP-n-Om
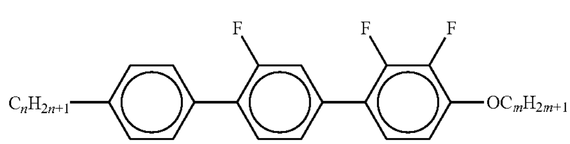
PGIY-n-Om TABLE A-continued
| In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$. |
| --- |
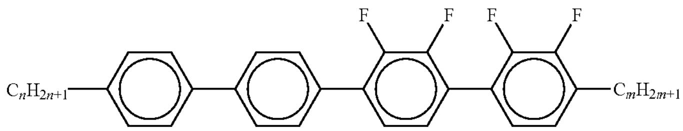
PPYY-n-m
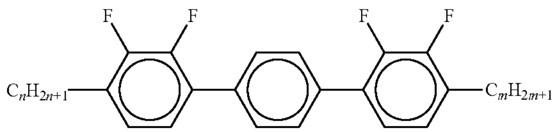
YPY-n-m
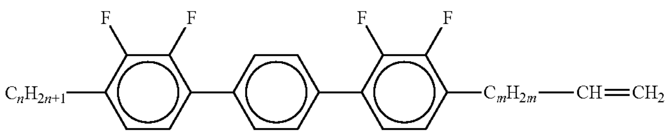
YPY-n-mV
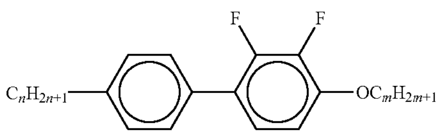
PY-n-Om
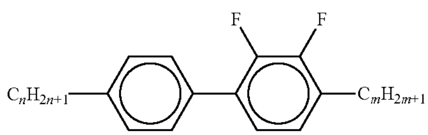
PY-n-m
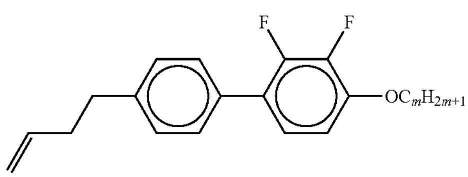
PY-V2-Om
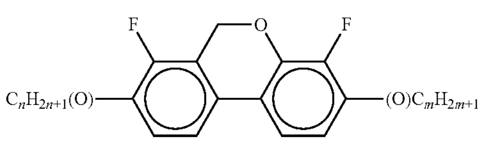
DFDBC-n(O)-(O)m
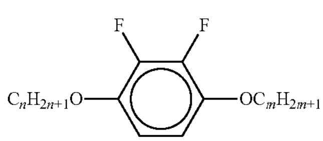
Y-nO-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
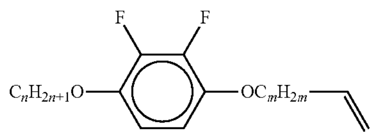
Y-nO-OmV
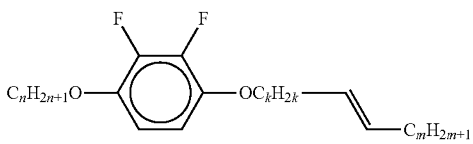
Y-nO-OkVm
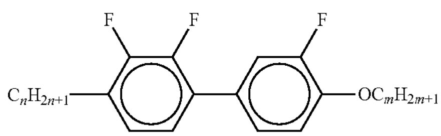
YG-n-Om
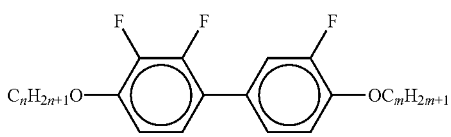
YG-nO-Om
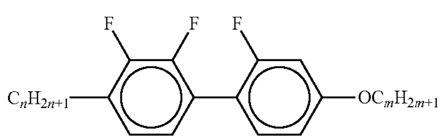
YGI-n-Om
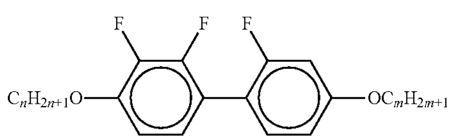
YGI-nO-Om
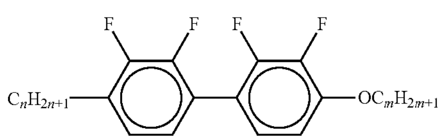
YY-n-Om
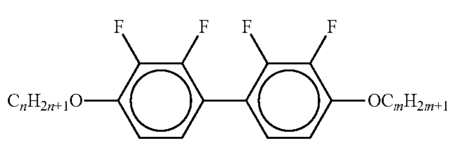
YY-nO-Om TABLE A-continued In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

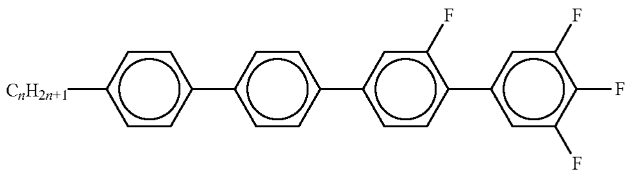

PPGU-n-F

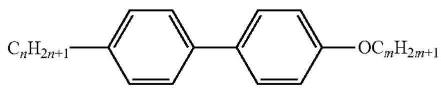

PP-n-Om

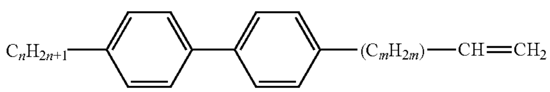

PP-n-mV

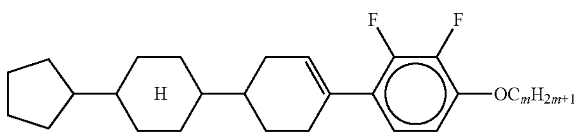

CLY-cp-Om

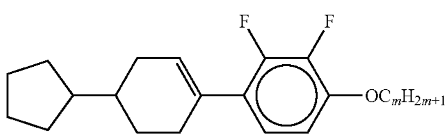

LY-Cp-Om

In a preferred embodiment of the present invention, the LC media according to the invention comprise one or more compounds selected from the group consisting of compounds from Table A.

TABLE B

Table B shows possible chiral dopants which can be added to the LC media according to the invention.

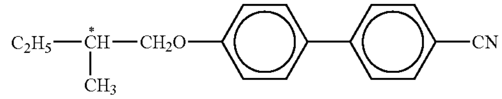

C 15

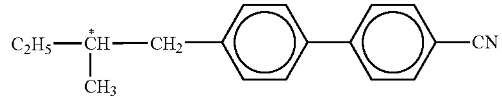

CB 15

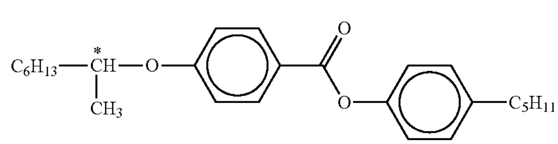

CM 21

TABLE B-continued
| Table B shows possible chiral dopants which can be added to the LC media according to the invention. |
|---|
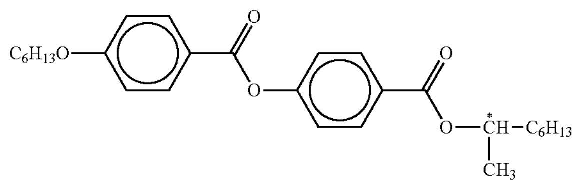
R/S-811
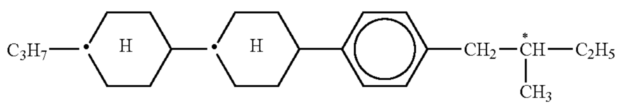
CM 44
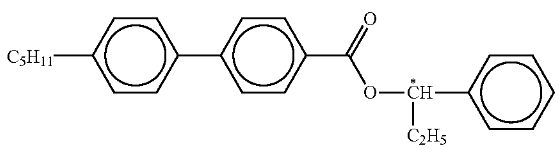
CM 45
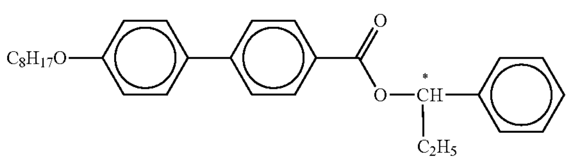
CM 47
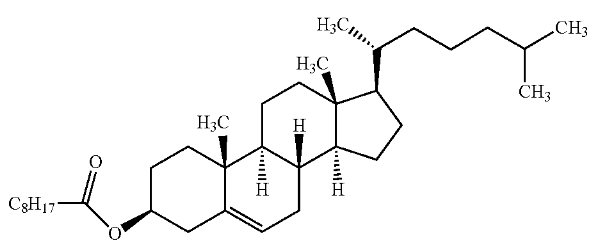
CN
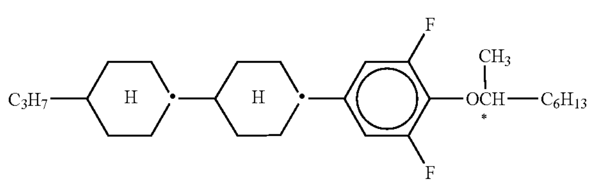
R/S-2011
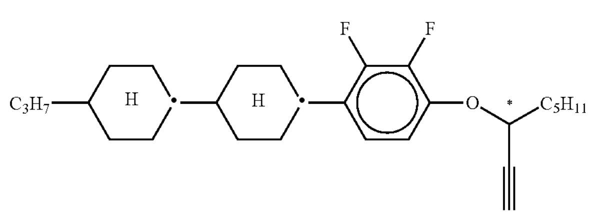
R/S-3011

TABLE B-continued

| Table B shows possible chiral dopants which can be added to the LC media according to the invention. |
|---|
| 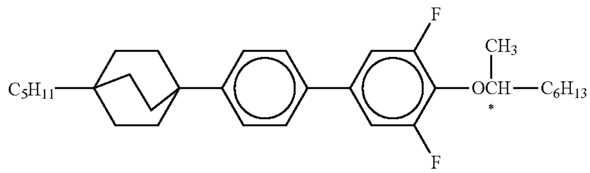 |
| R/S-4011 |
| 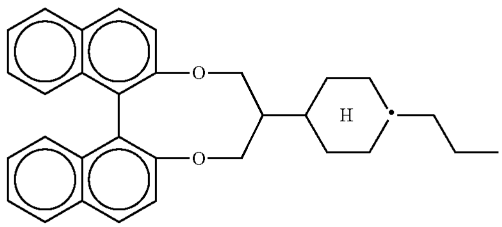 |
| R/S-5011 |

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 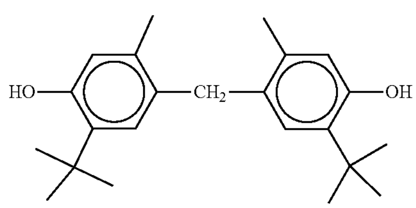 |
| 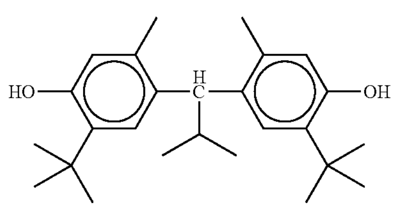 |
| 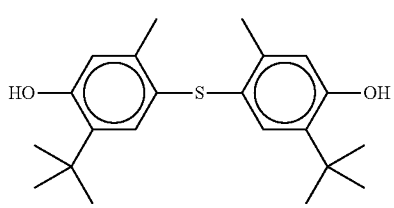 |

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
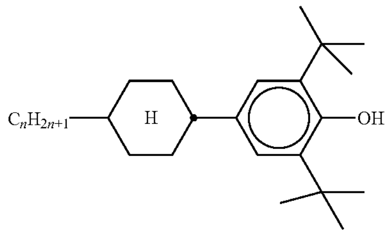
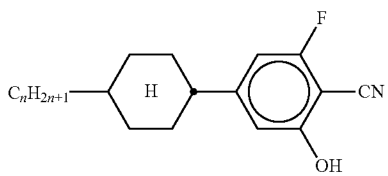
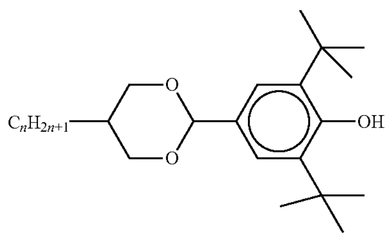
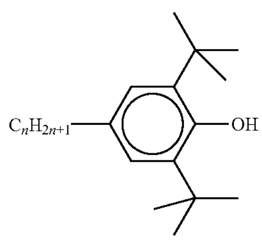
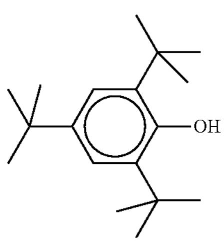
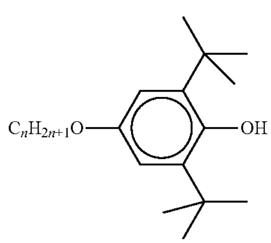

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
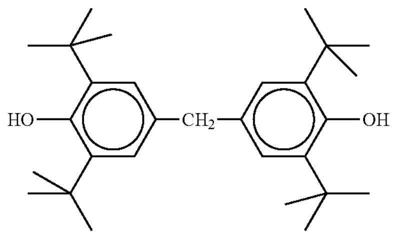
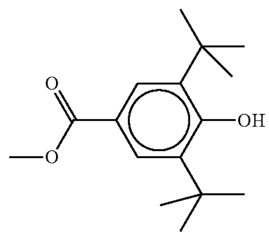
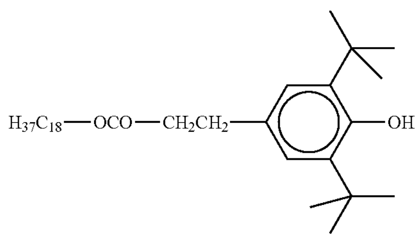
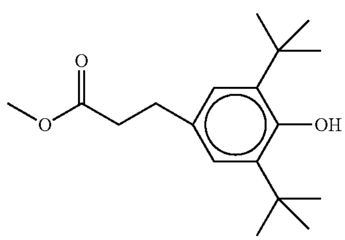
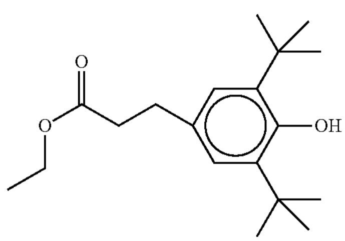
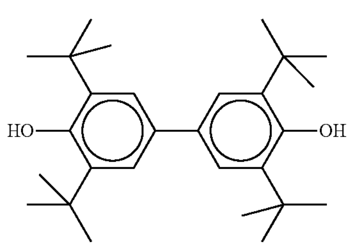

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
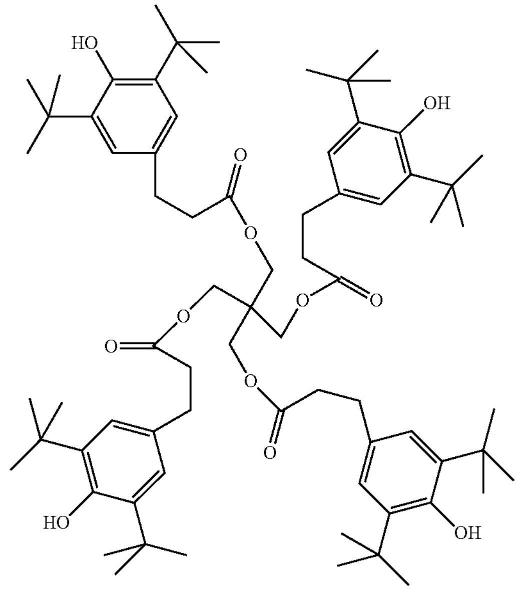 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
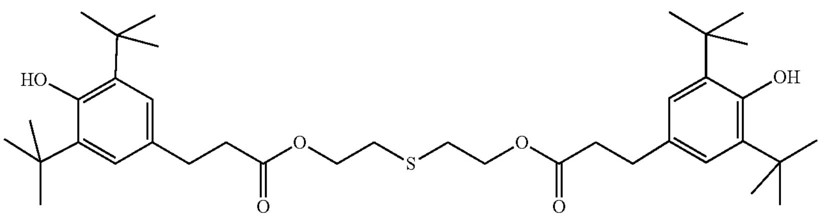 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
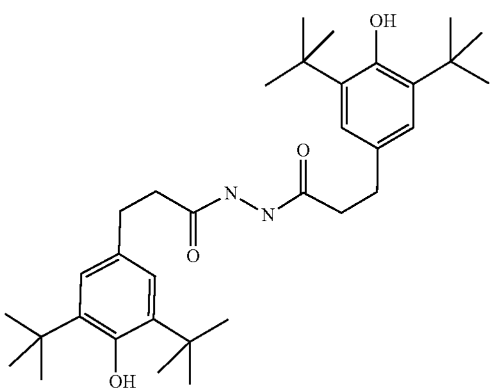
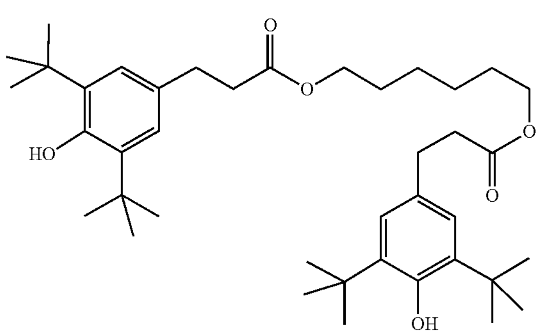 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
| --- |
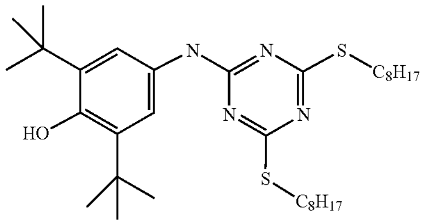
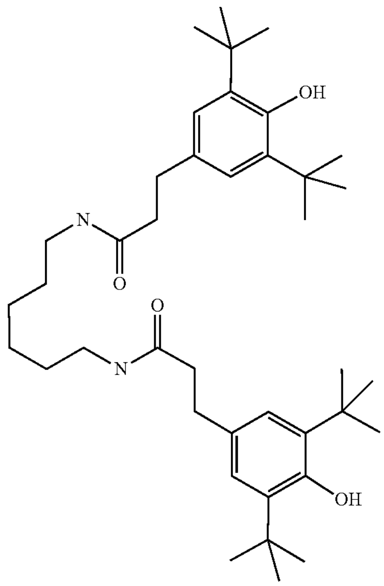
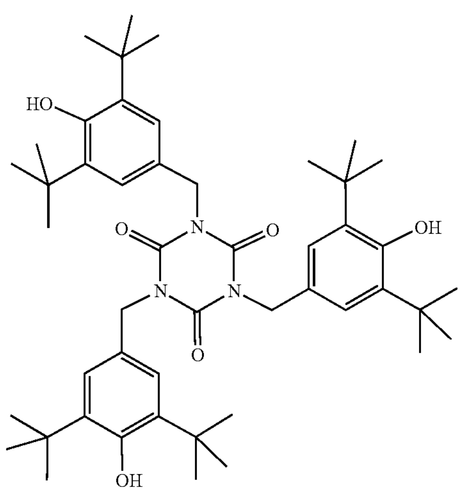 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
| --- |
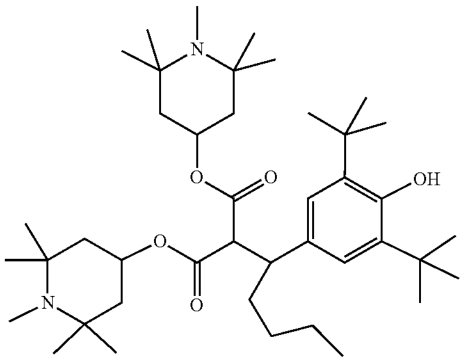 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
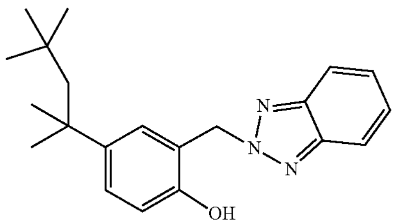 [SMILES: CC(C)(C)CC(C)(C)c1ccc(O)c(Cn2nc3ccccc3n2)c1]
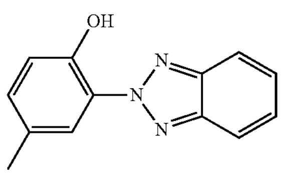
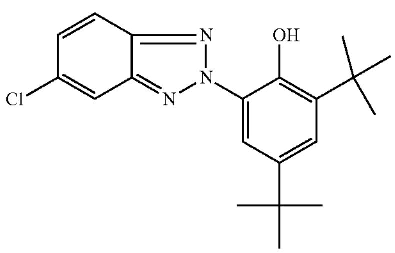 [SMILES: CC(C)(C)c1cc(-n2nc3ccc(Cl)cc3n2)c(O)c(C(C)(C)C)c1]
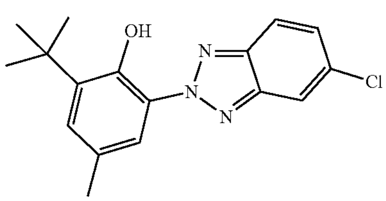 [SMILES: Cc1cc(-n2nc3ccc(Cl)cc3n2)c(O)c(C(C)(C)C)c1]

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
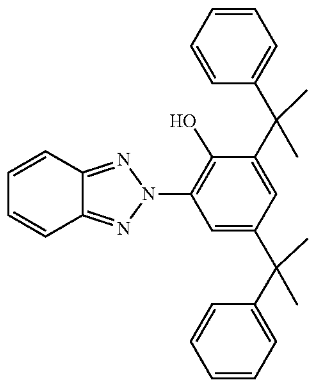 [SMILES: CC(C)(c1ccccc1)c1cc(-n2nc3ccccc3n2)c(O)c(C(C)(C)c2ccccc2)c1]
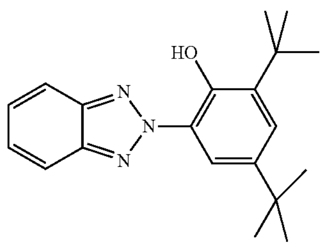 [SMILES: CC(C)(C)c1cc(-n2nc3ccccc3n2)c(O)c(C(C)(C)C)c1]
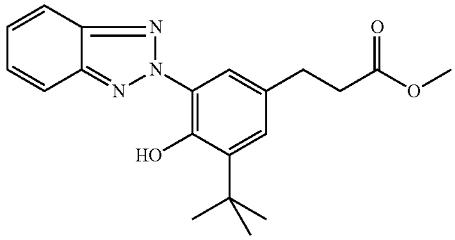 [SMILES: COC(=O)CCc1cc(-n2nc3ccccc3n2)c(O)c(C(C)(C)C)c1]
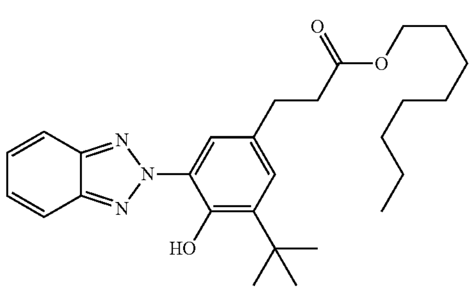 [SMILES: CCCCCCCCOC(=O)CCc1cc(-n2nc3ccccc3n2)c(O)c(C(C)(C)C)c1]

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
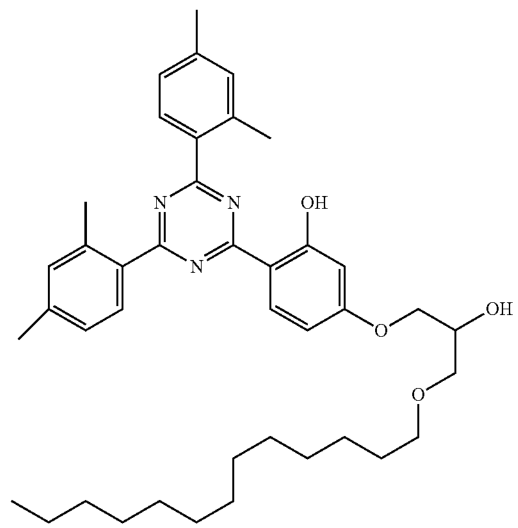 [SMILES: CCCCCCCCCCCCCOCC(O)COc1ccc(-c2nc(-c3ccc(C)cc3C)nc(-c3ccc(C)cc3C)n2)c(O)c1]
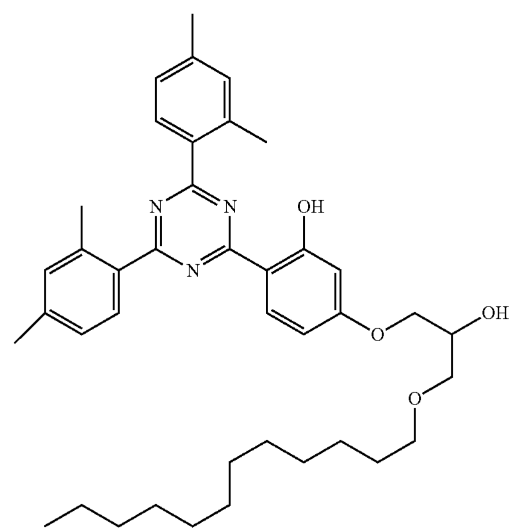 [SMILES: CCCCCCCCCCCCOCC(O)COc1ccc(-c2nc(-c3ccc(C)cc3C)nc(-c3ccc(C)cc3C)n2)c(O)c1]
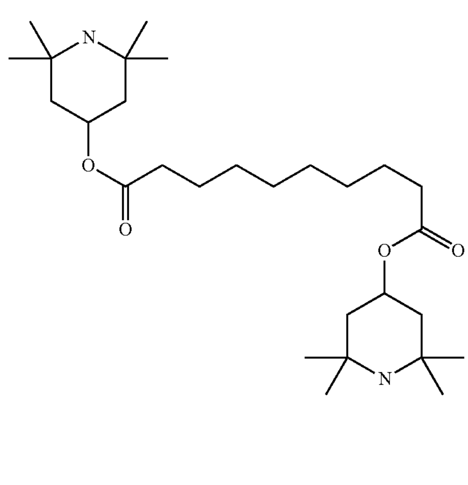

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
| --- |
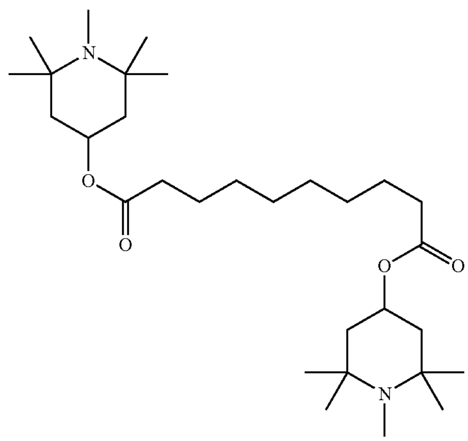
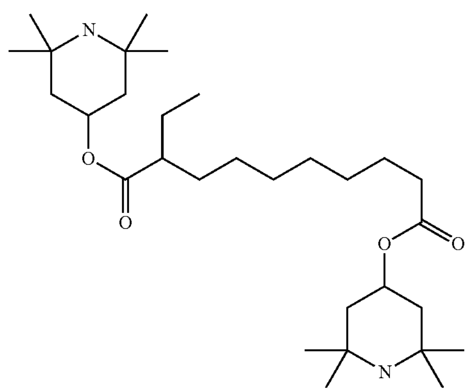
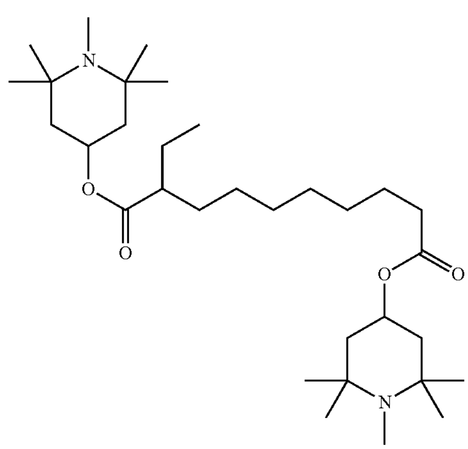

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
| --- |
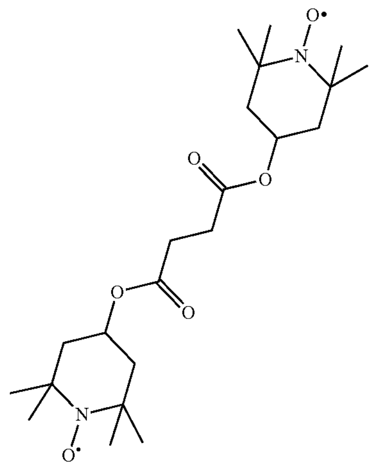
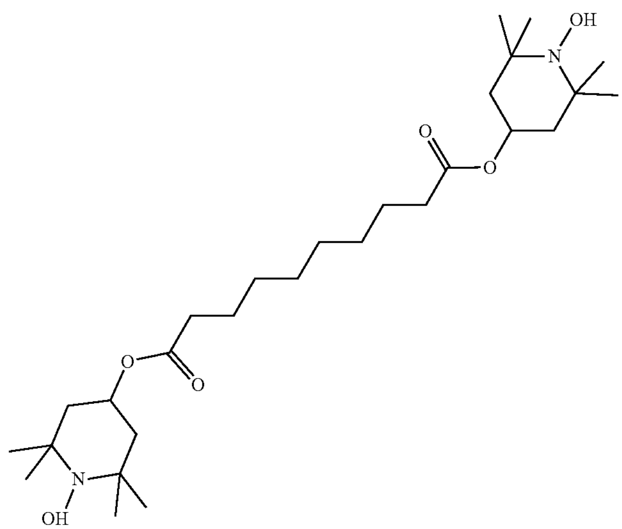
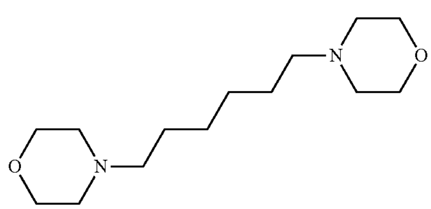 [SMILES: C(CCCN1CCOCC1)CCN1CCOCC1]

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
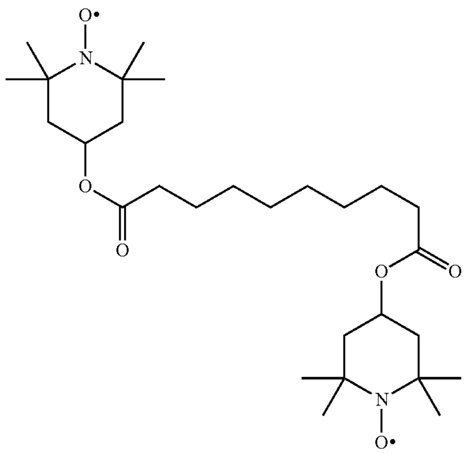
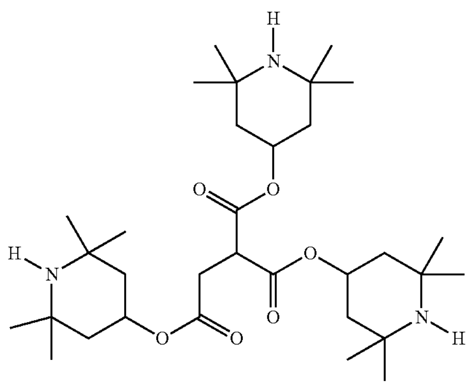
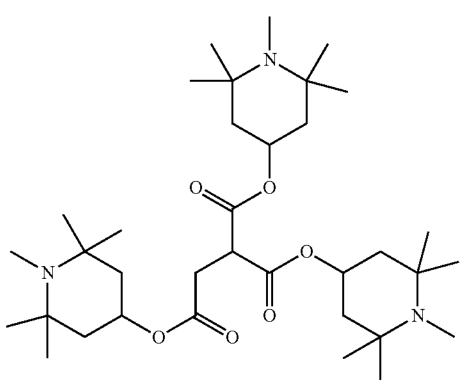

TABLE C-continued
| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
| --- |
| 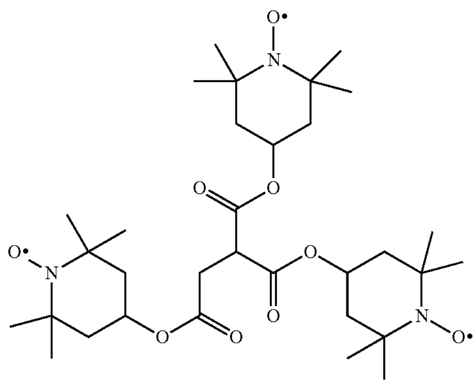 |
| 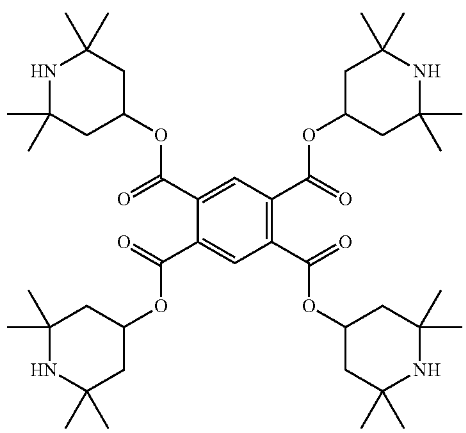 |
| 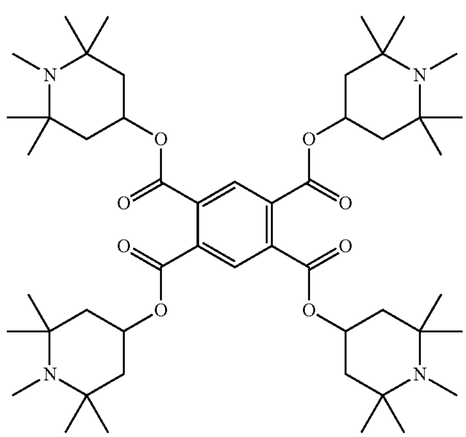 |

TABLE C-continued

| Table C shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 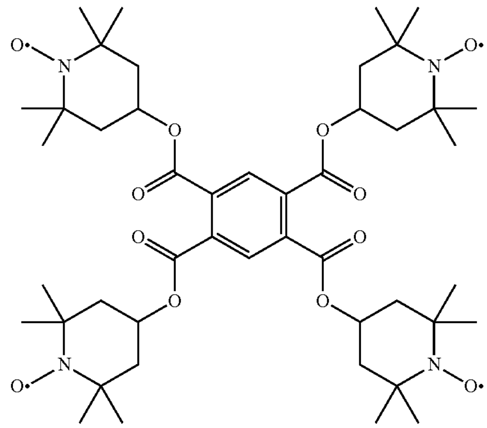 |
| 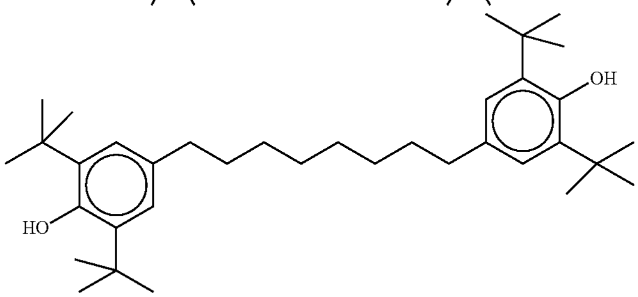 |

The LC media preferably comprise 0 to 10% by weight, in particular 1 ppm to 5% by weight, particularly preferably 1 ppm to 1% by weight, of stabilisers. The LC media preferably comprise one or more stabilisers selected from the k, group consisting of compounds from Table C.

TABLE D

| Table D shows illustrative reactive mesogenic compounds which can be used in the LC media in accordance with the present invention. |
|---|
| 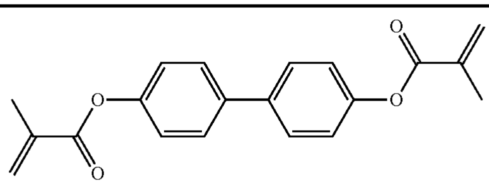 |
| RM-1 |
| 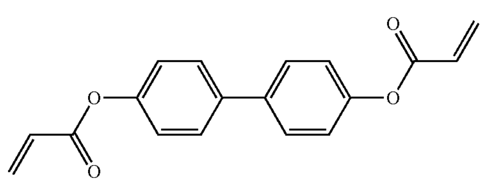 [SMILES: C=CC(=O)Oc1ccc(-c2ccc(OC(=O)C=C)cc2)cc1] |
| RM-2 |
| 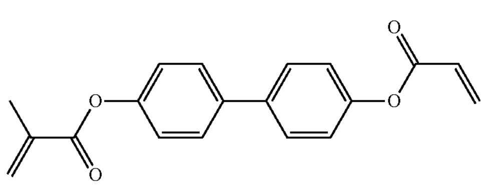 [SMILES: C=CC(=O)Oc1ccc(-c2ccc(OC(=O)C(=C)C)cc2)cc1] |
| RM-3 |

TABLE D-continued
| Table D shows illustrative reactive mesogenic compounds which can be used in the LC media in accordance with the present invention. |
| --- |
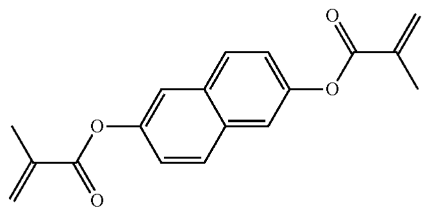 [SMILES: C=C(C)C(=O)Oc1ccc2cc(OC(=O)C(=C)C)ccc2c1]
RM-4
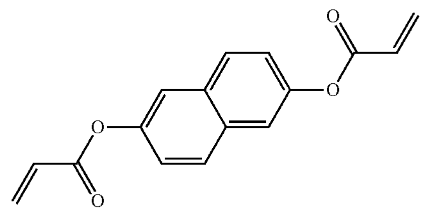 [SMILES: C=CC(=O)Oc1ccc2cc(OC(=O)C=C)ccc2c1]
RM-5
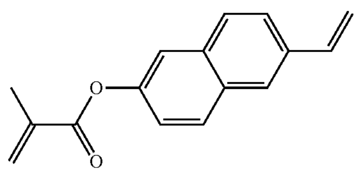 [SMILES: C=Cc1ccc2cc(OC(=O)C(=C)C)ccc2c1]
RM-6
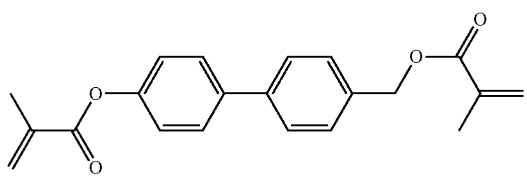 [SMILES: C=C(C)C(=O)OCc1ccc(-c2ccc(OC(=O)C(=C)C)cc2)cc1]
RM-7
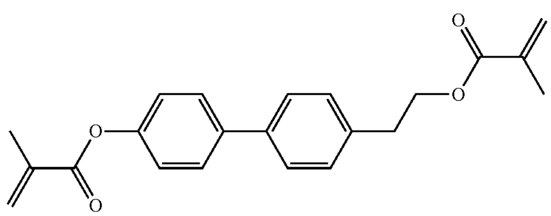 [SMILES: C=C(C)C(=O)OCCc1ccc(-c2ccc(OC(=O)C(=C)C)cc2)cc1]
RM-8
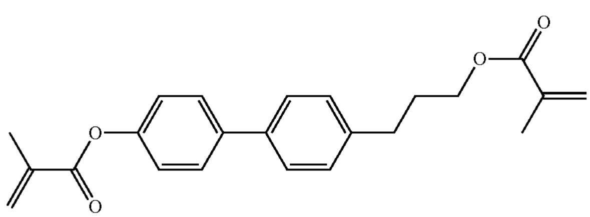 [SMILES: C=C(C)C(=O)OCCCc1ccc(-c2ccc(OC(=O)C(=C)C)cc2)cc1]
RM-9
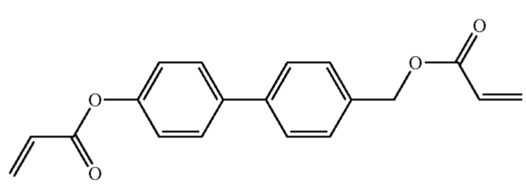 [SMILES: C=CC(=O)OCc1ccc(-c2ccc(OC(=O)C=C)cc2)cc1]
RM-10

TABLE D-continued
Table D shows illustrative reactive mesogenic compounds which can be used in the LC media in accordance with the present invention.
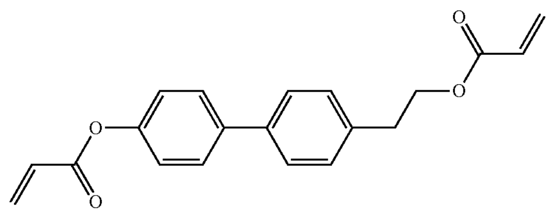 [SMILES: C=CC(=O)OCCc1ccc(-c2ccc(OC(=O)C=C)cc2)cc1]
RM-11
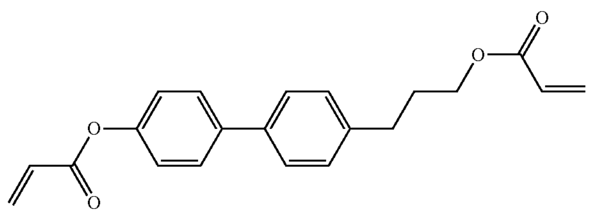 [SMILES: C=CC(=O)OCCCc1ccc(-c2ccc(OC(=O)C=C)cc2)cc1]
RM-12
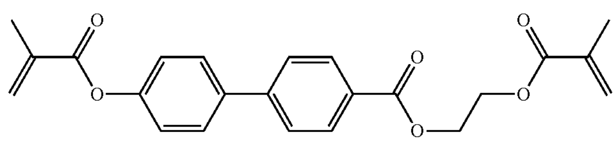 [SMILES: C=C(C)C(=O)OCCOC(=O)c1ccc(-c2ccc(OC(=O)C(=C)C)cc2)c(F)c1]
RM-13
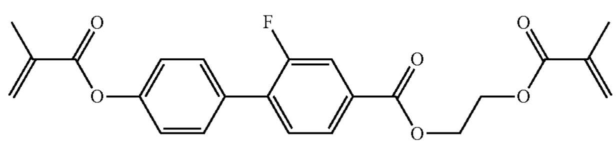
RM-14
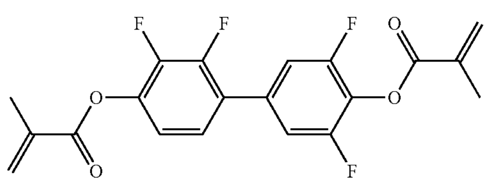 [SMILES: C=C(C)C(=O)Oc1ccc(-c2cc(F)c(OC(=O)C(=C)C)c(F)c2)c(F)c1F]
RM-15
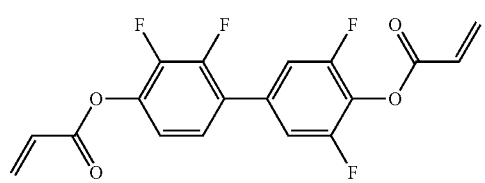 [SMILES: C=CC(=O)Oc1ccc(-c2cc(F)c(OC(=O)C=C)c(F)c2)c(F)c1F]
RM-16
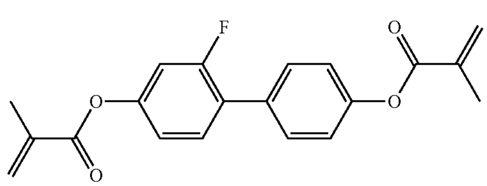
RM-17

TABLE D-continued
Table D shows illustrative reactive mesogenic compounds which can be used in the LC media in accordance with the present invention.
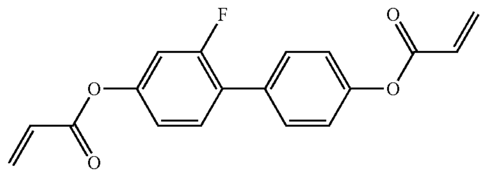
RM-18
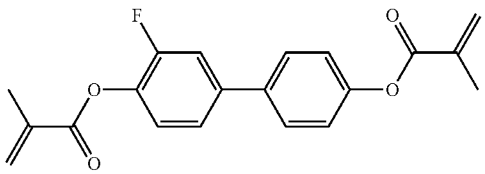
RM-19
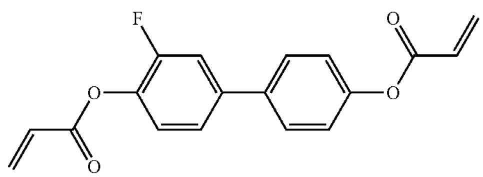
RM-20
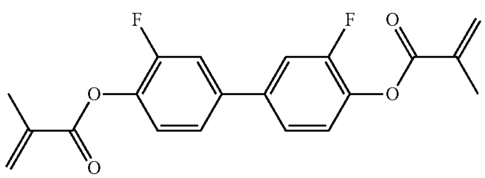 [SMILES: C=C(C)C(=O)Oc1ccc(-c2ccc(OC(=O)C(=C)C)c(F)c2)cc1]
RM-21
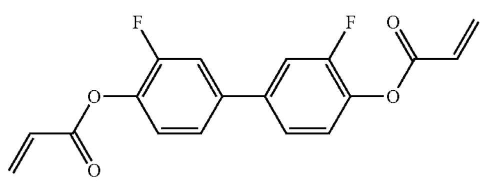
RM-22
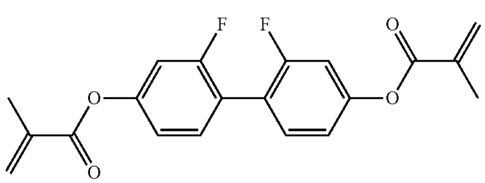
RM-23
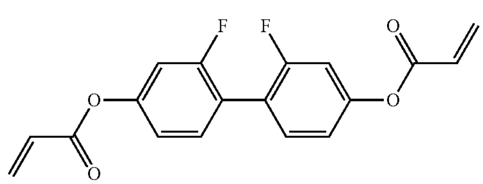
RM-24

TABLE D-continued
Table D shows illustrative reactive mesogenic compounds which can be used in the LC media in accordance with the present invention.
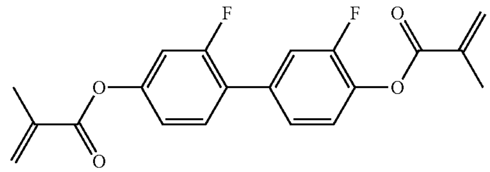 [SMILES: C=C(C)C(=O)Oc1ccc(-c2ccc(OC(=O)C(=C)C)c(F)c2F)c(F)c1]
RM-25
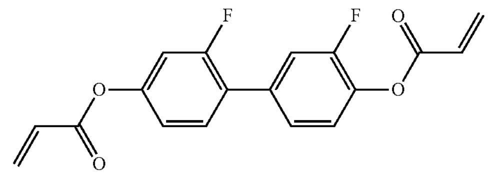
RM-26
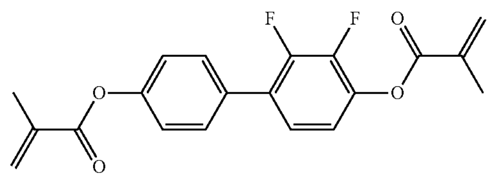
RM-27
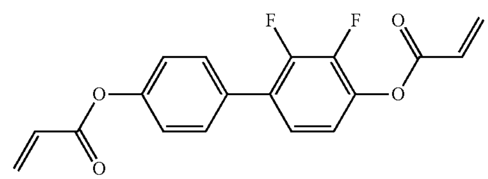
RM-28
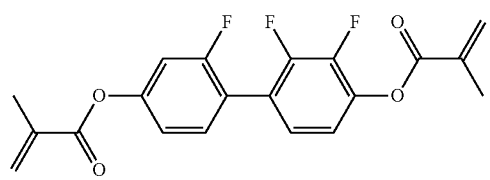
RM-29
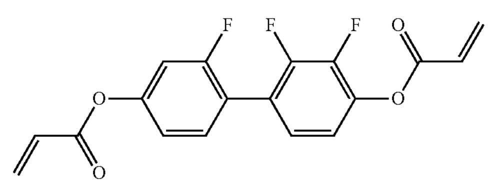 [SMILES: C=CC(=O)Oc1ccc(-c2ccc(OC(=O)C=C)c(F)c2F)c(F)c1]
RM-30
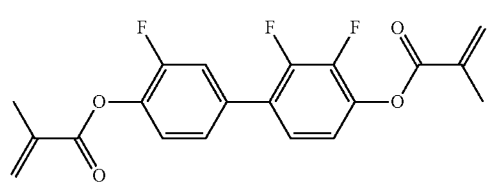 [SMILES: C=C(C)C(=O)Oc1ccc(-c2ccc(OC(=O)C(=C)C)c(F)c2F)cc1F]
RM-31

TABLE D-continued
Table D shows illustrative reactive mesogenic compounds which can be used in the LC media in accordance with the present invention.
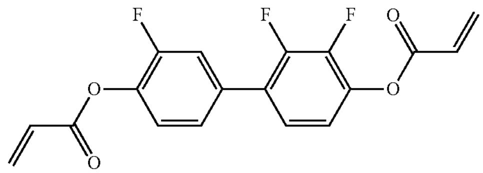 [SMILES: C=CC(=O)Oc1ccc(-c2ccc(OC(=O)C=C)c(F)c2F)cc1F]
RM-32
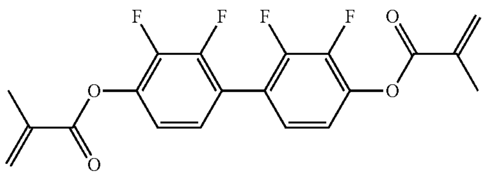 [SMILES: C=C(C)C(=O)Oc1ccc(-c2ccc(OC(=O)C(=C)C)c(F)c2F)c(F)c1F]
RM-33
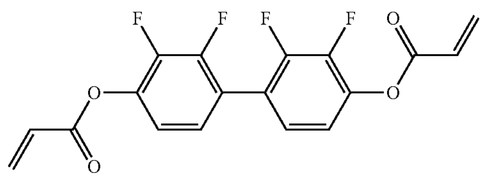 [SMILES: C=CC(=O)Oc1ccc(-c2ccc(OC(=O)C=C)c(F)c2F)c(F)c1F]
RM-34
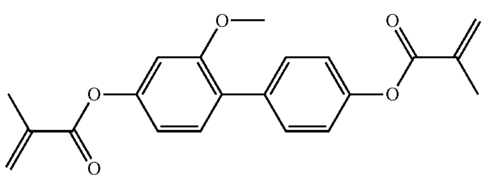
RM-35
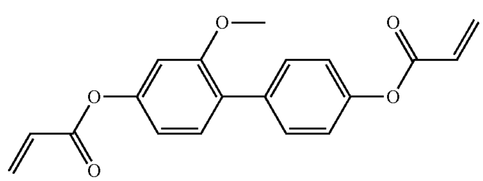 [SMILES: C=CC(=O)Oc1ccc(-c2ccc(OC(=O)C=C)cc2OC)cc1]
RM-36
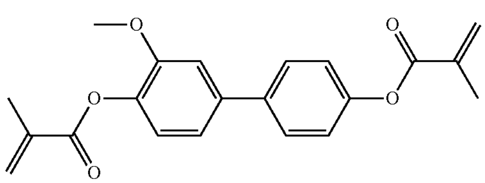
RM-37
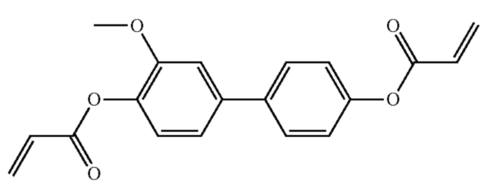
RM-38

TABLE D-continued
| Table D shows illustrative reactive mesogenic compounds which can be used in the LC media in accordance with the present invention. |
| --- |
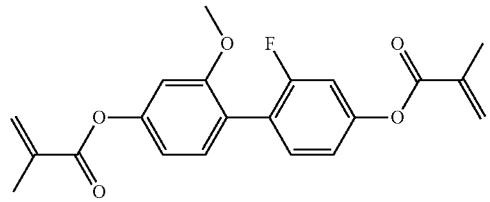 [SMILES: C=C(C)C(=O)Oc1ccc(-c2ccc(OC(=O)C(=C)C)cc2OC)c(F)c1]
RM-39
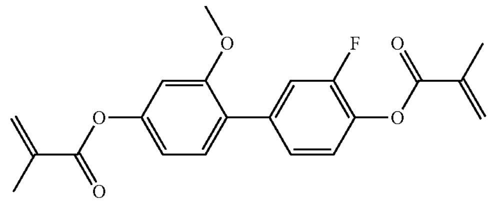 [SMILES: C=C(C)C(=O)Oc1ccc(-c2ccc(OC(=O)C(=C)C)c(F)c2)c(OC)c1]
RM-40
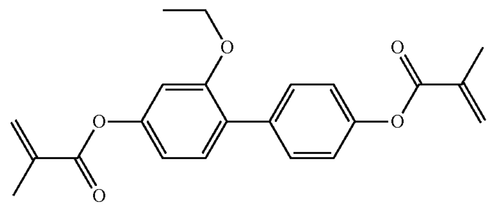 [SMILES: C=C(C)C(=O)Oc1ccc(-c2ccc(OC(=O)C(=C)C)cc2OCC)cc1]
RM-41
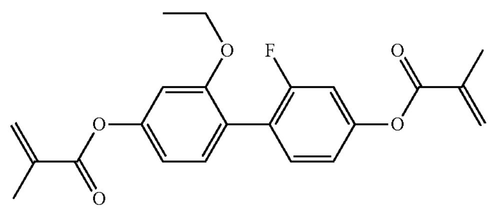 [SMILES: C=C(C)C(=O)Oc1ccc(-c2ccc(OC(=O)C(=C)C)cc2OCC)c(F)c1]
RM-42
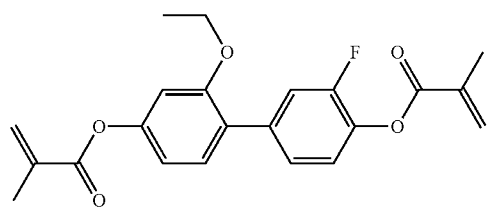 [SMILES: C=C(C)C(=O)Oc1ccc(-c2ccc(OC(=O)C(=C)C)c(F)c2)c(OCC)c1]
RM-43
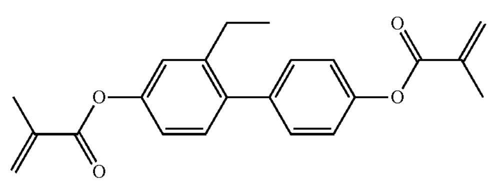 [SMILES: C=C(C)C(=O)Oc1ccc(-c2ccc(OC(=O)C(=C)C)cc2CC)cc1]
RM-44
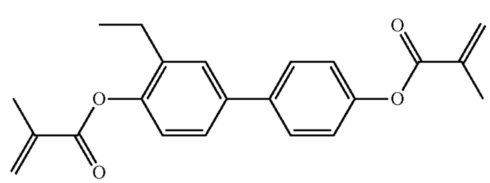
RM-45

TABLE D-continued
| Table D shows illustrative reactive mesogenic compounds which can be used in the LC media in accordance with the present invention. |
| --- |
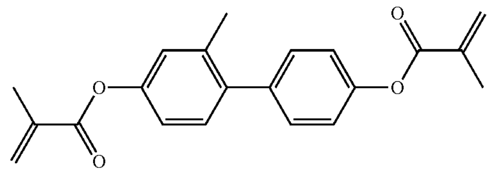
RM-46
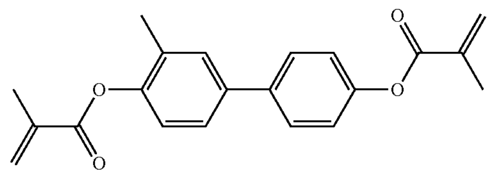
RM-47
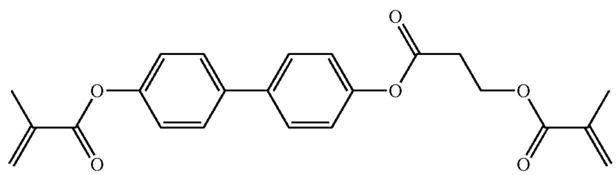 [SMILES: C=C(C)C(=O)OCCC(=O)Oc1ccc(-c2ccc(OC(=O)C(=C)C)cc2)cc1]
RM-48
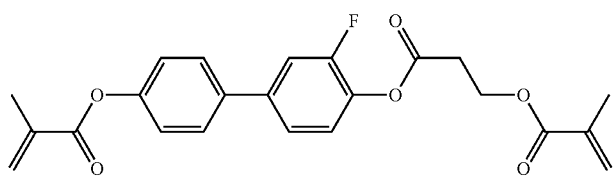 [SMILES: C=C(C)C(=O)OCCC(=O)Oc1ccc(-c2ccc(OC(=O)C(=C)C)cc2)cc1F]
RM-49
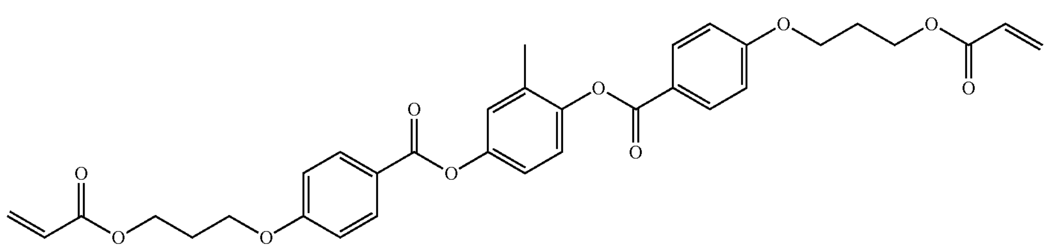 [SMILES: C=CC(=O)OCCCOc1ccc(C(=O)Oc2ccc(OC(=O)c3ccc(OCCCOC(=O)C=C)cc3)c(C)c2)cc1]
RM-50
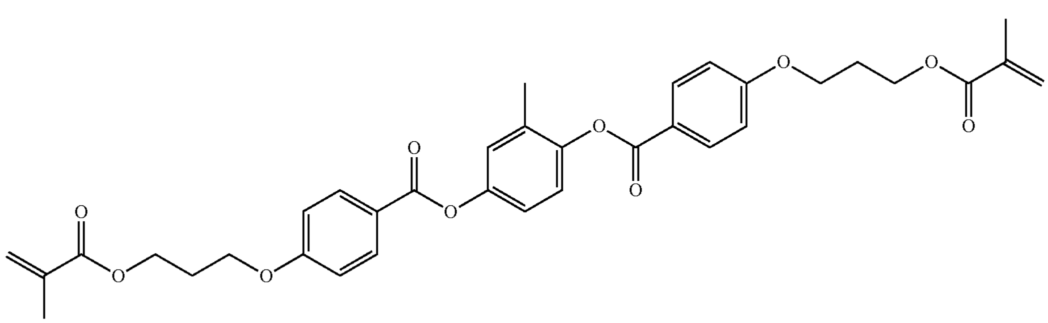 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51

TABLE D-continued
Table D shows illustrative reactive mesogenic compounds which can be used in the LC media in accordance with the present invention.
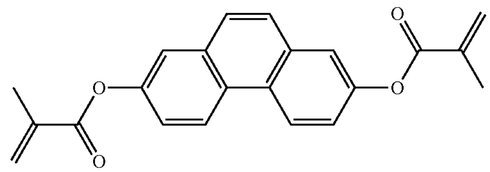 [SMILES: C=C(C)C(=O)Oc1ccc2c(ccc3cc(OC(=O)C(=C)C)ccc32)c1]
RM-52
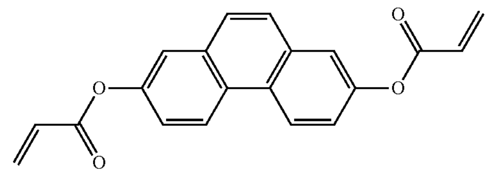 [SMILES: C=CC(=O)Oc1ccc2c(ccc3cc(OC(=O)C=C)ccc32)c1]
RM-53
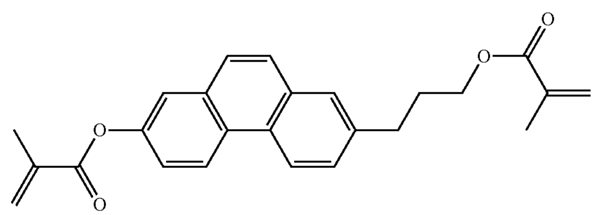 [SMILES: C=C(C)C(=O)OCCCc1ccc2c(ccc3cc(OC(=O)C(=C)C)ccc32)c1]
RM-54
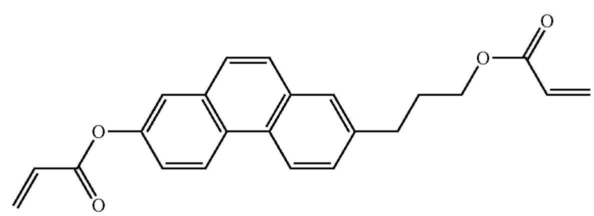 [SMILES: C=CC(=O)OCCCc1ccc2c(ccc3cc(OC(=O)C=C)ccc32)c1]
RM-55
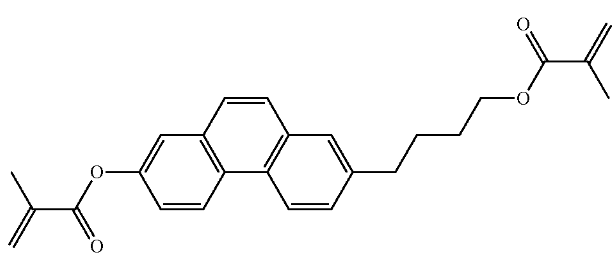 [SMILES: C=C(C)C(=O)OCCCCc1ccc2c(ccc3cc(OC(=O)C(=C)C)ccc32)c1]
RM-56
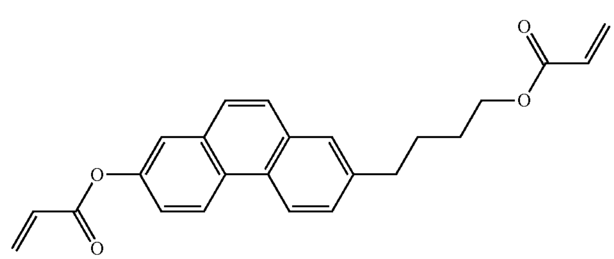 [SMILES: C=CC(=O)OCCCCc1ccc2c(ccc3cc(OC(=O)C=C)ccc32)c1]
RM-57

TABLE D-continued
Table D shows illustrative reactive mesogenic compounds which can be used in the LC media in accordance with the present invention.
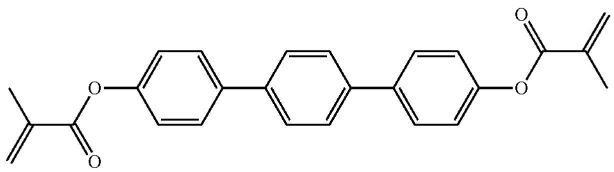 [SMILES: C=C(C)C(=O)Oc1ccc(-c2ccc(-c3ccc(OC(=O)C(=C)C)cc3)cc2)cc1]
RM-58
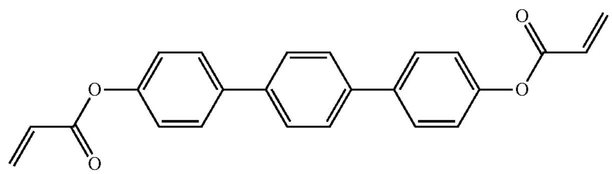 [SMILES: C=CC(=O)Oc1ccc(-c2ccc(-c3ccc(OC(=O)C=C)cc3)cc2)cc1]
RM-59
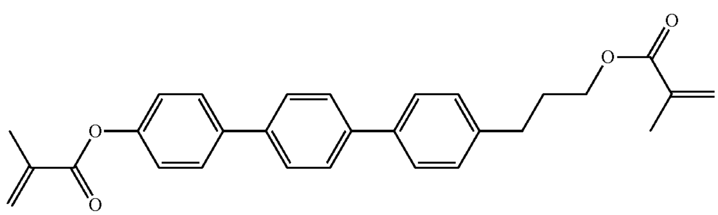 [SMILES: C=C(C)C(=O)OCCCc1ccc(-c2ccc(-c3ccc(OC(=O)C(=C)C)cc3)cc2)cc1]
RM-60
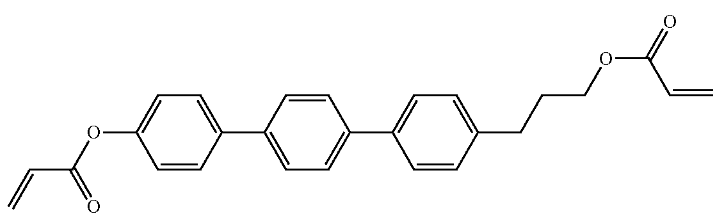 [SMILES: C=CC(=O)OCCCc1ccc(-c2ccc(-c3ccc(OC(=O)C=C)cc3)cc2)cc1]
RM-61
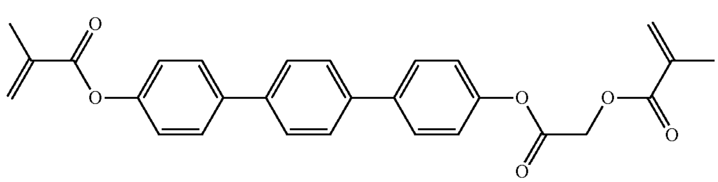 [SMILES: C=C(C)C(=O)OCC(=O)Oc1ccc(-c2ccc(-c3ccc(OC(=O)C(=C)C)cc3)cc2)cc1]
RM-62
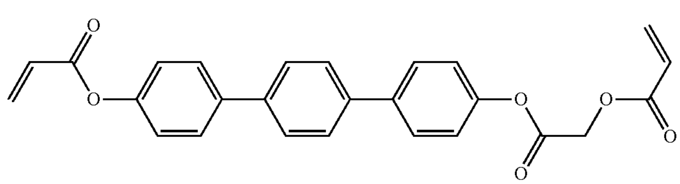 [SMILES: C=CC(=O)OCC(=O)Oc1ccc(-c2ccc(-c3ccc(OC(=O)C=C)cc3)cc2)cc1]
RM-63
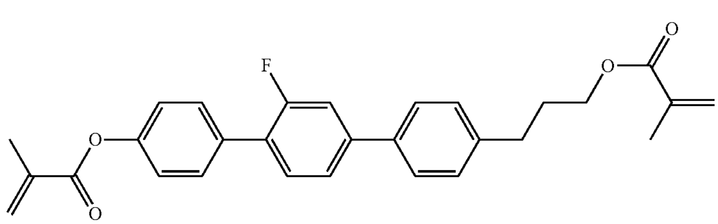
RM-64

TABLE D-continued
| Table D shows illustrative reactive mesogenic compounds which can be used in the LC media in accordance with the present invention. |
| --- |
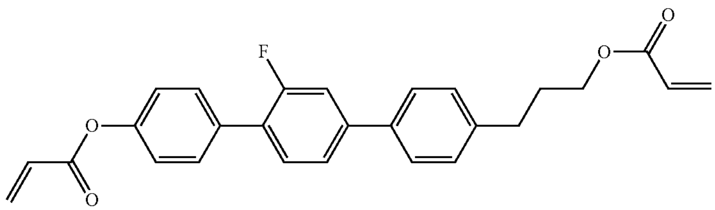 [SMILES: C=CC(=O)OCCCc1ccc(-c2ccc(-c3ccc(OC(=O)C=C)cc3)c(F)c2)cc1]
RM-65
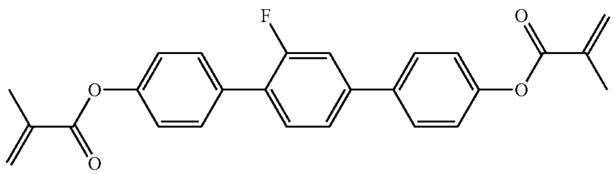
RM-66
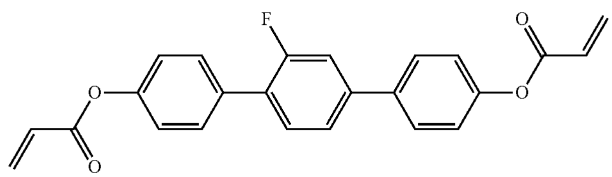
RM-67
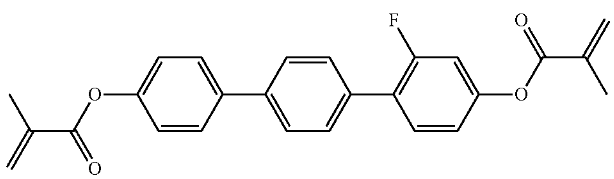 [SMILES: C=C(C)C(=O)Oc1ccc(-c2ccc(-c3ccc(OC(=O)C(=C)C)cc3F)cc2)cc1]
RM-68
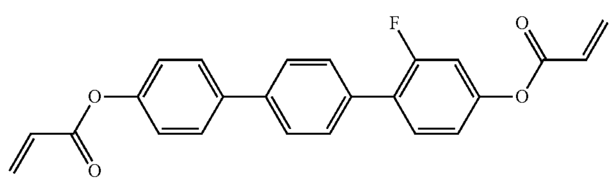
RM-69
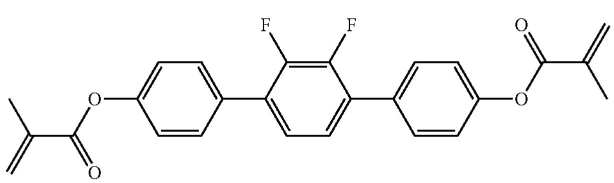 [SMILES: C=C(C)C(=O)Oc1ccc(-c2ccc(-c3ccc(OC(=O)C(=C)C)cc3)c(F)c2F)cc1]
RM-70
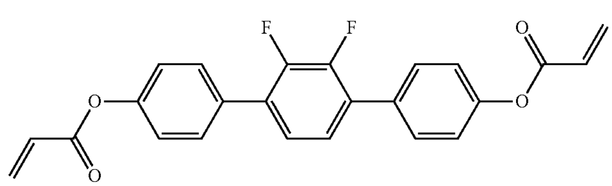 [SMILES: C=CC(=O)Oc1ccc(-c2ccc(-c3ccc(OC(=O)C=C)cc3)c(F)c2F)cc1]
RM-71

TABLE D-continued
| Table D shows illustrative reactive mesogenic compounds which can be used in the LC media in accordance with the present invention. |
| --- |
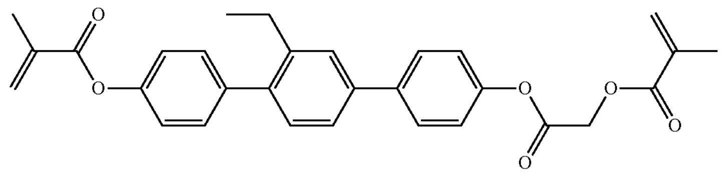 [SMILES: C=C(C)C(=O)OCC(=O)Oc1ccc(-c2ccc(-c3ccc(OC(=O)C(=C)C)cc3)c(CC)c2)cc1]
RM-72
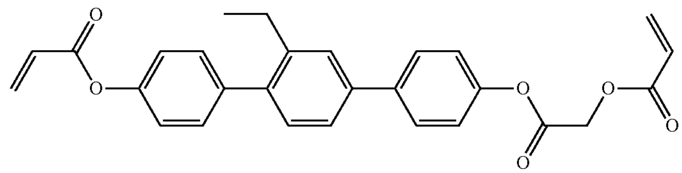
RM-73
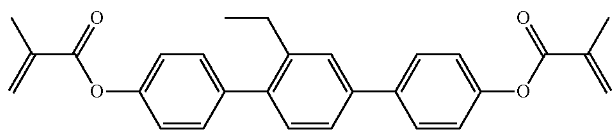 [SMILES: C=C(C)C(=O)Oc1ccc(-c2ccc(-c3ccc(OC(=O)C(=C)C)cc3)c(CC)c2)cc1]
RM-74
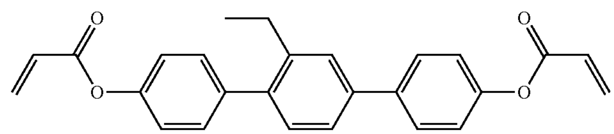 [SMILES: C=CC(=O)Oc1ccc(-c2ccc(-c3ccc(OC(=O)C=C)cc3)c(CC)c2)cc1]
RM-75
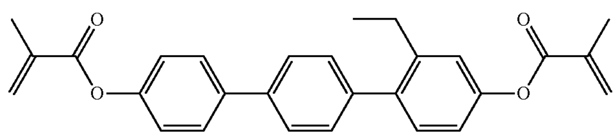 [SMILES: C=C(C)C(=O)Oc1ccc(-c2ccc(-c3ccc(OC(=O)C(=C)C)cc3CC)cc2)cc1]
RM-76
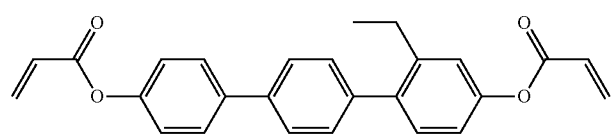 [SMILES: C=CC(=O)Oc1ccc(-c2ccc(-c3ccc(OC(=O)C=C)cc3CC)cc2)cc1]
RM-77
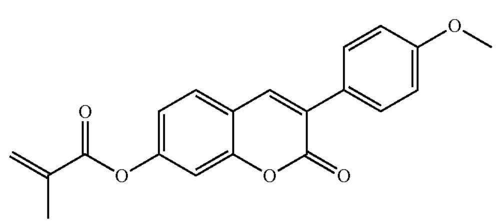 [SMILES: C=C(C)C(=O)Oc1ccc2cc(-c3ccc(OC)cc3)c(=O)oc2c1]
RM-78
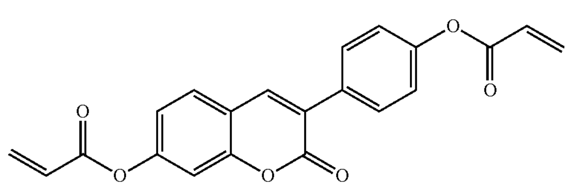 [SMILES: C=CC(=O)Oc1ccc(-c2cc3ccc(OC(=O)C=C)cc3oc2=O)cc1]
RM-79

TABLE D-continued
| Table D shows illustrative reactive mesogenic compounds which can be used in the LC media in accordance with the present invention. |
| --- |
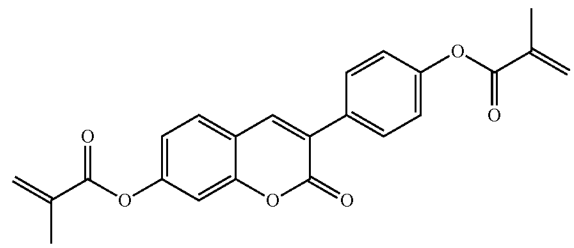 [SMILES: C=C(C)C(=O)Oc1ccc(-c2cc3ccc(OC(=O)C(=C)C)cc3oc2=O)cc1]
RM-80
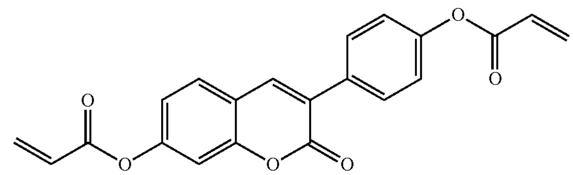 [SMILES: C=CC(=O)Oc1ccc(-c2cc3ccc(OC(=O)C=C)cc3oc2=O)cc1]
RM-81
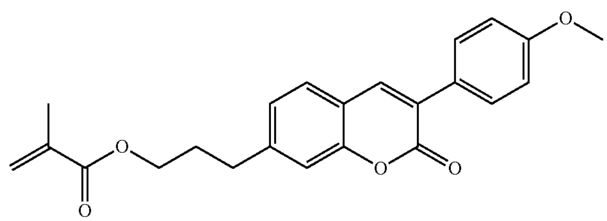 [SMILES: C=C(C)C(=O)OCCCc1ccc2cc(-c3ccc(OC)cc3)c(=O)oc2c1]
RM-82
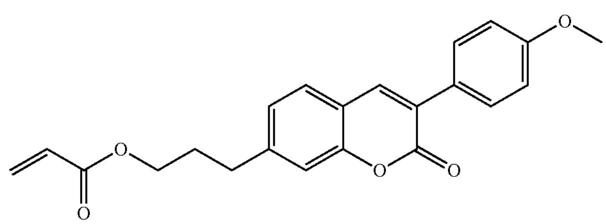 [SMILES: C=CC(=O)OCCCc1ccc2cc(-c3ccc(OC)cc3)c(=O)oc2c1]
RM-83
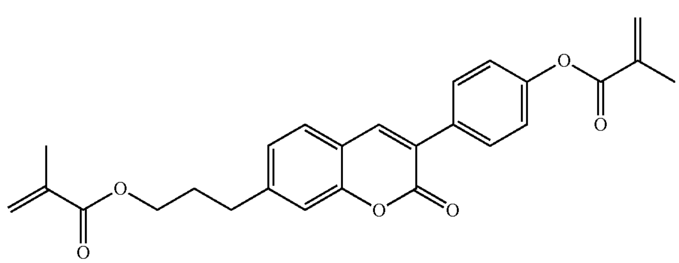 [SMILES: C=C(C)C(=O)OCCCc1ccc2cc(-c3ccc(OC(=O)C(=C)C)cc3)c(=O)oc2c1]
RM-84
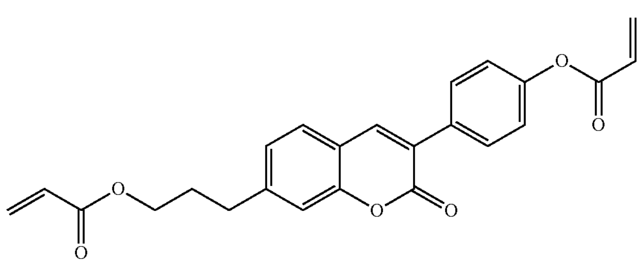 [SMILES: C=CC(=O)OCCCc1ccc2cc(-c3ccc(OC(=O)C=C)cc3)c(=O)oc2c1]
RM-85

TABLE D-continued
| Table D shows illustrative reactive mesogenic compounds which can be used in the LC media in accordance with the present invention. |
| --- |
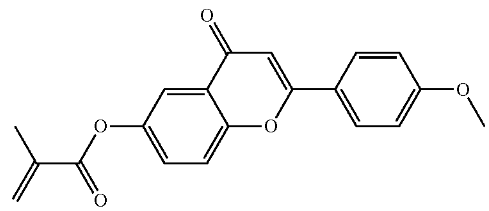 [SMILES: C=C(C)C(=O)Oc1ccc2oc(-c3ccc(OC)cc3)cc(=O)c2c1]
RM-86
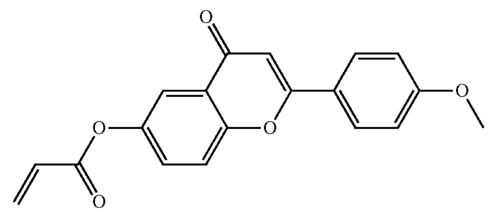 [SMILES: C=CC(=O)Oc1ccc2oc(-c3ccc(OC)cc3)cc(=O)c2c1]
RM-87
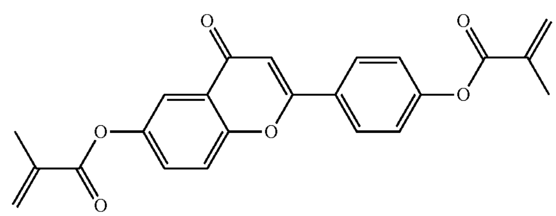 [SMILES: C=C(C)C(=O)Oc1ccc(-c2cc(=O)c3cc(OC(=O)C(=C)C)ccc3o2)cc1]
RM-88
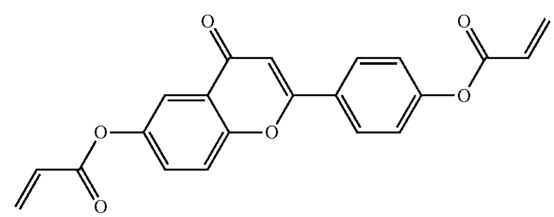 [SMILES: C=CC(=O)Oc1ccc(-c2cc(=O)c3cc(OC(=O)C=C)ccc3o2)cc1]
RM-89
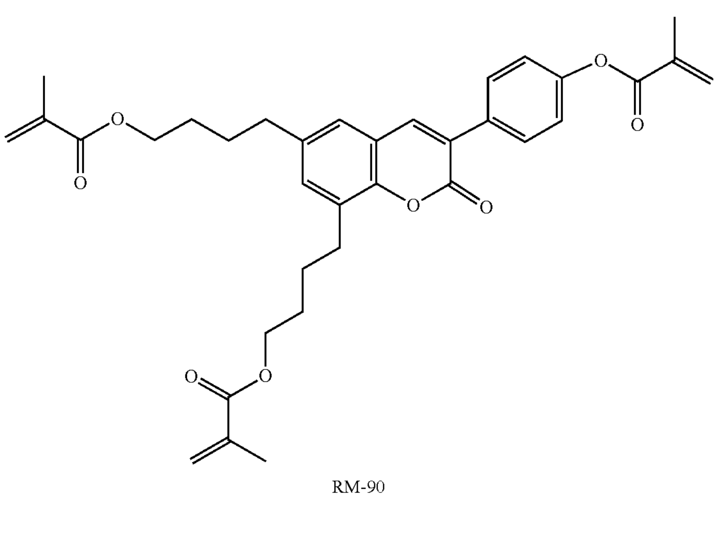
RM-90

TABLE D-continued
| Table D shows illustrative reactive mesogenic compounds which can be used in the LC media in accordance with the present invention. |
| --- |
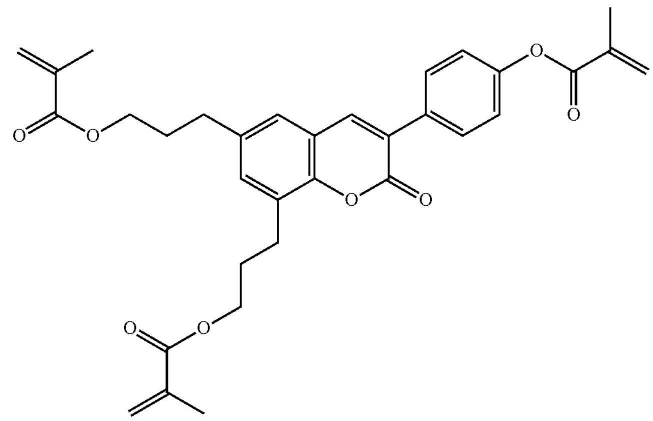 [SMILES: C=C(C)C(=O)OCCCc1cc(CCCOC(=O)C(=C)C)c2oc(=O)c(-c3ccc(OC(=O)C(=C)C)cc3)cc2c1]
RM-91
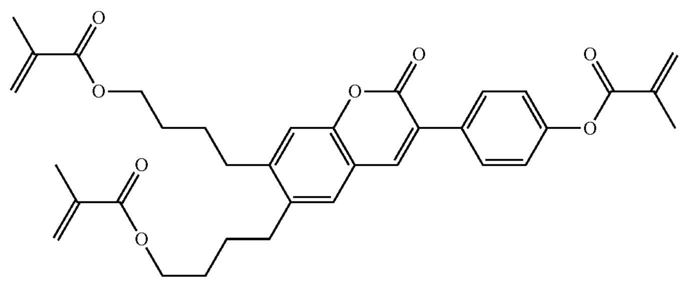 [SMILES: C=C(C)C(=O)OCCCCc1cc2cc(-c3ccc(OC(=O)C(=C)C)cc3)c(=O)oc2cc1CCCCOC(=O)C(=C)C]
RM-92
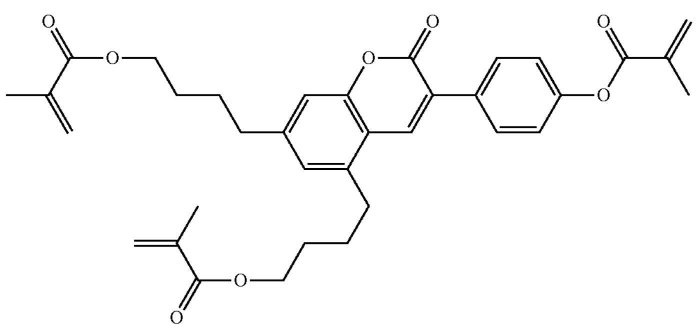 [SMILES: C=C(C)C(=O)OCCCCc1cc(CCCCOC(=O)C(=C)C)c2cc(-c3ccc(OC(=O)C(=C)C)cc3)c(=O)oc2c1]
RM-93
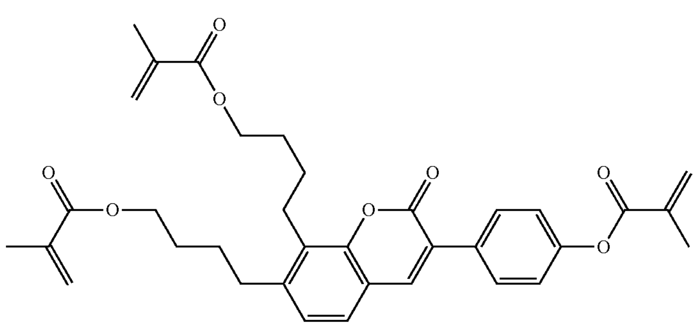 [SMILES: C=C(C)C(=O)OCCCCc1ccc2cc(-c3ccc(OC(=O)C(=C)C)cc3)c(=O)oc2c1CCCCOC(=O)C(=C)C]
RM-94

TABLE D-continued
| Table D shows illustrative reactive mesogenic compounds which can be used in the LC media in accordance with the present invention. |
|---|
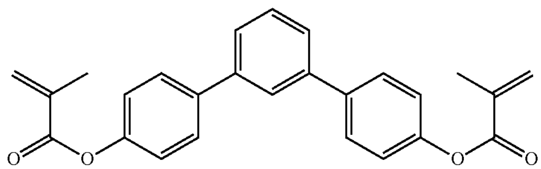 [SMILES: C=C(C)C(=O)Oc1ccc(-c2cccc(-c3ccc(OC(=O)C(=C)C)cc3)c2)cc1]
RM-95
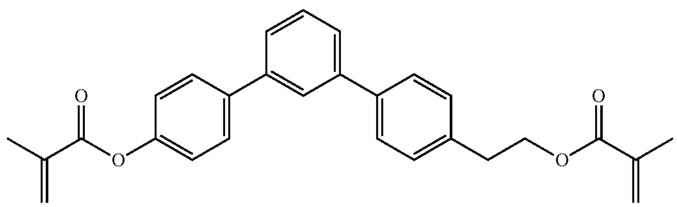 [SMILES: C=C(C)C(=O)OCCc1ccc(-c2cccc(-c3ccc(OC(=O)C(=C)C)cc3)c2)cc1]
RM-96
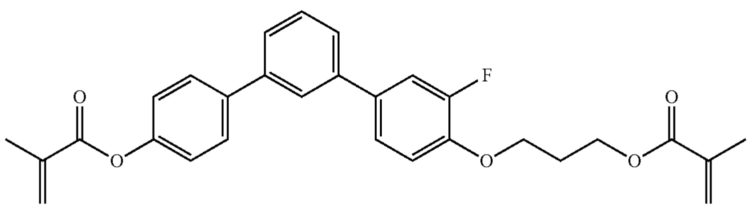 [SMILES: C=C(C)C(=O)OCCCOc1ccc(-c2cccc(-c3ccc(OC(=O)C(=C)C)cc3)c2)cc1F]
RM-97
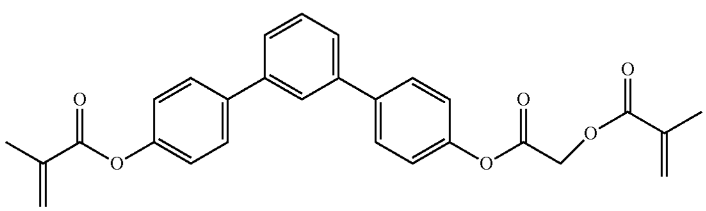 [SMILES: C=C(C)C(=O)OCC(=O)Oc1ccc(-c2cccc(-c3ccc(OC(=O)C(=C)C)cc3)c2)cc1]
RM-98
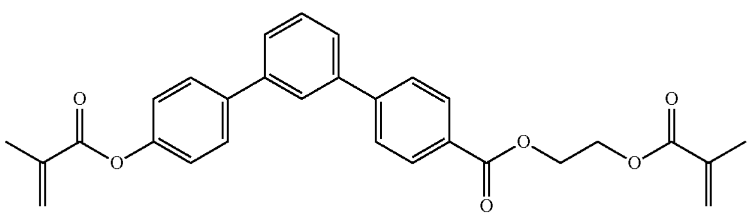 [SMILES: C=C(C)C(=O)OCCOC(=O)c1ccc(-c2cccc(-c3ccc(OC(=O)C(=C)C)cc3)c2)cc1]
RM-99
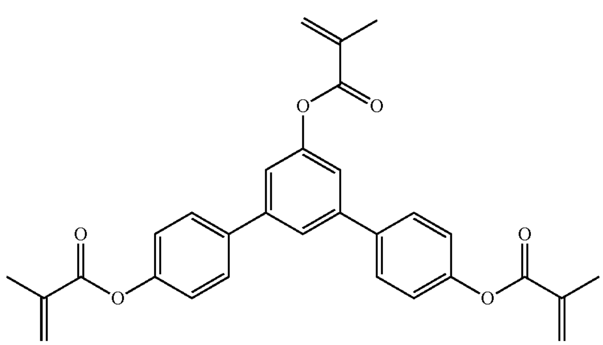 [SMILES: C=C(C)C(=O)Oc1ccc(-c2cc(OC(=O)C(=C)C)cc(-c3ccc(OC(=O)C(=C)C)cc3)c2)cc1]
RM-100

TABLE D-continued
Table D shows illustrative reactive mesogenic compounds which can be used in the LC media in accordance with the present invention.
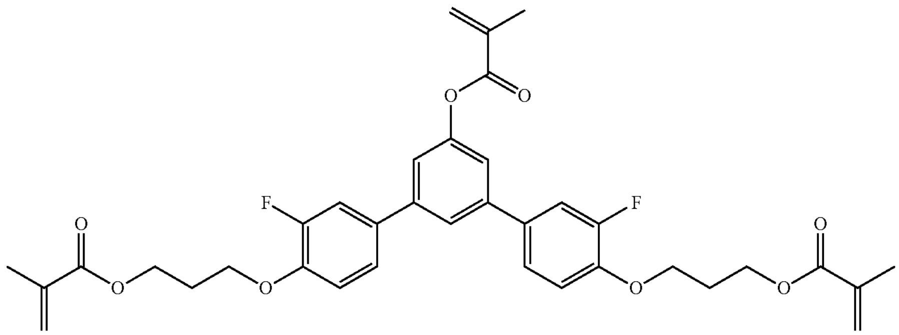 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101
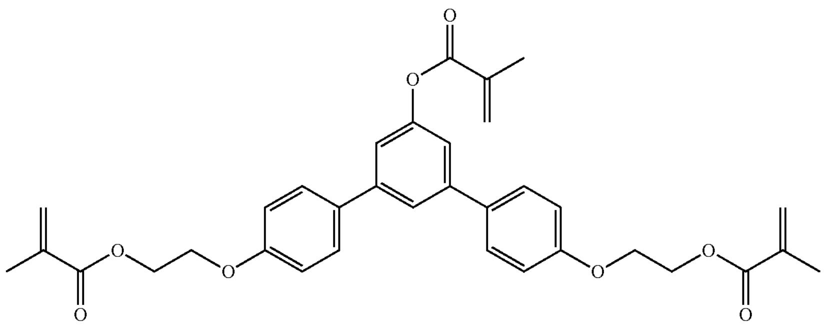 [SMILES: C=C(C)C(=O)OCCOc1ccc(-c2cc(OC(=O)C(=C)C)cc(-c3ccc(OCCOC(=O)C(=C)C)cc3)c2)cc1]
RM-102
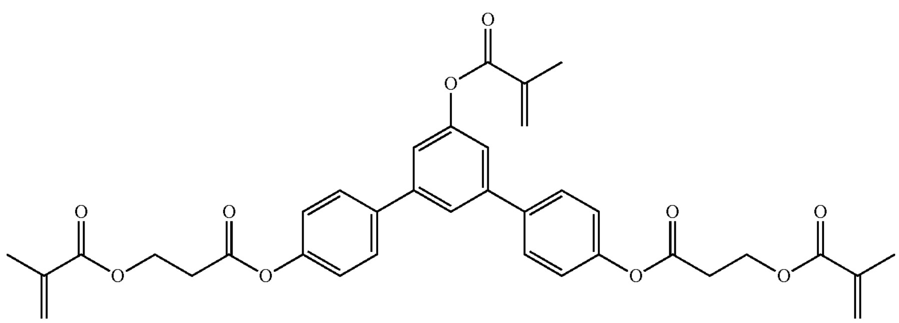
RM-103
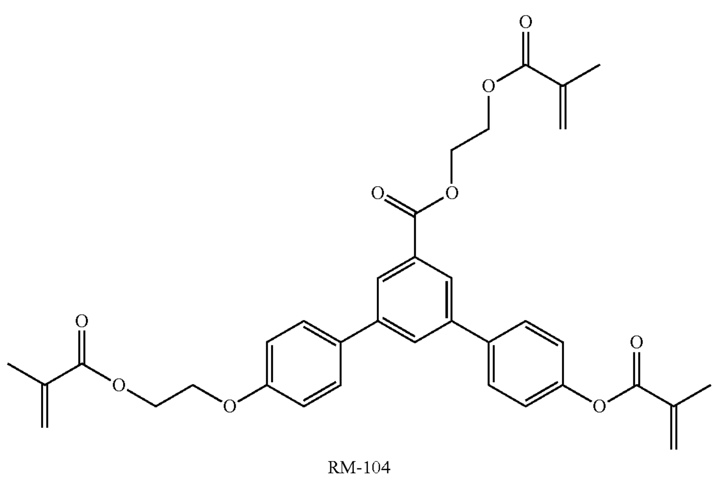
RM-104

TABLE D-continued
| Table D shows illustrative reactive mesogenic compounds which can be used in the LC media in accordance with the present invention. |
| --- |
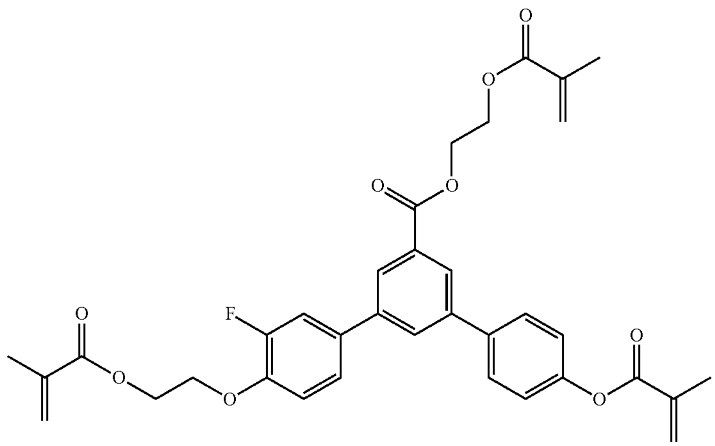 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-105
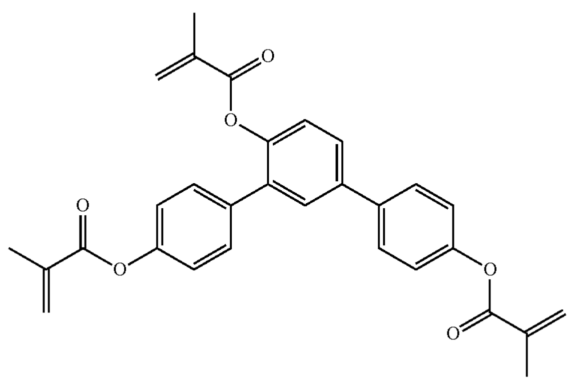 [SMILES: C=C(C)C(=O)Oc1ccc(-c2ccc(OC(=O)C(=C)C)c(-c3ccc(OC(=O)C(=C)C)cc3)c2)cc1]
RM-106
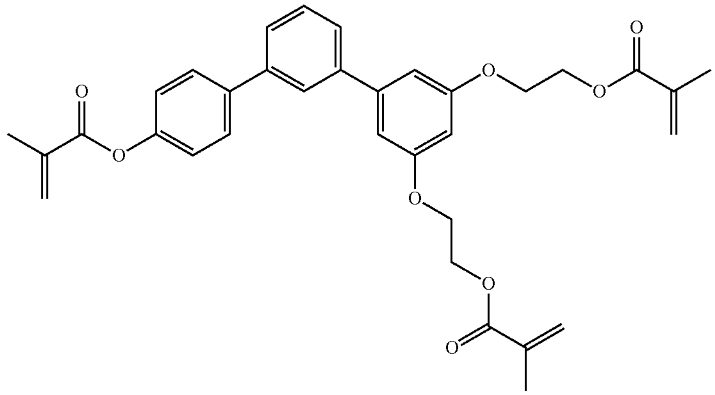 [SMILES: C=C(C)C(=O)OCCOc1cc(OCCOC(=O)C(=C)C)cc(-c2cccc(-c3ccc(OC(=O)C(=C)C)cc3)c2)c1]
RM-107

TABLE D-continued
Table D shows illustrative reactive mesogenic compounds which can be used in the LC media in accordance with the present invention.
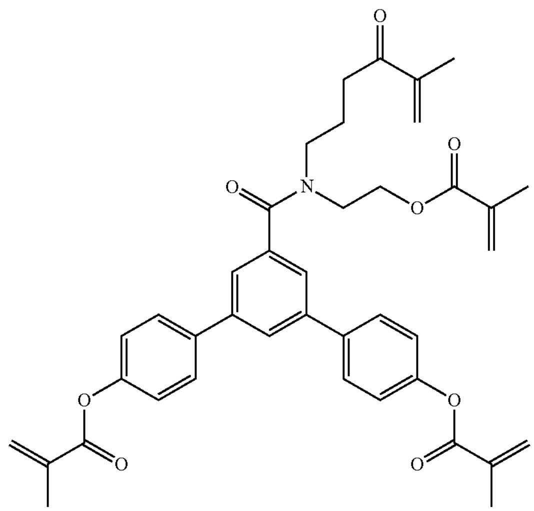 [SMILES: C=C(C)C(=O)CCCN(CCOC(=O)C(=C)C)C(=O)c1cc(-c2ccc(OC(=O)C(=C)C)cc2)cc(-c2ccc(OC(=O)C(=C)C)cc2)c1]
RM-108
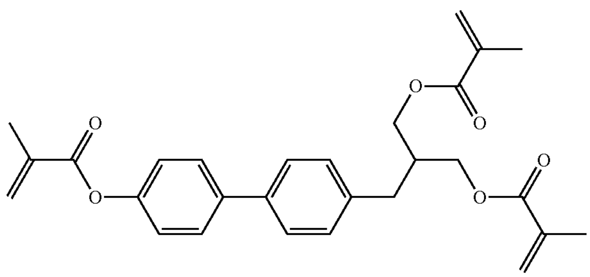 [SMILES: C=C(C)C(=O)OCC(COC(=O)C(=C)C)Cc1ccc(-c2ccc(OC(=O)C(=C)C)cc2)cc1]
RM-109
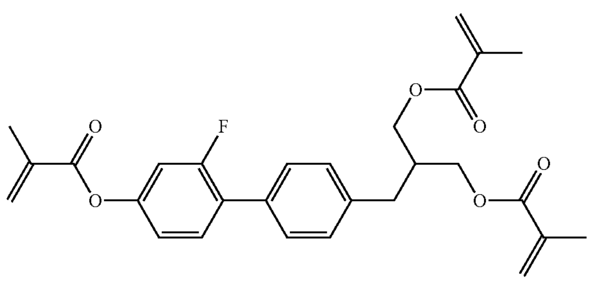 [SMILES: C=C(C)C(=O)OCC(COC(=O)C(=C)C)Cc1ccc(-c2ccc(OC(=O)C(=C)C)cc2F)cc1]
RM-110
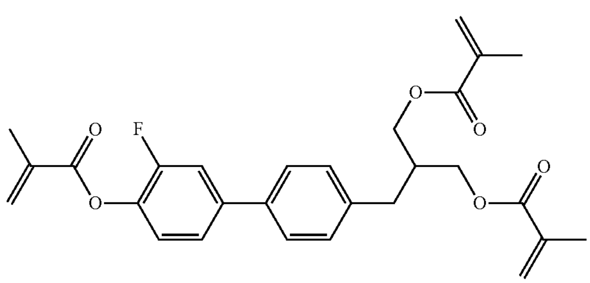 [SMILES: C=C(C)C(=O)OCC(COC(=O)C(=C)C)Cc1ccc(-c2ccc(OC(=O)C(=C)C)c(F)c2)cc1]
RM-111

TABLE D-continued
Table D shows illustrative reactive mesogenic compounds which can be used in the LC media in accordance with the present invention.
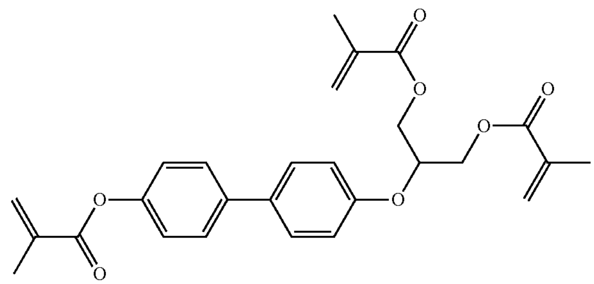 [SMILES: C=C(C)C(=O)OCC(COC(=O)C(=C)C)Oc1ccc(-c2ccc(OC(=O)C(=C)C)cc2)cc1]
RM-112
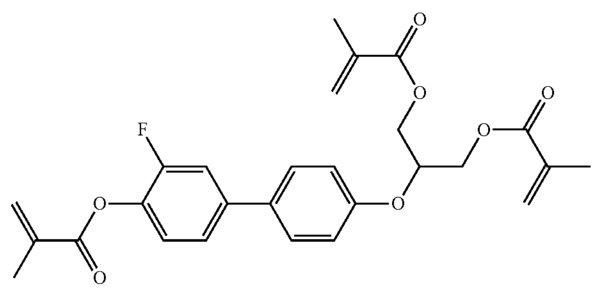 [SMILES: C=C(C)C(=O)OCC(COC(=O)C(=C)C)Oc1ccc(-c2ccc(OC(=O)C(=C)C)c(F)c2)cc1]
RM-113
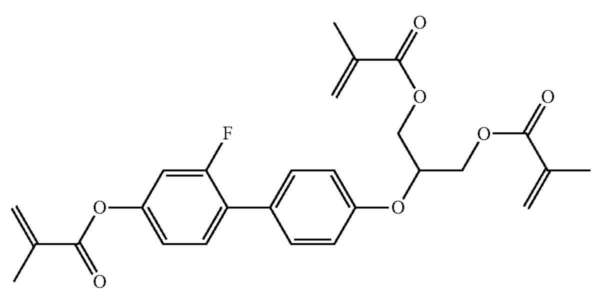 [SMILES: C=C(C)C(=O)OCC(COC(=O)C(=C)C)Oc1ccc(-c2ccc(OC(=O)C(=C)C)cc2F)cc1]
RM-114
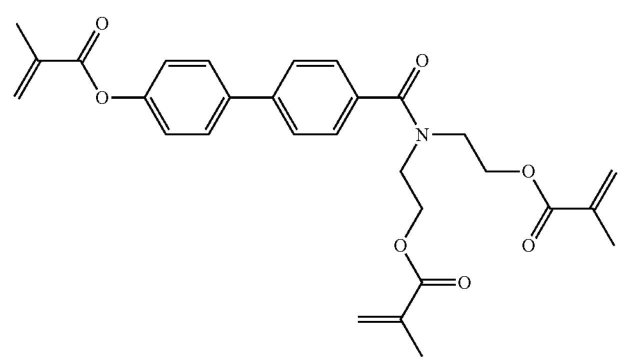 [SMILES: C=C(C)C(=O)OCCN(CCOC(=O)C(=C)C)C(=O)c1ccc(-c2ccc(OC(=O)C(=C)C)cc2)cc1]
RM-115

TABLE D-continued
| Table D shows illustrative reactive mesogenic compounds which can be used in the LC media in accordance with the present invention. |
|---|
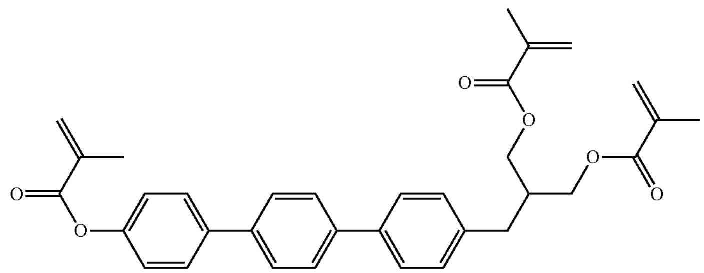 [SMILES: C=C(C)C(=O)OCC(COC(=O)C(=C)C)Cc1ccc(-c2ccc(-c3ccc(OC(=O)C(=C)C)cc3)cc2)cc1]
RM-116
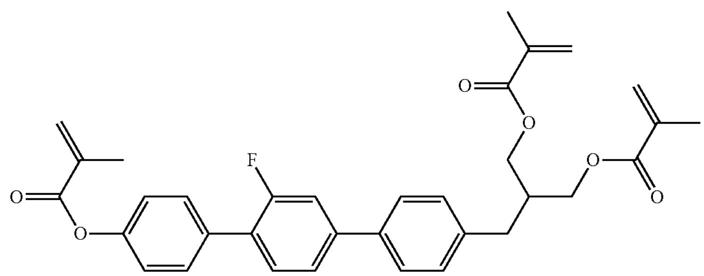 [SMILES: C=C(C)C(=O)OCC(COC(=O)C(=C)C)Cc1ccc(-c2ccc(-c3ccc(OC(=O)C(=C)C)cc3)c(F)c2)cc1]
RM-117
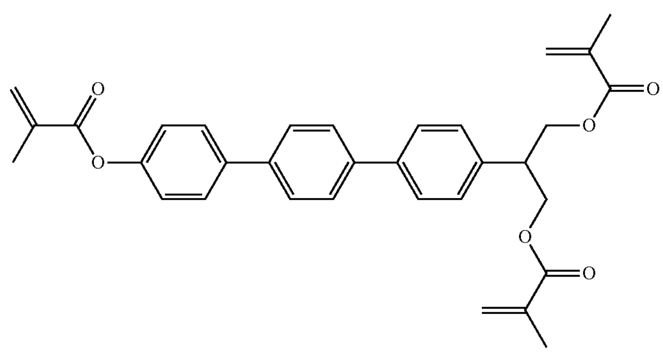 [SMILES: C=C(C)C(=O)OCC(COC(=O)C(=C)C)c1ccc(-c2ccc(-c3ccc(OC(=O)C(=C)C)cc3)cc2)cc1]
RM-118
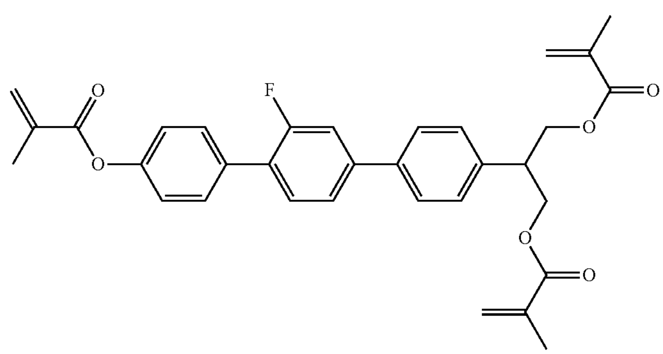 [SMILES: C=C(C)C(=O)OCC(COC(=O)C(=C)C)c1ccc(-c2ccc(-c3ccc(OC(=O)C(=C)C)cc3)c(F)c2)cc1]
RM-119

TABLE D-continued
Table D shows illustrative reactive mesogenic compounds which can be used in the LC media in accordance with the present invention.
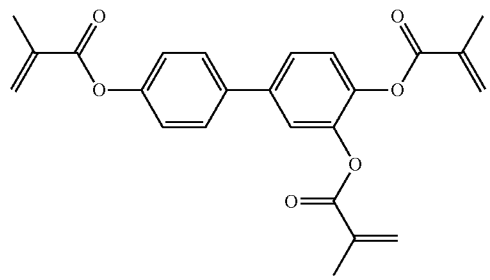 [SMILES: C=C(C)C(=O)Oc1ccc(-c2ccc(OC(=O)C(=C)C)c(OC(=O)C(=C)C)c2)cc1]
RM-120
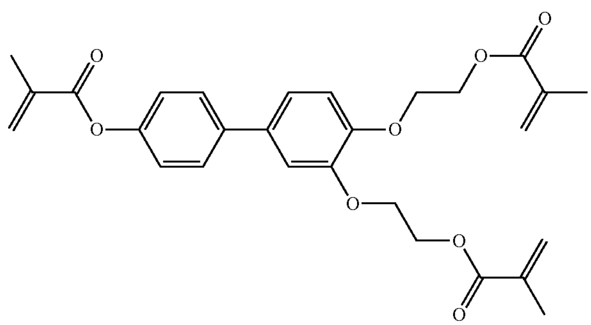 [SMILES: C=C(C)C(=O)OCCOc1ccc(-c2ccc(OC(=O)C(=C)C)cc2)cc1OCCOC(=O)C(=C)C]
RM-121
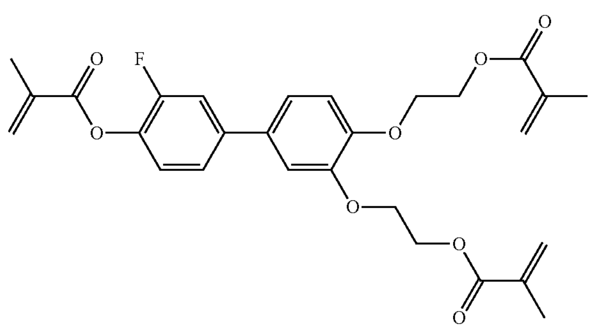 [SMILES: C=C(C)C(=O)OCCOc1ccc(-c2ccc(OC(=O)C(=C)C)c(F)c2)cc1OCCOC(=O)C(=C)C]
RM-122
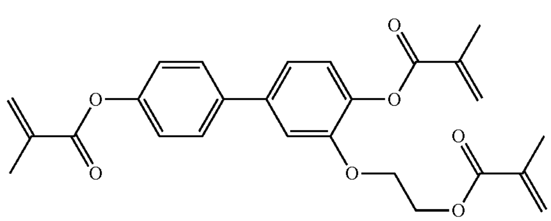 [SMILES: C=C(C)C(=O)OCCOc1cc(-c2ccc(OC(=O)C(=C)C)cc2)ccc1OC(=O)C(=C)C]
RM-123
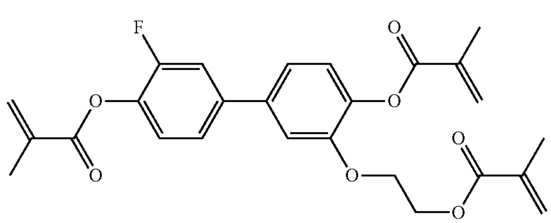 [SMILES: C=C(C)C(=O)OCCOc1cc(-c2ccc(OC(=O)C(=C)C)c(F)c2)ccc1OC(=O)C(=C)C]
RM-124

TABLE D-continued
| Table D shows illustrative reactive mesogenic compounds which can be used in the LC media in accordance with the present invention. |
| --- |
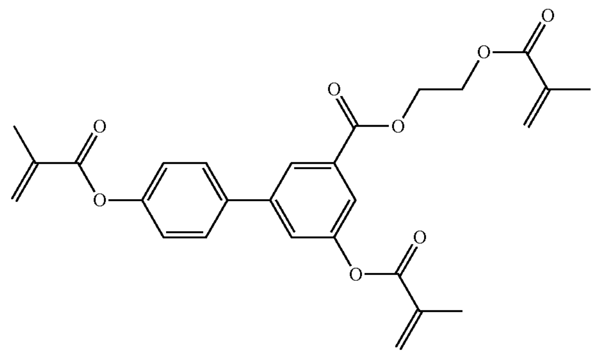 [SMILES: C=C(C)C(=O)OCCOC(=O)c1cc(OC(=O)C(=C)C)cc(-c2ccc(OC(=O)C(=C)C)cc2)c1]
RM-125
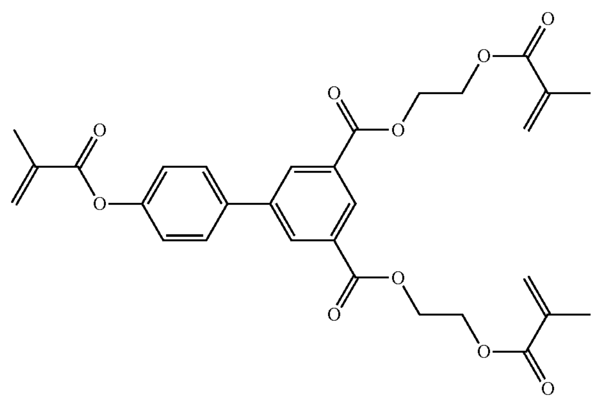 [SMILES: C=C(C)C(=O)OCCOC(=O)c1cc(C(=O)OCCOC(=O)C(=C)C)cc(-c2ccc(OC(=O)C(=C)C)cc2)c1]
RM-126
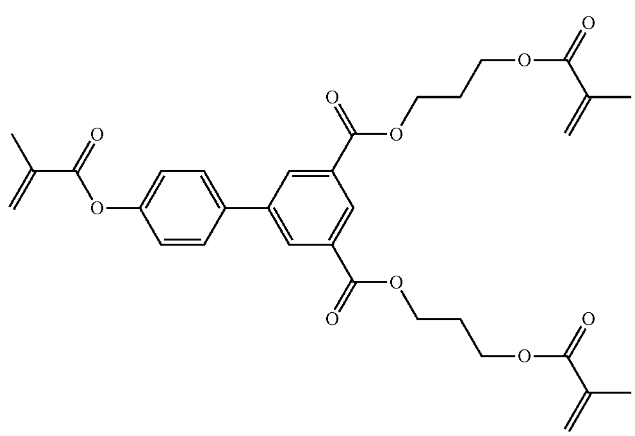 [SMILES: C=C(C)C(=O)OCCCOC(=O)c1cc(C(=O)OCCCOC(=O)C(=C)C)cc(-c2ccc(OC(=O)C(=C)C)cc2)c1]
RM-127

TABLE D-continued
| Table D shows illustrative reactive mesogenic compounds which can be used in the LC media in accordance with the present invention. |
|---|
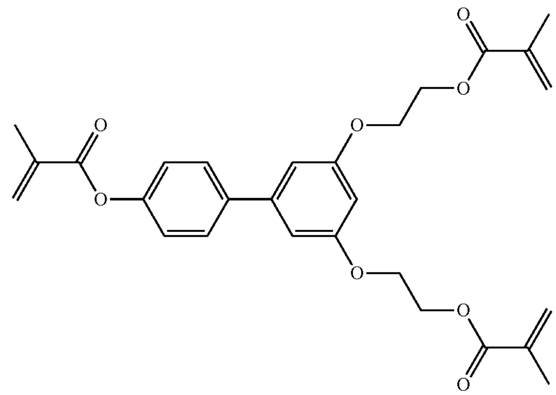 [SMILES: C=C(C)C(=O)OCCOc1cc(OCCOC(=O)C(=C)C)cc(-c2ccc(OC(=O)C(=C)C)cc2)c1]
RM-128
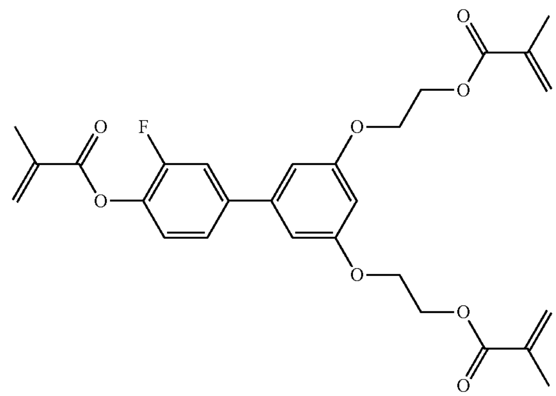 [SMILES: C=C(C)C(=O)OCCOc1cc(OCCOC(=O)C(=C)C)cc(-c2ccc(OC(=O)C(=C)C)c(F)c2)c1]
RM-129
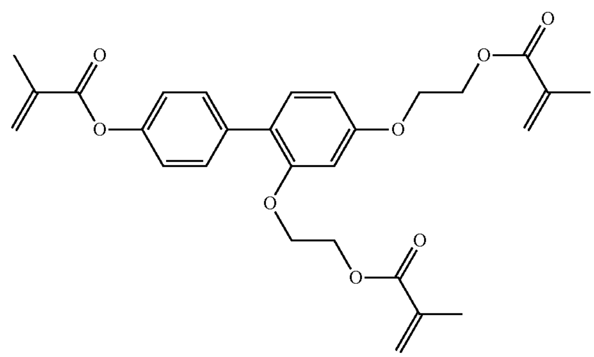 [SMILES: C=C(C)C(=O)OCCOc1ccc(-c2ccc(OC(=O)C(=C)C)cc2)c(OCCOC(=O)C(=C)C)c1]
RM-130
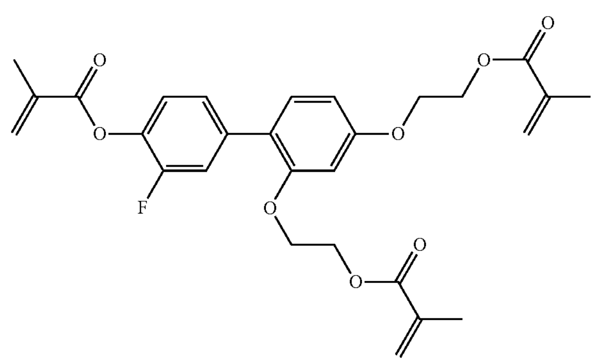 [SMILES: C=C(C)C(=O)OCCOc1ccc(-c2ccc(OC(=O)C(=C)C)c(F)c2)c(OCCOC(=O)C(=C)C)c1]
RM-131

TABLE D-continued
Table D shows illustrative reactive mesogenic compounds which can be used in the LC media in accordance with the present invention.
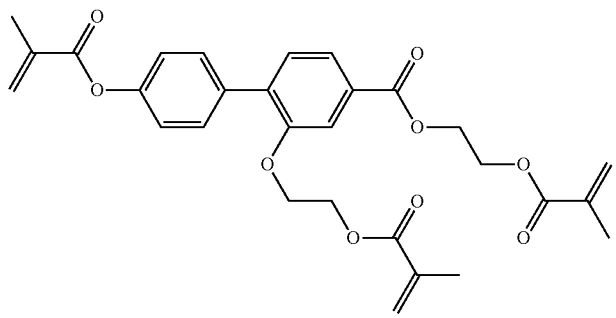 [SMILES: C=C(C)C(=O)OCCOC(=O)c1ccc(-c2ccc(OC(=O)C(=C)C)cc2)c(OCCOC(=O)C(=C)C)c1]
RM-132
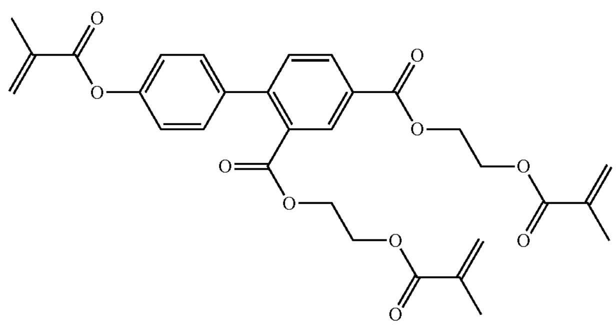 [SMILES: C=C(C)C(=O)OCCOC(=O)c1ccc(-c2ccc(OC(=O)C(=C)C)cc2)c(C(=O)OCCOC(=O)C(=C)C)c1]
RM-133
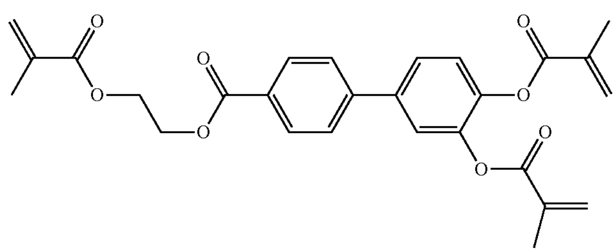 [SMILES: C=C(C)C(=O)OCCOC(=O)c1ccc(-c2ccc(OC(=O)C(=C)C)c(OC(=O)C(=C)C)c2)cc1]
RM-134
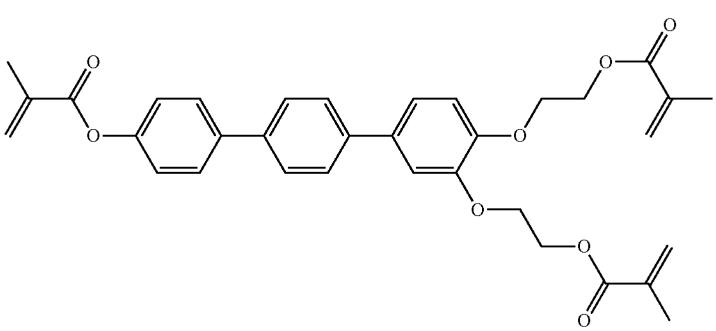 [SMILES: C=C(C)C(=O)OCCOc1ccc(-c2ccc(-c3ccc(OC(=O)C(=C)C)cc3)cc2)cc1OCCOC(=O)C(=C)C]
RM-135

TABLE D-continued
| Table D shows illustrative reactive mesogenic compounds which can be used in the LC media in accordance with the present invention. |
| --- |
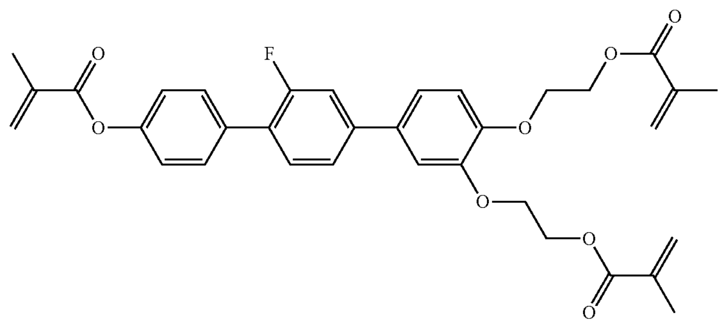 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136
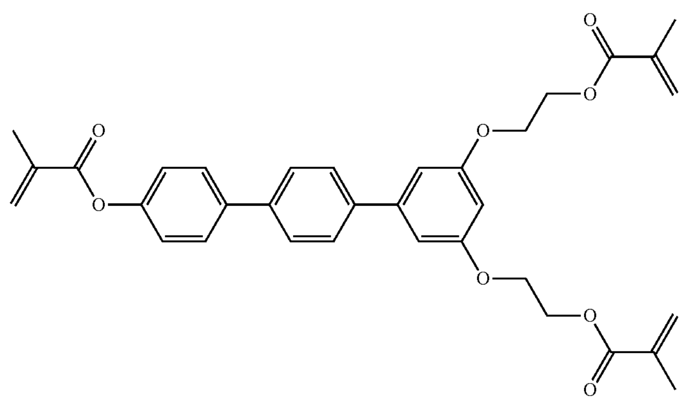 [SMILES: C=C(C)C(=O)OCCOc1cc(OCCOC(=O)C(=C)C)cc(-c2ccc(-c3ccc(OC(=O)C(=C)C)cc3)cc2)c1]
RM-137
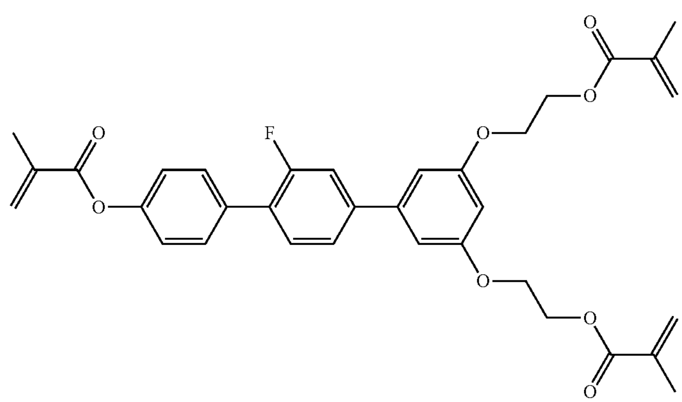 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-138
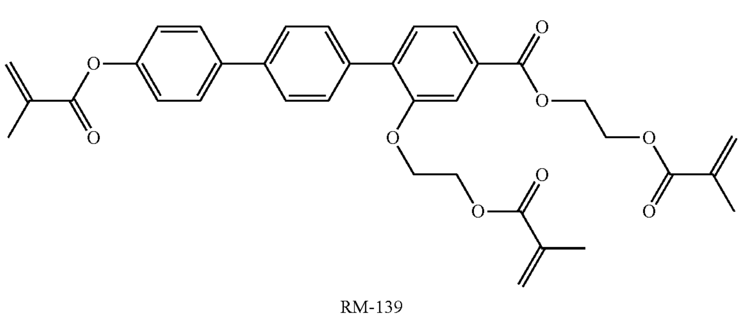
RM-139

TABLE D-continued
| Table D shows illustrative reactive mesogenic compounds which can be used in the LC media in accordance with the present invention. |
| --- |
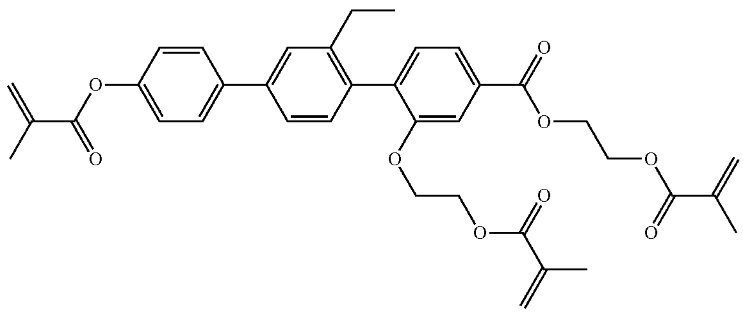 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140
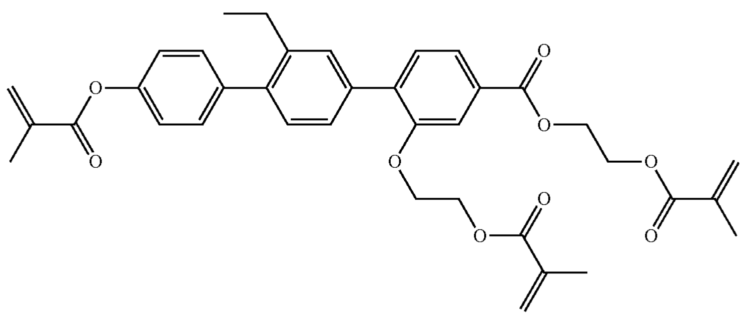 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-141
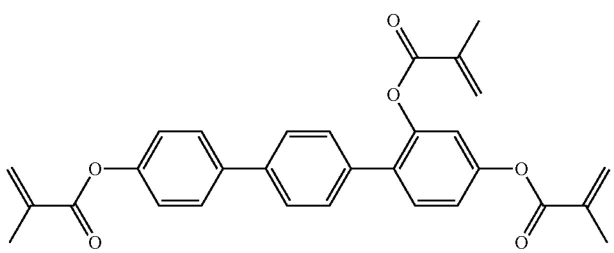 [SMILES: C=C(C)C(=O)Oc1ccc(-c2ccc(-c3ccc(OC(=O)C(=C)C)cc3OC(=O)C(=C)C)cc2)cc1]
RM-142
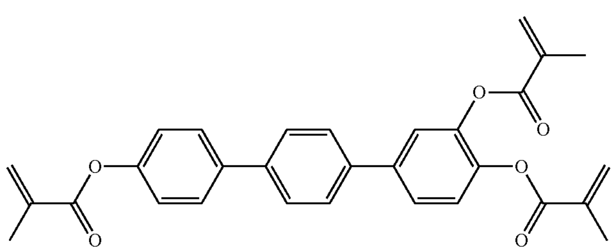 [SMILES: C=C(C)C(=O)Oc1ccc(-c2ccc(-c3ccc(OC(=O)C(=C)C)c(OC(=O)C(=C)C)c3)cc2)cc1]
RM-143
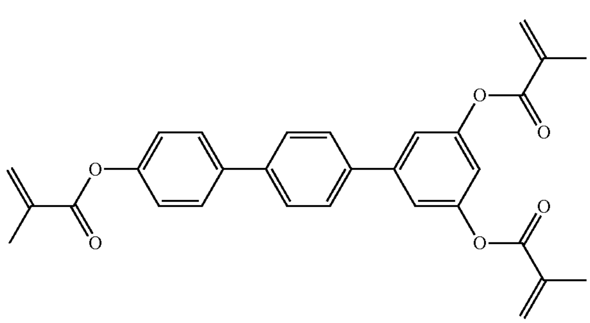 [SMILES: C=C(C)C(=O)Oc1ccc(-c2ccc(-c3cc(OC(=O)C(=C)C)cc(OC(=O)C(=C)C)c3)cc2)cc1]
RM-144

TABLE D-continued
Table D shows illustrative reactive mesogenic compounds which can be used in the LC media in accordance with the present invention.
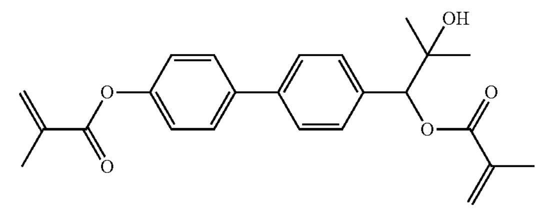 [SMILES: C=C(C)C(=O)Oc1ccc(-c2ccc(C(OC(=O)C(=C)C)C(C)(C)O)cc2)cc1]
RM-145
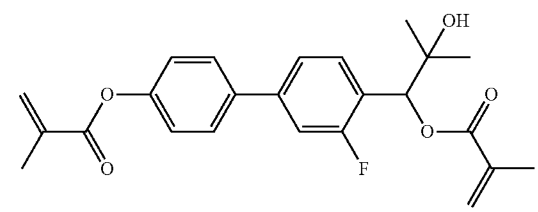 [SMILES: C=C(C)C(=O)Oc1ccc(-c2ccc(C(OC(=O)C(=C)C)C(C)(C)O)c(F)c2)cc1]
RM-146
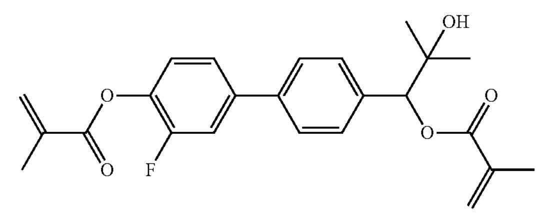 [SMILES: C=C(C)C(=O)Oc1ccc(-c2ccc(C(OC(=O)C(=C)C)C(C)(C)O)cc2)cc1F]
RM-147
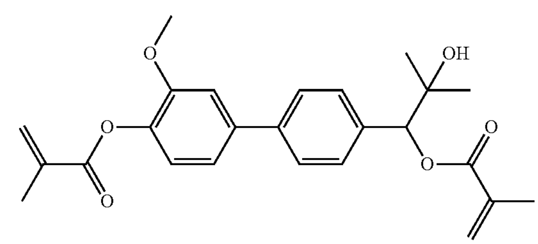 [SMILES: C=C(C)C(=O)Oc1ccc(-c2ccc(C(OC(=O)C(=C)C)C(C)(C)O)cc2)cc1OC]
RM-148
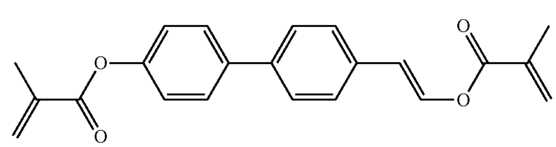 [SMILES: C=C(C)C(=O)O/C=C/c1ccc(-c2ccc(OC(=O)C(=C)C)cc2)cc1]
RM-149
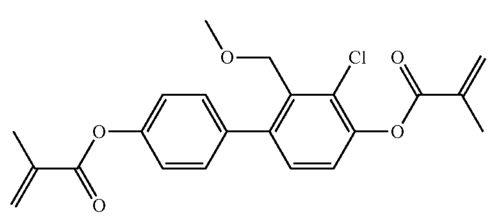 [SMILES: C=C(C)C(=O)Oc1ccc(-c2ccc(OC(=O)C(=C)C)c(Cl)c2COC)cc1]
RM-150

TABLE D-continued
Table D shows illustrative reactive mesogenic compounds which can be used in the LC media in accordance with the present invention.
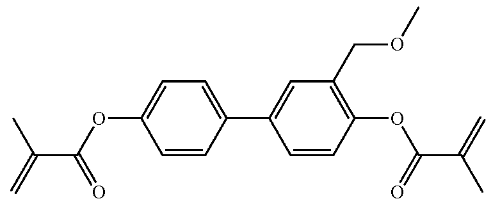 [SMILES: C=C(C)C(=O)Oc1ccc(-c2ccc(OC(=O)C(=C)C)c(COC)c2)cc1]
RM-151
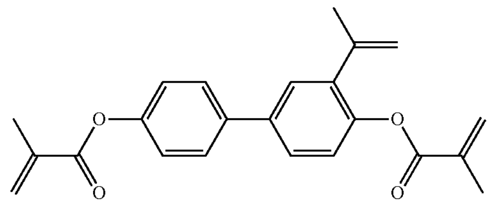 [SMILES: C=C(C)C(=O)Oc1ccc(-c2ccc(OC(=O)C(=C)C)c(C(=C)C)c2)cc1]
RM-152
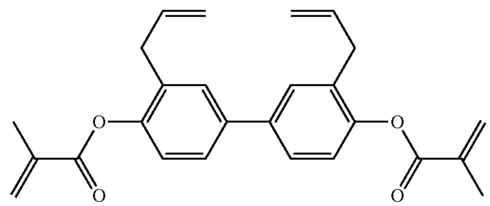 [SMILES: C=CCc1cc(-c2ccc(OC(=O)C(=C)C)c(CC=C)c2)ccc1OC(=O)C(=C)C]
RM-153
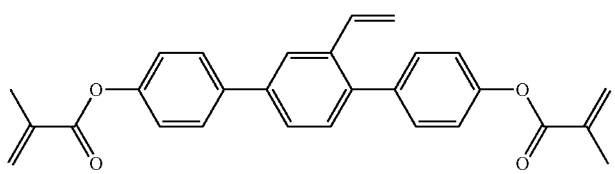 [SMILES: C=Cc1cc(-c2ccc(OC(=O)C(=C)C)cc2)ccc1-c1ccc(OC(=O)C(=C)C)cc1]
RM-154
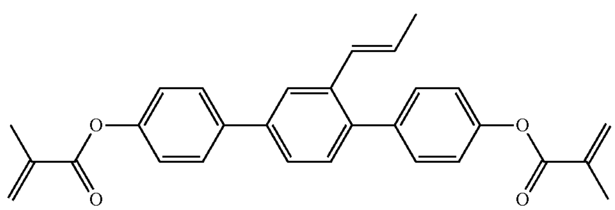 [SMILES: C=C(C)C(=O)Oc1ccc(-c2ccc(-c3ccc(OC(=O)C(=C)C)cc3)c(/C=C/C)c2)cc1]
RM-155
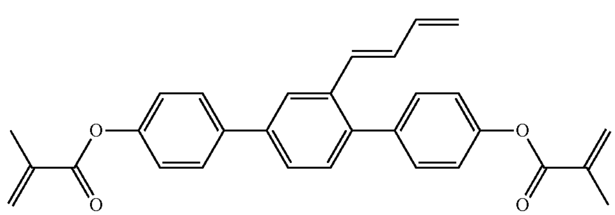 [SMILES: C=C/C=C/c1cc(-c2ccc(OC(=O)C(=C)C)cc2)ccc1-c1ccc(OC(=O)C(=C)C)cc1]
RM-156
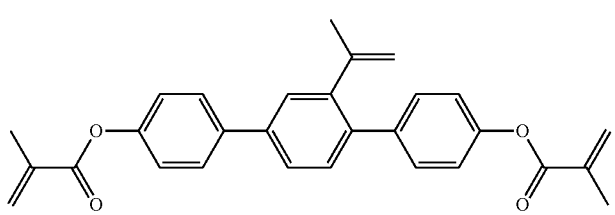 [SMILES: C=C(C)C(=O)Oc1ccc(-c2ccc(-c3ccc(OC(=O)C(=C)C)cc3)c(C(=C)C)c2)cc1]
RM-157

TABLE D-continued
| Table D shows illustrative reactive mesogenic compounds which can be used in the LC media in accordance with the present invention. |
| --- |
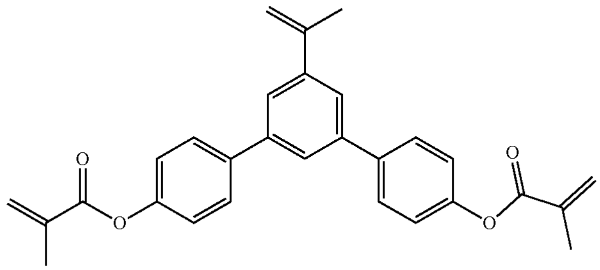 [SMILES: C=C(C)C(=O)Oc1ccc(-c2cc(C(=C)C)cc(-c3ccc(OC(=O)C(=C)C)cc3)c2)cc1]
RM-158
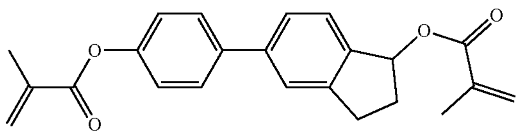 [SMILES: C=C(C)C(=O)Oc1ccc(-c2ccc3c(c2)CCC3OC(=O)C(=C)C)cc1]
RM-159
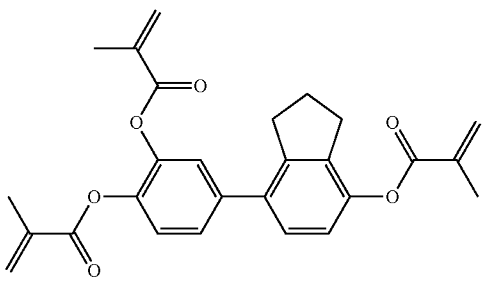 [SMILES: C=C(C)C(=O)Oc1ccc(-c2ccc(OC(=O)C(=C)C)c3c2CCC3)cc1OC(=O)C(=C)C]
RM-160
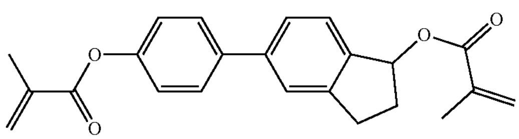 [SMILES: C=C(C)C(=O)Oc1ccc(-c2ccc3c(c2)CCC3OC(=O)C(=C)C)cc1]
RM-161
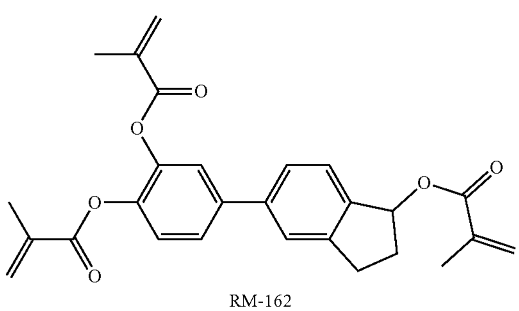
RM-162
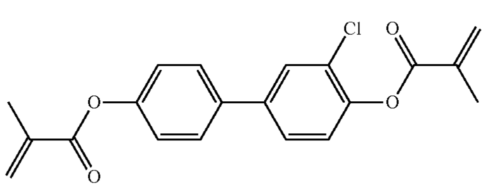 [SMILES: C=C(C)C(=O)Oc1ccc(-c2ccc(OC(=O)C(=C)C)c(Cl)c2)cc1]
RM-163

TABLE D-continued
Table D shows illustrative reactive mesogenic compounds which can be used in the LC media in accordance with the present invention.
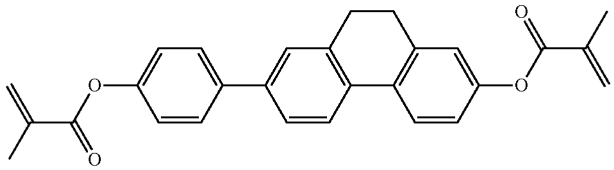 [SMILES: C=C(C)C(=O)Oc1ccc(-c2ccc3c(c2)CCc2cc(OC(=O)C(=C)C)ccc2-3)cc1]
RM-164
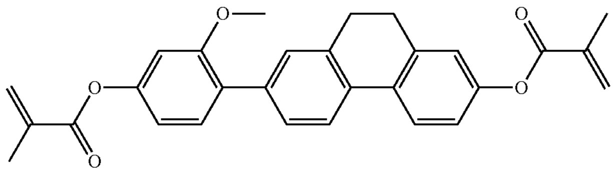 [SMILES: C=C(C)C(=O)Oc1ccc2c(c1)CCc1cc(-c3ccc(OC(=O)C(=C)C)cc3OC)ccc1-2]
RM-165
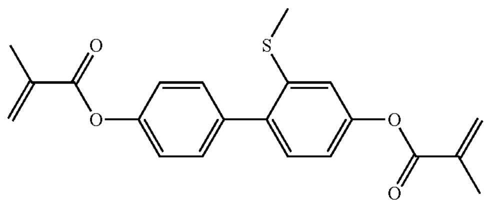 [SMILES: C=C(C)C(=O)Oc1ccc(-c2ccc(OC(=O)C(=C)C)cc2SC)cc1]
RM-166
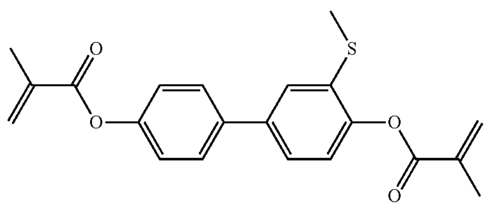 [SMILES: C=C(C)C(=O)Oc1ccc(-c2ccc(OC(=O)C(=C)C)c(SC)c2)cc1]
RM-167
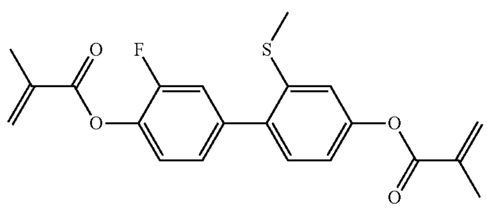 [SMILES: C=C(C)C(=O)Oc1ccc(-c2ccc(OC(=O)C(=C)C)c(F)c2)c(SC)c1]
RM-168
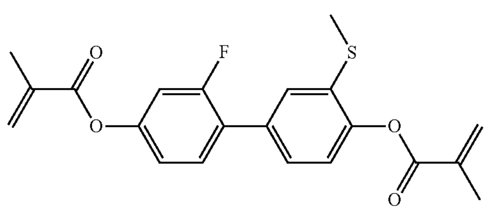 [SMILES: C=C(C)C(=O)Oc1ccc(-c2ccc(OC(=O)C(=C)C)c(SC)c2)c(F)c1]
RM-169
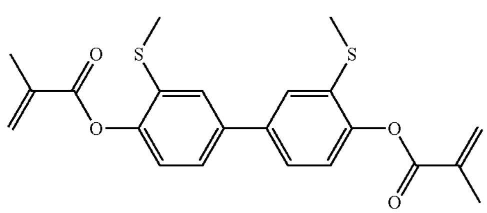 [SMILES: C=C(C)C(=O)Oc1ccc(-c2ccc(OC(=O)C(=C)C)c(SC)c2)cc1SC]
RM-170

TABLE D-continued
| Table D shows illustrative reactive mesogenic compounds which can be used in the LC media in accordance with the present invention. |
|---|
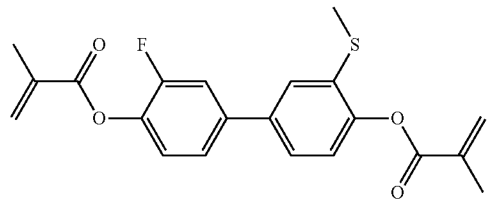 [SMILES: C=C(C)C(=O)Oc1ccc(-c2ccc(OC(=O)C(=C)C)c(SC)c2)cc1F]
RM-171
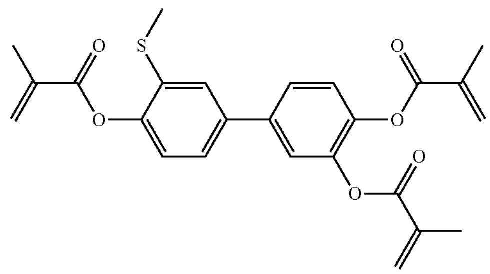 [SMILES: C=C(C)C(=O)Oc1ccc(-c2ccc(OC(=O)C(=C)C)c(SC)c2)cc1OC(=O)C(=C)C]
RM-172
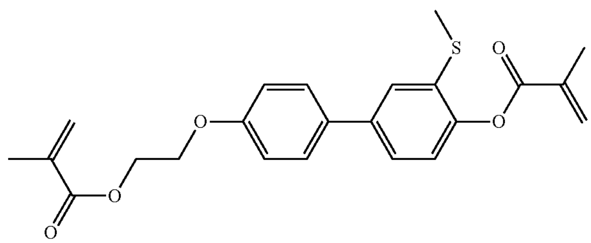 [SMILES: C=C(C)C(=O)OCCCc1ccc(-c2ccc(OC(=O)C(=C)C)c(SC)c2)cc1]
RM-173
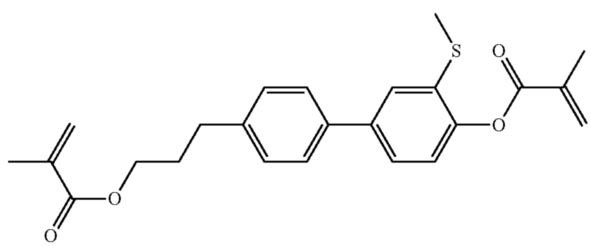
RM-174
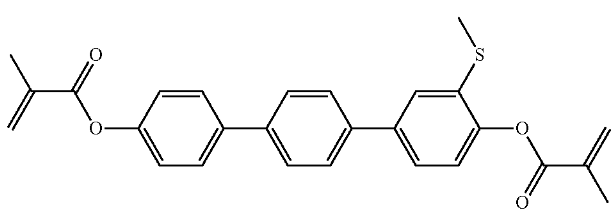 [SMILES: C=C(C)C(=O)Oc1ccc(-c2ccc(-c3ccc(OC(=O)C(=C)C)c(SC)c3)cc2)cc1]
RM-175
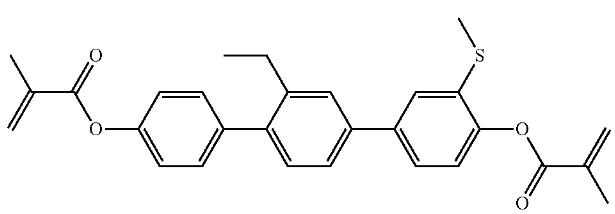 [SMILES: C=C(C)C(=O)Oc1ccc(-c2ccc(-c3ccc(OC(=O)C(=C)C)c(SC)c3)cc2CC)cc1]
RM-176

TABLE D-continued

| Table D shows illustrative reactive mesogenic compounds which can be used in the LC media in accordance with the present invention. |
| --- |

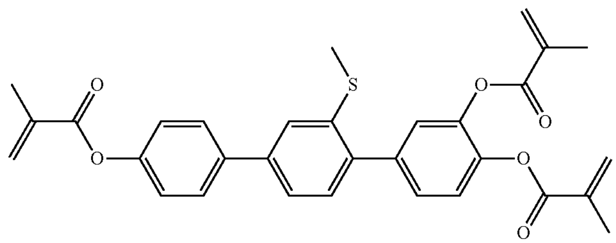 [SMILES: C=C(C)C(=O)Oc1ccc(-c2ccc(-c3ccc(OC(=O)C(=C)C)c(OC(=O)C(=C)C)c3)c(SC)c2)cc1]

RM-177

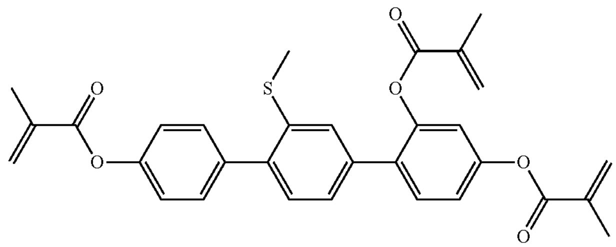 [SMILES: C=C(C)C(=O)Oc1ccc(-c2ccc(-c3ccc(OC(=O)C(=C)C)cc3OC(=O)C(=C)C)cc2SC)cc1]

RM-178

In a preferred embodiment, the mixtures according to the invention comprise one or more polymerizable compounds, preferably selected from the polymerizable compounds of the formulae RM-1 to RM-178. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122, R-139, RM-142, RM-143, RM-148 to RM-158, RM-164, RM-165 and RM-166 to RM-178 are particularly preferred.

TABLE E

| Table E shows self-alignment additives for vertical alignment which can be used in LC media for SA-VA and SA-FFS displays according to the present invention together with the polymerizable compounds of formulae RM-1 to RM-178: |
| --- |

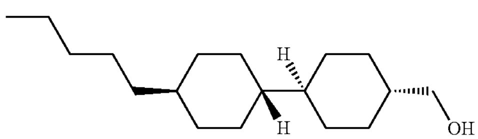

SA-1

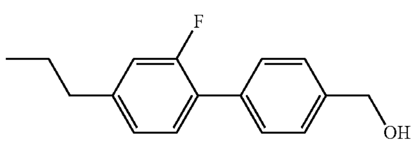 [SMILES: CCCc1ccc(-c2ccc(CO)cc2)c(F)c1]

SA-2

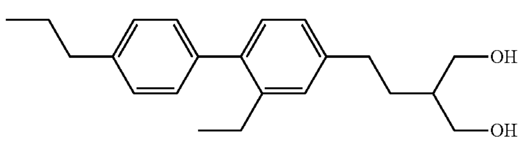 [SMILES: CCCc1ccc(-c2ccc(CCC(CO)CO)cc2CC)cc1]

SA-3

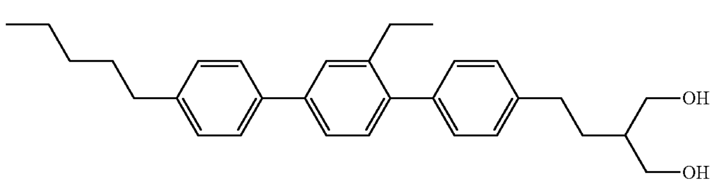 [SMILES: CCCCCc1ccc(-c2ccc(-c3ccc(CCC(CO)CO)cc3)c(CC)c2)cc1]

SA-4

TABLE E-continued
| Table E shows self-alignment additives for vertical alignment which can be used in LC media for SA-VA and SA-FFS displays according to the present invention together with the polymerizable compounds of formulae RM-1 to RM-178: |
| --- |
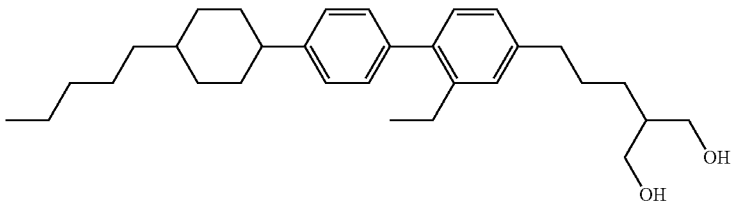 [SMILES: CCCCCC1CCC(c2ccc(-c3ccc(CCCC(CO)CO)cc3CC)cc2)CC1]
SA-5
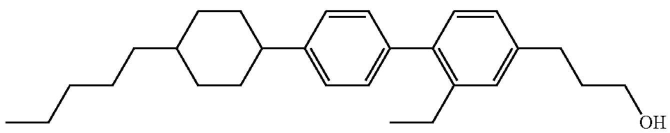 [SMILES: CCCCCC1CCC(c2ccc(-c3ccc(CCCO)cc3CC)cc2)CC1]
SA-6
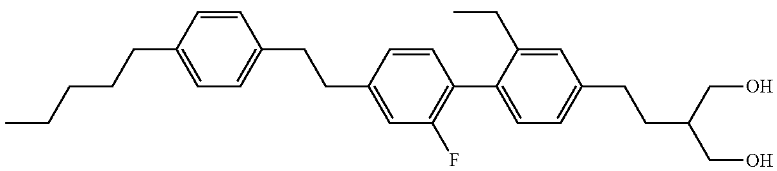 [SMILES: CCCCCc1ccc(CCc2ccc(-c3ccc(CCC(CO)CO)cc3CC)c(F)c2)cc1]
SA-7
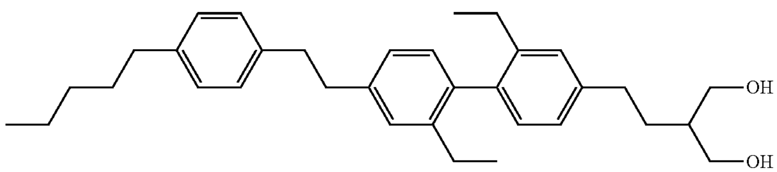 [SMILES: CCCCCc1ccc(CCc2ccc(-c3ccc(CCC(CO)CO)cc3CC)c(CC)c2)cc1]
SA-8
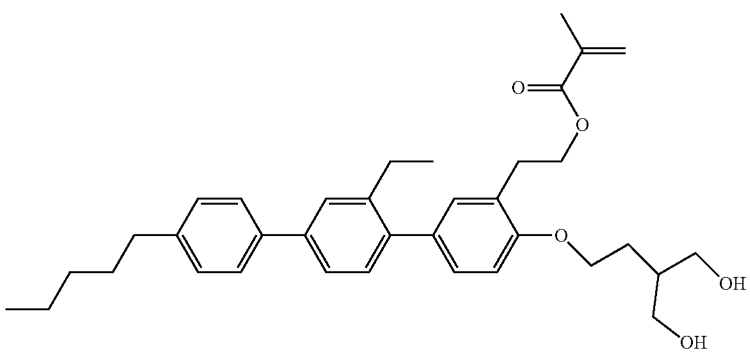 [SMILES: C=C(C)C(=O)OCCc1cc(-c2ccc(-c3ccc(CCCCC)cc3)cc2CC)ccc1OCCC(CO)CO]
SA-9
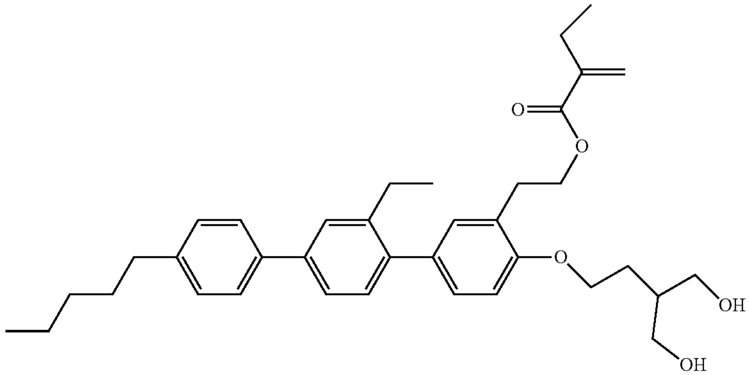 [SMILES: C=C(CC)C(=O)OCCc1cc(-c2ccc(-c3ccc(CCCCC)cc3)cc2CC)ccc1OCCC(CO)CO]
SA-10

TABLE E-continued
Table E shows self-alignment additives for vertical alignment which can be used in LC media for SA-VA and SA-FFS displays according to the present invention together with the polymerizable compounds of formulae RM-1 to RM-178:
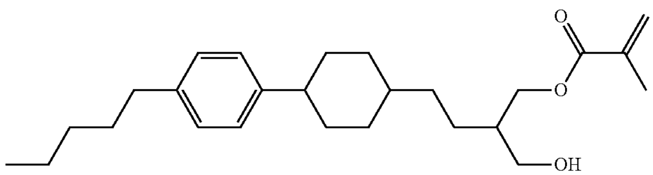 [SMILES: C=C(C)C(=O)OCC(CO)CCC1CCC(c2ccc(CCCCC)cc2)CC1]
SA-11
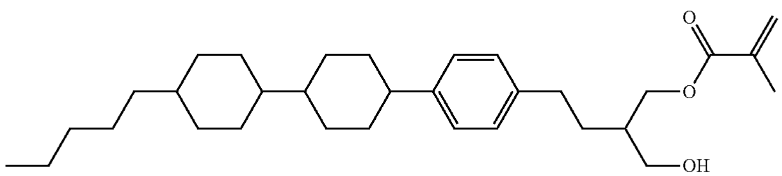 [SMILES: C=C(C)C(=O)OCC(CO)CCc1ccc(C2CCC(C3CCC(CCCCC)CC3)CC2)cc1]
SA-12
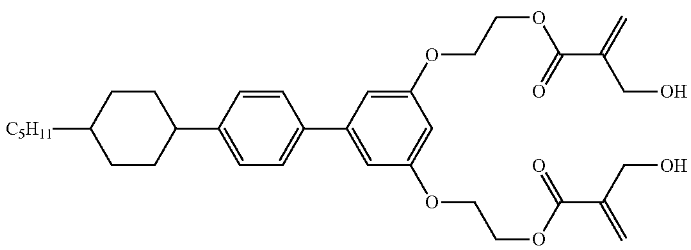
SA-13
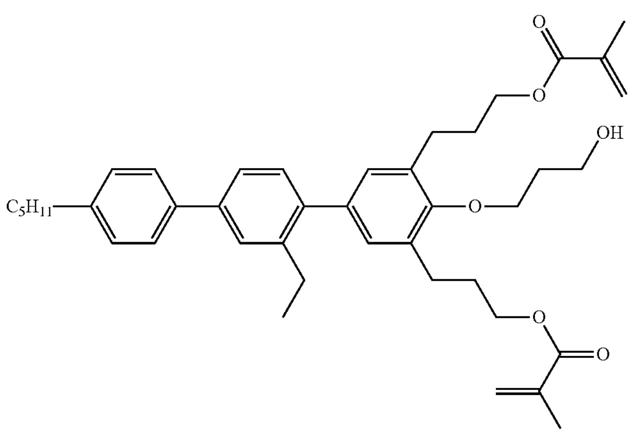
SA-14
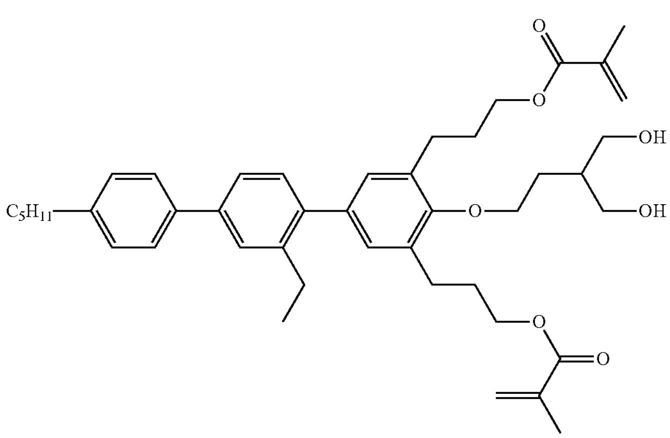
SA-15

TABLE E-continued
| Table E shows self-alignment additives for vertical alignment which can be used in LC media for SA-VA and SA-FFS displays according to the present invention together with the polymerizable compounds of formulae RM-1 to RM-178: |
| --- |
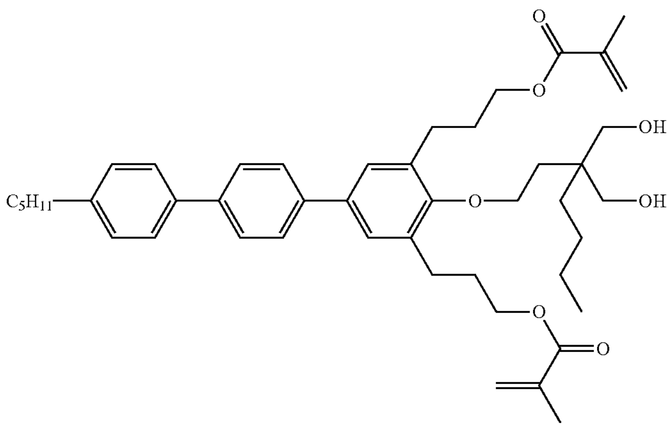
SA-16
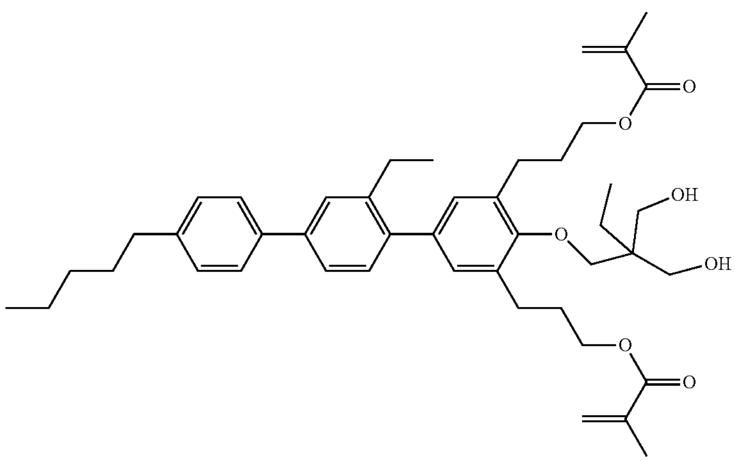 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-17
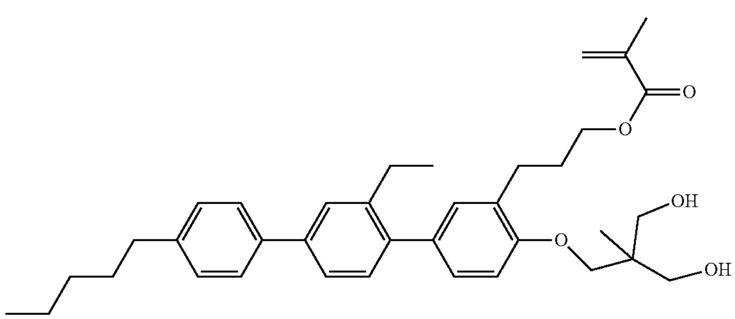 [SMILES: C=C(C)C(=O)OCCCc1cc(-c2ccc(-c3ccc(CCCCC)cc3)cc2CC)ccc1OCC(C)(CO)CO]
SA-18

TABLE E-continued
| Table E shows self-alignment additives for vertical alignment which can be used in LC media for SA-VA and SA-FFS displays according to the present invention together with the polymerizable compounds of formulae RM-1 to RM-178: |
|---|
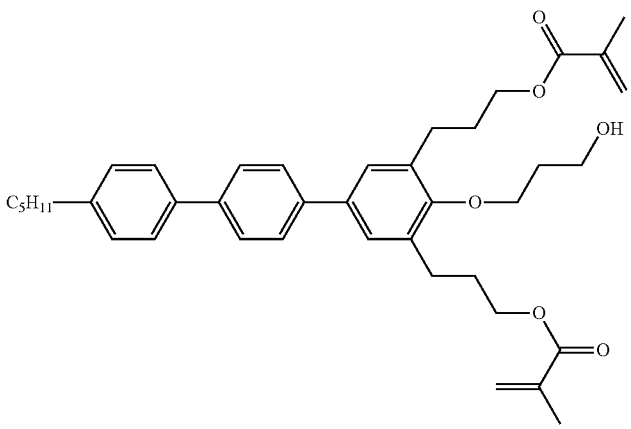
SA-19
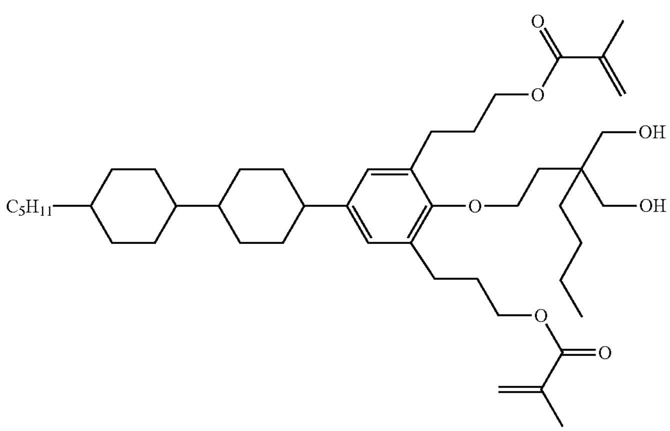
SA-20
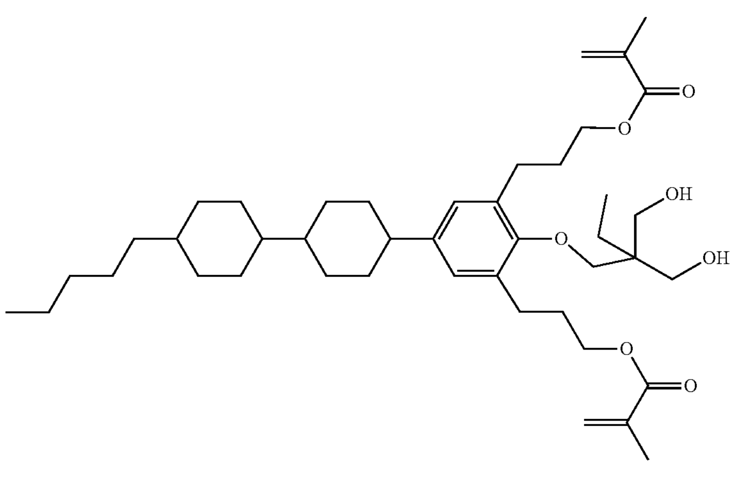 [SMILES: C=C(C)C(=O)OCCCc1cc(C2CCC(C3CCC(CCCCC)CC3)CC2)cc(CCCOC(=O)C(=C)C)c1OCC(CC)(CO)CO]
SA-21

TABLE E-continued
| Table E shows self-alignment additives for vertical alignment which can be used in LC media for SA-VA and SA-FFS displays according to the present invention together with the polymerizable compounds of formulae RM-1 to RM-178: |
|---|
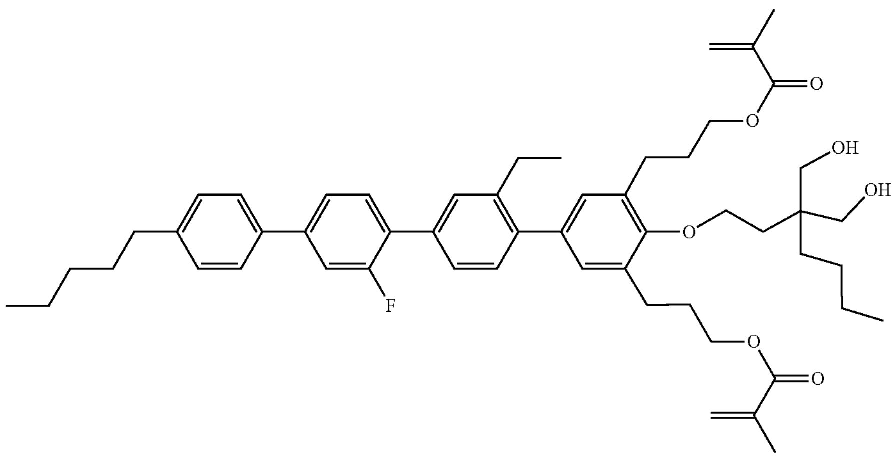 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-22
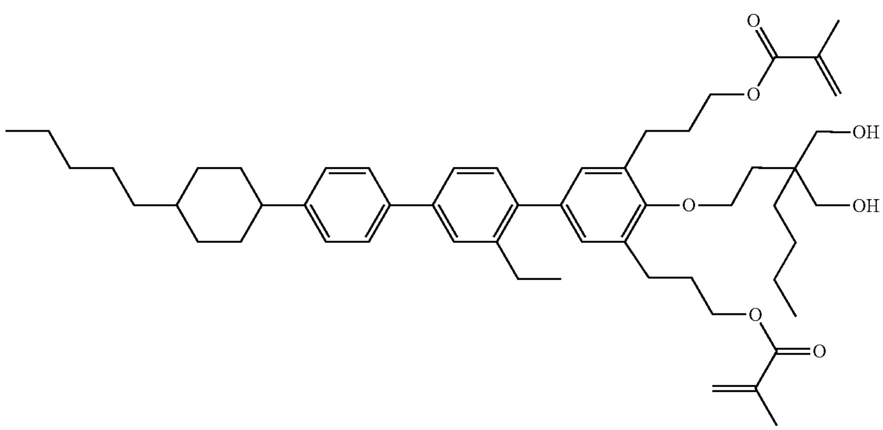 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-23
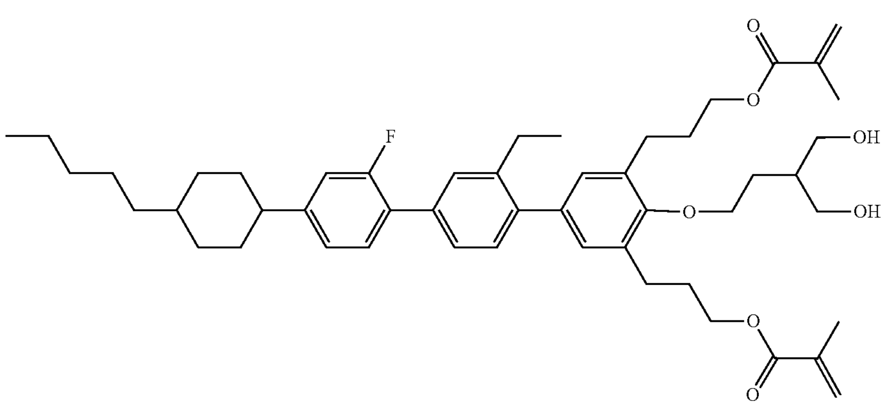 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-24

TABLE E-continued
Table E shows self-alignment additives for vertical alignment which can be used in LC media for SA-VA and SA-FFS displays according to the present invention together with the polymerizable compounds of formulae RM-1 to RM-178:
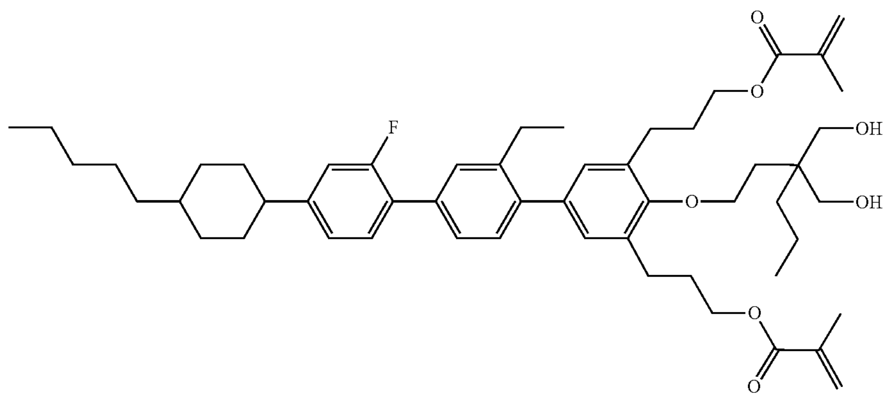 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-25
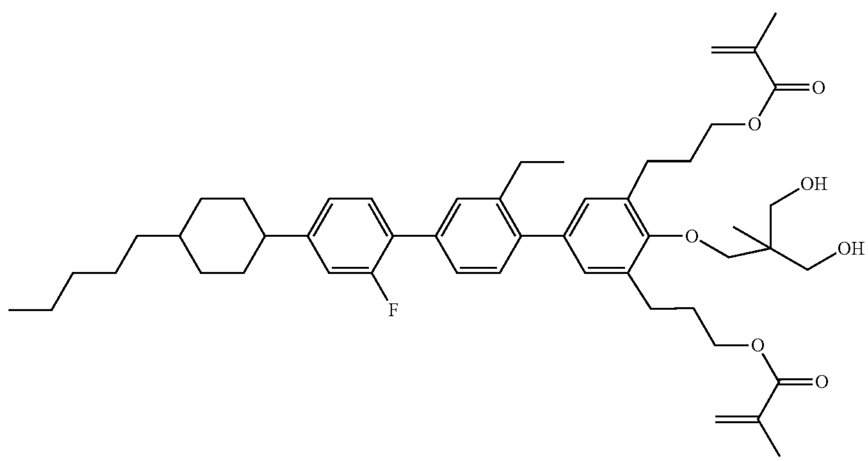 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]
SA-26
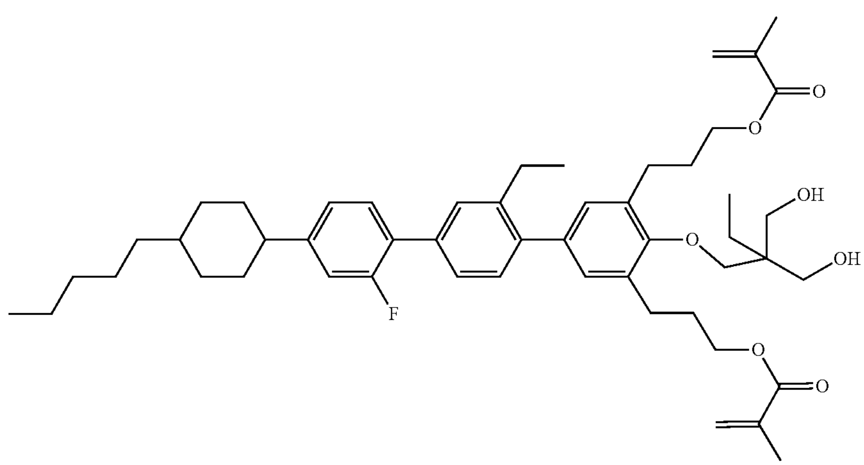 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-27

TABLE E-continued
| Table E shows self-alignment additives for vertical alignment which can be used in LC media for SA-VA and SA-FFS displays according to the present invention together with the polymerizable compounds of formulae RM-1 to RM-178: |
| --- |
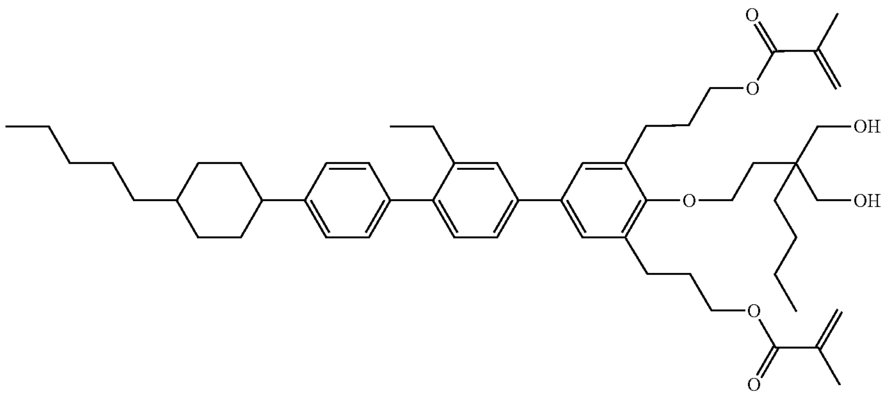 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-28
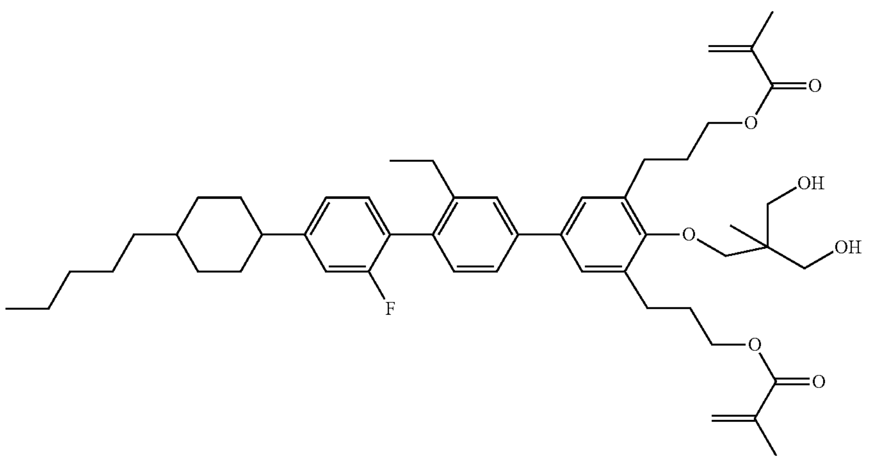 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]
SA-29
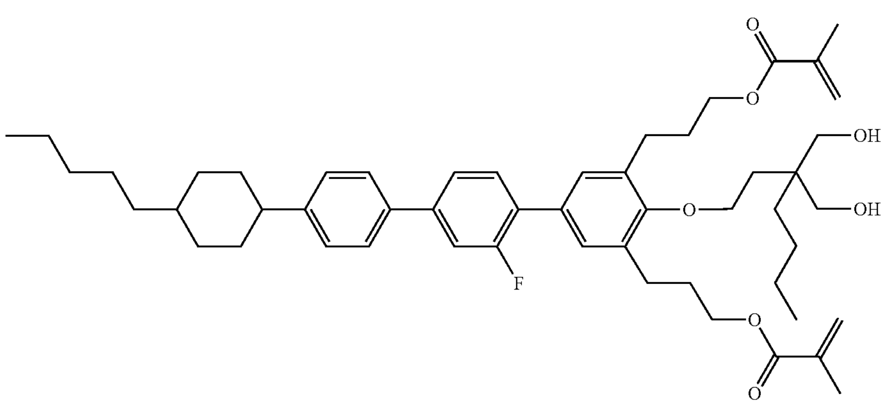 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-30

TABLE E-continued
Table E shows self-alignment additives for vertical alignment which can be used in LC media for SA-VA and SA-FFS displays according to the present invention together with the polymerizable compounds of formulae RM-1 to RM-178:
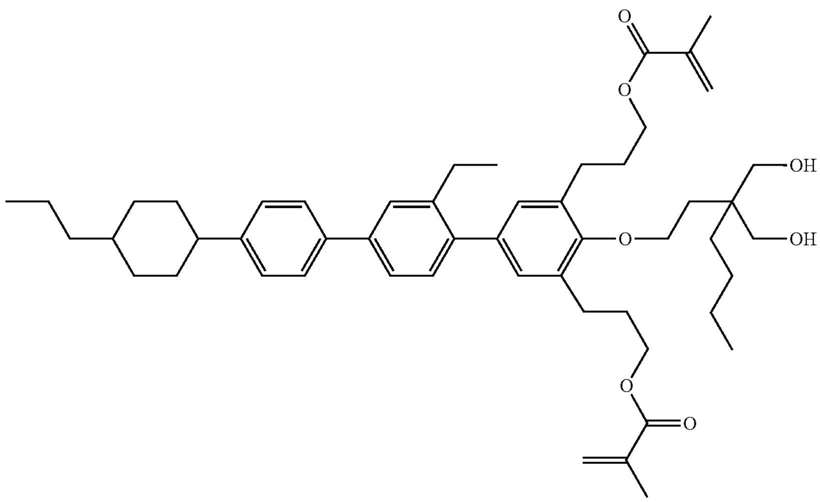 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-31
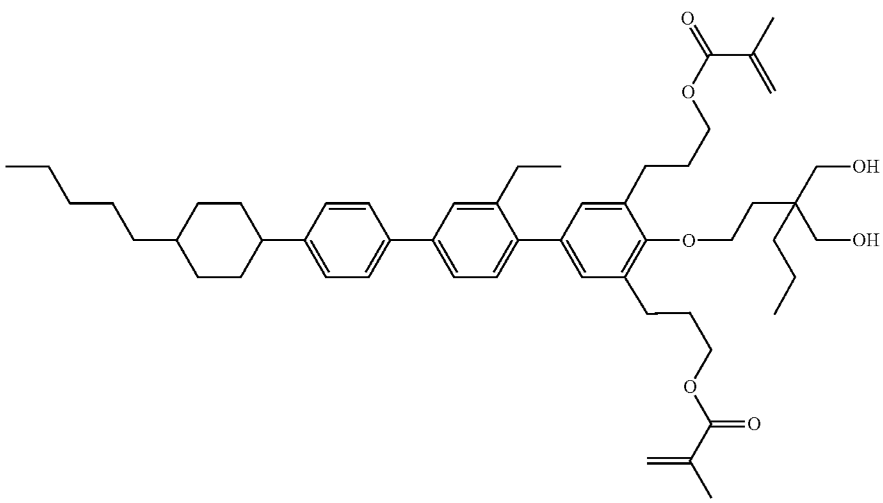 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]
SA-32
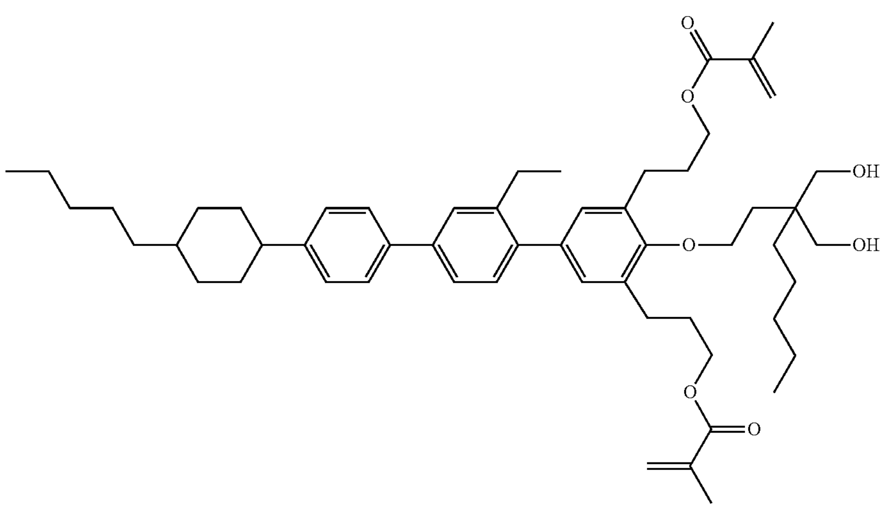 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-33

TABLE E-continued
| Table E shows self-alignment additives for vertical alignment which can be used in LC media for SA-VA and SA-FFS displays according to the present invention together with the polymerizable compounds of formulae RM-1 to RM-178: |
| --- |
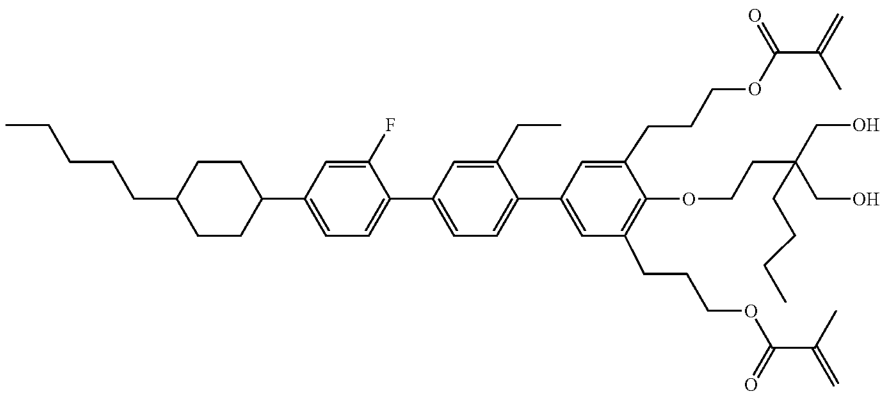 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
SA-34
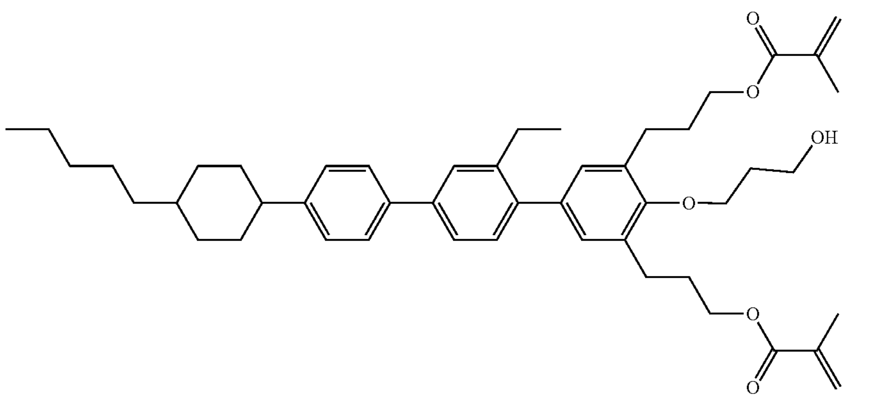 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-35
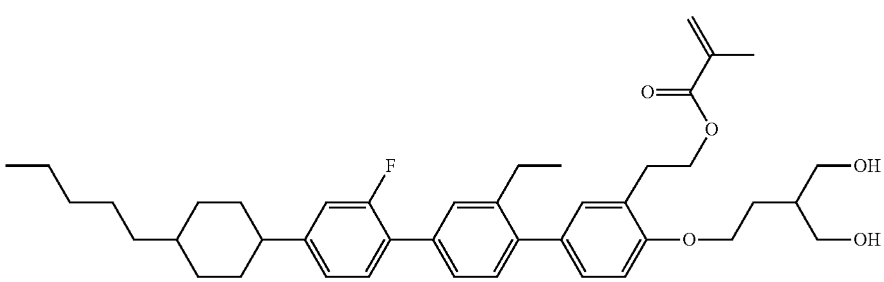 [SMILES: C=C(C)C(=O)OCCc1cc(-c2ccc(-c3ccc(C4CCC(CCCCC)CC4)cc3F)cc2CC)ccc1OCCC(CO)CO]
SA-36
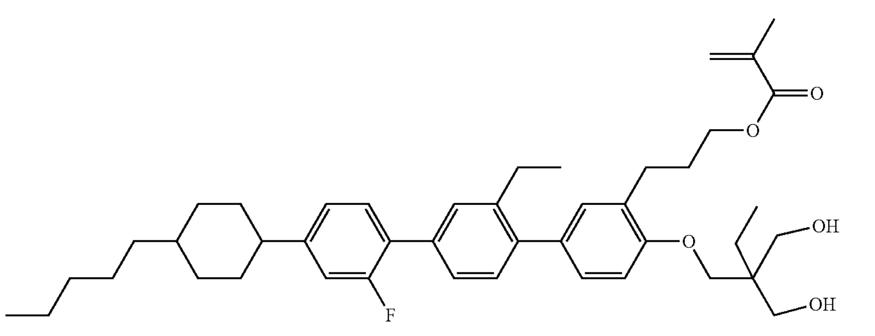
SA-37

TABLE E-continued
| Table E shows self-alignment additives for vertical alignment which can be used in LC media for SA-VA and SA-FFS displays according to the present invention together with the polymerizable compounds of formulae RM-1 to RM-178: |
|---|
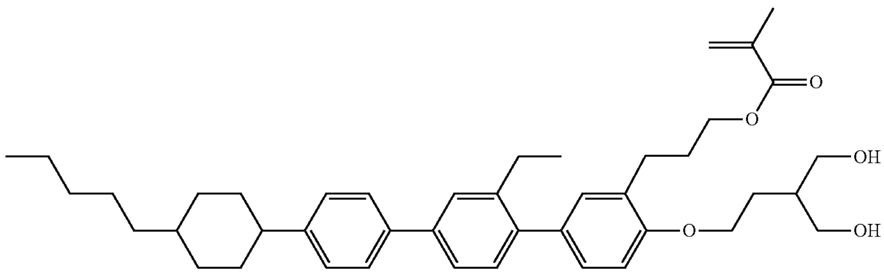
SA-38
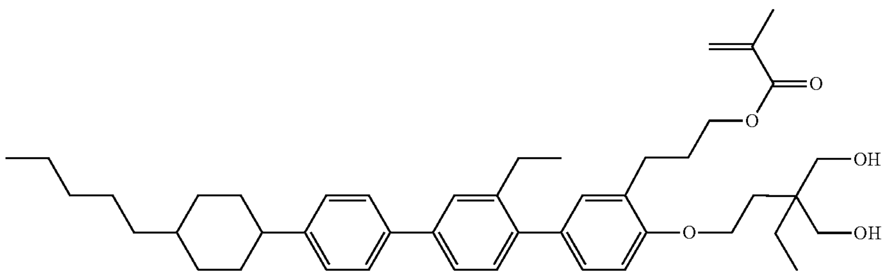 [SMILES: C=C(C)C(=O)OCCCc1cc(-c2ccc(-c3ccc(C4CCC(CCCCC)CC4)cc3)cc2CC)ccc1OCCC(CC)(CO)CO]
SA-39
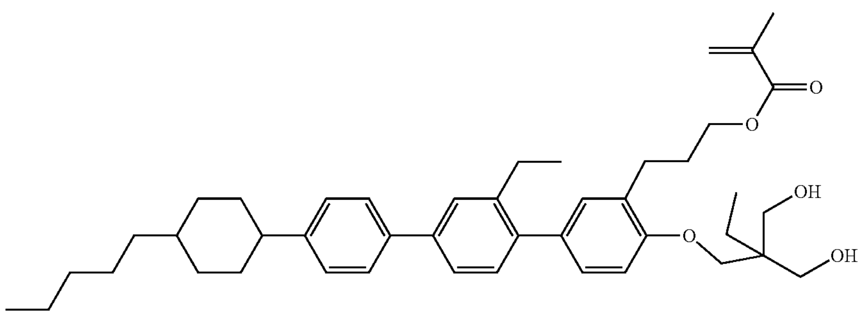 [SMILES: C=C(C)C(=O)OCCCc1cc(-c2ccc(-c3ccc(C4CCC(CCCCC)CC4)cc3)cc2CC)ccc1OCC(CC)(CO)CO]
SA-40
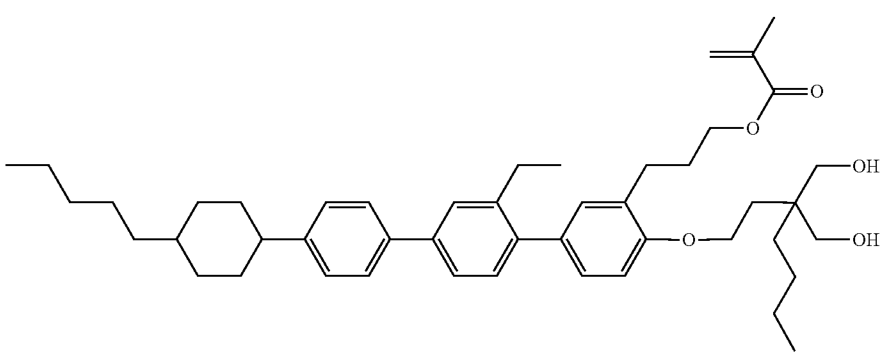 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-41

TABLE E-continued
| Table E shows self-alignment additives for vertical alignment which can be used in LC media for SA-VA and SA-FFS displays according to the present invention together with the polymerizable compounds of formulae RM-1 to RM-178: |
| --- |
SA-42
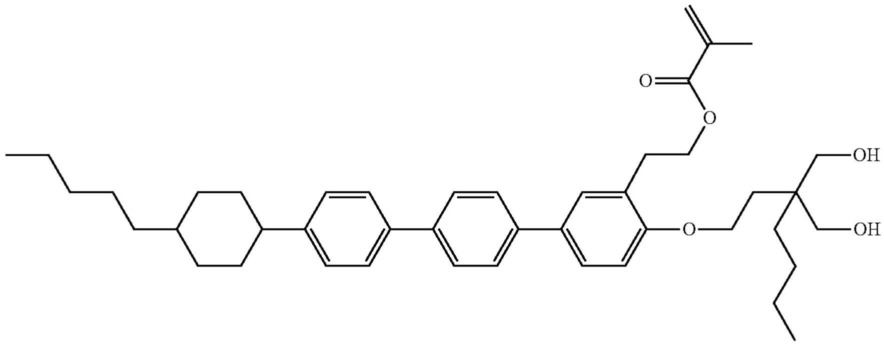
SA-43
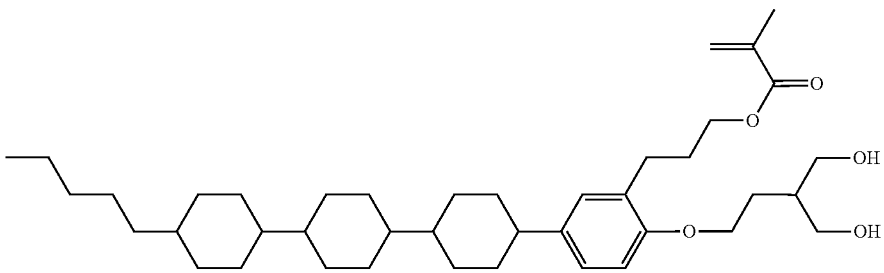 [SMILES: C=C(C)C(=O)OCCCc1cc(C2CCC(C3CCC(C4CCC(CCCCC)CC4)CC3)CC2)ccc1OCCC(CO)CO]
SA-44
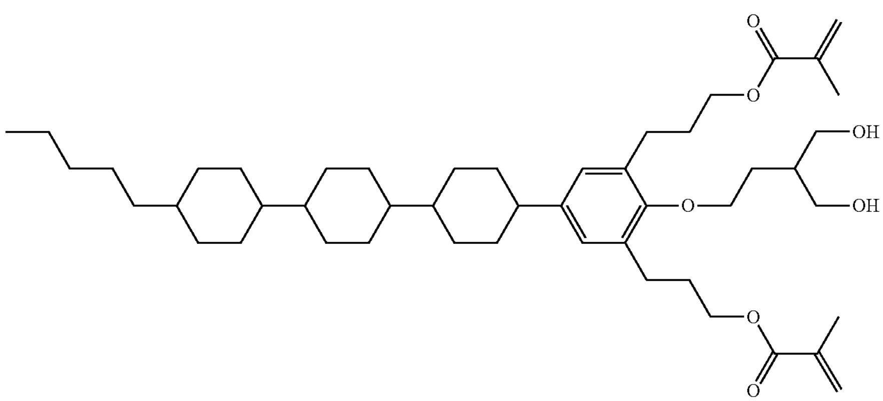 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO]
SA-45
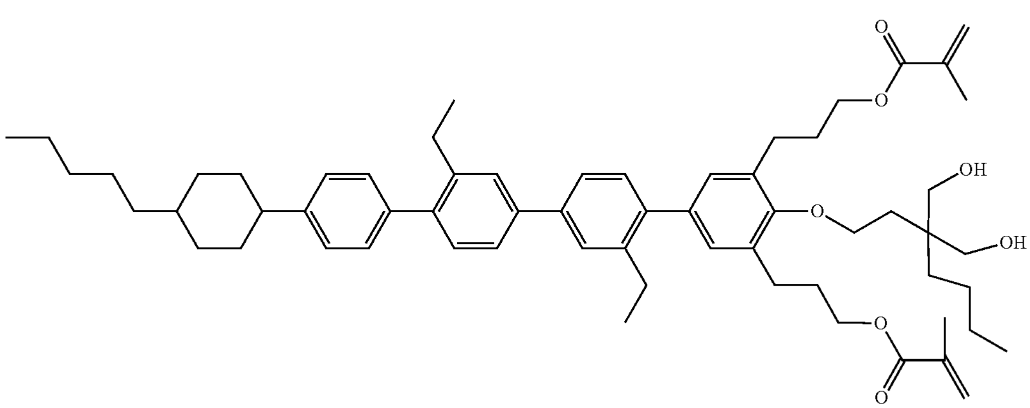 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]

TABLE E-continued

Table E shows self-alignment additives for vertical alignment which can be used in LC media for SA-VA and SA-FFS displays according to the present invention together with the polymerizable compounds of formulae RM-1 to RM-178:

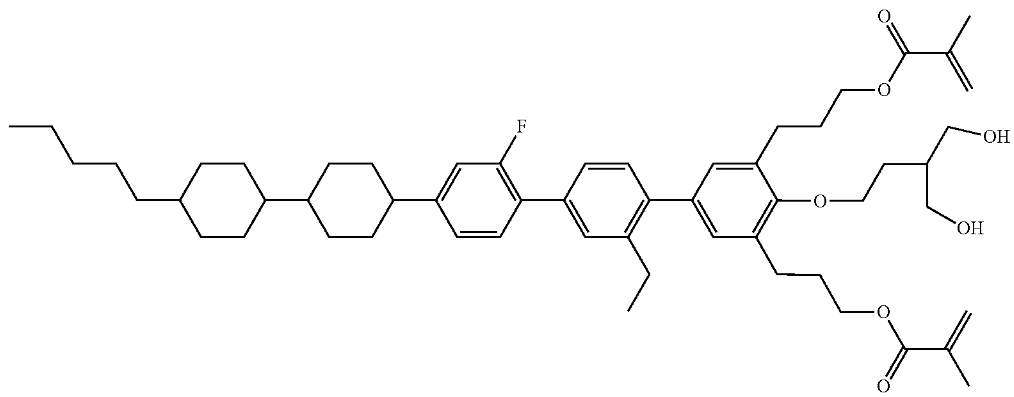 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO]

SA-46

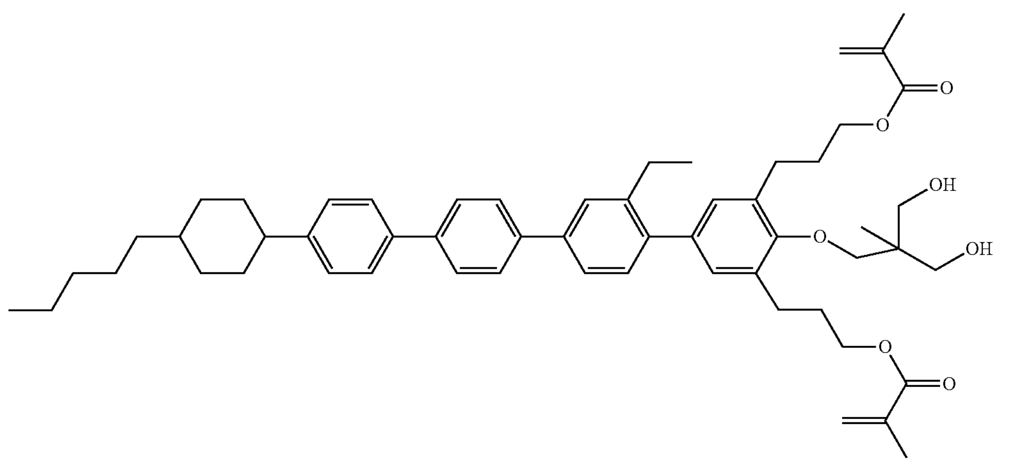

SA-47

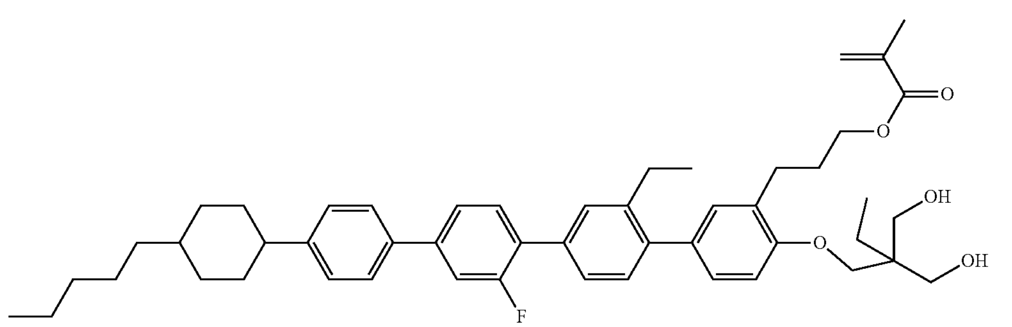

SA-48

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs of formulae RM-1 to RM-178.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European Application No. 21213602.2, filed Dec. 10, 2021, are incorporated by reference herein.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C., $n_e$ extraordinary refractive index at 20° C. and 589 nm, $n_o$ ordinary refractive index at 20° C. and 589 nm, Δn optical anisotropy at 20° C. and 589 nm, $\varepsilon_\perp$ dielectric permittivity perpendicular to the director at 20° C. and 1 kHz, $\varepsilon_\parallel$ dielectric permittivity parallel to the director at 20° C. and 1 kHz, Δε dielectric anisotropy at 20° C. and 1 kHz, cl.p., T(N,I) clearing point [° C.], $\gamma_1$ rotational viscosity at 20° C. [mPa·s], $K_1$ elastic constant, "splay" deformation at 20° C. [pN], $K_2$ elastic constant, "twist" deformation at 20° C. [pN], $K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage usually consists of two plane-parallel glass outer plates at a separation of 25 μm, each of which has on the inside an electrode layer and an unrubbed polyimide alignment layer on top, which effect a homeotropic edge alignment of the liquid-crystal molecules.

The PSVA display or PSVA test cell used for measurement of the tilt angles usually consists of two plane-parallel glass outer plates at a separation of ca. 4 μm unless stated otherwise, each of which has on the inside an electrode layer and a polyimide alignment layer on top, where the two polyimide layers are rubbed antiparallel to one another and effect a homeotropic edge alignment of the liquid-crystal molecules. The SAVA display or test cell has the same structure but wherein one or both polyimide layers are omitted.

The polymerizable compounds are usually polymerized in the display or test cell by irradiation with UV light of defined intensity for a prespecified time, with a voltage simultaneously being applied to the display (usually 10 V to 30 V alternating current, 1 kHz).

The intensity is measured using a standard meter (Hoenle UV-meter high end with UV sensor).

The tilt angle is usually determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Example 1

The nematic LC host mixture N1 is formulated as follows

| | | | |
|---|---|---|---|
| B(S)-2O-O4 | 3.00% | cl.p. | 74.9° C. |
| B(S)-2O-O5 | 5.00% | Δn | 0.1154 |
| BCH-32 | 7.00% | Δε | −2.7 |
| CC-3-V | 29.50% | $\gamma_1$ | 77 mPa · s |
| CC-3-V1 | 9.00% | $K_1$ | 14.3 |
| CCP-3-1 | 11.00% | $K_3$ | 14.9 |
| CCP-3-3 | 2.00% | $\gamma_1/K_3$ | 5.17 |
| CLY-3-O2 | 2.00% | | |
| CPY-2-O2 | 6.50% | | |
| CPY-3-O2 | 5.50% | | |
| PY-1-O2 | 10.50% | | |
| PY-2-O2 | 9.00% | | |

Polymerizable mixtures P11 to P13 according to the present invention are prepared by adding polymerizable compound MA1 of formula IA1 and polymerizable compound MB1 of formula IBD1 to nematic LC host mixture N1 in varying concentrations.

For comparison purpose polymerizable mixture $C_{11}$ is prepared by adding only 0.3% of polymerizable compound MA1 of formula IA6 to nematic LC host mixture N1.

MA1

(formula IA1)

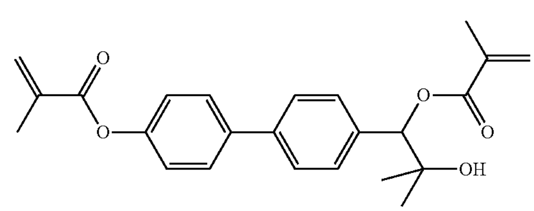

-continued

MB1

(formula IBD1)

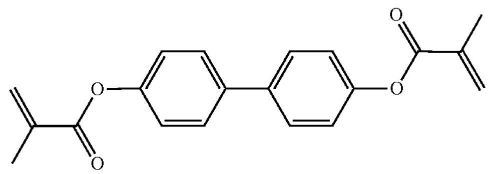

The polymerizable mixture compositions are shown in Table 1.1.

TABLE 1.1

| Polymerizable mixture compositions | | | | |
|---|---|---|---|---|
| Conc. | Host | Monomer | | Total Monomer |
| (wt. %) | N1 | MA1 | MB1 | Conc. (%) |
| C11 | 99.7 | 0.3 | — | 0.3 |
| P11 | 99.4 | 0.3 | 0.3 | 0.6 |
| P12 | 99.4 | 0.4 | 0.2 | 0.6 |
| P13 | 99.4 | 0.2 | 0.4 | 0.6 |

Each polymerizable mixture further contains 150 ppm of the stabilizer S1-1 and 10 ppm of Irganox®1076.

S1-1

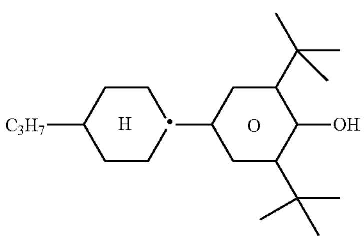

Tilt Angle Generation

Electrooptical VA test cells with AF glass substrates containing the polymerizable mixtures are exposed to UV light in a two step process, the first step (UV1) for generating a tilt angle and the second step (UV2) for polymerizing any residual monomer that was not polymerized in the first step. In UV1 step a voltage is applied (0.1 V step and curing at DC 15V). In UV2 step no voltage is applied. As radiation source a fluorescent UV lamp type C with a cut-off filter of 313 nm was used. The UV intensity is checked by UV detector with 313 nm. The other conditions are as follows, unless stated otherwise:

UV1 (C-type lamp): 0.22 mW/cm$^2$ at room temperature for 30-200 s

UV2 (C-type lamp): 0.32 mW/cm$^2$ at RT, 120 min

The tilt angle generated in the test cells after the UV1 step above after varying irradiation times is measured using an Otsuka T_RETS-10 system. The results are shown in Table 1.2.

TABLE 1.2

| Tilt angle | | | | |
|---|---|---|---|---|
| Mixture | C11 | P11 | P12 | P13 |
| Tilt angle (°) after 60 s | 89.5 | 88.1 | 88.4 | 88.1 |

TABLE 1.2-continued

| Tilt angle | | | | |
|---|---|---|---|---|
| Mixture | C11 | P11 | P12 | P13 |
| Tilt angle (°) after 120 s | 88.8 | 86.3 | 86.1 | 86.3 |

It can be seen that polymerizable mixtures P11 to P13 according to the invention show a significantly faster tilt angle generation than reference mixture $C_{11}$.

Tilt Stability

Tilt stability, i.e. the change of the tilt angle after repeated electric stress, is a criterion for evaluating the risk of image sticking. A low value for the change of the tilt angle indicates a good tilt stability and a low potential risk of image sticking.

For determining the tilt stability the test cells after polymerization as described above for the tilt angle generation are electrically stressed with a square wave of 40 $V_{PP}$ at 60 Hz for 168 h on backlight unit. After a relaxation time of 5-10 min the tilt angles are measured using the Otsuka T_RETS-10 system.

The change of the tilt angle Δtilt is determined according to equation (1)

$$\text{tilt}_{after\ stress} - \text{tilt}_{after\ tilt\ generation} = \Delta\text{tilt} \quad (1)$$

The lower the value of Δtilt, the higher is the tilt stability. The results are shown in Table 1.3.

TABLE 1.3

| Tilt Stability | | | | |
|---|---|---|---|---|
| Mixture | C11 | P11 | P12 | P13 |
| Δ tilt (°) | 0.464 | 0.273 | 0.313 | 0.182 |

It can be seen that polymerizable mixtures P11 to P13 according to the invention show better tilt stability than reference mixture $C_{11}$.

Residual RM

The residual content of unpolymerized monomer (in ppm) in the mixture was determined after UV photopolymerization. The smaller the residual monomer content after a given time interval, the faster the polymerization. For this purpose the polymerizable mixtures were filled in test cells and polymerized by UV exposure for varying time intervals at RT using a fluorescent UV lamp type C with an intensity of 0.32 mW/cm$^2$ The UV intensity is checked by UV detector with 313 nm. After photopolymerization for a certain time interval the test cells were opened, and the mixture was dissolved and rinsed out of the test cell with methyl ethyl ketone and analyzed by Ultra Performance Liquid Chromatography (UPLC).

The results are shown in Table 1.4.

TABLE 1.4

| Residual RM | | | | | | | |
|---|---|---|---|---|---|---|---|
| Mixture | C11 | P11 | | P12 | | P13 | |
| Monomer | MA1 | MA1 | MB1 | MA1 | MB1 | MA1 | MB1 |
| ppm after 1 h | 109 | <30 | 67 | 37 | 65 | n.d. | 63 |

TABLE 1.4-continued

| Residual RM | | | | | | | |
|---|---|---|---|---|---|---|---|
| Mixture | C11 | P11 | | P12 | | P13 | |
| Monomer | MA1 | MA1 | MB1 | MA1 | MB1 | MA1 | MB1 |
| ppm after 1.5 h | 48 | n.d. | <30 | <30 | n.d. | n.d. | n.d. |
| ppm after 2 h | <30 | n.d. | n.d. | n.d. | n.d. | n.d. | n.d. |

n.d. = not detectable

It can be seen that the total residual content of all monomers after polymerization in the polymerizable mixtures P11 to P13 according to the invention is smaller than in the polymerizable reference mixture $C_{11}$. This is especially surprising when considering that the initial amount of monomers in mixtures P11 to P13 was twice as high as in reference mixture $C_{11}$.

Voltage Holding Ratio (VHR)

For the VHR measurement the polymerizable LC media were filled in in test cells with a fishbone pattern ITO electrode and the monomers were polymerized under the same conditions as described above for the tilt angle generation. The VHR was measured before and after UV exposure while applying a voltage of 1 V/0.6 Hz at 60° C.

Light stress usually causes the decrease of VHR in LC mixtures, therefore the smaller the absolute decrease of VHR value after stress, the better performance for display applications.

The results are shown in Table 1.5.

TABLE 1.5

| VHR | | | | |
|---|---|---|---|---|
| Mixture | C11 | P11 | P12 | P13 |
| VHR (%) initial | 90.9 | 86.3 | 90.5 | 90.8 |
| VHR (%) after 2 h UV | 86.9 | 84.4 | 85.1 | 83.7 |

It can be seen that the VHR of polymerizable mixtures P11 to P13 according to the invention after UV stress is at similar level to that polymerizable mixture $C_{11}$, especially when considering that the total amount of monomers in mixtures P11 to P13 is twice as high as in reference mixture $C_{11}$.

Overall, the above results demonstrate that the polymerizable mixtures comprising both a polymerizable compound of formula IA and of formula IB show significant improvements like better tilt stability and lower amount of residual monomer.

Example 2

The nematic LC host mixture N2 is formulated as follows

| | | | |
|---|---|---|---|
| B(S)-2O-O4 | 3.50% | cl.p. | 74.9° C. |
| B(S)-2O-O5 | 5.00% | Δn | 0.1154 |
| BCH-32 | 7.50% | Δε | −2.6 |
| CC-3-V | 29.50% | $\gamma_1$ | 74 mPa · s |
| CC-3-V1 | 5.50% | $K_1$ | 14.5 |
| CCP-3-1 | 7.00% | $K_3$ | 14.9 |
| CCP-V-1 | 11.50% | $\gamma_1/K_3$ | 4.97 |
| CLY-3-O2 | 5.00% | | |
| CPY-2-O2 | 4.00% | | |
| CPY-3-O2 | 10.00% | | |
| PY-1-O2 | 0.50% | | |
| PY-2-O2 | 11.00% | | |

Polymerizable mixtures P21 to P23 according to the present invention are prepared by adding polymerizable compound MA1 of formula IA6 and polymerizable compound MB1 of formula IBD1 to nematic LC host mixture N2 in varying concentrations.

The polymerizable mixture compositions are shown in Table 2.1.

TABLE 2.1

| Polymerizable mixture compositions | | | | |
|---|---|---|---|---|
| Conc. | Host | Monomer | | Total Monomer |
| (wt. %) | N2 | MA1 | MB1 | Conc. (%) |
| P21 | 99.4 | 0.2 | 0.2 | 0.4 |
| P22 | 99.4 | 0.1 | 0.3 | 0.4 |
| P23 | 99.5 | 0.2 | 0.3 | 0.5 |

Each polymerizable mixture further contains 150 ppm of the stabilizer S1-1 and 10 ppm of Irganox®1076.

Tilt Stability

The tilt stability is determined as described in Example 1. The results are shown in Table 2.2.

TABLE 2.2

| Tilt Stability | | | |
|---|---|---|---|
| Mixture | P21 | P22 | P23 |
| Δ tilt (°) | 0.163 | 0.163 | 0.149 |

It can be seen that polymerizable mixtures P21 to P23 according to the invention show good tilt stability.

Residual RM

The residual content of unpolymerized monomer is measured as described in Example 1. The results are shown in Table 2.3.

TABLE 2.3

| Residual RM | | | | | | |
|---|---|---|---|---|---|---|
| Mixture | P21 | | P22 | | P23 | |
| Monomer | MA1 | MB1 | MA1 | MB1 | MA1 | MB1 |
| ppm after 1 h | 52 | 150 | 31 | 154 | 32 | 154 |
| ppm after 1.5 h | 32 | 79 | n.d | 72 | n.d. | 56 |

n.d. = not detectable

It can be seen that the polymerizable mixtures P21 to P23 according to the invention show quick and complete polymerization with a low residual content of unreacted monomers at proper UV exposure time.

Voltage Holding Ratio (VHR)

The VHR of the polymerizable LC media is measured as described in Example 1. The results are shown in Table 2.4.

TABLE 2.4

| VHR | | | |
|---|---|---|---|
| Mixture | P21 | P22 | P23 |
| VHR (%) initial | 96.2 | 96.1 | 95.6 |
| VHR (%) after 2 h UV | 93.3 | 90.5 | 93.0 |

It can be seen that the VHR of polymerizable mixtures P21 to P23 according to the invention after UV stress is still high, and there is only a low drop of the VHR, especially in mixtures P21 and P23 with higher content of monomer M1.

Overall, the above results demonstrate that the polymerizable mixtures comprising both a polymerizable compound of formula IA and of formula IB show significant improvements like better tilt angle generation, higher tilt stability and lower amount of residual monomer.

Example 3

Polymerizable mixtures P31 and P32 according to the present invention are prepared by adding polymerizable compound MA1 of formula IA6, polymerizable compound MB1 of formula IBD1 and polymerizable compound MC1 of formula IC45 to nematic LC host mixture N2 in varying concentrations.

MC1

(formula IC45)

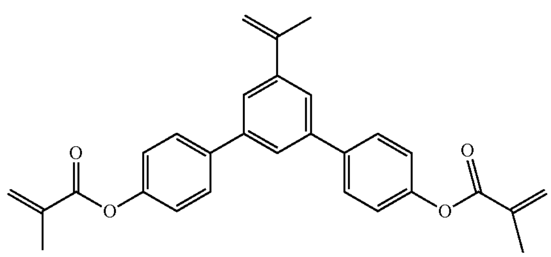

The polymerizable mixture compositions are shown in Table 3.1.

TABLE 3.1

| Polymerizable mixture compositions | | | | | |
|---|---|---|---|---|---|
| Conc. | Host | Monomer | | | Total Monomer |
| (wt. %) | N2 | MA1 | MB1 | MC1 | Conc. (%) |
| P31 | 99.6 | 0.3 | — | 0.1 | 0.4 |
| P32 | 99.4 | 0.2 | 0.3 | 0.1 | 0.6 |

Each polymerizable mixture further contains 150 ppm of the stabilizer S1-1 and 10 ppm of Irganox®1076.

Tilt Stability

The tilt stability is determined as described in Example 1. The results are shown in Table 3.2.

TABLE 3.2

| Tilt Stability | | |
|---|---|---|
| Mixture | P31 | P32 |
| Δ tilt (°) | 0.244 | 0.202 |

It can be seen that polymerizable mixtures P31 and P32 according to the invention show good tilt stability.

Residual RM

The residual content of unpolymerized monomer is measured as described in Example 1. The results are shown in Table 3.3.

TABLE 3.3

| Residual RM | | | | | |
|---|---|---|---|---|---|
| Mixture | P31 | | P32 | | |
| Monomer | MA1 | MC1 | MA1 | MB1 | MC1 |
| ppm after 1 h | 289 | 61 | 68 | <30 | 219 |
| ppm after 1.5 h | 153 | <30 | n.d. | n.d. | 79 |

n.d. = not detectable

It can be seen that the polymerizable mixtures P31 and P32 according to the invention show quick and complete polymerization with a low residual content of unreacted monomers at proper UV exposure time.

Voltage Holding Ratio (VHR)

The VHR of the polymerizable LC media is measured as described in Example 1. The results are shown in Table 3.4.

TABLE 3.4

| VHR | | |
|---|---|---|
| Mixture | P31 | P32 |
| VHR (%) initial | 95.4 | 95.9 |
| VHR (%) after 2 h UV | 95.1 | 94.4 |

It can be seen that the VHR of polymerizable mixtures P31 and P32 according to the invention after UV stress is still high, and there is only a low drop of the VHR.

Overall, the above results demonstrate that the polymerizable mixtures comprising both a polymerizable compound of formula IA and of formula IB show significant improvements like better tilt stability and lower amount of residual monomer.

Example 4

The nematic LC host mixture N3 is formulated as follows

| | | | |
|---|---|---|---|
| B(S)-2O-O4 | 4.50% | cl.p. | 75.7° C. |
| B(S)-2O-O5 | 5.00% | Δn | 0.1232 |
| CC-3-V | 28.20% | $n_e$ | 1.6169 |
| CC-3-V1 | 8.00% | $n_o$ | 1.4937 |
| CCP-3-1 | 3.80% | Δε | −2.8 |
| CCP-V-1 | 10.60% | $\varepsilon_{\parallel}$ | 3.5 |
| CPY-2-O2 | 7.80% | $\varepsilon_{\perp}$ | 6.3 |
| CPY-3-O2 | 12.00% | $\gamma_1$ | 78 |
| PP-1-2V1 | 7.60% | $K_1$ | 15.0 |
| PY-1-O2 | 10.00% | $K_3$ | 16.1 |
| PY-3-O2 | 3.00% | $K_3/K_1$ | 1.07 |
| | | $V_0$ | 2.55 V |

Polymerizable mixture P4 is prepared by adding 0.2% of compound MA1, 0.3% of compound MB1, 0.05% of compound MC1, 150 ppm of the stabilizer S1-1 and 10 ppm of Irganox®1076 to 99.434% of the nematic LC host mixture N3.

Example 5

Polymerizable mixture P5 is prepared by adding 0.3% of compound MA1, 0.2% of compound MB1 and 100 ppm of the stabilizer S1-1 to 99.49% of the nematic LC host mixture N3.

Example 6

The nematic LC host mixture N4 is formulated as follows

| | | | |
|---|---|---|---|
| B(S)-2O-O4 | 5.00% | cl.p. | 74.3° C. |
| B(S)-2O-O5 | 5.00% | Δn | 0.1302 |
| BCH-32 | 9.00% | $n_e$ | 1.625 |
| CC-3-V | 15.00% | $n_o$ | 1.4948 |
| CC-3-V1 | 7.50% | Δε | −2.9 |
| CC-4-V1 | 13.00% | $\varepsilon_{\parallel}$ | 3.6 |
| CCP-3-1 | 10.00% | $\varepsilon_{\perp}$ | 6.5 |
| CLY-3-O2 | 2.50% | $\gamma_1$ | 89 |
| CPY-3-O2 | 2.00% | $K_1$ | 15.1 |
| PY-1-O2 | 12.00% | $K_3$ | 15 |
| PY-3-O2 | 10.00% | $K_3/K_1$ | 0.99 |
| PYP-2-3 | 9.00% | $V_0$ | 2.42 V |

Polymerizable mixture P6 is prepared by adding 0.2% of compound MA1 and 0.2% of compound MB1 to 99.6% of the nematic LC host mixture N4.

Example 7

Polymerizable mixture P7 is prepared by adding 0.2% of compound MA1, 0.25% of compound MB1, 0.05% of compound MC1, 100 ppm of stabilizer S1-1 and 10 ppm of Irganox®1076 to 99.539% of the nematic LC host mixture N4.

Example 8

The nematic LC host mixture N5 is formulated as follows

| | | | |
|---|---|---|---|
| CC-3-V1 | 9.00% | cl.p. | 74.6° C. |
| CCH-3O1 | 3.50% | Δn | 0.0984 |
| CCH-34 | 8.00% | $n_e$ | 1.5804 |
| CCH-35 | 8.00% | $n_o$ | 1.4820 |
| CCP-3-1 | 6.00% | Δε | −3.6 |
| CCY-3-O1 | 6.50% | $\varepsilon_{\parallel}$ | 3.6 |
| CCY-3-O2 | 12.50% | $\varepsilon_{\perp}$ | 7.1 |
| CPY-3-O2 | 10.00% | $\gamma_1$ | 119 mPa · s |
| CY-3-O2 | 15.50% | $K_1$ | 14.1 |
| PCH-3O1 | 8.50% | $K_3$ | 17.0 |
| PY-3-O2 | 12.50% | $K_3/K_1$ | 1.21 |
| | | $V_0$ | 2.31 V |

Polymerizable mixture P8 is prepared by adding 0.2% of compound MA1 and 0.1% of compound MC1 to the nematic LC host mixture N5.

Example 9

Polymerizable mixture P9 is prepared by adding 0.2% of compound MA1, 0.2% of compound MB1 and 50 ppm of the stabilizer S1-1 to the nematic LC host mixture N8.

Example 10

The nematic LC host mixture N6 is formulated as follows

| | | | |
|---|---|---|---|
| B(S)-2O-O4 | 4.50% | cl.p. | 75.5° C. |
| B(S)-2O-O5 | 5.00% | Δn | 0.1120 |
| BCH-32 | 6.00% | $n_e$ | 1.6001 |
| CC-3-V | 30.00% | $n_o$ | 1.4881 |
| CC-3-V1 | 8.00% | Δε | −4.1 |
| CCY-3-O1 | 7.50% | $\varepsilon_{\parallel}$ | 3.8 |
| CCY-3-O2 | 11.00% | $\varepsilon_{\perp}$ | 8.0 |
| CLY-3-O2 | 8.00% | $\gamma_1$ | 92 mPa · s |
| PY-1-O2 | 10.50% | $K_1$ | 14.8 |
| PY-2-O2 | 9.50% | $K_3$ | 15.7 |
| | | $K_3/K_1$ | 1.06 |
| | | $V_0$ | 2.06 V |

Polymerizable mixture P10 is prepared by adding 0.1% of compound MA1 and 0.3% of compound MB1 to the nematic LC host mixture N6.

Example 11

Polymerizable mixture P11 is prepared by adding 0.1% of compound MA1, 0.3% of compound MB1, 0.1% of compound MC1 and 100 ppm of the stabilizer S1-1 to the nematic LC host mixture N6.

Example 12

Polymerizable mixture P12 is prepared by adding 0.2% of compound MA1 and 0.2% of compound MC1 to the nematic LC host mixture N1.

Example 13

Polymerizable mixture P13 is prepared by adding 0.2% of compound MA1, 0.2% of compound MB1, 0.1% of compound MC1 and and 150 ppm of the stabilizer S1-1 to the nematic LC host mixture N3.

Example 14

Polymerizable mixture P14 is prepared by adding 0.1% of the compound MA2 of formula IA1 and 0.3% of compound MB1 to the nematic LC host mixture N1.

MA2

(formula IA1)

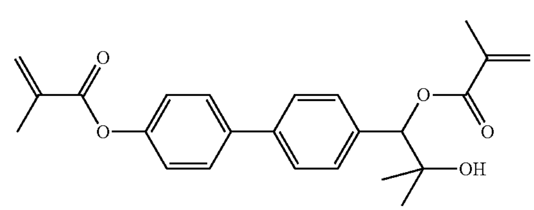

Example 15

Polymerizable mixture P15 is prepared by adding 0.1% of compound MA2, k, 0.3% of compound MB1 and 100 ppm of the stabilizer S1-1 to the nematic LC host mixture N2.

Example 16

Polymerizable mixture P16 is prepared by adding 0.2% of compound MA2, 0.1% of compound MC1 and 150 ppm of the stabilizer S1-1 to the nematic LC host mixture N1.

Example 17

Polymerizable mixture P17 is prepared by adding 0.2% of compound MA2, 0.1% of compound MB1, 0.05% of compound MC1 and 100 ppm of the stabilizer S1-1 to the nematic LC host mixture N3.

Example 18

Polymerizable mixture P18 is prepared by adding 0.1% of compound MA1, 0.3% of compound M5 of formula IBD4 and 100 ppm of the stabilizer S1-1 to the nematic LC host mixture N1.

MB2

(formula IBD4)

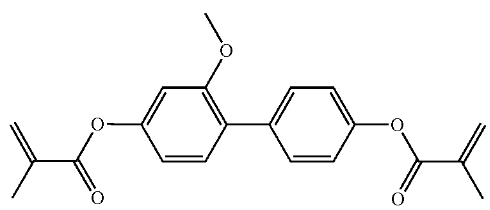

Example 19

Polymerizable mixture P19 is prepared by adding 0.1% of compound MA2, 0.3% of compound MB2 and 100 ppm of the stabilizer S1-1 to the nematic LC host mixture N2.

Example 20

Polymerizable mixture P20 is prepared by adding 0.2% of compound MA1, 0.3% of compound MB2, 0.2% of compound MC1 and 100 ppm of the stabilizer S1-1 to the nematic LC host mixture N3.

Example 21

Polymerizable mixture P21 is prepared by adding 0.1% of compound MA1, 0.3% of compound MB3 of formula IBT1 and 100 ppm of the stabilizer S1-1 to the nematic LC host mixture N1.

MB3

(formula IBT1)

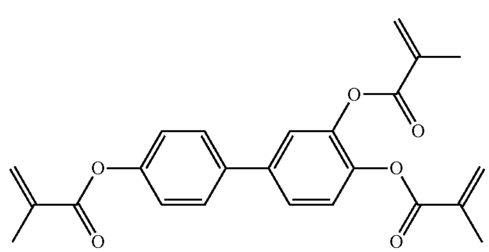

Example 22

Polymerizable mixture P22 is prepared by adding 0.2% of compound MA1, 0.1% of compound MC1 and 100 ppm of the stabilizer S1-1 to the nematic LC host mixture N3.

Example 23

Polymerizable mixture P23 is prepared by adding 0.1% of compound MA2, 0.3% of compound MB3 and 100 ppm of the stabilizer S1-1 to the nematic LC host mixture N2.

Example 24

Polymerizable mixture P24 is prepared by adding 0.1% of compound MA1, 0.3% of the compound MB4 of formula IBT22 and 100 ppm of the stabilizer S1-1 to the nematic LC host mixture N1.

MB4

(formula IBT22)

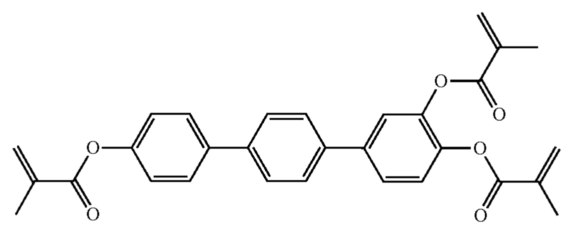

Example 25

Polymerizable mixture P25 is prepared by adding 0.2% of compound MA2, 0.2% of compound MB4 and 100 ppm of the stabilizer S1-1 to the nematic LC host mixture N1.

Example 26

Polymerizable mixture P26 is prepared by adding 0.2% of compound MA1, 0.3% of compound MB4, 0.05% of compound MC1 and 100 ppm of the stabilizer S1-1 to the nematic LC host mixture N3.

Example 27

Polymerizable mixture P27 is prepared by adding 0.1% of compound MA1, 0.3% of compound MB5 of formula IBT35 and 100 ppm of the stabilizer S1-1 to the nematic LC host mixture N1.

MB5

(formula IBT35)

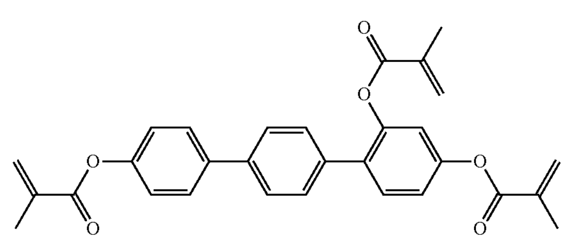

Example 28

Polymerizable mixture P28 is prepared by adding 0.2% of compound MA1, 0.2% of compound MB5, 0.05% of compound MC1 and 100 ppm of the stabilizer S1-1 to the nematic LC host mixture N3.

Example 29

Polymerizable mixture P29 is prepared by adding 0.1% of compound MA2, 0.3% of compound MB5 and 100 ppm of the stabilizer S1-1 to the nematic LC host mixture N2.

Example 30

The nematic LC host mixture N7 is formulated as follows

| | | | |
|---|---|---|---|
| B(S)-2O-O4 | 4.50% | cl.p. | 74.9° C. |
| B(S)-2O-O5 | 5.00% | Δn | 0.1122 |
| B(S)-2O-O6 | 2.00% | $n_e$ | 1.5993 |
| CC-3-V | 30.00% | $n_o$ | 1.4871 |
| CC-4-V1 | 17.50% | Δε | −3.7 |
| CLY-3-O2 | 8.00% | $ε_{\parallel}$ | 3.7 |
| CPY-2-O2 | 10.00% | $ε_{\perp}$ | 7.4 |
| CPY-3-O2 | 10.00% | $γ_1$ | 85 mPa · s |
| PY-1-O2 | 3.00% | $K_1$ | 14.5 |
| PY-2-O2 | 10.00% | $K_3$ | 14.2 |
| | | $K_3/K_1$ | 0.98 |
| | | $V_0$ | 2.07 V |

Polymerizable mixture P30 is prepared by adding 0.35% of compound MA1, 0.15% of compound MB1 and 50 ppm of the stabilizer S1-1 to the nematic LC host mixture N6.

Example 31

The nematic LC host mixture N8 is formulated as follows

| | | | |
|---|---|---|---|
| B(S)-2O-O4 | 4.00% | cl.p. | 74.7° C. |
| B(S)-2O-O5 | 5.00% | Δn | 0.1122 |
| BCH-32 | 7.00% | $n_e$ | 1.5977 |
| CC-3-V1 | 8.00% | $n_o$ | 1.4855 |
| CC-4-V1 | 11.00% | Δε | −3.8 |
| CCH-34 | 8.00% | $ε_{\parallel}$ | 3.9 |
| CCH-35 | 6.00% | $ε_{\perp}$ | 7.7 |
| CCY-3-O2 | 11.00% | $γ_1$ | 109 mPa · s |
| CPY-2-O2 | 3.00% | $K_1$ | 15.0 |
| CPY-3-O2 | 5.00% | $K_3$ | 15.4 |
| CY-3-O2 | 15.00% | $K_3/K_1$ | 0.97 |
| PCH-3O2 | 5.00% | $V_0$ | 2.13 |
| PPGU-3-F | 1.00% | | |
| PY-1-O2 | 4.00% | | |
| PY-2-O2 | 7.00% | | |

Polymerizable mixture P31 is prepared by adding 0.2% of compound MA1, 0.2% of compound MB1 and 50 ppm of the stabilizer S2-1 to the nematic LC host mixture N8.

S2-1

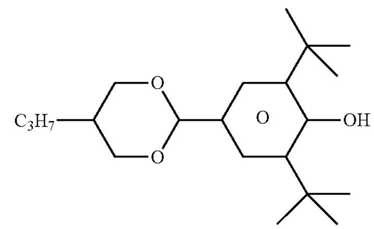

Example 32

The nematic LC host mixture N9 is formulated as follows

| | | | |
|---|---|---|---|
| CC-3-V1 | 8.50% | cl.p. | 75.1° C. |
| CC-4-V1 | 19.00% | Δn | 0.1123 |
| CCY-3-O1 | 6.00% | $n_e$ | 1.5969 |
| CCY-3-O2 | 11.00% | $n_o$ | 1.4846 |
| CLY-3-O2 | 5.00% | Δε | −3.9 |
| CPY-3-O2 | 11.00% | $ε_{\parallel}$ | 3.7 |
| CY-3-O2 | 6.00% | $ε_{\perp}$ | 7.5 |
| PCH-3O2 | 13.50% | $γ_1$ | 124 mPa · s |
| PY-1-O2 | 6.00% | $K_1$ | 15.2 |
| PY-2-O2 | 6.00% | $K_3$ | 18.3 |
| PY-3-O2 | 8.00% | $K_3/K_1$ | 1.20 |
| | | $V_0$ | 2.29 V |

Polymerizable mixture P32 is prepared by adding 0.3% of compound MA1, 0.2% of compound MB1 and 150 ppm of the stabilizer S1-1 to the nematic LC host mixture N9.

Example 33

The nematic LC host mixture N10 is formulated as follows

| | | | |
|---|---|---|---|
| B(S)-2O-O4 | 2.00% | cl.p. | 73.9° C. |
| B(S)-2O-O5 | 2.50% | Δn | 0.1165 |
| BCH-32 | 8.00% | $n_e$ | 1.6084 |
| CC-3-V | 30.00% | $n_o$ | 1.4919 |
| CC-4-V1 | 7.00% | Δε | −2.7 |
| CCP-3-1 | 11.00% | $ε_{\parallel}$ | 3.6 |
| CLY-3-O2 | 3.00% | $ε_{\perp}$ | 6.3 |
| CPY-2-O2 | 2.00% | $γ_1$ | 79 mPa · s |
| CPY-3-O2 | 12.00% | $K_1$ | 14.1 |
| PY-1-O2 | 11.50% | $K_3$ | 14.7 |
| PY-2-O2 | 11.00% | $K_3/K_1$ | 1.04 |
| | | $V_0$ | 2.46 V |

Polymerizable mixture P33 is prepared by adding 0.3% of compound MA1, 0.2% of compound MB1 and 0.6% of the SA additive SA23 to the nematic LC host mixture N10.

SA23

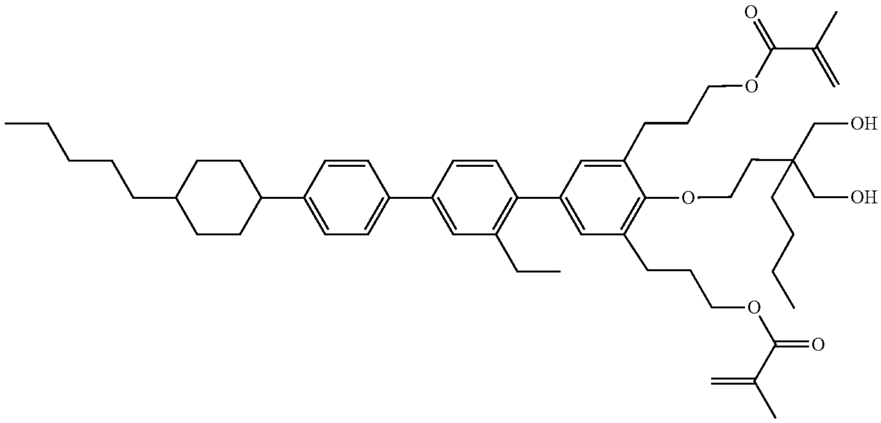

Example 34

The nematic LC host mixture N11 is formulated as follows

| | | | |
|---|---|---|---|
| B(S)-2O-O4 | 4.50% | cl.p. | 75.6° C. |
| B(S)-2O-O5 | 3.00% | Δn | 0.1049 |
| CC-3-V | 51.00% | $n_e$ | 1.5904 |
| CCP-3-1 | 1.00% | $n_o$ | 1.4855 |
| CLY-3-O2 | 9.00% | Δε | −3.1 |
| CPY-2-O2 | 10.00% | $ε_{\|\|}$ | 3.5 |
| CPY-3-O2 | 12.00% | $ε_⊥$ | 6.6 |
| PY-1-O2 | 9.50% | $γ_1$ | 72 mPa · s |
| | | $K_1$ | 14.1 |
| | | $K_3$ | 15.0 |
| | | $K_3/K_1$ | 1.06 |
| | | $V_0$ | 2.34 V |

Polymerizable mixture P34 is prepared by adding 0.1% of compound MA2, 0.2% of compound MB1, 0.05% of compound MC1 and 100 ppm of the stabilizer S1-1 to the nematic LC host mixture N11.

Example 35

The nematic LC host mixture N12 is formulated as follows

| | | | |
|---|---|---|---|
| CC-3-V1 | 9.00% | cl.p. | 75.4° C. |
| CCH-23 | 14.00% | Δn | 0.1055 |
| CCH-34 | 6.00% | $n_e$ | 1.5907 |
| CCH-35 | 6.00% | $n_o$ | 1.4852 |
| CCP-3-1 | 7.00% | Δε | −2.8 |
| CCY-3-O1 | 5.00% | $ε_{\|\|}$ | 3.3 |
| CCY-3-O2 | 10.00% | $ε_⊥$ | 6.1 |
| CPY-3-O2 | 12.00% | $γ_1$ | 102 mPa · s |
| CY-3-O2 | 9.50% | $K_1$ | 16.2 |
| PP-1-2V1 | 8.50% | $K_3$ | 17.3 |
| PY-3-O2 | 12.00% | $K_3/K_1$ | 1.07 |
| PY-4-O2 | 1.00% | $V_0$ | 2.67 V |

Polymerizable mixture P35 is prepared by adding 0.2% of compound MA1, 0.2% of compound MB1 and 150 ppm of the stabilizer S2-1 to the nematic LC host mixture N12.

Example 36

The nematic LC host mixture N13 is formulated as follows

| | | | |
|---|---|---|---|
| CC-3-V1 | 9.00% | cl.p. | 74.7° C. |
| CCH-23 | 18.00% | Δn | 0.0982 |
| CCH-34 | 3.00% | $n_e$ | 1.5800 |
| CCH-35 | 7.00% | $n_o$ | 1.4818 |
| CCP-3-1 | 5.50% | Δε | −3.4 |
| CCY-3-O2 | 11.50% | $ε_{\|\|}$ | 3.5 |
| CPY-2-O2 | 8.00% | $ε_⊥$ | 6.9 |
| CPY-3-O2 | 11.00% | $γ_1$ | 108 mPa · s |
| CY-3-O2 | 15.50% | $K_1$ | 14.9 |
| PY-3-O2 | 11.50% | $K_3$ | 15.9 |
| | | $K_3/K_1$ | 1.07 |
| | | $V_0$ | 2.28 V |

Polymerizable mixture P36 is prepared by adding 0.1% of compound MA1, 0.3% of compound MB1 and 100 ppm of the stabilizer S1-1 to the nematic LC host mixture N13.

Example 37

The nematic LC host mixture N14 is formulated as follows

| | | | |
|---|---|---|---|
| BCH-32 | 10.00% | cl.p. | 74.6° C. |
| CC-3-V1 | 6.50% | Δn | 0.1113 |
| CCH-34 | 8.00% | $n_e$ | 1.5981 |
| CCH-35 | 8.00% | $n_o$ | 1.4868 |
| CCY-3-O2 | 12.00% | Δε | −3.3 |
| CPY-2-O2 | 6.50% | $ε_{\|\|}$ | 3.5 |
| CPY-3-O2 | 11.00% | $ε_⊥$ | 6.8 |
| CY-3-O2 | 15.00% | $γ_1$ | 128 mPa · s |
| CY-5-O2 | 13.00% | $K_1$ | 14.5 |
| PP-1-4 | 10.00% | $K_3$ | 15.3 |
| | | $K_3/K_1$ | 1.06 |
| | | $V_0$ | 2.28 V |

Polymerizable mixture P37 is prepared by adding 0.3% of compound MA1, 0.1% of compound MB1 and 50 ppm of the stabilizer S1-1 to the nematic LC host mixture N14.

Example 38

The nematic LC host mixture N15 is formulated as follows

| | | | |
|---|---|---|---|
| CC-3-V1 | 8.00% | cl.p. | 74.6° C. |
| CCH-23 | 15.0% | Δn | 0.0899 |
| CCH-34 | 5.00% | $n_e$ | 1.5694 |
| CCH-35 | 6.00% | $n_o$ | 1.4795 |
| CCP-3-1 | 3.00% | Δε | −3.3 |
| CCY-3-O1 | 8.00% | $ε_{\|\|}$ | 3.5 |
| CCY-3-O2 | 10.00% | $ε_⊥$ | 6.8 |
| CCY-3-O3 | 6.00% | $γ_1$ | 114 mPa · s |
| CCY-4-O2 | 6.00% | $K_1$ | 13.9 |
| CY-3-O2 | 12.0% | $K_3$ | 14.6 |
| CY-3-O4 | 3.75% | $K_3/K_1$ | 1.05 |
| PCH-3O1 | 3.00% | $V_0$ | 2.22 V |
| PY-3-O2 | 2.75% | | |
| PY-4-O2 | 6.50% | | |
| PYP-2-3 | 5.00% | | |

Polymerizable mixture P38 is prepared by adding 0.4% of compound MA1, 0.1% of compound MB1 and 50 ppm of the stabilizer S2-1 to the nematic LC host mixture N15.

Example 39

The nematic LC host mixture N16 is formulated as follows

| | | | |
|---|---|---|---|
| B(S)-2O-O4 | 0.25% | cl.p. | 74.6° C. |
| BCH-32 | 4.50% | Δn | 0.1034 |
| CC-3-V1 | 13.00% | $n_e$ | 1.5883 |
| CCH-23 | 15.00% | $n_o$ | 1.4849 |
| CCH-3O1 | 1.00% | Δε | −2.9 |
| CCH-34 | 2.00% | $ε_{\|\|}$ | 3.4 |
| CCH-35 | 0.50% | $ε_⊥$ | 6.3 |
| CCY-3-O2 | 6.50% | $γ_1$ | 103 mPa · s |
| CPY-2-O2 | 12.00% | $K_1$ | 13.0 |
| CPY-3-O2 | 15.00% | $K_3$ | 15.3 |
| CY-3-O2 | 15.50% | $K_3/K_1$ | 1.18 |
| CY-3-O4 | 0.25% | $V_0$ | 2.44 V |
| PCH-3O1 | 13.00% | | |
| PP-1-2V1 | 0.50% | | |
| PYP-2-3 | 1.00% | | |

Polymerizable mixture P39 is prepared by adding 0.3% of compound MA2, 0.2% of compound MB1 and 150 ppm of the stabilizer S3-1 to the nematic LC host mixture N16.

S3-1

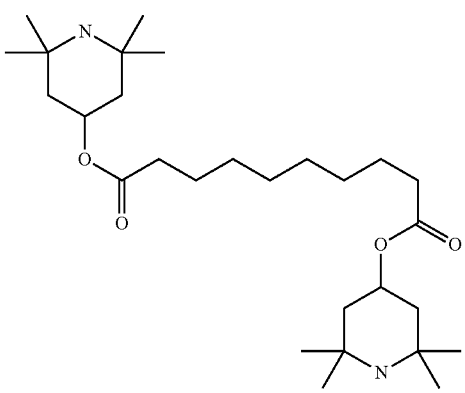

Example 40

The nematic LC host mixture N17 is formulated as follows

| | | | |
|---|---|---|---|
| CCH-3O1 | 6.00% | cl.p. | 109.9° C. |
| CCH-3O3 | 10.00% | Δn | 0.0976 |
| CCH-5O1 | 4.00% | $n_e$ | 1.5806 |
| CCP-3-1 | 7.00% | $n_o$ | 1.4830 |
| CCPC-33 | 3.00% | Δε | −3.6 |
| CCPC-34 | 3.00% | $ε_{\|\|}$ | 3.4 |
| CCY-3-O1 | 5.50% | $ε_⊥$ | 7.0 |
| CCY-3-O2 | 9.50% | $γ_1$ | 233 mPa · s |
| CCY-3-O3 | 7.00% | $K_1$ | 16.9 |
| CCY-4-O2 | 8.50% | $K_3$ | 19.6 |
| CPY-2-O2 | 3.00% | $K_3/K_1$ | 1.16 |
| CPY-3-O2 | 12.50% | $V_0$ | 2.47 V |
| CY-3-O4 | 9.50% | | |
| PCH-3O1 | 11.50% | | |

Polymerizable mixture P40 is prepared by adding 0.25% of compound MA1, 0.1% of compound MB1 and 150 ppm of the stabilizer S1-1 to the nematic LC host mixture N17.

Example 41

The nematic LC host mixture N18 is formulated as follows

| | | | |
|---|---|---|---|
| BCH-32 | 8.00% | cl.p. | 74.6° C. |
| CC-3-V1 | 13.00% | Δn | 0.1042 |
| CC-4-V1 | 2.50% | $n_e$ | 1.5897 |
| CCH-3O1 | 10.00% | $n_o$ | 1.4855 |
| CCH-34 | 5.00% | Δε | −3.1 |
| CCH-35 | 5.00% | $ε_{\|\|}$ | 3.5 |
| CLY-3-O2 | 12.50% | $ε_⊥$ | 6.6 |
| CPY-2-O2 | 11.50% | $γ_1$ | 104 mPa · s |
| CPY-3-O2 | 4.00% | $K_1$ | 13.7 |
| CY-3-O2 | 15.00% | $K_3$ | 15.4 |
| PCH-3O1 | 6.50% | $K_3/K_1$ | 1.12 |
| PY-1-O2 | 7.00% | $V_0$ | 2.37 V |

Polymerizable mixture P41 is prepared by adding 0.15% of compound MA2, 0.2% of compound MB3 and 100 ppm of the stabilizer S3-2 to the nematic LC host mixture N18.

S3-2

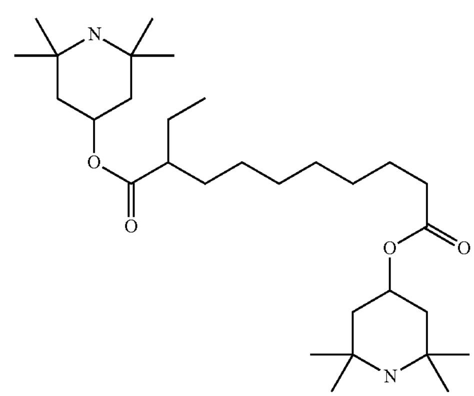

Example 42

The nematic LC host mixture N19 is formulated as follows

| | | | |
|---|---|---|---|
| B(S)-2O-O5 | 0.25% | cl.p. | 74.5° C. |
| BCH-32 | 5.50% | Δn | 0.1028 |
| CC-3-V | 10.00% | $n_e$ | 1.5880 |
| CC-3-V1 | 7.50% | $n_o$ | 1.4852 |
| CC-4-V1 | 16.50% | Δε | −3.1 |
| CCH-35 | 0.25% | $ε_{\|\|}$ | 3.6 |
| CCP-3-1 | 7.50% | $ε_⊥$ | 6.7 |
| CCY-3-O2 | 11.00% | $γ_1$ | 96 mPa · s |
| CCY-3-O3 | 1.00% | $K_1$ | 13.8 |
| CCY-4-O2 | 7.00% | $K_3$ | 15.5 |
| CCY-5-O2 | 2.00% | $K_3/K_1$ | 1.12 |
| CY-3-O2 | 9.00% | $V_0$ | 2.37 V |
| PY-1-O2 | 9.00% | | |
| PY-2-O2 | 9.00% | | |
| PY-3-O2 | 4.50% | | |

Polymerizable mixture P42 is prepared by adding 0.3% of compound MA1, 0.2% of compound MB3 and 100 ppm of the stabilizer S1-1 to the nematic LC host mixture N19.

Example 43

The nematic LC host mixture N20 is formulated as follows

| | | | |
|---|---|---|---|
| BCH-32 | 4.50% | cl.p. | 74.8° C. |
| CC-3-V | 15.00% | Δn | 0.1030 |
| CC-3-V1 | 7.50% | $n_e$ | 1.5889 |
| CC-4-V1 | 12.50% | $n_o$ | 1.4859 |
| CCP-3-1 | 7.00% | Δε | −3.1 |
| CCY-3-O1 | 7.00% | $ε_{\|\|}$ | 3.6 |
| CCY-3-O2 | 10.50% | $ε_⊥$ | 6.8 |
| CCY-4-O2 | 6.50% | $γ_1$ | 94 mPa · s |
| CY-3-O2 | 4.50% | $K_1$ | 13.8 |
| PY-1-O2 | 9.50% | $K_3$ | 15.4 |
| PY-2-O2 | 9.00% | $K_3/K_1$ | 1.12 |
| PY-3-O2 | 6.50% | $V_0$ | 2.35 V |

Polymerizable mixture P43 is prepared by adding 0.2% of compound MA1, 0.3% of compound MB1, 0.05% of compound MC1 and 100 ppm of the stabilizer S1-1 to the nematic LC host mixture N20.

Example 44

The nematic LC host mixture N21 is formulated as follows

| | | | |
|---|---|---|---|
| CC-3-V | 10.50% | cl.p. | 74.5° C. |
| CC-3-V1 | 5.50% | Δn | 0.1033 |
| CC-4-V1 | 20.00% | $n_e$ | 1.5875 |
| CCH-34 | 2.00% | $n_o$ | 1.4842 |
| CCH-35 | 1.50% | Δε | −3.3 |
| CCY-3-1 | 2.00% | $ε_{\|\|}$ | 3.6 |
| CCY-3-O1 | 7.50% | $ε_⊥$ | 6.9 |
| CCY-3-O2 | 11.00% | $γ_1$ | 96 mPa's |
| CCY-4-O2 | 8.50% | $K_1$ | 14.4 |
| CLY-2-O4 | 1.00% | $K_3$ | 15.1 |
| CLY-3-O2 | 2.00% | $K_3/K_1$ | 1.05 |
| PP-1-2V1 | 3.50% | $V_0$ | 2.29 V |
| PY-1-O2 | 9.50% | | |
| PY-2-O2 | 9.50% | | |
| PY-3-O2 | 6.00% | | |

Polymerizable mixture P44 is prepared by adding 0.15% of compound MA1, 0.2% of compound MB1, 0.05% of compound MC1 and 150 ppm of the stabilizer S1-1 to the nematic LC host mixture N21.

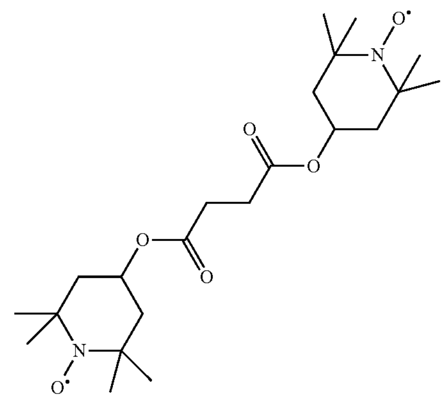

S3-3

Example 45

The nematic LC host mixture N22 is formulated as follows

| | | | |
|---|---|---|---|
| CC-3-V1 | 7.50% | cl.p. | 74.5° C. |
| CC-4-V1 | 20.00% | Δn | 0.1030 |
| CCH-34 | 5.00% | $n_e$ | 1.5861 |
| CCH-35 | 7.50% | $n_o$ | 1.4831 |
| CCP-3-1 | 2.00% | Δε | −3.5 |
| CCY-3-O1 | 8.00% | $ε_{\|\|}$ | 3.6 |
| CCY-3-O2 | 12.00% | $ε_⊥$ | 7.1 |
| CCY-4-O2 | 3.00% | $γ_1$ | 103 mPa · s |
| CLY-3-O2 | 4.00% | $K_1$ | 15.1 |
| CY-3-O2 | 1.50% | $K_3$ | 15.4 |
| PY-1-O2 | 9.50% | $K_3/K_1$ | 1.02 |
| PY-2-O2 | 9.50% | $V_0$ | 2.23 V |
| PY-3-O2 | 10.50% | | |

Polymerizable mixture P45 is prepared by adding 0.2% of compound 1, 0.25% of compound MB1, 0.05% of compound MC1 and 50 ppm of the stabilizer S1-1 to the nematic LC host mixture N22.

Example 46

The nematic LC host mixture N23 is formulated as follows

| | | | |
|---|---|---|---|
| CC-3-V1 | 7.50% | cl.p. | 75° C. |
| CC-4-V1 | 19.50% | Δn | 0.1041 |
| CCH-3O1 | 5.50% | $n_e$ | 1.5884 |
| CCH-34 | 5.00% | $n_o$ | 1.4843 |
| CCP-3-1 | 11.00% | Δε | −3.1 |
| CLY-3-O2 | 5.00% | $ε_{\|\|}$ | 3.6 |
| CPY-2-O2 | 6.00% | $ε_⊥$ | 6.7 |
| CPY-3-O2 | 11.50% | $γ_1$ | 101 mPa · s |
| CY-3-O2 | 15.00% | $K_1$ | 14.0 |
| PY-1-O2 | 6.50% | $K_3$ | 15.7 |
| PY-2-O2 | 7.50% | $K_3/K_1$ | 1.12 |
| | | $V_0$ | 2.37 V |

Polymerizable mixture P46 is prepared by adding 0.3% of compound MA1, 0.3% of compound MB1 and 0.6% of the SA additive SA32 to the nematic LC host mixture N23.

SA32

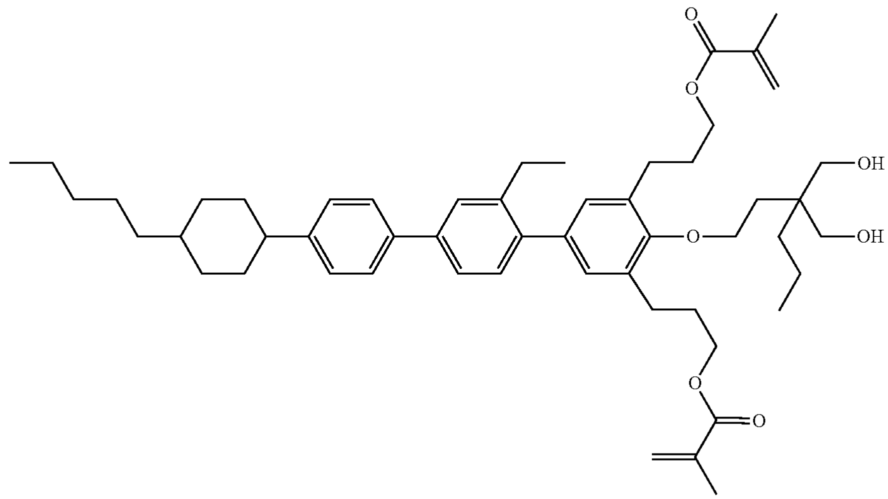

Example 47

The nematic LC host mixture N24 is formulated as follows

| | | | |
|---|---|---|---|
| CC-3-V1 | 2.50% | cl.p. | 105.9° C. |
| CC-4-V1 | 10.00% | Δε | −3.6 |
| CCH-3O1 | 3.00% | $\varepsilon_{\parallel}$ | 3.4 |
| CCH-34 | 4.00% | $\varepsilon_{\perp}$ | 7.0 |
| CCH-35 | 4.00% | | |
| CCP-3-1 | 6.00% | | |
| CCP-3-3 | 6.00% | | |
| CCY-3-O1 | 4.00% | | |
| CCY-3-O2 | 4.00% | | |
| CCY-3-O3 | 4.00% | | |
| CCY-4-O2 | 4.00% | | |
| CCY-5-O2 | 4.00% | | |
| CPY-2-O2 | 10.00% | | |
| CPY-3-O2 | 10.00% | | |
| CY-3-O2 | 6.50% | | |
| CY-3-O4 | 10.00% | | |
| PYP-2-3 | 5.00% | | |
| PYP-2-4 | 3.00% | | |

Polymerizable mixture P47 is prepared by adding 0.25% of compound MA1, 0.15% of compound MB1 and 150 ppm of the stabilizer S1-1 to the nematic LC host mixture N24.

Example 48

The nematic LC host mixture N25 is formulated as follows

| | | | |
|---|---|---|---|
| BCH-52 | 9.00% | cl.p. | 105° C. |
| CC-3-V1 | 2.00% | Δε | −3.6 |
| CC-4-V1 | 12.50% | $\varepsilon_{\parallel}$ | 3.4 |
| CCH-3O1 | 2.00% | $\varepsilon_{\perp}$ | 7.0 |
| CCH-34 | 3.50% | | |
| CCH-35 | 4.00% | | |
| CCP-3-1 | 7.50% | | |
| CCY-3-O1 | 4.00% | | |
| CCY-3-O2 | 4.00% | | |
| CCY-3-O3 | 4.00% | | |
| CCY-4-O2 | 4.00% | | |
| CCY-5-O2 | 4.00% | | |
| CPY-2-O2 | 10.00% | | |
| CPY-3-O2 | 10.00% | | |
| CY-3-O4 | 12.50% | | |
| PY-1-O2 | 7.00% | | |

Polymerizable mixture P48 is prepared by adding 0.1% of compound MA1, 0.3% of compound MB1 and 100 ppm of the stabilizer S2-1 to the nematic LC host mixture N25.

Example 49

The nematic LC host mixture N26 is formulated as follows

| | | | |
|---|---|---|---|
| B(S)-2O-O5 | 0.25% | cl.p. | 75.1° C. |
| BCH-32 | 1.50% | Δn | 0.1038 |
| CC-3-V1 | 8.00% | $n_e$ | 1.5864 |
| CC-4-V1 | 20.00% | $n_o$ | 1.4826 |
| CCH-303 | 1.50% | Δε | −3.0 |
| CCH-34 | 6.00% | $\varepsilon_{\parallel}$ | 3.4 |
| CCH-35 | 8.00% | $\varepsilon_{\perp}$ | 6.5 |
| CCY-3-O2 | 9.50% | $\gamma_1$ | 99 mPa · s |
| CPY-2-O2 | 6.00% | $K_1$ | 15.6 |
| CPY-3-O2 | 11.00% | $K_3$ | 16.0 |
| CY-3-O2 | 12.50% | $K_3/K_1$ | 1.03 |
| PP-1-2V1 | 2.75% | $V_0$ | 2.44 V |
| PY-1-O2 | 5.50% | | |
| PY-2-O2 | 4.50% | | |
| PY-3-O2 | 3.00% | | |

Polymerizable mixture P49 is prepared by adding 0.2% of compound MA1, 0.05% of the compound MC1 and 150 ppm of the stabilizer S1-1 to the nematic LC host mixture N26.

Example 50

The nematic LC host mixture N27 is formulated as follows

| | | | |
|---|---|---|---|
| BCH-32 | 0.50% | cl.p. | 74.8° C. |
| CC-3-V1 | 7.00% | Δn | 0.1036 |
| CC-4-V1 | 19.50% | $n_e$ | 1.5884 |
| CCH-3O1 | 12.00% | $n_o$ | 1.4848 |

-continued

| | | | |
|---|---|---|---|
| CCH-34 | 1.50% | $\Delta\varepsilon$ | −3.1 |
| CCP-3-1 | 9.00% | $\varepsilon_{\parallel}$ | 3.6 |
| CCY-3-O1 | 1.50% | $\varepsilon_{\perp}$ | 6.7 |
| CCY-3-O2 | 9.50% | $\gamma_1$ | 102 mPa · s |
| CPY-2-O2 | 3.00% | $K_1$ | 13.8 |
| CPY-3-O2 | 11.00% | $K_3$ | 15.6 |
| CY-3-O2 | 6.50% | $K_3/K_1$ | 1.13 |
| PY-1-O2 | 9.00% | $V_0$ | 2.39 V |
| PY-2-O2 | 9.00% | | |
| PY-3-O2 | 1.00% | | |

Polymerizable mixture P50 is prepared by adding 0.3% of compound MA2, 0.2% of compound MB1 and 50 ppm of the stabilizer S3-1 to the nematic LC host mixture N27.

Example 51

The nematic LC host mixture N28 is formulated as follows

| | | | |
|---|---|---|---|
| B-2O-O5 | 4.00% | cl.p. | 74.2° C. |
| BCH-32 | 8.00% | $\Delta n$ | 0.1091 |
| CC-3-V1 | 9.00% | $n_e$ | 74.2 |
| CCH-3O1 | 2.00% | $n_o$ | 1.4862 |
| CCH-34 | 8.00% | $\Delta\varepsilon$ | −3.1 |
| CCH-35 | 7.00% | $\varepsilon_{\parallel}$ | 3.6 |
| CCP-3-1 | 8.00% | $\varepsilon_{\perp}$ | 6.7 |
| CCP-V2-1 | 5.00% | $\gamma_1$ | 108 mPa · s |
| CCY-3-O2 | 10.50% | $K_1$ | 14.5 |
| CLY-3-O2 | 1.00% | $K_3$ | 16.5 |
| CPY-3-O2 | 2.50% | $K_3/K_1$ | 1.14 |
| CY-3-O2 | 11.50% | $V_0$ | 2.41 V |
| PCH-3O1 | 5.50% | | |
| PY-3-O2 | 18.00% | | |

Polymerizable mixture P51 is prepared by adding 0.3% of compound MA1, 0.2% of compound MB2 and 50 ppm of the stabilizer S3-3 to the nematic LC host mixture N28.

Example 52

The nematic LC host mixture N29 is formulated as follows

| | | | |
|---|---|---|---|
| CC-3-V1 | 3.00% | cl.p. | 74.8° C. |
| CCH-3O1 | 9.00% | $\Delta n$ | 0.0891 |
| CCH-3O3 | 5.00% | $n_e$ | 1.5681 |
| CCH-34 | 9.00% | $n_o$ | 1.4790 |
| CCH-35 | 9.00% | $\Delta\varepsilon$ | −3.2 |
| CCP-3-1 | 8.00% | $\varepsilon_{\parallel}$ | 3.5 |
| CCY-3-O2 | 11.50% | $\varepsilon_{\perp}$ | 6.7 |
| CCY-5-O2 | 9.00% | $\gamma_1$ | 115 mPa · s |
| CPY-3-O2 | 6.00% | $K_1$ | 14.2 |
| CY-3-O2 | 15.00% | $K_3$ | 16.3 |
| PCH-3O1 | 4.50% | $K_3/K_1$ | 1.15 |
| PY-3-O2 | 11.00% | $V_0$ | 2.38 V |

Polymerizable mixture P52 is prepared by adding 0.3% of compound MA1, 0.2% of compound MB4 and 150 ppm of the stabilizer S2-1 to the nematic LC host mixture N29.

Example 53

The nematic LC host mixture N30 is formulated as follows

| | | | |
|---|---|---|---|
| BCH-32 | 10.50% | cl.p. | 74.5° C. |
| CCH-34 | 9.00% | $\Delta n$ | 0.1090 |
| CCH-35 | 9.00% | $n_e$ | 1.5953 |
| CCP-3-1 | 8.00% | $n_o$ | 1.4863 |
| CCY-3-O2 | 9.50% | $\Delta\varepsilon$ | −3.4 |
| CCY-4-O2 | 5.50% | $\varepsilon_{\parallel}$ | 3.7 |
| CPY-3-O2 | 5.50% | $\varepsilon_{\perp}$ | 7.0 |
| CY-3-O2 | 15.00% | $\gamma_1$ | 128 mPa · s |
| CY-5-O2 | 5.00% | $K_1$ | 14.0 |
| PCH-3O1 | 7.00% | $K_3$ | 15.7 |
| PY-3-O2 | 16.00% | $K_3/K_1$ | 1.12 |
| | | $V_0$ | 2.25 V |

Polymerizable mixture P53 is prepared by adding 0.2% of compound MA2, 0.1% of compound MB1 and 150 ppm of the stabilizer S1-1 to the nematic LC host mixture N30.

Example 54

The nematic LC host mixture N31 is formulated as follows

| | | | |
|---|---|---|---|
| B(S)-2O-O5 | 4.00% | cl.p. | 74.7° C. |
| BCH-32 | 5.00% | $\Delta n$ | 0.1024 |
| CC-3-V1 | 6.00% | $n_e$ | 1.5885 |
| CCH-34 | 9.00% | $n_o$ | 1.4861 |
| CCH-35 | 9.00% | $\Delta\varepsilon$ | −3.2 |
| CCP-3-1 | 8.00% | $\varepsilon_{\parallel}$ | 3.6 |
| CCY-3-O1 | 6.50% | $\varepsilon_{\perp}$ | 6.7 |
| CCY-3-O2 | 9.00% | $\gamma_1$ | 109 mPa · s |
| CLY-3-O2 | 1.00% | $K_1$ | 13.5 |
| CPY-3-O2 | 4.50% | $K_3$ | 16.5 |
| CY-3-O2 | 13.00% | $K_3/K_1$ | 1.22 |
| PCH-3O1 | 15.00% | $V_0$ | 2.39 V |
| PY-1-O2 | 8.00% | | |
| PY-2-O2 | 2.00% | | |

Polymerizable mixture P54 is prepared by adding 0.3% of compound MA1, 0.2% of compound MB5 and 150 ppm of the stabilizer S1-1 to the nematic LC host mixture N31.

Example 55

The nematic LC host mixture N32 is formulated as follows

| | | | |
|---|---|---|---|
| CCH-3O1 | 9.00% | cl.p. | 110.9° C. |
| CCH-34 | 9.00% | $\Delta n$ | 0.1022 |
| CCH-35 | 8.00% | $n_e$ | 1.5867 |
| CCOC-4-3 | 3.00% | $n_o$ | 1.4845 |
| CCP-3-1 | 6.00% | $\Delta\varepsilon$ | −3.0 |
| CCP-3-3 | 6.00% | $\varepsilon_{\parallel}$ | 3.3 |
| CCPC-33 | 3.00% | $\varepsilon_{\perp}$ | 6.3 |
| CCY-3-1 | 3.50% | $\gamma_1$ | 199 mPa · s |
| CCY-3-O2 | 4.50% | $K_1$ | 18.8 |
| CCY-3-O3 | 6.00% | $K_3$ | 19.6 |
| CCY-4-O2 | 6.00% | $K_3/K_1$ | 1.04 |
| CCY-5-O2 | 5.00% | $V_0$ | 2.69 V |
| CPY-2-O2 | 10.50% | | |
| CPY-3-O2 | 6.50% | | |
| CY-3-O2 | 1.00% | | |
| PCH-3O2 | 4.00% | | |
| PY-2-O2 | 9.00% | | |

Polymerizable mixture P55 is prepared by adding 0.3% of compound MA2, 0.4% of compound MB4 and 0.6% of the SA additive SA23 to the nematic LC host mixture N32.

Example 56

The nematic LC host mixture N33 is formulated as follows

| | | | |
|---|---|---|---|
| BCH-32 | 3.00% | cl.p. | 109.8° C. |
| CCH-3O1 | 9.00% | Δn | 0.1020 |
| CCH-34 | 9.00% | $n_e$ | 1.5867 |
| CCH-35 | 2.50% | $n_o$ | 1.4847 |
| CCOC-4-3 | 3.00% | Δε | −3.0 |
| CCP-3-1 | 6.00% | $ε_{\|\|}$ | 3.3 |
| CCP-3-3 | 5.00% | $ε_⊥$ | 6.2 |
| CCY-3-1 | 3.00% | $γ_1$ | 204 mPa · s |
| CCY-3-O2 | 6.00% | $K_1$ | 18.4 |
| CCY-3-O3 | 6.00% | $K_3$ | 20.3 |
| CCY-4-O2 | 6.00% | $K_3/K_1$ | 1.10 |
| CCY-5-O2 | 6.00% | $V_0$ | 2.75 V |
| CPY-2-O2 | 10.00% | | |
| CPY-3-O2 | 8.50% | | |
| CY-3-O2 | 6.00% | | |
| PCH-3O2 | 11.00% | | |

Polymerizable mixture P56 is prepared by adding 0.4% of compound MA1, 0.2% of compound MB1, 0.6% of the SA additive SA23 and 50 ppm of the stabilizer S3-3 to the nematic LC host mixture N33.

Example 57

The nematic LC host mixture N34 is formulated as follows

| | | | |
|---|---|---|---|
| B(S)-2O-O5 | 2.00% | cl.p. | 74.3° C. |
| BCH-32 | 9.50% | Δn | 0.1080 |
| CC-3-V1 | 6.50% | $n_e$ | 1.5962 |
| CCH-3O1 | 8.50% | $n_o$ | 1.4882 |
| CCH-34 | 3.00% | Δε | −3.3 |
| CCP-3-1 | 9.50% | $ε_{\|\|}$ | 3.7 |
| CCY-3-O1 | 6.50% | $ε_⊥$ | 7.0 |
| CCY-5-O2 | 9.50% | $γ_1$ | 121 mPa · s |
| CLY-3-O2 | 1.00% | $K_1$ | 12.9 |
| CPY-3-O2 | 5.50% | $K_3$ | 15.9 |
| CY-3-O2 | 15.50% | $K_3/K_1$ | 1.23 |
| PCH-3O1 | 5.00% | $V_0$ | 2.31 V |
| PCH-3O2 | 6.50% | | |
| PY-2-O2 | 11.50% | | |

Polymerizable mixture P57 is prepared by adding 0.4% of compound MA2, 0.2% of compound MB1, 0.6% of the SA additive SA32 and 50 ppm of the stabilizer S3-1 to the nematic LC host mixture N34.

Example 58

The nematic LC host mixture N35 is formulated as follows

| | | | |
|---|---|---|---|
| BCH-32 | 6.50% | cl.p. | 74.7° C. |
| CC-3-V1 | 8.00% | Δn | 0.1039 |
| CCH-23 | 17.00% | Δε | −3.0 |
| CCH-34 | 6.50% | $ε_⊥$ | 3.4 |
| CCY-3-O1 | 3.50% | $K_3/K_1$ | 1.07 |
| CCY-3-O2 | 12.50% | $γ_1$ | 106 mPa · s |
| CPY-2-O2 | 5.50% | $V_0$ | 2.43 V |
| CPY-3-O2 | 10.00% | | |
| CY-3-O2 | 15.50% | | |
| PCH-3O1 | 4.50% | | |
| PP-1-2V1 | 5.00% | | |
| PY-3-O2 | 5.50% | | |

Polymerizable mixture P58 is prepared by adding 0.3% of compound MA1, 0.2% of compound MB5, 0.1% of compound MC1 and 150 ppm of the stabilizer S3-2 to the nematic LC host mixture N35.

Example 59

The nematic LC host mixture N36 is formulated as follows

| | | | |
|---|---|---|---|
| BCH-32 | 2.00% | cl.p. | 74.7° C. |
| CC-3-V | 22.50% | Δn | 0.1039 |
| CC-3-V1 | 9.50% | Δε | −3.0 |
| CCP-3-1 | 3.00% | $ε_{\|\|}$ | 3.5 |
| CCY-3-O2 | 3.50% | $K_3/K_1$ | 1.17 |
| CCY-4-O2 | 4.00% | $γ_1$ | 99 mPa · s |
| CPY-2-O2 | 12.00% | $V_0$ | 2.39 |
| CPY-3-O2 | 12.50% | | |
| CY-3-O2 | 15.50% | | |
| CY-3-O4 | 4.00% | | |
| PCH-3O1 | 7.00% | | |
| PP-1-2V1 | 1.50% | | |
| PYP-2-3 | 3.00% | | |

Polymerizable mixture P59 is prepared by adding 0.2% of compound MA2, 0.3% of compound MB2, 0.05% of compound MC1 and 150 ppm of the stabilizer S3-3 to the nematic LC host mixture N36.

Example 60

The nematic LC host mixture N37 is formulated as follows

| | | | |
|---|---|---|---|
| CY-3-O4 | 12.00% | cl.p. | 77° C. |
| PY-3-O2 | 9.00% | Δn | 0.0880 |
| CPY-3-O2 | 12.00% | Δε | −3.1 |
| CCOY-2-O2 | 8.00% | | |
| CCY-5-O2 | 10.00% | | |
| CC-3-V | 20.00% | | |
| CCH-32 | 30.00% | | |

Polymerizable mixture P60 is prepared by adding 0.3% of compound MA1, 0.3% of compound MB1, 0.6% of the SA additive SA23 and 50 ppm of the stabilizer S1-1 to the nematic LC host mixture N37.

Example 61

The nematic LC host mixture N38 is formulated as follows

| | | | |
|---|---|---|---|
| CY-3-O4 | 12.00% | cl.p. | 77° C. |
| PY-3-O2 | 9.00% | Δn | 0.0880 |
| CPY-3-O2 | 12.00% | Δε | −3.1 |
| CCOY-2-O2 | 8.00% | | |
| CCY-5-O2 | 10.00% | | |
| CC-3-V | 20.00% | | |
| CCH-32 | 30.00% | | |

Polymerizable mixture P61 is prepared by adding 0.2% of compound MA2, 0.3% of compound MB3, 0.1% of compound MC1 and 150 ppm of the stabilizer S1-1 to the nematic LC host mixture N38.

Example 62

The nematic LC host mixture N39 is formulated as follows

| | | | |
|---|---|---|---|
| CCH-32 | 10.00% | cl.p. | 86° C. |
| COY-3-O2 | 10.00% | Δn | 0.1050 |
| COY-3-O1 | 10.00% | Δε | −5.9 |
| CCOY-2-O2 | 9.00% | | |
| CCY-3-O1 | 7.00% | | |
| CCY-3-O2 | 6.00% | | |
| CCY-4-O2 | 6.00% | | |
| CPY-5-O2 | 8.00% | | |
| CPY-3-O1cpr | 10.00% | | |
| CPY-2-O2 | 10.00% | | |
| CY-3-O2 | 7.00% | | |
| CY-3-O4 | 7.00% | | |

Polymerizable mixture P62 is prepared by adding 0.2% of compound MA1, 0.2% of compound MB4, 0.1% of compound MC1 and 150 ppm of the stabilizer S3-3 to the nematic LC host mixture N39.

Example 63

The nematic LC host mixture N40 is formulated as follows

| | | | |
|---|---|---|---|
| CCH-32 | 11.00% | cl.p. | 79° C. |
| CC-3-V | 10.00% | Δn | 0.1120 |
| PP-5-O2 | 5.00% | Δε | −4.3 |
| COY-3-O2 | 8.00% | | |
| COY-3-O1 | 7.00% | | |
| CCOY-2-O2 | 13.00% | | |
| CPY-cp-O2 | 7.00% | | |
| CPY-3-O2 | 10.00% | | |
| CPY-2-O2 | 10.00% | | |
| PY-3-O2 | 10.00% | | |
| CCP-3-1 | 2.00% | | |
| CCP-V-1 | 4.00% | | |
| CCP-V2-1 | 4.00% | | |

Polymerizable mixture P63 is prepared by adding 0.2% of compound MA1, 0.1% of compound MC1 and 150 ppm of the stabilizer S3-2 to the nematic LC host mixture N40.

Example 64

The nematic LC host mixture N41 is formulated as follows

| | | | |
|---|---|---|---|
| CY-5-O2 | 11.00% | cl.p. | 60° C. |
| PY-3-O2 | 9.00% | Δn | 0.0970 |
| COY-3-O2 | 17.00% | Δε | −2.8 |
| B(S)-cp1O-O4 | 4.00% | | |
| PP-1-5 | 10.00% | | |
| CC-3-V1 | 26.00% | | |
| CCH-32 | 5.00% | | |
| CCP-3-1 | 12.00% | | |
| BCH-32 | 6.00% | | |

Polymerizable mixture P64 is prepared by adding 0.3% of compound MA1, 0.2% of compound MB1, 0.1% of the compound MC1 and 100 ppm of the stabilizer S3-3 to the nematic LC host mixture N41.

Example 65

The nematic LC host mixture N42 is formulated as follows

| | | | |
|---|---|---|---|
| CCH-23 | 16.50% | cl.p. | 75° C. |
| CCH-34 | 3.00% | Δn | 0.1120 |
| PCH-3O1 | 15.00% | Δε | −3.0 |
| PP-1-3 | 9.00% | | |
| BCH-32 | 8.00% | | |
| COY-3-O1 | 8.50% | | |
| CCOY-3-O2 | 17.00% | | |
| CPY-2-O2 | 6.50% | | |
| CPY-3-O2 | 8.00% | | |
| CPY-3-O4 | 8.50% | | |

Polymerizable mixture P65 is prepared by adding 0.3% of compound MA1, 0.2% of compound MB1, 0.1% of compound MC1 and 150 ppm of the stabilizer S1-1 to the nematic LC host mixture N42.

Example 66

The nematic LC host mixture N43 is formulated as follows

| | | | |
|---|---|---|---|
| CCH-23 | 12.00% | cl.p. | 111° C. |
| CCH-34 | 8.00% | Δn | 0.0970 |
| CCH-35 | 7.00% | Δε | −3.1 |
| PCH-3O1 | 8.00% | | |
| CCP-3-1 | 7.00% | | |
| CCP-3-3 | 4.00% | | |
| BCH-32 | 5.00% | | |
| CCOY-2-O2 | 15.00% | | |
| CCOY-3-O2 | 15.00% | | |
| CPY-2-O2 | 5.00% | | |
| CPY-3-O2 | 5.00% | | |
| CPY-3-O3 | 5.00% | | |
| CPY-3-O4 | 4.00% | | |

Polymerizable mixture P66 is prepared by adding 0.4% of compound MA1, 0.2% of compound MB1 and 150 ppm of the stabilizer S2-1 to the nematic LC host mixture N43.

Example 67

The nematic LC host mixture N44 is formulated as follows

| | | | |
|---|---|---|---|
| CC-3-V | 32.00% | cl.p. | 74° C. |
| PP-1-3 | 11.00% | Δn | 0.1040 |
| CCP-3-1 | 8.00% | Δε | −2.9 |
| CY-5-O2 | 2.00% | | |
| COY-3-O1 | 11.50% | | |
| CCY-3-O2 | 11.50% | | |
| CPY-2-O2 | 7.00% | | |
| CPY-3-O2 | 8.00% | | |
| CPY-3-O4 | 9.00% | | |

Polymerizable mixture P67 is prepared by adding 0.2% of compound MA2, 0.3% of compound MB2 and 150 ppm of the stabilizer S3-2 to the nematic LC host mixture N44.

Example 68

The nematic LC host mixture N45 is formulated as follows

| | | | |
|---|---|---|---|
| CCH-23 | 21.50% | cl.p. | 75° C. |
| CCH-34 | 9.50% | Δn | 0.1030 |
| PP-1-3 | 13.50% | Δε | −2.8 |
| CCP-3-1 | 6.00% | | |
| COY-3-O1 | 11.50% | | |
| CCOY-3-O2 | 14.00% | | |
| CPY-2-O2 | 7.00% | | |
| CPY-3-O2 | 8.00% | | |
| CPY-3-O4 | 9.00% | | |

Polymerizable mixture P68 is prepared by adding 0.3% of compound MA1, 0.2% of compound MB3, 0.05% of compound MC1 and 150 ppm of the stabilizer S3-3 to the nematic LC host mixture N45.

Example 69

The nematic LC host mixture N46 is formulated as follows

| | | | |
|---|---|---|---|
| CEY-3-O2 | 7.00% | cl.p. | 89° C. |
| CCY-3-O2 | 8.00% | Δn | 0.1150 |
| CCOY-3-O2 | 5.00% | Δε | −1.9 |
| CLY-2-O2 | 8.00% | | |
| CAIY-3-O2 | 3.00% | | |
| CAIY-5-O2 | 4.00% | | |
| PYP-2-3 | 7.00% | | |
| PYP-2-4 | 7.00% | | |
| CC-4-V | 15.00% | | |
| CC-3-V1 | 6.00% | | |
| CC-1-2V1 | 6.00% | | |
| CC-3-2V1 | 4.00% | | |
| PP-1-2V | 5.00% | | |
| PP-1-2V1 | 5.00% | | |
| CCP-3-1 | 6.00% | | |
| CBC-33F | 4.00% | | |

Polymerizable mixture P69 is prepared by adding 0.4% of compound MA1, 0.2% of compound MB1, 0.6% of the SA additive SA32 and 50 ppm of the stabilizer S3-1 to the nematic LC host mixture N46.

Example 70

The nematic LC host mixture N47 is formulated as follows

| | | | |
|---|---|---|---|
| B(S)-2O-O5 | 2.00% | cl.p. | 74° C. |
| BCH-32 | 9.50% | Δn | 0.1080 |
| CCP-3-1 | 9.50% | Δε | −3.6 |
| CCY-3-O1 | 6.50% | | |
| CCY-5-O2 | 9.50% | | |
| CLY-3-O2 | 1.00% | | |
| CPY-3-O2 | 5.50% | | |
| CC-3-V1 | 6.50% | | |
| CCH-3O1 | 8.50% | | |
| CCH-34 | 3.00% | | |
| COY-3-O2 | 15.50% | | |
| PCH-3O1 | 5.00% | | |
| PCH-3O2 | 6.50% | | |
| PY-2-O2 | 11.50% | | |

Polymerizable mixture P70 is prepared by adding 0.3% of compound MA1, 0.2% of compound MB1, 0.6% of the SA additive SA32 and 50 ppm of the stabilizer S2-1 to the nematic LC host mixture N47.

Example 71

The nematic LC host mixture N48 is formulated as follows

| | | | |
|---|---|---|---|
| B(S)-2O-O4 | 4.00% | cl.p. | 75° C. |
| B(S)-2O-O5 | 4.00% | Δn | 0.1140 |
| BCH-32 | 7.50% | $n_e$ | 1.6060 |
| CC-3-V | 25.75% | $n_o$ | 1.4920 |
| CC-3-V1 | 10.00% | Δε | −2.6 |
| CCP-3-1 | 13.00% | $\varepsilon_{\parallel}$ | 3.6 |
| CCP-3-3 | 3.25% | $\varepsilon_{\perp}$ | 6.1 |
| CLY-3-O2 | 2.00% | $K_1$ | 13.7 |
| CPY-2-O2 | 9.50% | $K_3$ | 14.2 |
| PY-2-O2 | 11.00% | | |
| PY-2-O1 | 10.00% | | |

Polymerizable mixture P71 is prepared by adding 0.4% of compound MA1, 0.3% of compound MB1, 0.6% of the SA additive SA32 and 50 ppm of the stabilizer S3-3 to the nematic LC host mixture N48.

Example 72

The nematic LC host mixture N49 is formulated as follows

| | | | |
|---|---|---|---|
| BCH-32 | 7.50% | cl.p. | 75.5° C. |
| CC-3-V1 | 6.50% | Δn | 0.1105 |
| CCH-34 | 8.00% | $n_e$ | 1.5970 |
| CCH-35 | 8.00% | $n_o$ | 1.4865 |
| CCY-3-O2 | 12.00% | Δε | −3.3 |
| CPY-2-O2 | 9.50% | $\varepsilon_{\parallel}$ | 3.5 |
| CPY-3-O2 | 11.00% | $\varepsilon_{\perp}$ | 6.8 |
| CY-3-O2 | 12.00% | $\gamma_1$ | 130 mPa · s |
| CY-5-O2 | 13.00% | $K_1$ | 14.2 |
| PCH-3O1 | 4.00% | $K_3$ | 15.4 |
| PP-1-4 | 8.50% | $K_3/K_1$ | 1.08 |
| | | $V_0$ | 2.28 V |

Polymerizable mixture P72 is prepared by adding 0.2% of compound MA1 and 0.2% of compound MB1 to the nematic LC host mixture N49.

Example 73

Polymerizable mixture P73 is prepared by adding 0.2% of compound MA1, 0.3% of compound MB1, 0.05% of compound MC2 of formula IC1 and 150 ppm of the stabilizer S1-1 to the nematic LC host mixture N1.

MC2

(formula IC1)

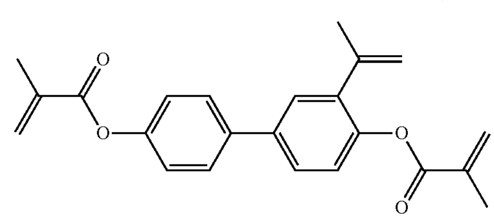

Example 74

Polymerizable mixture P74 is prepared by adding 0.1% of compound MA1, 0.3% of compound MB2, 0.05% of compound MC2 and 100 ppm of the stabilizer S1-1 to the nematic LC host mixture N1.

Example 75

Polymerizable mixture P75 is prepared by adding 0.2% of compound MA2, 0.1% of compound MC2 and 100 ppm of the stabilizer S1-1 to the nematic LC host mixture N1.

Example 76

Polymerizable mixture P76 is prepared by adding 0.2% of compound MA1, 0.3% of compound MB1, 0.05% of the compound MC3 of formula IC13 and 150 ppm of the stabilizer S1-1 to the nematic LC host mixture N3.

MC3

(formula IC13)

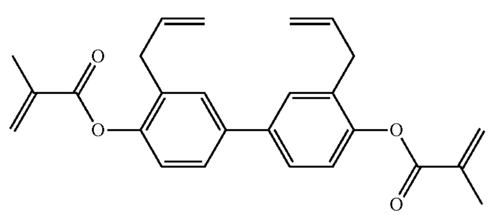

Example 77

Polymerizable mixture P77 is prepared by adding 0.2% of compound MA2, 0.2% of compound MB2, 0.1% of compound MC2 and 100 ppm of the stabilizer S1-1 to the nematic LC host mixture N1.

Example 78

Polymerizable mixture P76 is prepared by adding 0.2% of compound MA1, 0.3% of compound MB1, 0.05% of the compound MC4 of formula IC22 and 100 ppm of the stabilizer S1-1 to the nematic LC host mixture N3.

MC4

(formula IC22)

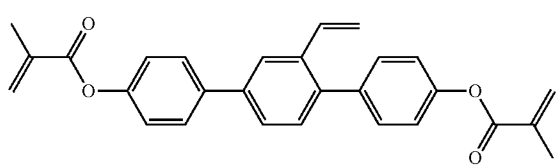

Example 79

Polymerizable mixture P79 is prepared by adding 0.2% of compound MA1, 0.1% of the compound MC5 of formula IC23 and 150 ppm of the stabilizer S1-1 to the nematic LC host mixture N1.

MC5

(formula IC23)

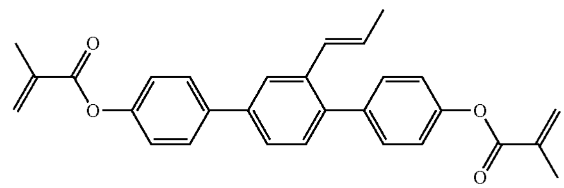

Example 80

Polymerizable mixture P80 is prepared by adding 0.1% of compound MA2, 0.3% of compound MB2, 0.05% of compound MC5 and 100 ppm of the stabilizer S1-1 to the nematic LC host mixture N1.

Example 81

Polymerizable mixture P81 is prepared by adding 0.2% of compound MA1, 0.3% of compound MB1, 0.05% of the compound MC6 of formula IC25 and 150 ppm of the stabilizer S1-1 to the nematic LC host mixture N3.

MC6

(formula IC25)

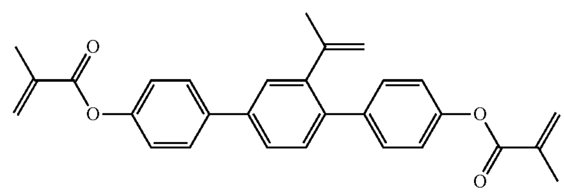

Example 82

Polymerizable mixture P82 is prepared by adding 0.2% of compound MA2, 0.2% of compound MB4, 0.05% of compound MC6 and 150 ppm of the stabilizer S1-1 to the nematic LC host mixture N1.

Example 83

Polymerizable mixture P83 is prepared by adding 0.2% of compound MA1, 0.1% of compound MC6 and 150 ppm of the stabilizer S1-1 to the nematic LC host mixture N3.

Example 84

The nematic LC host mixture N50 is formulated as follows

| | | | |
|---|---|---|---|
| B(S)-2O-O5 | 3.20% | cl.p. | 74.6° C. |
| CC-3-V | 15.00% | Δn | 0.1047 |
| CC-3-V1 | 7.80% | $n_e$ | 1.5888 |
| CC-4-V1 | 15.80% | $n_o$ | 1.4841 |
| CCH-34 | 1.00% | Δε | −3.8 |
| CCY-3-O1 | 8.00% | $ε_{\parallel}$ | 3.7 |
| CCY-3-O2 | 11.00% | $ε_{\perp}$ | 7.5 |
| CCY-4-O2 | 7.00% | $γ_1$ | 99 mPa · s |

-continued

| | | | |
|---|---|---|---|
| CLY-3-O2 | 4.40% | $K_1$ | 14.6 |
| PY-2-O2 | 10.00% | $K_3$ | 15.1 |
| PY-3-O2 | 15.80% | $V_0$ | 2.10 V |
| PYP-2-3 | 1.00% | | |

Polymerizable mixture P84 is prepared by adding 0.2% of compound MA1, 0.3% of compound MB1, 150 ppm of the stabilizer S1-1 and 10 ppm of the stabilizer Irganox®1076 to 99.484% of the nematic LC host mixture N50.

Example 85

The nematic LC host mixture N51 is formulated as follows

| | | | |
|---|---|---|---|
| B(S)-2O-O4 | 1.00% | cl.p. | 75.0° C. |
| B(S)-2O-O5 | 5.00% | Δn | 0.1047 |
| CC-3-V | 22.40% | $n_e$ | 1.5887 |
| CC-3-V1 | 7.80% | $n_o$ | 1.4842 |
| CC-4-V1 | 5.00% | Δε | −3.8 |
| CCH-34 | 5.80% | ε∥ | 3.7 |
| CCY-3-O1 | 8.00% | $ε_⊥$ | 7.5 |
| CCY-3-O2 | 11.00% | $γ_1$ | 94 mPa · s |
| CCY-4-O2 | 4.00% | $K_1$ | 14.8 |
| CLY-3-O2 | 6.40% | $K_3$ | 14.9 |
| PY-2-O2 | 8.00% | $V_0$ | 2.08 V |
| PY-3-O2 | 13.60% | | |
| PYP-2-3 | 2.00% | | |

Polymerizable mixture P85 is prepared by adding 0.2% of compound MA1, 0.3% of compound MB1, 150 ppm of the stabilizer S1-1 and 10 ppm of the stabilizer Irganox®1076 to 99.484% of the nematic LC host mixture N51.

Example 86

The nematic LC host mixture N52 is formulated as follows

| | | | |
|---|---|---|---|
| B(S)-2O-O5 | 1.00% | cl.p. | 75.4° C. |
| BCH-32 | 2.00% | Δn | 0.1159 |
| CC-3-V | 15.00% | $n_e$ | 1.6046 |
| CC-3-V1 | 7.80% | $n_o$ | 1.4887 |
| CC-4-V1 | 17.20% | Δε | −2.7 |
| CCP-3-1 | 10.80% | ε∥ | 3.5 |
| CLY-3-O2 | 1.00% | $ε_⊥$ | 6.2 |
| CPY-2-O2 | 6.20% | $γ_1$ | 87 mPa · s |
| CPY-3-O2 | 14.00% | $K_1$ | 14.5 |
| PY-1-O2 | 10.00% | $K_3$ | 15.6 |
| PY-2-O2 | 10.00% | $V_0$ | |
| PY-3-O2 | 5.00% | | |

Polymerizable mixture P86 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N52.

Example 87

The nematic LC host mixture N53 is formulated as follows

| | | | |
|---|---|---|---|
| B(S)-2O-O4 | 2.00% | cl.p. | 76.3° C. |
| B(S)-2O-O5 | 4.00% | Δn | 0.1151 |
| BCH-32 | 7.80% | $n_e$ | 1.6045 |
| CC-3-V | 27.00% | $n_o$ | 1.4894 |
| CC-3-V1 | 7.90% | Δε | −2.6 |
| CC-4-V1 | 7.40% | ε∥ | 3.5 |
| CCP-3-1 | 6.40% | $ε_⊥$ | 6.1 |
| CLY-3-O2 | 4.00% | $γ_1$ | 80 mPa · s |
| CPY-3-O2 | 14.00% | $K_1$ | 14.7 |
| PY-1-O2 | 3.00% | $K_3$ | 15.3 |
| PY-2-O2 | 10.00% | | |
| PY-3-O2 | 6.50% | | |

Polymerizable mixture P87 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N53.

Example 88

The nematic LC host mixture N54 is formulated as follows

| | | | |
|---|---|---|---|
| B(S)-2O-O4 | 2.00% | cl.p. | 74.6° C. |
| B(S)-2O-O5 | 3.00% | Δn | 0.1288 |
| BCH-32 | 3.80% | $n_e$ | 1.6246 |
| CC-3-V | 22.20% | $n_o$ | 1.4958 |
| CC-3-V1 | 7.90% | Δε | −2.8 |
| CCP-V-1 | 15.00% | ε∥ | 3.6 |
| CPY-2-O2 | 3.70% | $ε_⊥$ | 6.4 |
| CPY-3-O2 | 14.90% | $γ_1$ | 84 mPa · s |
| LY-3-O2 | 1.00% | $K_1$ | 14.4 |
| PP-1-2V1 | 5.90% | $K_3$ | 15.6 |
| PY-1-O2 | 10.00% | $V_0$ | 2.52 V |
| PY-2-O2 | 9.10% | | |
| PYP-2-3 | 1.50% | | |

Polymerizable mixture P88 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N54.

Example 89

Polymerizable mixture P89 is prepared by adding 0.2% of compound MA1, 0.3% of compound MB1, 150 ppm of the stabilizer S1-1 and 10 ppm of the stabilizer Irganox®1076 to 99.484% of the nematic LC host mixture N54.

Example 90

The nematic LC host mixture N55 is formulated as follows

| | | | |
|---|---|---|---|
| B(S)-2O-O4 | 2.00% | cl.p. | 74.7° C. |
| B(S)-2O-O5 | 4.00% | Δn | 0.1361 |
| CC-3-V | 20.50% | $n_e$ | 1.6338 |
| CC-3-V1 | 7.50% | $n_o$ | 1.4977 |
| CCP-V-1 | 15.00% | Δε | −3.1 |
| CPY-2-O2 | 8.00% | ε∥ | 3.7 |
| CPY-3-O2 | 12.00% | $ε_⊥$ | 6.8 |
| PP-1-2V1 | 10.00% | $γ_1$ | 91 mPa · s |
| PY-1-O2 | 11.00% | $K_1$ | 15.0 |
| PY-2-O2 | 4.50% | $K_3$ | 16.2 |
| PYP-2-3 | 2.50% | $V_0$ | 2.40 V |

Polymerizable mixture P90 is prepared by adding 0.2% of compound MA1, 0.3% of compound MB1, 150 ppm of the stabilizer S1-1 and 10 ppm of the stabilizer Irganox®1076 to 99.484% of the nematic LC host mixture N55.

Example 91

Polymerizable mixture P91 is prepared by adding 0.94% of the chiral dopant S-4011 to 99.06% of the polymerizable mixture P90.

Example 92

The nematic LC host mixture N56 is formulated as follows

| | | | |
|---|---|---|---|
| B(S)-2O-O4 | 2.00% | cl.p. | 75.8° C. |
| B(S)-2O-O5 | 4.20% | Δn | 0.1366 |
| BCH-32 | 4.40% | $n_e$ | 1.6329 |
| CC-3-V | 19.00% | $n_o$ | 1.4963 |
| CC-3-V1 | 7.80% | Δε | −3.1 |
| CC-4-V1 | 2.80% | ε\|\| | 3.6 |
| CCP-3-1 | 6.80% | $\varepsilon_\perp$ | 6.7 |
| CPY-2-O2 | 11.00% | $\gamma_1$ | 98 mPa · s |
| CPY-3-O2 | 14.00% | $K_1$ | 15.5 |
| PP-1-2V1 | 10.00% | $K_3$ | 16.1 |
| PY-2-O2 | 10.00% | $V_0$ | 2.43 V |
| PY-3-O2 | 7.00% | | |
| PYP-2-3 | 1.00% | | |

Polymerizable mixture P92 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N56.

Example 93

Polymerizable mixture P93 is prepared by adding 0.89% of the chiral dopant S-4011 to 99.11% of the polymerizable mixture P92.

Example 94

The nematic LC host mixture N57 is formulated as follows

| | | | |
|---|---|---|---|
| B(S)-2O-O4 | 2.00% | cl.p. | 7548° C. |
| B(S)-2O-O5 | 4.10% | Δn | 0.1360 |
| BCH-32 | 4.20% | $n_e$ | 1.6319 |
| CC-3-V | 19.00% | $n_o$ | 1.4959 |
| CC-3-V1 | 7.80% | Δε | −3.1 |
| CC-4-V1 | 2.80% | ε\|\| | 3.6 |
| CCP-3-1 | 7.00% | $\varepsilon_\perp$ | 6.7 |
| CPY-2-O2 | 10.80% | $\gamma_1$ | 97 mPa · s |
| CPY-3-O2 | 14.00% | $K_1$ | 15.6 |
| LY-3-O2 | 1.00% | $K_3$ | 16.1 |
| PP-1-2V1 | 10.00% | $V_0$ | 2.43 V |
| PY-2-O2 | 10.00% | | |
| PY-3-O2 | 6.30% | | |
| PYP-2-3 | 1.00% | | |

Polymerizable mixture P94 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N57.

Example 95

Polymerizable mixture P95 is prepared by adding 0.91% of the chiral dopant S-4011 to 99.09% of the polymerizable mixture P94.

Example 96

The nematic LC host mixture N58 is formulated as follows

| | | | |
|---|---|---|---|
| B(S)-cp1O-O2 | 1.00% | cl.p. | 74.6° C. |
| B(S)-2O-O5 | 5.00% | Δn | 0.1043 |
| CC-3-V | 22.40% | Δε | −3.7 |
| CC-3-V1 | 7.80% | ε\|\| | 3.7 |
| CC-4-V1 | 5.00% | $\varepsilon_\perp$ | 7.4 |
| CCH-34 | 5.80% | $\gamma_1$ | 97 mPa · s |
| CCY-3-O1 | 8.00% | | |
| CCY-3-O2 | 11.00% | | |
| CCY-4-O2 | 4.00% | | |
| CLY-3-O2 | 6.40% | | |
| PY-2-O2 | 8.00% | | |
| PY-3-O2 | 13.60% | | |
| PYP-2-3 | 2.00% | | |

Polymerizable mixture P96 is prepared by adding 0.2% of compound MA1, 0.3% of compound MB1, 150 ppm of the stabilizer S1-1 and 10 ppm of the stabilizer Irganox®1076 to 99.484% of the nematic LC host mixture N58.

Example 97

The nematic LC host mixture N59 is formulated as follows

| | | | |
|---|---|---|---|
| B(S)-2O-O4 | 2.00% | cl.p. | 76.1° C. |
| B(S)-cpr1O-O4 | 4.00% | Δn | 0.1149 |
| BCH-32 | 7.80% | Δε | −2.5 |
| CC-3-V | 27.00% | ε\|\| | 3.5 |
| CC-3-V1 | 7.90% | $\varepsilon_\perp$ | 6.0 |
| CC-4-V1 | 7.40% | $\gamma_1$ | 83 mPa · s |
| CCP-3-1 | 6.40% | | |
| CLY-3-O2 | 4.00% | | |
| CPY-3-O2 | 14.00% | | |
| PY-1-O2 | 3.00% | | |
| PY-2-O2 | 10.00% | | |
| PY-3-O2 | 6.50% | | |

Polymerizable mixture P97 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N59.

Example 98

The nematic LC host mixture N60 is formulated as follows

| | | | |
|---|---|---|---|
| B(S)-2O-O5 | 1.00% | cl.p. | 75.1° C. |
| BCH-32 | 2.00% | Δn | 0.1156 |
| CC-3-V | 15.00% | Δε | −2.6 |
| CC-3-V1 | 7.80% | ε\|\| | 3.5 |
| CC-4-V1 | 17.20% | $\varepsilon_\perp$ | 6.1 |
| CCP-3-1 | 10.80% | $\gamma_1$ | 89 mPa · s |
| CLY-cp-O2 | 1.00% | | |
| CPY-2-O2 | 6.20% | | |
| CPY-3-O2 | 14.00% | | |
| PY-1-O2 | 10.00% | | |
| PY-2-O2 | 10.00% | | |
| PY-3-O2 | 5.00% | | |

Polymerizable mixture P98 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N60.

Example 99

The nematic LC host mixture N61 is formulated as follows

| | | | |
|---|---|---|---|
| B(S)-cp1O-O2 | 2.00% | cl.p. | 75.4° C. |
| B(S)-2O-O5 | 4.20% | Δn | 0.1362 |
| BCH-32 | 4.40% | Δε | −3.0 |
| CC-3-V | 19.00% | ε∥ | 3.6 |
| CC-3-V1 | 7.80% | $ε_⊥$ | 6.6 |
| CC-4-V1 | 2.80% | $γ_1$ | 101 mPa · s |
| CCP-3-1 | 6.80% | | |
| CPY-2-O2 | 11.00% | | |
| CPY-3-O2 | 14.00% | | |
| PP-1-2V1 | 10.00% | | |
| PY-2-O2 | 10.00% | | |
| PY-3-O2 | 7.00% | | |
| PYP-2-3 | 1.00% | | |

Polymerizable mixture P99 is prepared by adding 0.2% of compound MA1, 0.3% of compound MB1, 0.05% of compound MC1, 150 ppm of the stabilizer S1-1 and 10 ppm of the stabilizer Irganox®1076 to 99.434% of the nematic LC host mixture N61.

Example 100

Polymerizable mixture P100 is prepared by adding 0.92% of the chiral dopant S-4011 to 99.08% of the polymerizable mixture P99.

Example 101

The nematic LC host mixture N62 is formulated as follows

| | | | |
|---|---|---|---|
| B(S)-2O-O4 | 4.00% | cl.p. | 74.5° C. |
| B(S)-2O-O5 | 5.00% | Δn | 0.1212 |
| B(S)-2O-O6 | 2.50% | Δε | −2.5 |
| CC-3-V | 39.50% | $γ_1$ | 61 mPa · s |
| CC-3-V1 | 3.00% | $K_1$ | 14.6 |
| CCY-3-O2 | 6.00% | $K_3$ | 14.8 |
| CPY-2-O2 | 9.50% | $V_0$ | 2.56 V |
| CPY-3-O2 | 11.50% | | |
| LY-3-O2 | 2.00% | | |
| PP-1-2V1 | 13.50% | | |
| PYP-2-3 | 3.50% | | |

Polymerizable mixture P101 is prepared by adding 0.2% of compound MA1, 0.4% of compound MB1 and 150 ppm of the stabilizer S1-1 to the nematic LC host mixture N62.

Example 102

The nematic LC host mixture N63 is formulated as follows

| | | | |
|---|---|---|---|
| B(S)-2O-O4 | 4.00% | cl.p. | 73.6° C. |
| B(S)-2O-O5 | 5.00% | Δn | 0.1184 |
| B(S)-2O-O6 | 2.50% | | |
| BCH-32 | 3.00% | Δε | −2.3 |
| CC-3-V | 38.50% | $γ_1$ | 57 mPa · s |
| CC-3-V1 | 8.00% | $K_1$ | 14.3 |
| CPY-2-O2 | 12.00% | $K_3$ | 14.2 |
| CPY-3-O2 | 12.00% | $V_0$ | 2.62 V |
| LY-3-O2 | 0.50% | | |
| PP-1-2V1 | 10.50% | | |
| PY-2-O2 | 2.50% | | |
| PYP-2-3 | 1.50% | | |

Polymerizable mixture P102 is prepared by adding 0.2% of compound MA1, 0.4% of compound MB1 and 150 ppm of the stabilizer S1-1 to the nematic LC host mixture N63.

Example 103

The nematic LC host mixture N64 is formulated as follows

| | | | |
|---|---|---|---|
| B(S)-2O-O4 | 4.00% | cl.p. | 73.5° C. |
| B(S)-2O-O5 | 5.00% | Δn | 0.1210 |
| B(S)-2O-O6 | 2.50% | Δε | −2.3 |
| CC-3-V | 39.50% | $γ_1$ | 65 mPa · s |
| CC-3-V1 | 3.00% | | |
| CCY-3-O2 | 6.00% | | |
| CPY-2-O2 | 9.50% | | |
| CPY-3-O2 | 11.50% | | |
| LY-cp1-O2 | 2.00% | | |
| PP-1-2V1 | 13.50% | | |
| PYP-2-3 | 3.50% | | |

Polymerizable mixture P103 is prepared by adding 0.2% of compound MA1, 0.4% of compound MB1 and 150 ppm of the stabilizer S1-1 to the nematic LC host mixture N64.

Example 104

The nematic LC host mixture N65 is formulated as follows

| | | | |
|---|---|---|---|
| B(S)-2O-O4 | 4.00% | cl.p. | 74.0° C. |
| B(S)-cp1O-O4 | 5.00% | Δn | 0.1208 |
| B(S)-cp1O-O1 | 2.50% | Δε | 2.4 |
| CC-3-V | 39.50% | $γ_1$ | 64 mPa · s |
| CC-3-V1 | 3.00% | | |
| CCY-3-O2 | 6.00% | | |
| CPY-2-O2 | 9.50% | | |
| CPY-3-O2 | 11.50% | | |
| LY-3-O2 | 2.00% | | |
| PP-1-2V1 | 13.50% | | |
| PYP-2-3 | 3.50% | | |

Polymerizable mixture P104 is prepared by adding 0.2% of compound MA1, 0.4% of compound MB1 and 150 ppm of the stabilizer S1-1 to the nematic LC host mixture N65.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal medium comprising:

one or more polymerizable compounds selected from formula IA-1 to IA-10, and one or more polymerizable compounds selected from formulae IB-D, IB-T, and IC-1 to IC-9

IA-1
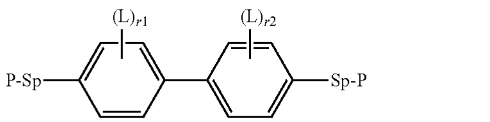
IA-2
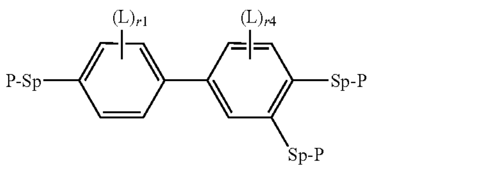
IA-3
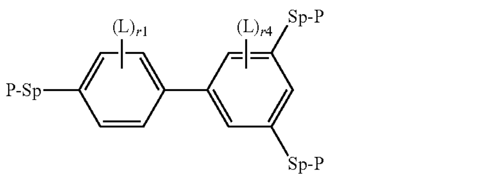
IA-4
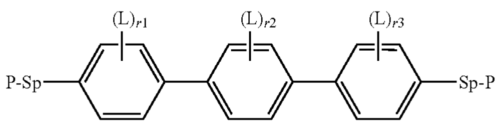
IA-5
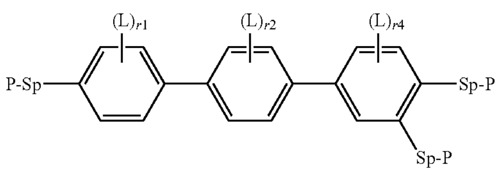
IA-6
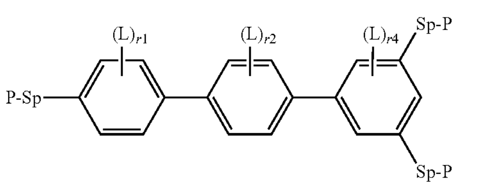
IA-7
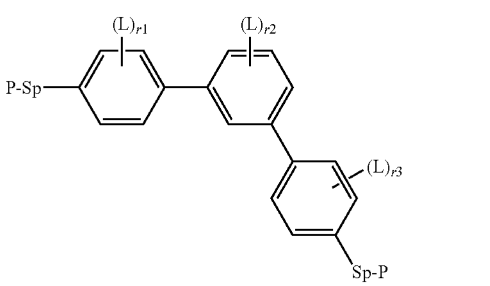
IA-8
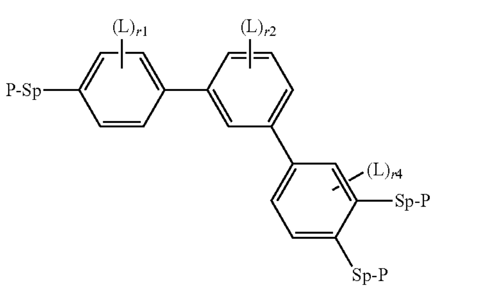
-continued
IA-9
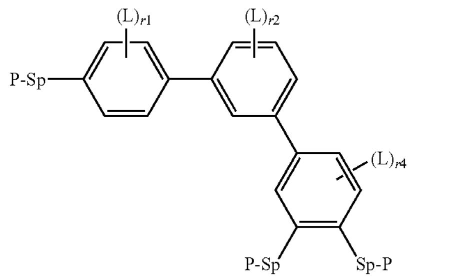
IA-10
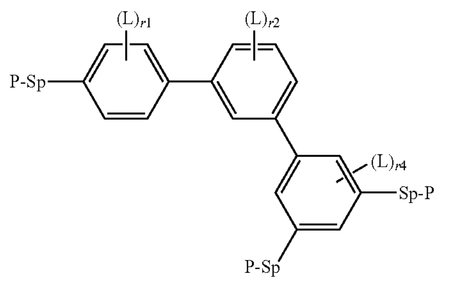
IB-D
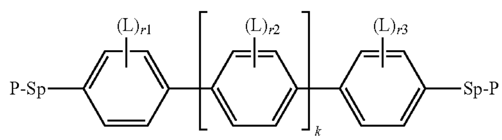
IB-T
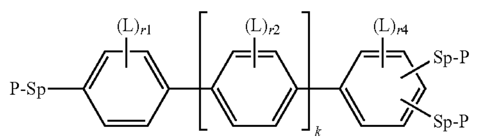
IC-1
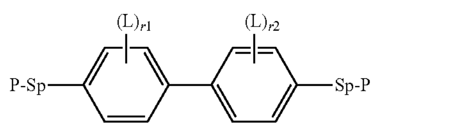
IC-2
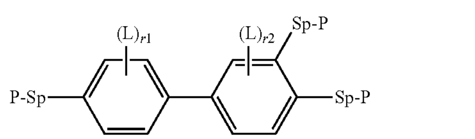
IC-3
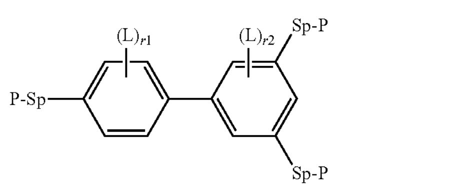
IC-4
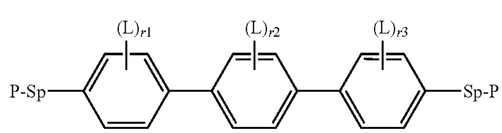

-continued

IC-5

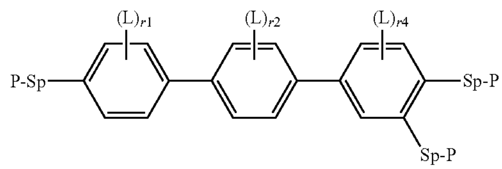

IC-6

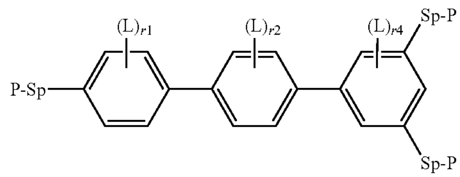

IC-7

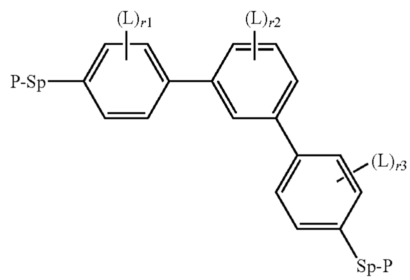

IC-8

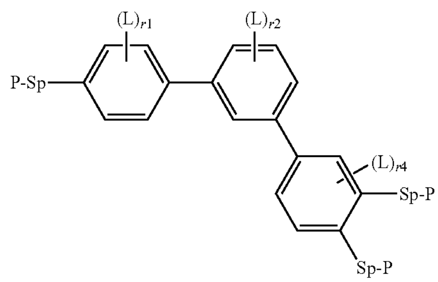

IC-9

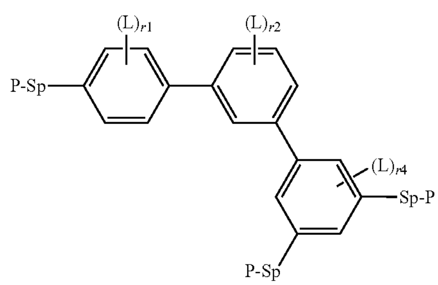

wherein the individual radicals, independently of each other and on each occurrence identically or differently, have the following meanings P acrylate or methacrylate group, Sp a single bond, or —$(CH_2)_2$—, —$(CH_2)_3$—, or —$(CH_2)_4$—, or —O—$(CH_2)_2$—, —O—$(CH_2)_3$—, —O—CO—$(CH_2)_2$, or —CO—O—$(CH)_2$— wherein the O atom or the CO group is attached to a benzene ring, L F, Cl, —CN, or straight chain alkyl having 1 to 25 C atoms, branched alkyl having 3 to 25 C atoms, or cyclic alkyl having 3 to 25 C atoms, wherein one or more non-adjacent $CH_2$-groups are each optionally replaced by —O—, —S—, —CO—, —CO—O—, —O—CO—, —O—CO—O— in such a manner that O- and/or S-atoms are not directly connected with each other, and wherein one or more H atoms are each optionally replaced by P, F or Cl, r1, r2, and r3 independently of each other 0, 1, 2, 3 or 4, r4 0, 1, 2 or 3, k 0 or 1, wherein in the compounds of formulae IC-1 to IC-9 at least one of the phenylene groups is monosubstituted with $L^b$, wherein the compounds of formulae IA-1 to IA-10 contain at least one spacer group Sp that is at least monosubstituted with $L^a$ and/or at least one group L that denotes $L^a$, $L^a$ —C($R^{aa}$)($R^{bb}$)OH, $L^b$ straight-chain or branched alkenyl with 3 to 7 C atoms, and $R^{aa}$, $R^{bb}$ straight-chain alkyl with 1 to 6 C atoms; and one or more compounds of formula II:

II

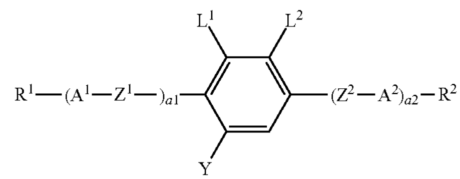

wherein the individual radicals, independently of each other and on each occurrence identically or differently, have the following meanings $R^1$ and $R^2$ straight chain alkyl having 1 to 25 C atoms, branched alkyl having 3 to 25 C atoms, or cyclic alkyl having 3 to 25 C atoms, wherein one or more non-adjacent $CH_2$-groups are each optionally replaced by —O—, —S—, —CO—, —CO—O—, —O—CO—, —O—CO—O—, $CR^0$═$CR^{00}$—, —C≡C—,

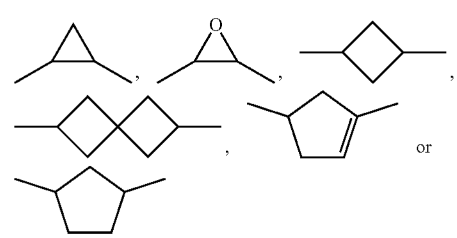

in such a manner that O- and/or S-atoms are not directly connected with each other, and wherein one or more H atoms are each optionally replaced by F or Cl, $R^0$ and $R^{00}$ H or alkyl with 1 to 12 C atoms, $A^1$ and $A^2$ a group selected from the following formulae:

A1

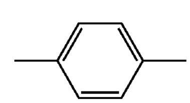

-continued

A2

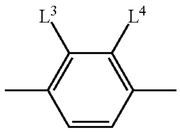

A3

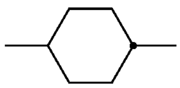

A4

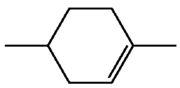

A5

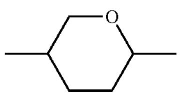

A6

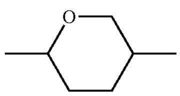

A7

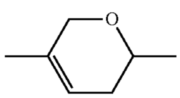

A8

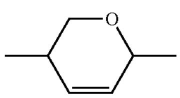

A9

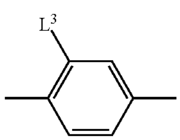

A10

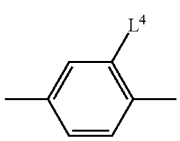

A11

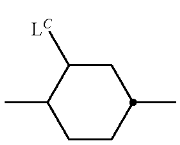

A12

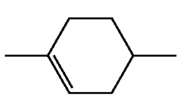

A13

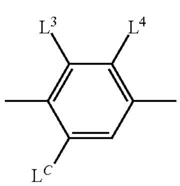

A14

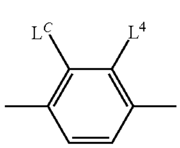

-continued

A15

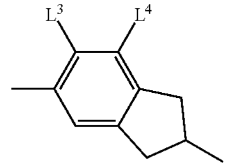

A16

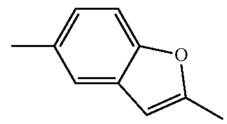

wherein the individual radicals, independently of each other and on each occurrence identically or differently, have the following meanings $Z^1$ and $Z^2$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, $L^1$, $L^2$, $L^3$ and $L^4$ F, Cl, $OCF_3$, $CF_3$, $CH_3$, $CH_2F$ or $CHF_2$, Y H, F, Cl, $CF_3$, $CHF_2$ or $CH_3$, $L^C$ $CH_3$ or $OCH_3$, a1 1 or 2, a2 0 or 1.

2. The liquid crystal medium according to claim 1, further comprising one or more compounds selected from the group consisting of compounds of the formulae IIA, IIB, IIC and IID:

IIA

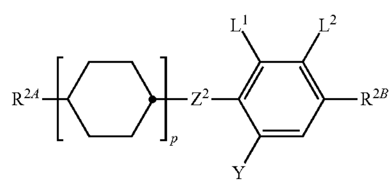

IIB

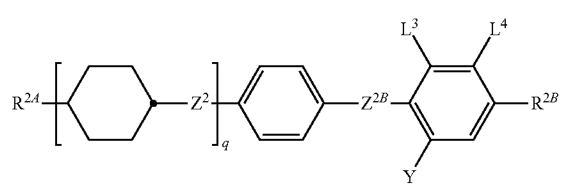

IIC

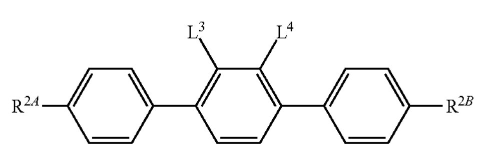

IID

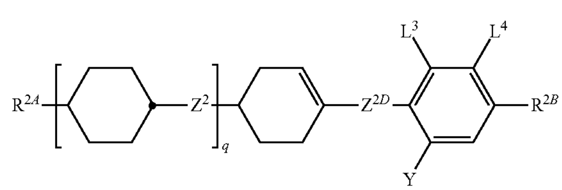

in which $R^{2A}$ and $R^{2B}$ each, independently of one another, denote H, alkyl having 1 to 15 C atoms, or alkenyl having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

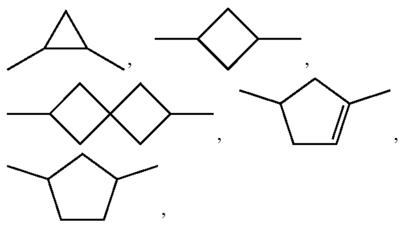

C≡C—, —$CF_2$O—, —O$CF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, $Z^2$, $Z^{2B}$ and $Z^{2D}$ each, independently of one another, denote a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF—, —CH═CHC$H_2$O—, p denotes 0, 1 or 2, and q on each occurrence, identically or differently, denotes 0 or 1.

3. The liquid crystal medium according claim 1, further comprising one or more compounds of formula III:

III

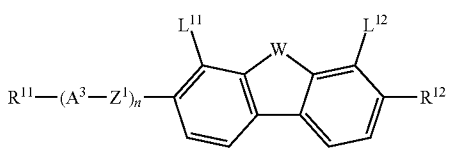

in which $R^{11}$ and $R^{12}$ each, independently of one another, denote H, an alkyl or alkoxy radical having 1 to 15 C atoms, where one or more $CH_2$ groups in these radicals may each be replaced, independently of one another, by

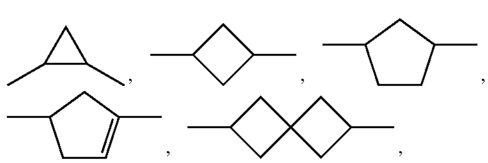

—C≡C—, —$CF_2$O—, —O$CF_2$—, —CH═CH—, by —O—, —CO—O— or —O—CO— in such a way that O atoms are not linked directly to one another, and in which, in addition, one or more H atoms may each be replaced by halogen, $A^3$ on each occurrence, independently of one another, denotes a) 1,4-cyclohexenylene or 1,4-cyclohexylene radical, in which one or two non-adjacent $CH_2$ groups may each be replaced by —O— or —S—, b) a 1,4-phenylene radical, in which one or two CH groups may each be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, $Z^1$ on each occurrence independently of one another denotes —CO—O—, —O—CO—, —$CF_2$O—, —O$CF_2$—, —$CH_2$O—, —O$CH_2$—, —$CH_2$—, —$CH_2CH_2$—, —$(CH_2)_4$—, —CH═CH—$CH_2$O—, —$C_2F_4$—, —$CH_2CF_2$—, —$CF_2CH_2$—, —CF═CF—, —CH═CF—, —CF=CH—, —CH═CH—, —C≡C— or a single bond, $L^{11}$ and $L^{12}$ each, independently of one another, denote F, Cl, $CF_3$ or $CHF_2$, and W denotes O or S.

4. The liquid crystal medium according to claim 1, further comprising one or more compounds of formula IV:

IV

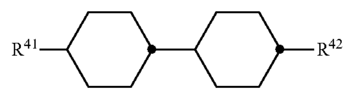

in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms or an unsubstituted alkoxy radical having 1 to 6 C atoms, an unsubstituted alkenyl radical having 2 to 7 C atoms.

5. The liquid crystal medium according to claim 1, further comprising one or more compounds of formula V:

V

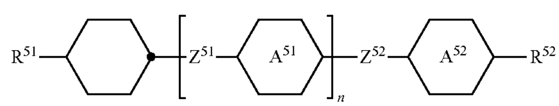

in which $R^{51}$ and $R^{52}$ independently of one another, denote alkyl having 1 to 7 C atoms,

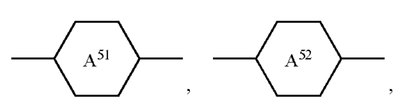

identically or differently, denote

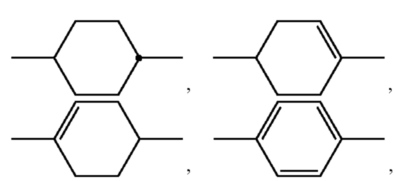

-continued

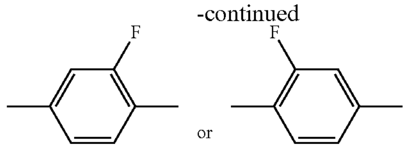

in which $Z^{51}$, $Z^{52}$ each, independently of one another, denote —$CH_2$—$CH_2$—, —$CH_2$—O—, —CH═CH—, —C≡C—, —COO— or a single bond, and n is 1 or 2.

6. The liquid crystal medium according to claim 1, further comprising one or more chiral dopants.

7. The liquid crystal medium according to claim 1, further comprising one or more additives selected from the group consisting of stabilizers, polymerization initiators and self alignment additives.

8. A process of preparing a liquid crystal medium according to claim 1, comprising: mixing one or more polymerizable compounds of formula IA and one or more polymerizable compounds of formulae IB and IC with one or more compounds of formula II, and optionally with further liquid-crystalline compounds and/or additives, and optionally polymerizing the polymerizable compounds.

9. A liquid crystal display comprising a liquid crystal medium as defined in claim 1.

10. The liquid crystal display according to claim 9, which is a PS-VA, PS-IPS, PS-FFS or SA-VA display.

11. The liquid crystal display according to claim 9, wherein said display comprises two substrates, at least one of which is transparent to light, an electrode provided on each substrate or two electrodes provided on only one of the substrates, and located between the substrates a layer of the liquid crystal medium, wherein the polymerizable compounds are polymerized between the substrates of the display by UV photopolymerization.

12. A process for the production of a liquid crystal display, comprising: providing a liquid crystal medium according to claim 1 between two display substrates wherein at least one of which the two substrates is transparent to light and an electrode is provided on each substrate or two electrodes are provided on only one of the substrates, and polymerizing the polymerizable compounds by irradiation with UV light.

13. Use of a liquid crystal medium according to claim 1 for an energy-saving liquid crystal display or an energy-saving liquid crystal display production process.

14. The liquid crystal medium according to claim 1, wherein in formula II:

$R^1$ and $R^2$ are each, independently, alkyl or alkoxy having 1 to 6 C atoms, $R^0$ and $R^{00}$ are each H, $Z^1$ and $Z^2$ are each a single bond, $L^1$, $L^2$, $L^3$ and $L^4$ are each F or Cl, Y is H or $CH_3$, and $L^C$ is $CH_3$.

15. The liquid crystal medium according to claim 4, wherein $R^{41}$ denotes an n-alkyl radical having 2, 3, 4 or 5 C atoms, and $R^{42}$ denotes an unsubstituted alkyl radical having 2 to 5 C atoms or an unsubstituted alkoxy radical having 2 to 5 C atoms, or an unsubstituted alkenyl radical having 2, 3 or 4 C atoms.

16. The liquid crystal medium according to claim 1, wherein said medium contains one or more compounds of formulae IA-1 to IA-10, one or more compounds selected from subformulae IB-D and IB-T, and one or more compounds selected from subformulae IC-1 to IC-9.

17. The liquid crystal medium according to claim 1, wherein said one or more polymerizable compounds selected from formula IA-1 to IA-10 are selected from the compounds of subformulae IA1 to IA19:

IA1

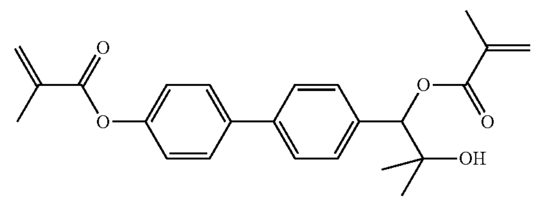

IA2

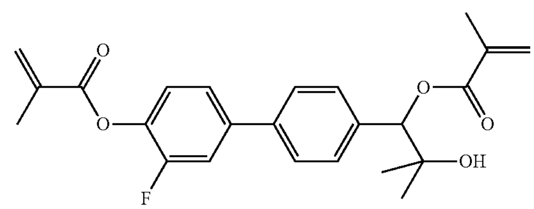

IA3

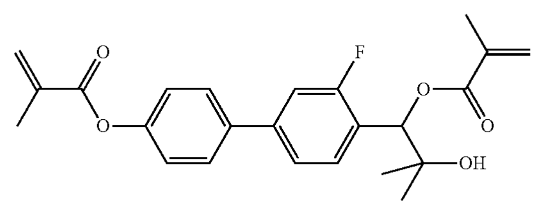

IA4

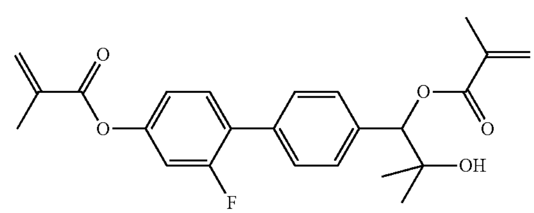

IA5

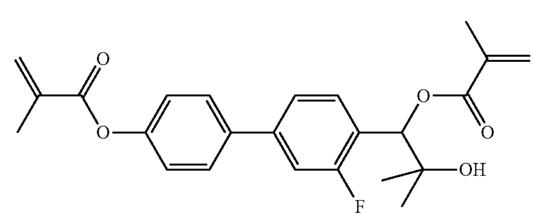

IA6

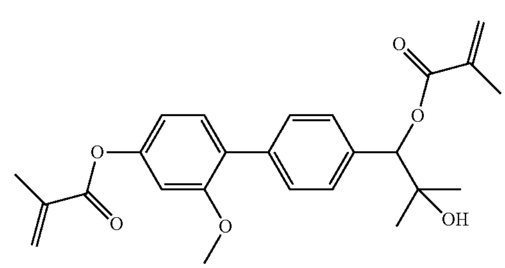

IA7
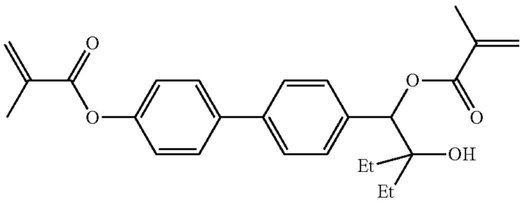
IA8
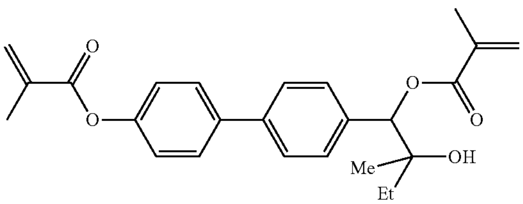
IA9
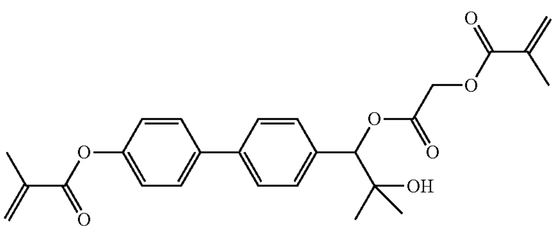
IA10
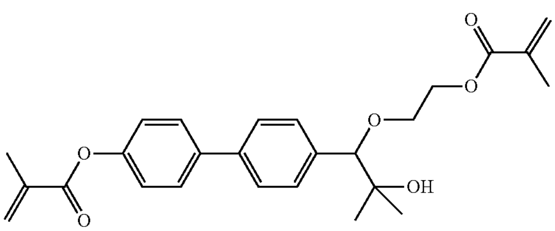
IA11
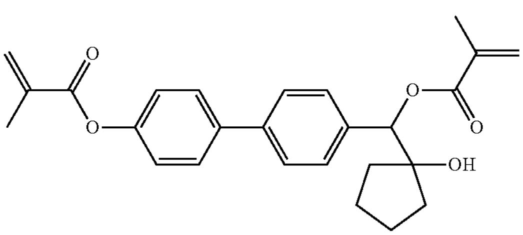
IA12
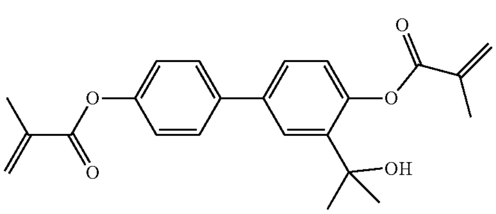
IA13
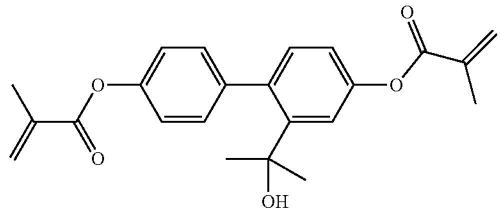
IA14
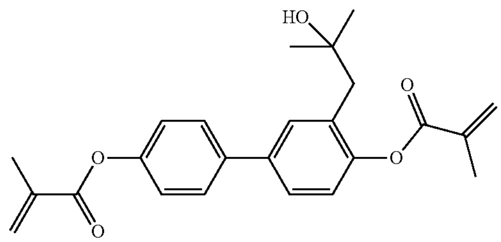
IA15
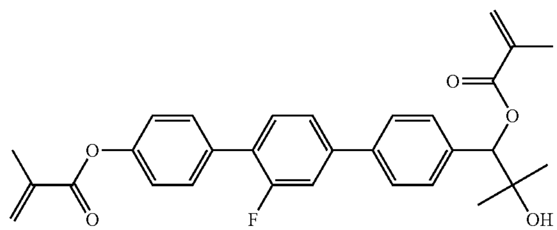
IA16
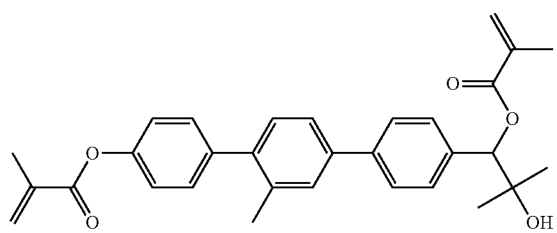
IA17
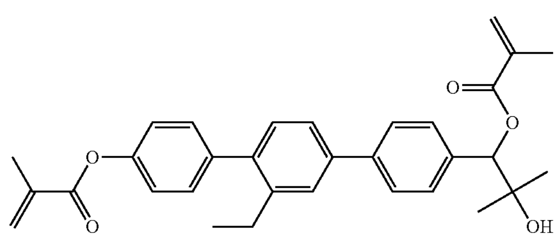
IA18
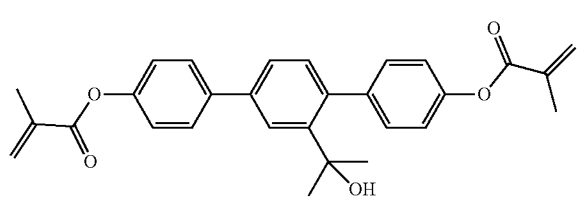

-continued

IA19

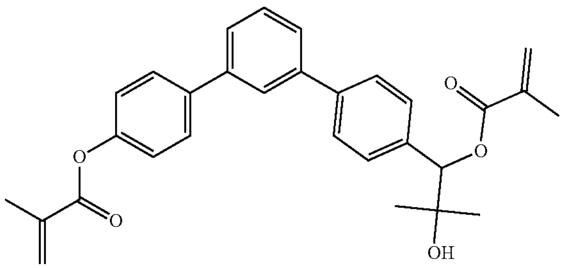

wherein Me is methyl and Et is ethyl.

18. The liquid crystal medium according to claim 1, wherein said medium contains one or more compounds selected from formula IB-T, and said one or more compounds of formula IB-T are selected from the following subformulae IB-T-1 to IB-T-6:

IB-T-1

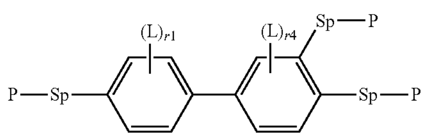

IB-T-2

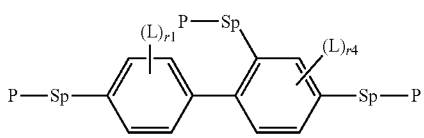

IB-T-3

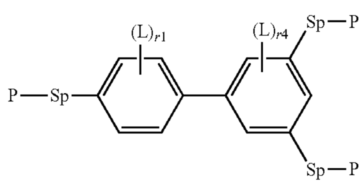

IB-T-4

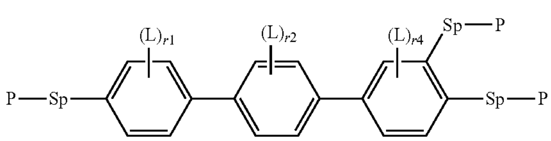

-continued

IB-T-5

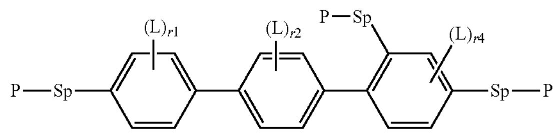

IB-T-6

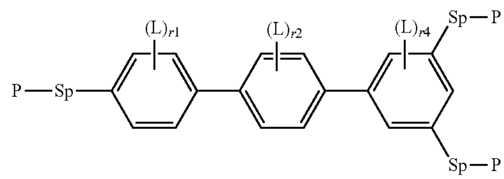

wherein

P is acrylate or methacrylate group,

Sp is a single bond, or —$(CH_2)_2$—, —$(CH_2)_3$—, or —$(CH_2)_4$—, or —O—$(CH_2)_2$—, —O—$(CH_2)_3$—, —O—CO—$(CH_2)_2$, or —CO—O—$(CH)_2$— wherein the O atom or the CO group is attached to a benzene ring, L is F, Cl, —CN, or straight chain alkyl having 1 to 25 C atoms, branched alkyl having 3 to 25 C atoms, or cyclic alkyl having 3 to 25 C atoms, wherein one or more non-adjacent $CH_2$-groups are each optionally replaced by —O—, —S—, —CO—, —CO—O—, —O—CO—, —O—CO—O— in such a manner that O- and/or S-atoms are not directly connected with each other, and wherein one or more H atoms are each optionally replaced by P, F or Cl, r1, r2, and r3 are independently of each other 0, 1, 2, 3 or 4, and r4 is 0, 1, 2 or 3.

19. The liquid crystal medium according to claim 17, wherein, in subformulae IB-T-1 to IB-T-6, at least one of r1, r2 and r4 is not 0, P is acrylate or methacrylate, and L is F, $CH_3$, $OCH_3$, $OC_2H_5$ or $C_2H_5$.

20. The liquid crystal medium according to claim 1, wherein said medium contains one or more compounds of formulae IC-1 to IC-9 wherein $L^b$ is —CH═$CH_2$, —$CH_2$—CH═$CH_2$, —CH═CH—$CH_3$, —CH═CH—CH═$CH_2$, or —$C(CH_3)$═$CH_2$.

* * * * *